United States Patent [19]

Bryan et al.

[11] 4,093,941

[45] June 6, 1978

[54] SLOPE FEATURE DETECTION SYSTEM

[75] Inventors: Larry Wayne Bryan, Arlington; David Paul Himmel; George William Woster, Jr., both of Dallas, all of Tex.

[73] Assignee: Recognition Equipment Incorporated, Dallas, Tex.

[21] Appl. No.: 749,200

[22] Filed: Dec. 9, 1976

[51] Int. Cl.² .............................................. G06K 9/16
[52] U.S. Cl. ................... 340/146.3 AE; 340/146.3 H; 340/146.3 MA
[58] Field of Search ............. 340/146.3 H, 146.3 AE, 340/146.3 AC, 146.3 AG, 146.3 MA, 146.3 R

[56] References Cited

U.S. PATENT DOCUMENTS

| | | | |
|---|---|---|---|
| 3,303,465 | 2/1967 | Essinger et al. | 340/146.3 AE |
| 3,609,685 | 9/1971 | Deutsch | 340/146.3 AE |
| 3,723,970 | 3/1973 | Stoller | 340/146.3 AG |
| 3,735,349 | 5/1973 | Beun et al. | 340/146.3 H |
| 3,987,412 | 10/1976 | Morrin | 340/146.3 AE |

OTHER PUBLICATIONS

Freeman, "Computer Processing of Line-Drawing Images" ACM Computing Surveys, vol. 6, No. 1, Mar. 1974, pp. 57-97.

*Primary Examiner*—Leo H. Boudreau
*Attorney, Agent, or Firm*—John E. Vandigriff; Thomas W. DeMond

[57] ABSTRACT

A character feature detection system is provided for reliably reading non-touching hand printed and multi-font machine printed alphanumeric characters. An information field is scanned by a sensor array, and the sensor responses are digitized to form a binary character image. The image is thinned in one-cell layers as the image boundary and loops internal to the image are traced from boundary point to boundary point. A transition from one boundary point to another is defined by one of eight equally divergent vectors which are indicative of the local slope of a boundary between connected points. The sequence of vectors and their x-ray locations are recorded, and boundary slopes are indicated by a running average of four vectors representative of cell to cell transitions. Character features are detected from the sequence of boundary slopes to form a feature set including circumference counts, maximum and minimum image boundary limits, inflection points and loops. The image boundary is thinned to a one-cell stroke width, and character stops and nodes are located. Each stop arm is traced to identify valid stops, and the slope of each valid stop is determined to complete the feature set. The feature set is formatted and stored in a memory unit for character identification.

14 Claims, 120 Drawing Figures

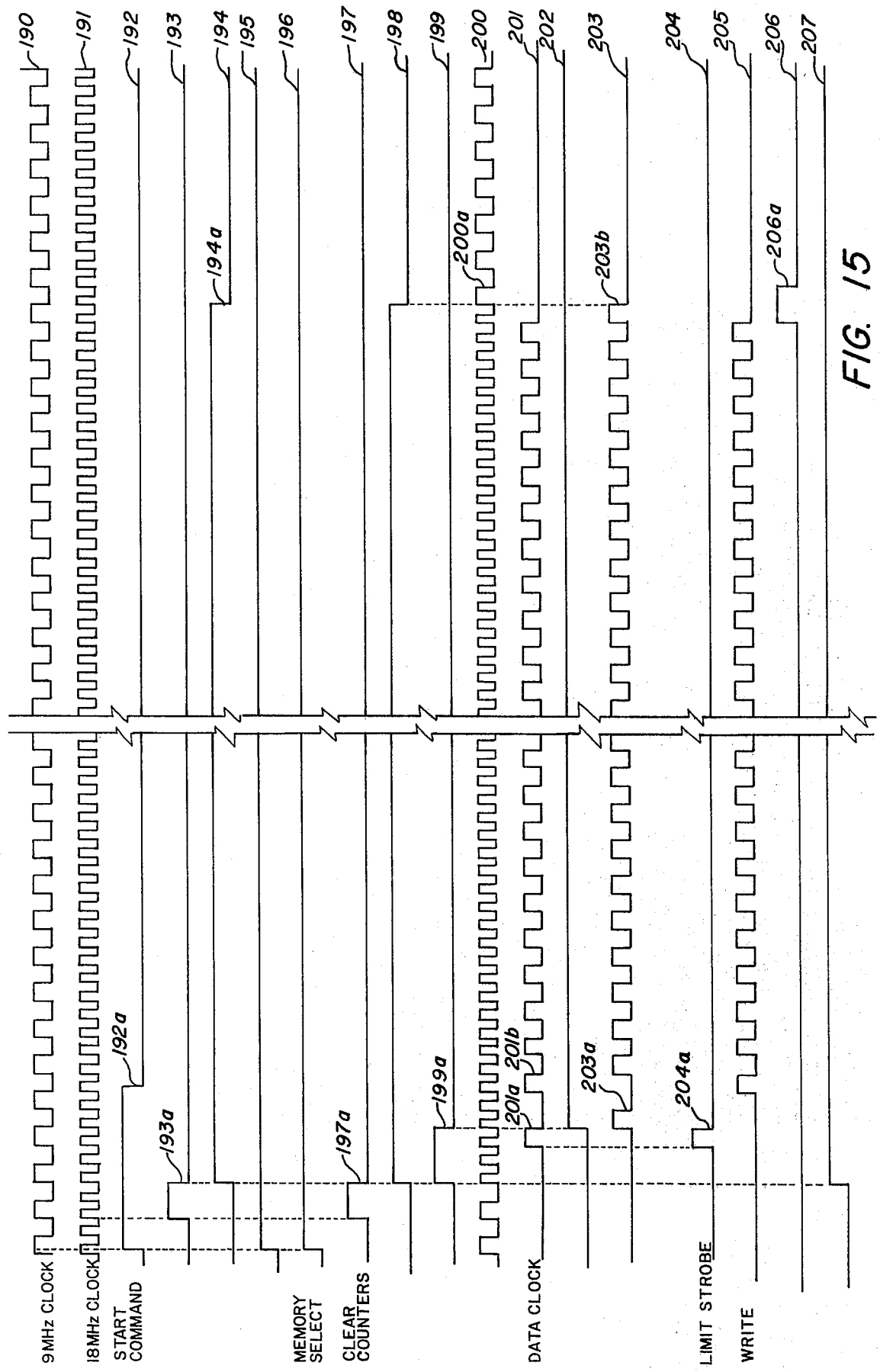

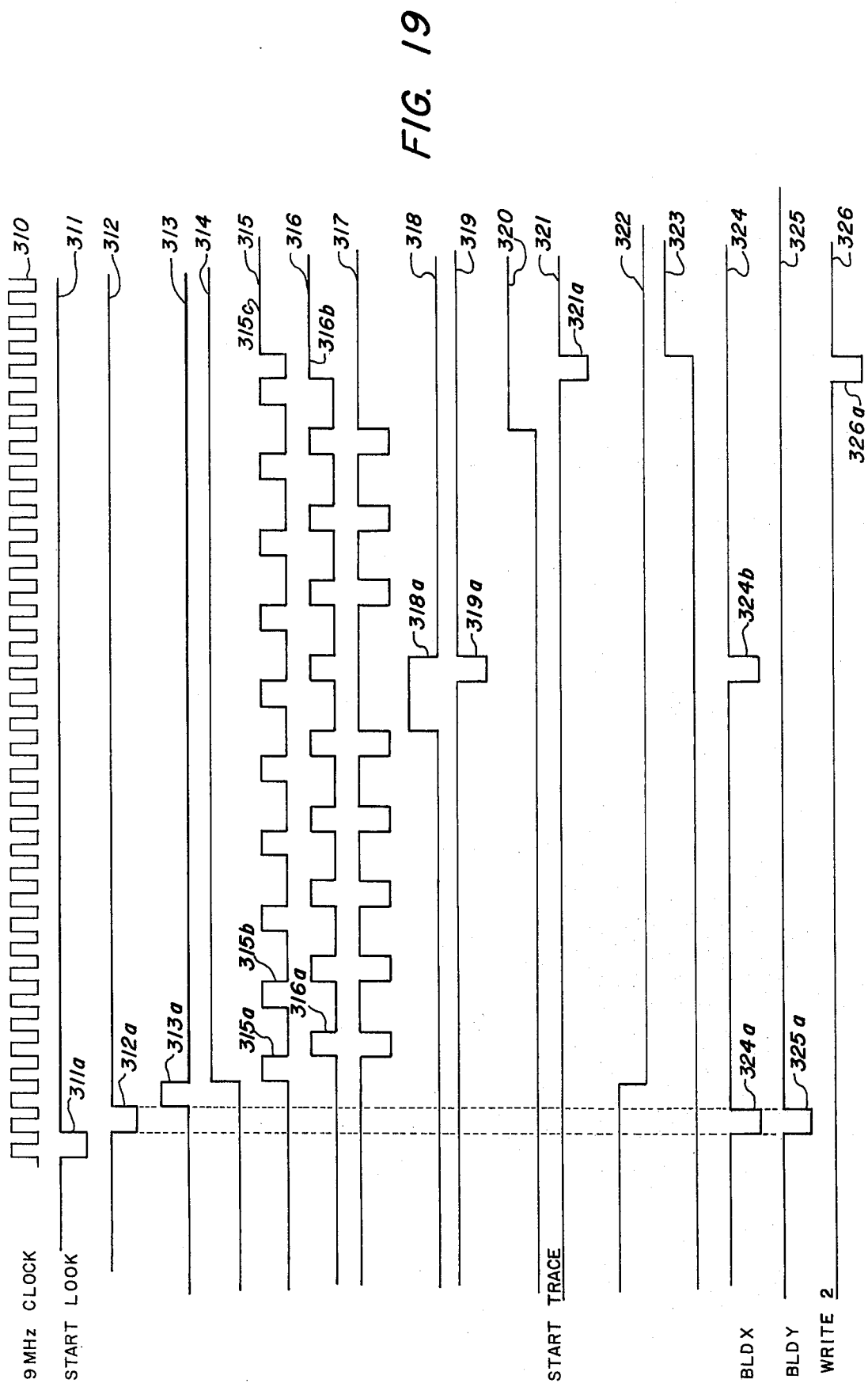

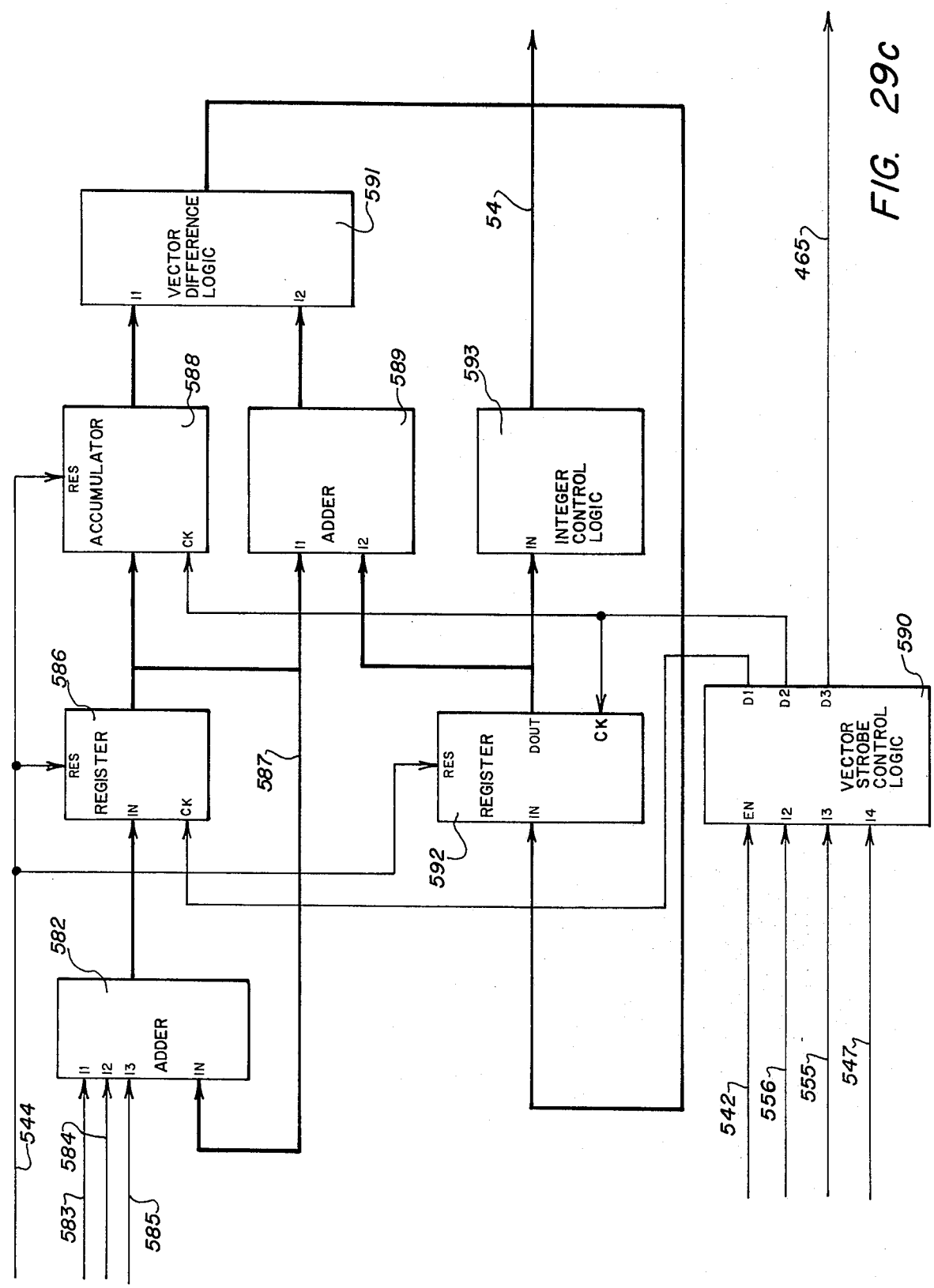

| PA5 | PA6 | PA7 |
|---|---|---|
| PA4 | CNTR CELL | PA0 |
| PA3 | PA2 | PA1 |

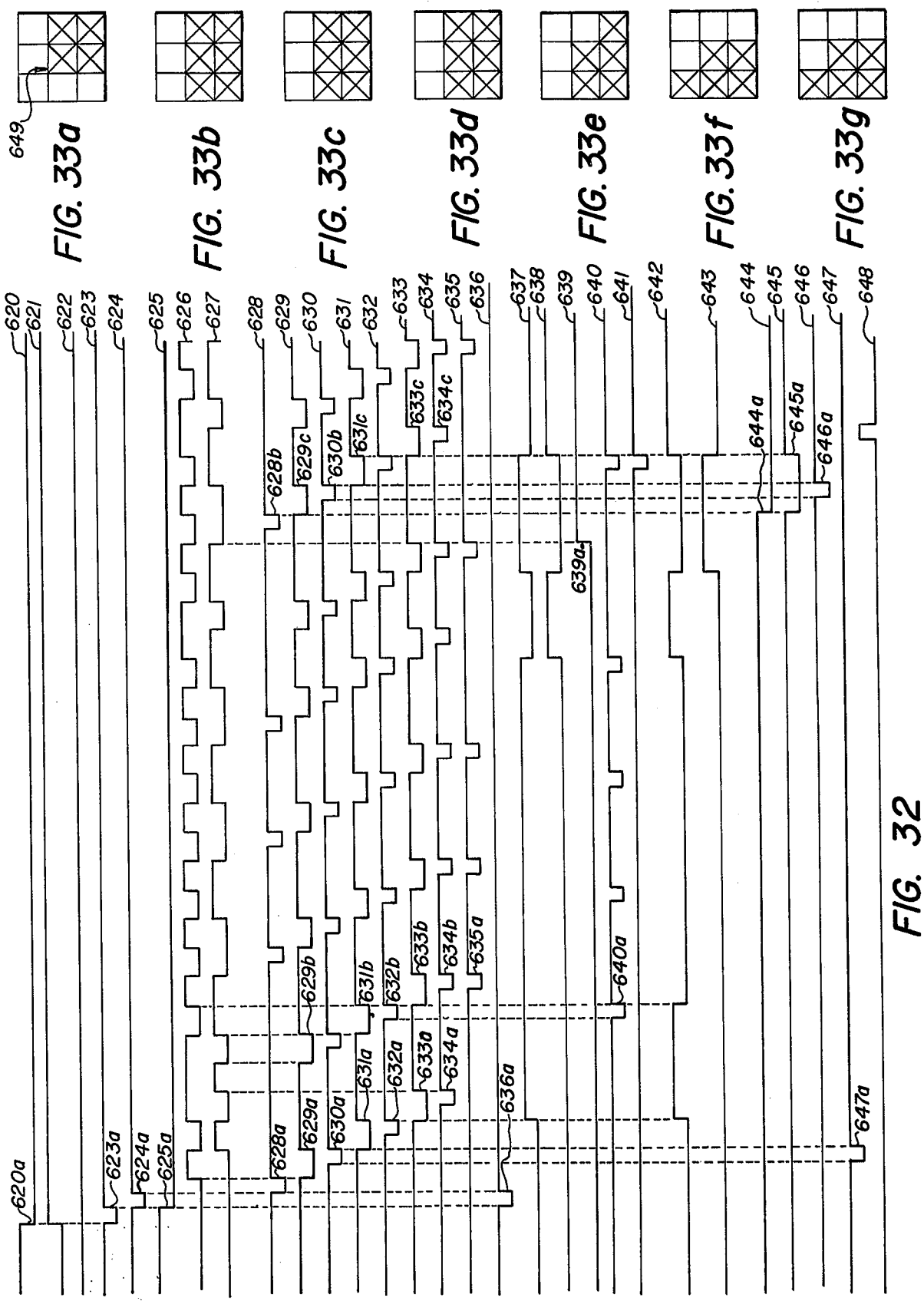

LOGIC STATE ONE

SLOPE FEATURE DETECTION SYSTEM

FIELD OF THE INVENTION

The invention relates to the automatic reading of both machine printed and hand-printed characters, and more particularly to a character feature detection system using a contour tracing to perform a character stroke thinning while detecting slope indicia representative of the character.

PRIOR ART

Commercial institutions handle a high volume of commercial forms, records and mail pieces daily. Each of the printed forms must be classified and sorted for further processing. In order to meet the daily demand economically, the commercial institutions have turned to automated character recognition systems.

The commercial environment requires a recognition system to read both hand printed and multi-font machine printed documents. Further, the reliability of the system must be high.

A problem presented to the multi-font reading machines heretofore used has been that of the varying character stylization which may occur in the hand printing of characters. Systems utilizing a particular writing style or having positioning marks, are disclosed in U.S. Pat. Nos. 3,200,373 and 3,858,180.

A widely used method of multi-font reading is template matching in which an input pattern is compared to a stored set of reference patterns, or to selected resistor correlation matrices in which the resistors are arranged in a pattern similar to the character to be recognized as shown in U.S. Pat. No. 3,104,369.

Further a character feature analysis has been employed wherein the contour of a character image is traced and features of the image are isolated for character recognition. Recognition is accomplished by comparing a set of detected features to an ensemble of stored sets for either a unique fit or for a maximum correlation.

Feature detection systems of the type disclosed in U.S. Pat. No. 3,245,036 employ a flying spot scanner to trace the contour of an image boundary. Line endings, inflection points, nodes, and stroke curvatures are detected to identify a character. No thinning occurs.

Systems such as those disclosed in "Model H-8959 Optical Character Reader", by T. Sano and T. Hananoi, Volumn 22, No. 8, Hitachi Review, August 1973; and in U.S. Pat. Nos. 3,846,754 and 3,863,218 employ a thinning means to reduce the character image to a onecell stroke width. No feature detection may be initiated, however, until after the image has been thinned.

Systems of the type disclosed in U.S. Pat. Nos. 3,858,180; 3,587,046 and 3,766,520 have included the classification of character features within fixed zones of a character image.

In systems of the type disclosed in U.S. Pat. No. 3,863,218, complex template networks have been added to the feature detection system.

Feature detection systems of the type disclosed in U.S. Pat. No. 2,928,074 operate upon a character image at the scan rate to detect character features. Before a character may be identified, however, the character features are ordered by noting their proximity to character strokes encountered from scan to scan. Example of systems requiring a piecing together or a chaining of character features after detection include those disclosed in "Model H-8959 Optical Character Reader", by T. Sano and T. Hananoi, Volume 22, No. 8, Hitachi Review, August 1973; and in U.S. Pat. No. 3,863,218.

None of the construction heretofore used have combined the characteristics of accommodating large variations in character size, reliably identifying multi-piece or broken segment characters, and providing for the tracing of both outer boundries and inner loops without substantial redundancy.

The present invention provides a feature detection system for reliably reading both handprinted and machine printed alphanumeric characters. Only minimal user constraints are required for handprinted characters. A binary image of each character is isolated from external dynamic error sources, and thinned in one cell layers while both outer boundaries and inner loops are traced. Redundant trace operations are substantially eliminated. Further, character features are detected during a contour trace and stored in their natural occurring order for correlation with reference feature sets to identify a character. Characters of varying sizes, and multi-piece or broken segment characters are reliably represented for identification. The architecture of the system leads to simplistic logic means of substantially reduced complexity.

SUMMARY OF THE INVENTION

The invention is directed to a character recognition system for reading both hand-printed and multi-font machine printed alphanumerics of varying sizes. More particularly, an unnormalized binary character image is raster scanned to locate a first information cell representative of a mark condition from which the boundary of the character image may be traced. A transition from one boundary point to another is defined by one of eight equally divergent vectors which are indicative of the local slope of the boundary between connected boundary points. The outer boundary of the character image is traced, and additional mark conditions are recorded in the order detected. The sequence of vectors and their locations also are recorded to completely described the boundary. Upon completing the outer boundary trace, the image is again scanned from the first mark condition until a mark condition is detected which has not been recorded. An inner loop boundary trace is initiated from the unrecorded mark condition, and the sequence of inner loop vectors and vector coordinates is stored. To overcome local anomalies, vectors representing cell to cell moves are averaged in groups of four to provide a sequence of boundary slopes. Slope features including circumference counts, maximum and minimum image boundary limits, loops and inflection points are detected from the slope sequence.

The image thereafter is thinned to a one-cell stroke width, and stops and nodes are located. Each stop arm is traced to detect valid stops, and invalid stops are delected from the character image at the node point. The slope of each valid stop is determined to complete the feature set, which is formatted and stored for character recognition.

In one aspect of the invention, character features are detected and image strokes are thinned in one-cell layers as the outer boundary of the image is traced. The character image thereby remains substantially free of distortion as it is thinned, and character features may be accurately located during a boundary trace.

In another aspect of the invention, the character image is stored in three memory plane units to provide 3 × 3 binary subimages of the character. The center cell of each subimage is a boundary point. A marker memory unit is used in association with the memory plane units to record the progress of a boundary trace, to substantially reduce redundancy and to provide an orderly transition between outer boundary and inner loop traces.

In a further aspect of the invention, multi-piece or broken segment characters appearing in the memory plane units are accommodated. More particularly, all character pieces of a size equal to or greater than a threshold value are traced and the character features thereof are detected.

In a still further aspect of the invention, consecutively occurring inflection points are ignored to obviate errors caused by image boundary aberrations.

DESCRIPTION OF THE DRAWINGS

For a more complete understanding of the present invention and for further objects and advantages thereof, reference may now be had to the following description taken in conjunction with the accompanying drawings in which:

FIG. 15 is a timing diagram illustrating the operation of the row/column control logic unit of FIGS. 14a and 14b;

FIG. 19 is a timing diagram illustrating the operation of the raster scan logic unit of FIG. 18a;

FIG. 20 is a logic flow diagram of the operation of the raster scan logic unit of FIG. 18a;

FIG. 26 is a timing diagram illustrating the operation of the boundary trace logic control unit of FIG. 24a;

FIGS. 29a-29c comprise a functional block diagram of the vector control logic unit of FIG. 10;

FIG. 32 is a timing diagram illustrating the operation of the vector control logic unit of FIG. 29a;

FIGS. 33a-33g are 3 × 3 cell patterns illustrating moves executed in the boundary trace of the numeral three;

FIG. 34 is a timing diagram illustrating the operation of the vector control logic unit of FIG. 29a;

FIGS. 35a-35c are diagrams of 3 × 3 cell images comprising a 24 × 32 cell image of the numeral three;

FIG. 43 is a logic diagram of the command control logic unit of FIG. 14a;

FIG. 44 is a logic diagram of the timing control logic unit of FIG. 14a;

FIG. 45 is a logic diagram of the write control logic unit of FIG. 14a;

FIG. 49 is a logic diagram of the raster scan logic unit of FIG. 18a;

FIG. 51 is a logic diagram of the boundary trace logic control unit of FIG. 24a;

FIG. 56 is a logic diagram of the vector enable logic unit of FIG. 29a;

FIG. 57 is a logic diagram of the boundary trace termination logic unit of FIG. 29a;

FIG. 58 is a logic diagram of the vector control logic unit of FIG. 29a;

DESCRIPTION OF PREFERRED EMBODIMENTS

FIG. 1

Figure 1:
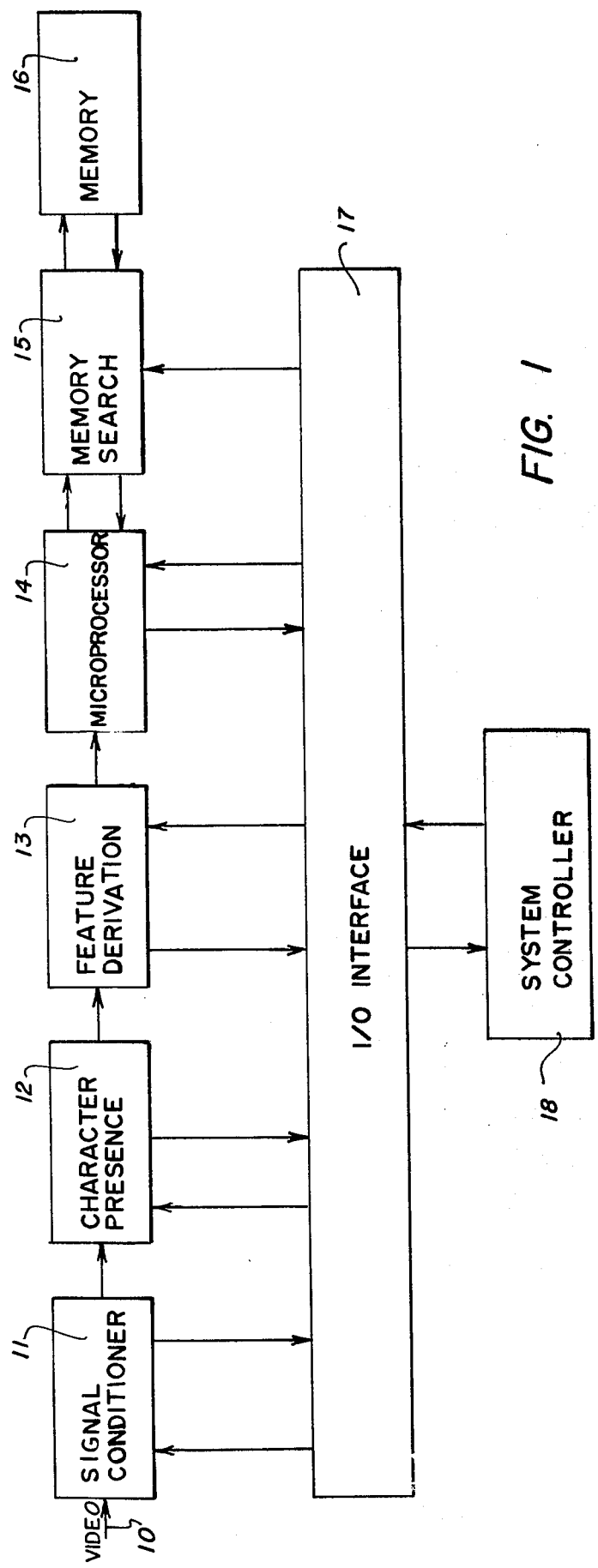
FIG. 1 is a functional block diagram of an optical character recognition system embodying the invention.

FIG. 1 illustrates in functional block diagram form a character recognition system embodying the present invention.

Video data on a data line 10 is received by a signal conditioner 11. The data is filtered, digitized, and formatted. The digitized output of conditioner 11 is applied to a character presence unit 12 which detects the character information, and positions a binary character image within a memory mosaic. A feature derivation unit 13 accesses the memory mosaic to trace the character image boundary, and derive therefrom slope features from which the character may be identified. The features so derived are supplied to a microprocessor 14 which formats the features for a memory search operation. Memory search unit 15 under the control of the microprocessor 14 searches a memory unit 16, and forwards a character recognition signal to the microprocessor upon finding a match to the formatted features. The microprocessor thereupon issues an interrupt through and I/O interface unit 17 to a system controller 18. Controller 18 then reads a character code stored in memory search unit 15 to identify the character.

The invention described herein is embodied in the feature derivation unit 13, and comprises a system for detecting features of both handprinted and multi-font machine printed characters of nonuniform sizes. The system provides a substantial improvement over prior systems in requiring neither severe printing constraints nor character image normalization. Further, read rates high compared to feature detection systems heretofore used are achieved without compromising the reliability of character recognition.

Figure 4:
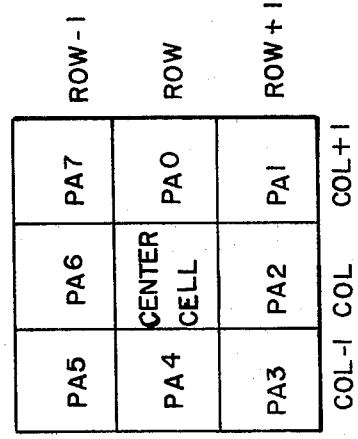
FIG. 4 is a diagram of a central black video cell and surrounding video cells of a 3 × 3 cell subimage of a character memory mosaic.
Figure 3:
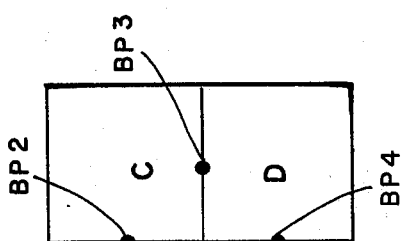
FIG. 3 is a diagram of a black video cell bordered by three adjacent video cells.
Figure 2:
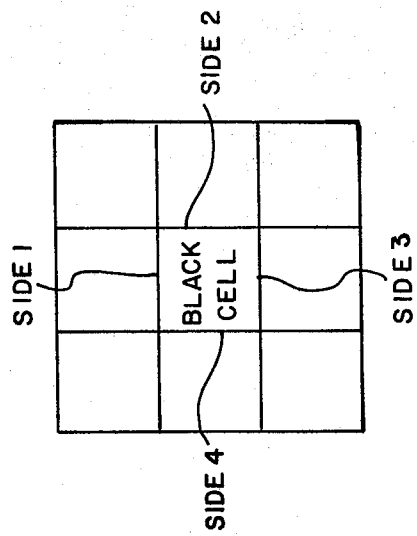
FIG. 2 is a side diagram of a center black video cell within a 3 × 3 cell subimage.
Figure 5A:
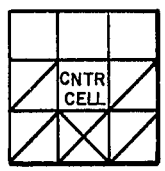
FIGS. 5a-5K, 5m, 5n, and 5p-5r are thinning pattern diagrams for removing boundary cells.
Figure 5B:
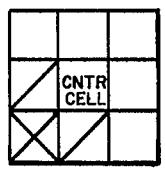
Figure 5C:
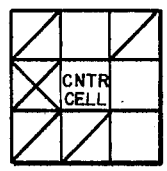
Figure 5D:
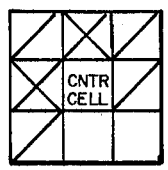
Figure 5E:
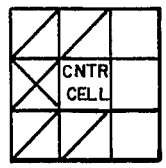
Figure 5F:
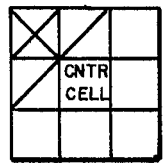
Figure 5G:
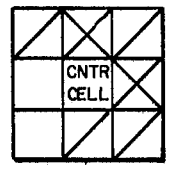
Figure 5H:
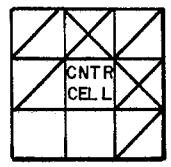
Figure 5I:
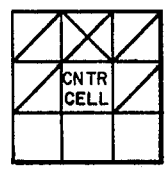
Figure 5J:
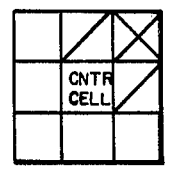
Figure 5K:
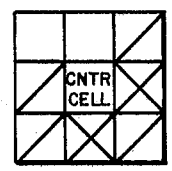
Figure 5M:
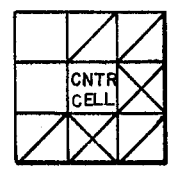
Figure 5N:
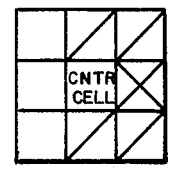
Figure 5P:
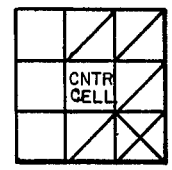
Figure 5Q:
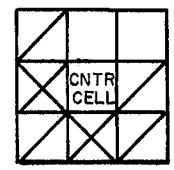
Figure 5R:
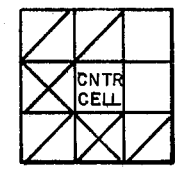
Figure 6A:
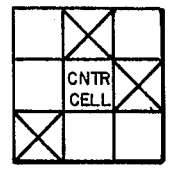
FIGS. 6a-6d are thinning pattern diagrams for removing stops.
Figure 6B:
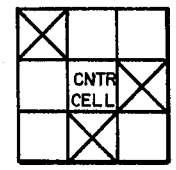
Figure 6C:
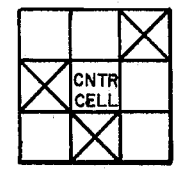
Figure 6D:
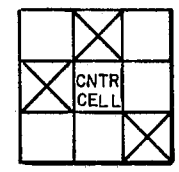

FIGS. 2, 3 and 4

FIG. 2 illustrates the location of sides 1–4 on a black video cell, FIG. 3 illustrates diagrammatically a black video cell bordered by three adjacent image cells, and FIG. 4 illustrates diagrammatically a 3 × 3 cell subimage of a character mosaic.

After data printed on a document surface is illuminated and focused on a sensor array, the sensor cell responses are digitized and evaluated by character presence unit 12 of FIG. 1. If a character is present, a binary character image is transferred to feature derivation unit 13.

The feature derivation process of the present invention involves two basic steps: feature extraction, and feature formatting. Upon receiving a character image from character presence unit 12, the feature derivation unit 13 scans the image to detect a first image boundary point. A boundary trace then is initialized.

Boundary tracing refers to the stepwise process of tracing the edge of a two-dimensional black/white binary image of arbitrary shape and size. A boundary trace is initialized when the row, column coordinates and the starting boundary point of a first detected black cell of the image are defined.

Referring to FIGS. 2 and 3, an initial boundary point BPI may be a center point of one of four cell sides represented by the triplet (column, row, side). Boundary tracing is accomplished by repeatedly scanning image cells adjacent to a current boundary cell such as cell A to detect a new boundary point such as points BP2–BP4. Such scanning occurs in a clockwise sense on an outer boundary of a character image, and in a counterclockwise sense on an inner boundary of a character image.

The initial boundary point BPI is located on a side of cell A bordered by a white cell B. The next boundary point may be at one of three locations depending on the state of cells C and D. If cell C is black, the next boundary point is located at point BP2 on the border between cells B and C. If cell C is not black and cell D is black, the next boundary point is located at point BP3 between cells C and D. If both cells C and cell D are white, the boundary point location merely changes to point BP4 at the border between cells A and D. Boundary tracing is accomplished by repeated application of the above stated rules.

During a first boundary trace, the character image is thinned. When a void is encountered, the inside boundary of the void is traced. If the distance around the void is less than a minimum loop circumference parameter, the void is ignored. In addition, vectors defining the discrete movements about the image boundary, and average slopes of the image boundary are determined.

As the boundary tracing proceeds, thinning rules as represented by Equation Q1 are applied to each image cell encountered.

$$X = \overline{PA5}\,\overline{PA6}\,\overline{PA7}(PA2 + PA3\,\overline{PA0}\,\overline{PA1}) + PA4$$
$$PA6\,\overline{PA1}\,(\overline{PA0} + \overline{PA2}) + \overline{PA0}\,\overline{PA1}\,\overline{PA7}(PA4$$
$$+ PA5\,\overline{PA2}\,\overline{PA3}) + PA0\,PA6\,\overline{PA3}\,(\overline{PA2} +$$
$$\overline{PA4}) + \overline{PA1}\,\overline{PA2}\,\overline{PA3}\,(PA6 + PA7\,\overline{PA4}\,\overline{PA5})$$
$$+ PA0\,PA2\,\overline{PA5}\,(\overline{PA4} + \overline{PA6}) + \overline{PA3}\,\overline{PA4}\,\overline{PA5}$$
$$(PA0 + PA1\,\overline{PA6}\,\overline{PA7}) + PA2\,PA4\,\overline{PA7}\,(\overline{PA0}$$
$$+ \overline{PA6}) \quad (Q1)$$

A bar appearing above a term of Equation Q1 indicates a logical complement of that term. Terms appearing side-by-side or separated by parenthesis indicate a logic AND operation, and a plus sign indicates a logic OR operation. The terms PA0–PA7 refer to image cells surrounding a central black cell of a 3 × 3 subimage as illustrated in FIG. 4. The locations of the central black cell, and the cells PA0–PA7 relative to the black cell are indicated by the row, column coordinates.

FIGS. 5, 6 and 7

FIGS. 5a–5k, 5m, 5n, and 5p–5r illustrate diagrammatically 3 × 3 cell thinning patterns according to Equation Q1. FIGS. 6a–6d illustrate 3 × 3 cell thinning patterns for removing stops, and FIGS. 7a-7e illustrate the moves which may be taken between boundary points during a boundary trace.

Referring to FIGS. 5 and 6, each thinning pattern includes a black center cell and eight adjoining image cells. The letter x indicates that a cell is black, a blank indicates that a cell is white, and a slash mark indicates that either a black or a white cell may occur. As the boundary trace proceeds from boundary point to boundary point, the 3 × 3 cell mosaic of each boundary point is compared to the thinning patterns of FIG. 5. If a match occurs, the corresponding boundary cell is removed.

Exceptions to Equation Q1 may indicate that the end of a character stroke or stop has been encountered. In that event, a comparison is made with the patterns of FIG. 6. If a match occurs, the stop is removed.

Figure 7A:
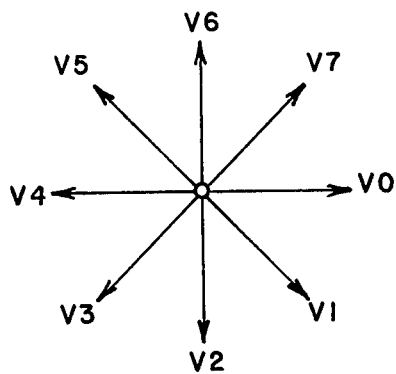
FIGS. 7a-7e are move direction diagrams illustrating transfers which may be taken between boundary points during a boundary trace.
Figure 7B:
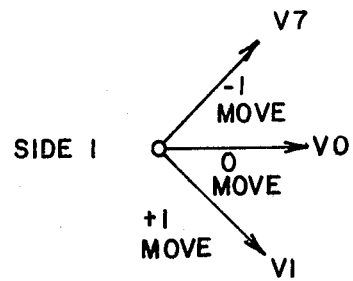

The boundary trace operation is comprised of discrete movements from boundary point to boundary point. Each move may be described by one of a set of eight equally divergent vectors as illustrated in FIG. 7a. The eight vectors V0-V7 are each separated from adjacent vectors by 45° and emanate from a common boundary point of an image cell. Such vectors represent all possible moves which may occur from a boundary point during a boundary trace. The moves which may be taken are further dependent upon the side of cell from which a move is to occur.

Referring to FIGS. 7b-7e, it is seen that when the logic decision flow is at a boundary point located on side 1 of an image cell, the logic decision flow may make one of three transfers or moves. If a minus one move is made, the logic decision flow transfers from side 1 of a current center cell to side 4 of an adjacent PA7 cell. If a zero move is made, the logic decision flow transfers to side 1 of an adjacent PA0 cell. Further, a transfer to side 4 of an adjacent PA0 cell occurs if a plus one move is made.

Figure 7C:
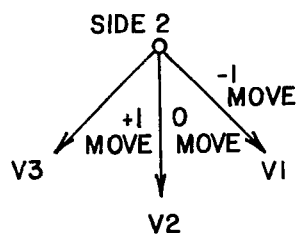
Figure 7D:
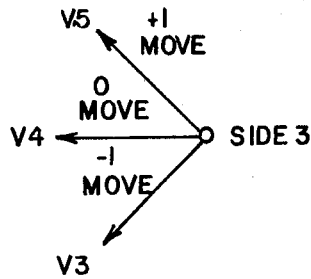
Figure 7E:
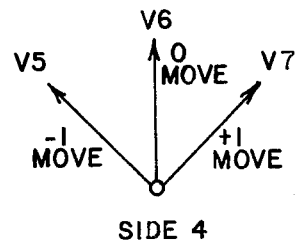

FIGS. 7c-7e further illustrate the direction of each possible move from a side 2, side 3 or side 4 of a center cell, respectively. In each case, a vertical or horizontal move is referred to as a zero move. A move to the right of the zero move is referred to as a plus one move, and a move to the left of a zero move is referred to as a minue one move.

The process of moving from boundary point to boundary point may be represented by the logic Equations Q2-Q9:

| Increment Column and Decrement row | = Side1 * PA7 | (Q2) |
| Incrememt Column | = Side1 * /PA7 * PA0 | (Q3) |
| Increment Column and Incrememt row | = Side2 * PA1 | (Q4) |
| Increment row | = Side2 * /PA1 * PA2 | (Q5) |
| Decrement Column and Increment row | = Side2 * PA3 | (Q6) |
| Decrement Column | = Side3 * /PA3 * PA4 | (Q7) |
| Decrement Column and Decrement row | = Side4 * PA5 | (Q8) |
| Decrement row | = Side4 * /PA5 * PA6 | (Q9) |

Equations Q3, Q5, Q7 and Q9 represent zero moves, Equations Q2, Q4, Q6 and Q8 represent minue one moves. Conditions not satisfying equations Q2-Q9 indicate that a plus one move is to be taken. The appearance of an asterisk in Equations Q2-Q9 represents a logic AND operation, and the appearance of a slash mark represents the absence of a logic one. In Equation Q2, for example, if the logic flow is presently located at side 1 of a center cell, and cell PA7 is a logic one, the logic flow decision will proceed to the cell PA7 represented by an increment in the Column-coordinate and a decrement in the row-coordinate. Equation Q3 describes the criteria for proceeding from a center cell to a cell PA0 which is reached by incrementing the column coordinate. Such transfer occurs if the logic flow is presently at side 1 of the center cell, and cell PA7 is not a logic one when cell PA0 is black as indicated by a logic one level.

As before described, vectors defining the discrete moves between boundary points are determined during a boundary trace. A sequence of vectors, however, is susceptible to local variations. Sensitivity to local anomalies can be overcome by averaging the consecutive vectors over a boundary length to provide an average boundary slope rounded to the nearest integer. The location of the slope is taken to be the location of the last vector in the vector sequence averaged.

FIGS. 8-9

Figure 8:
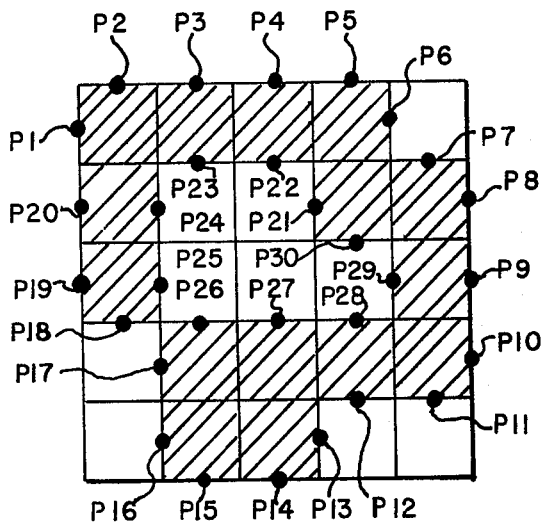
FIG. 8 is a diagrammatic illustration of the boundary points encountered in the tracing of a letter O.
Figure 9:
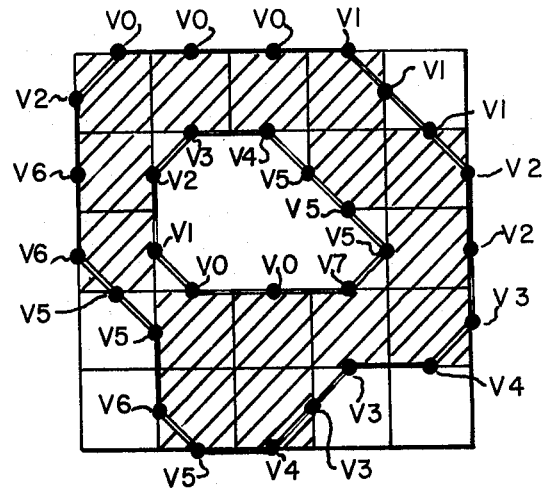
FIG. 9 is a diagrammatic illustration of vectors indicating the moves taken in transferring between the boundary points of FIG. 8.

FIGS. 8 and 9 illustrate diagrammatically the tracing of the inner and outer boundaries of the letter O, and the positions of the vectors generated during a boundary trace, respectively.

Referring to FIG. 8, a first boundary point P1 is located from a raster scanning of a 24 × 32 bit memory mosaic within which the binary image of the letter O is centered. The image first is traced along the outside in a positive or clockwise direction from boundary point P1, through boundary point P20, and returning through boundary point P1 to boundary point P4. The raster scan then is continued from point P1 until another boundary point P21 is located. The inner boundary of the image then is traced from boundary point P21 in a negative or counterclockwise direction through boundary point P30, and returning through boundary point P21 to boundary point P24.

Referring to FIG. 9, the moves as described by the vector notations V0-V7 are shown for both the outside boundary trace and the inside boundary trace. As before described, each of the vectors indicates the direction of a move taken from a boundary point. In determining the boundary slopes, each of the vectors is assigned a value. More particularly, vectors V0-V7 are assigned the values 0-7, respectively. To eliminate small anomalies in the contour of a character, vectors representing a move from one cell to another cell (cell to cell moves) are averaged to provide a slope value. Those vectors representing a move from one side of a cell to a second side of the same cell (side to side moves), however, are not included in the average. A problem arises, however, in determining the slopes at the trace starting points. The initial three boundary points encountered during a boundary trace do not have sufficient antecedent vector information to determine an average slope. Further, a transition from vector V0 to vector V7 or from vector V7 to vector V0 represents a break in the numbering of adjacent vectors which leads to errors in the determination of average slopes. These errors are obviated by continuing a boundary trace three cell to cell moves beyond its end point, and allowing the vector values to progress beyond 0 in a negative direction for a loop or beyond 7 in the positive direction for an outer boundary.

The average slopes at each of the outer boundary points of FIG. 8 are determined from a running average of four vectors as tabulated in Table 1. More particularly, the sum of a current vector value and the last three vector values all representing cell to cell moves is divided by four. The average is incremented if a remainder of two or greater occurs.

TABLE 1

OUTER BOUNDARY TRACE

| Boundary Point | Vector Value | Average Slope |
|---|---|---|
| P1 | Initalization | N/A |
| P2 | 0 | N/A |
| P3 | 0 | N/A |
| P4 | 0 | N/A |
| P5 | 1 | N/A |
| P6 | 1 | 0 |
| P7 | 1 | N/A |
| P8 | 2 | 1 |
| P9 | 2 | 1 |
| P10 | 3 | 2 |
| P11 | 4 | N/A |
| P12 | 3 | 3 |
| P13 | 3 | N/A |
| P14 | 4 | 3 |
| P15 | 5 | N/A |
| P16 | 6 | 4 |
| P17 | 5 | 5 |
| P18 | 5 | N/A |
| P19 | 6 | 5 |
| P20 | 6 | 6 |
| P1 | 7 | N/A |
| P2 | 8 | 6 |
| P3 | 8 | 7 |
| P4 | 8 | 8 |

The average slope at each inner boundary point of FIG. 8 which represents a cell to cell move is listed in Table 2.

TABLE 2

INNER BOUNDARY TRACE

| Boundary Point | Vector Value | Average Slope |
|---|---|---|
| P21 | +5 | N/A |
| P22 | +4 | N/A |
| P23 | +3 | N/A |
| P24 | +2 | +4 |
| P25 | +1 | +3 |
| P26 | 0 | +2 |
| P27 | 0 | +1 |
| P28 | −1 | 0 |
| P29 | −3 | −1 |
| P30 | −3 | N/A |
| P21 | −3 | −2 |
| P22 | −4 | −3 |
| P23 | −5 | −4 |
| P24 | −6 | −5 |

As before described, each of the slopes are determined by adding the value of a current cell to cell vector to the vector values of three immediately preceding cell to cell vectors, and dividing the sum by 4. By way of example, the slope at boundary point P2 occurs at a transition between V7 and V0. Thus, although the vector direction as illustrated in FIG. 9 indicates a V0 vector, a value of 8 is assigned to the vector. In addition, values of 8 are assigned to the vectors at the boundary points P3 and P4. The slope value at boundary point P2 thus may be represented by the term (8 + 6 + 6 + 5) divided by 4. Rounding off to the nearest integer, the average slope at boundary point P2 has a value of 6.

In tracing the inner boundary of the letter O as illustrated in FIGS. 8 and 9, a transition between the vector V0 and the vector V7 occurs at boundary point P28. The slope at boundary point P28 thus may be represented by the term (1 + 0 + 0 − 1) divided by 4. Rounding off to the nearest interger, the average slope at boundary point P28 has a value of 0.

The vector values and slope sequences generated in the tracing of character image boundaries represent fundamental measurements from which other features may be derived. Many characters can be recognized from the sequence of average slopes which indicate an inflection point when the slope values change from monotonically increasing to decreasing values, or from monotonically decreasing to increasing values. Straight lines can be identified from a sequence of near constant average slopes and stops and sharp corners may be identified by rapid and unidirectional changes in the slope sequence.

Many characters possess a unique inflection point sequence, and can be separated from all other characters by specifying the maximum and minimum slopes representing the inflection points and the order of their occurrence. The row and column coordinates of an average slope of an inflection point may distinguish characters. For example, the inflection sequence of sans-serifs J and U are identical, but the characters are obviously different because the left arm of the J does not project to the top of the letter. This difference is easily detected by noting the maximum row coordinate of a slope in the left arm of the character. Those character classes that cannot be separated by an inflection sequence are usually grouped with similar characters. For example, a sans-serif D has a slope sequence identical to that of the letter O. Neither have any inflection points. In such cases, additional features to be described are required for recognition.

Upon completing the initial boundary trace and detecting the vectors, average slopes, and character features characterized by the vector and slope sequences, a second boundary trace is initiated to thin the character image to a one-cell stroke width.

During the second boundary trace, the thinning rules represented by equation Q1 are applied to each image cell that is encountered. When an image cell is thinned, the next occurring image cell becomes the ending point after it has been encountered a second time. In this manner, a character image may be thinned in one-cell layers until a complete boundary trace occurs during which no image cell is thinned. In addition to the thinning process, each image cell that is not thinned is checked for the occurrence of a single adjacent black cell to detect a stop.

Upon completing the second boundary trace and saving the row, column coordinates of each detected stop, a third boundary trace is initiated. Each stop arm in the character image is traced from the previously saved row, column stop coordinates. A trace is completed when either a minimum threshold of moves have occurred or a node is encountered. The occurrence of nodes or line intersections is indicated when an image cell of a thinned image is detected which has more than two adjoining image cells. After four cell-to-cell moves, the average slope of the four moves is recorded as the stop slope. At the end of a stop trace, the length of the stop arm is compared to a minimum length threshold to qualify as valid. If a stop arm is too short to qualify, then it must be broken from the rest of the image at the junction of the short arm and the node. Otherwise the node may cause other stops to prematurely end at an invalid node, thereby resulting in a loss of vital feature information.

When the feature set is complete, the features are formatted and stored for character recognition.

FIG. 10

Figure 10:
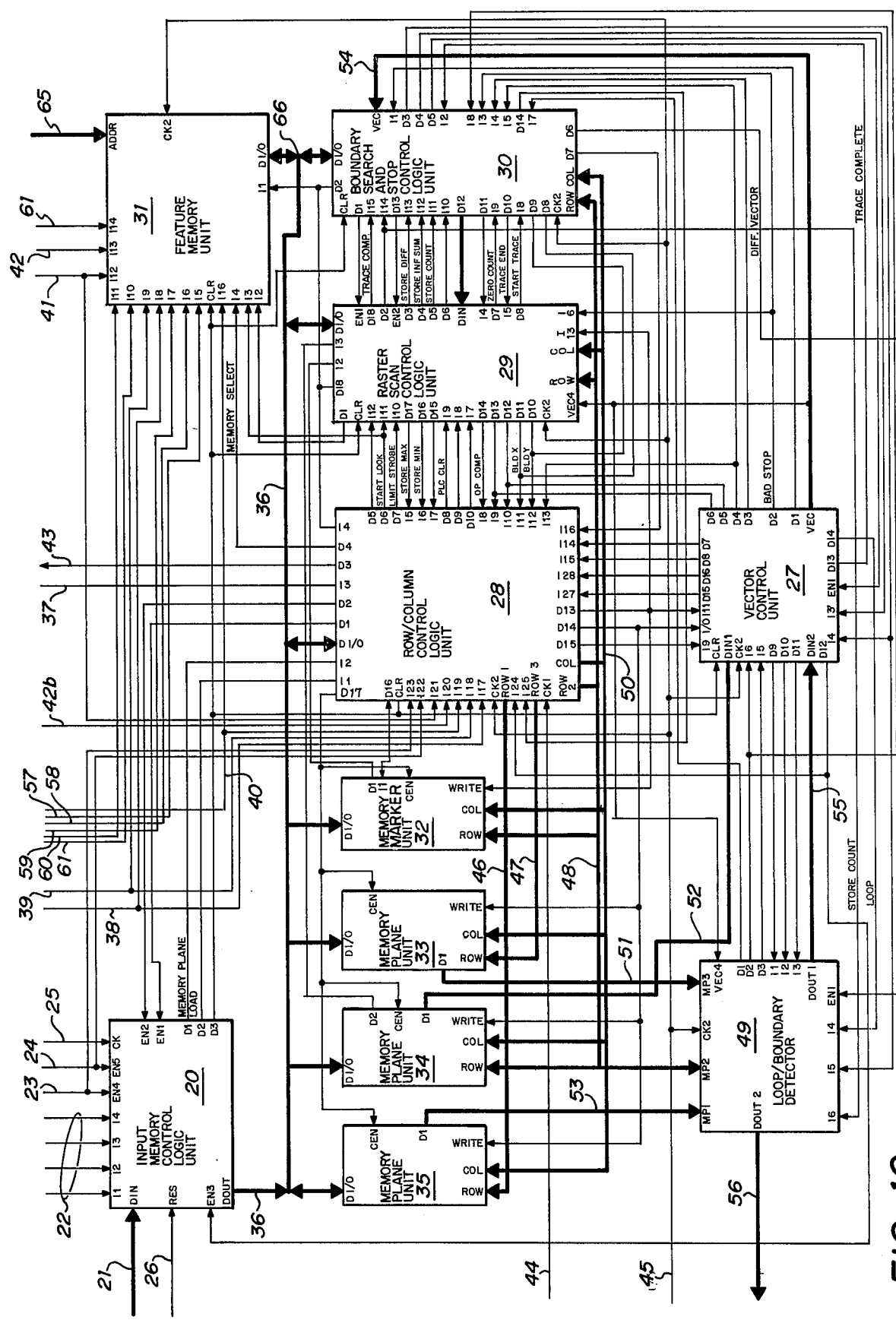
FIG. 10 is a functional block diagram of the feature derivation system of FIG. 1.

FIG. 10 illustrates in functional block diagram form the feature derivation unit 13 of FIG. 1.

Binary character image data is received at the DIN input of an input memory control logic unit 20 by way of a 24 bit data cable 21 leading from an output of the character presence unit 12 of FIG. 1. Data inputs from the microprocessor 14 are received by way of data lines 22 at the I1-I4 inputs of logic unit 20. The microprocessor also supplies control inputs to control lines 23 and 24 leading to the EN4 and EN5 enable inputs, respectively, of logic unit 20. The microprocessor in addition supplies a 1.0 MHz clock signal by way of a control line 25 to the clock input of logic unit 20. The reset input to logic unit 20 is connected by way of a control line 26 to an output of the I/O interface unit 17 of FIG. 1, and the EN3 enable input of the logic unit is connected to the D12 output of a vector control logic unit 27. The EN1 and EN2 enable inputs to logic unit 20 are connected to the D1 and D2 outputs, respectively, of a row/column control logic unit 28.

The D1 and D2 outputs of logic unit 20 are connected to the I2 and I1 inputs, respectively, of logic unit 28. The D3 output of logic unit 20 is connected to the clear input of logic unit 28, to the clear unit of control unit 27, to the clear input of a raster scan control logic unit 29, to the clear input of a boundary search and stop control logic unit 30, and to the clear input of a feature memory unit 31. The DOUT output of logic unit 20 is connected to a 24 bit data cable 36 leading to the DI/O inputs of logic units 28-30, memory unit 31, marker memory unit 32, and memory plane units 33-35.

The I3 input of logic unit 28 is connected to a control line 37 leading to a data clock output of character presence unit 12. The I4 input to logic unit 28 is connected to the D18 output of logic unit 29, to the D2 output of logic unit 30, and to the I1 input of memory unit 31. The I5-I7 inputs of logic unit 28 are connected to the D17, D16, D15 outputs, respectively, of logic unit 29. The I8-I12 inputs to logic unit 28 are connected to the D14, D13, D12, D11 and D10 outputs, respectively, of logic unit 29. The I13-I15 inputs to logic unit 28 are connected to the D4, D7 and D8, outputs respectively, of logic unit 27. The I16 input to logic unit 28 is connected to the D7 output of logic unit 30. The I17-I19 inputs to logic unit 28 are connected to control lines 38-40 leading from microprocessor 14 of FIG. 1. The I20 and I21 inputs of logic unit 28 are connected to control lines 42b and 41, respectively, leading to the microprocessor 14. The I22 and I23 inputs of logic unit 28 are connected to lines 24 and 23, respectively. The I24 input to logic unit 28 is connected to the D12 output of logic unit 27, and the I25 input to the logic unit 28 is connected to the D14 output of logic unit 30. The I27 and I28 inputs to logic unit 28 are connected to the D15 and D16 outputs, respectively, of logic unit 27. The CK1 clock input to logic unit 28 is connected by way of a control line 44 to a 55 nanosecond clock signal supplied by the I/O Interface unit 17 of FIG. 1. The CK2 clock input to logic unit 28 is connected to a control line 45 leading to a 110 nanosecond clock signal output of I/O interface unit 17.

The D3 output of logic unit 28 is connected by way of a control line 43 to an input of the character presence unit 12 of FIG. 1. The D4 output of logic unit 28 is connected to the I4 input of memory unit 31, the D5 output is connected to the I12 input of logic unit 29, the D6 output is connected to the I11 input of logic unit 29, and the D7 output is connected to the I10 input of logic unit 29. The D8 output of logic unit 28 is connected to the I9 input of logic unit 29, and the D10 output is connected to the I7 input of logic unit 29. The D13 output of logic unit 28 is connected to the I11 input of logic unit 27, the D14 output is connected to the I10 input of logic unit 27, and the D15 output is connected to the I9 input of control unit 27. The D16 output of logic unit 28 is connected to the I1 input of marker memory unit 32. The D17 output of logic unit 28 is connected to the CEN column enable inputs of units 32-35. The row 1 output of logic unit 28 is applied to a five bit data cable 46 leading to the row input of memory plane unit 35, and the row 3 output of the logic unit is applied to a five bit data cable 47 leading to the row input of memory plane unit 33. The row 2 output of logic unit 28 is applied to a five data cable 48 leading to the row inputs of logic units 29 and 30, to the row input of memory unit 32, to the row input of memory plane unit 34, and to the MP2 input of a loop/boundary detector 49. The COL output of logic unit 28 is applied to a five bit data cable 50 leading to the COL inputs of logic units 29 and 30, to the COL input of memory unit 32, and to the COL inputs of memory plane units 33-35.

The write enable input of memory unit 32 is connected to the D13 output of logic unit 28, and the write enable inputs of memory plane units 33-35 are connected to the D14 output of logic unit 28. The D1 output of memory plane unit 33 is applied to a three bit data cable 51 leading to the MP3 input of detector 49, and the D1 output of plane unit 34 is applied to a three bit data cable 52 leading to the DIN1 input of logic unit 27. The D2 output of memory plane unit 34 is connected to the I3 input of logic unit 29. The D1 output of memory plane unit 35 is applied by way of a three bit data cable 53 to the MP1 input of detector 49.

The CK2 clock input of logic unit 29 is connected to control line 45, and to the CK2 inputs of logic unit 30 and memory unit 31. The I2 input to logic unit 29 is connected to the D1 output of marker memory unit 32, and the I3 input to the logic unit is connected to the D2 output of memory plane unit 34. The I4 input to logic unit 29 is connected to the D11 output of logic unit 30, and the I5 input to logic unit 29 is connected to the D10 output of logic unit 30. The I6 input to logic unit 29 is connected to the D2 output of logic unit 27, and to the I3 input of logic unit 30. The I11 input to logic unit 29 also is connected to the I3 input of memory unit 31. The VEC4 input to logic unit 29 is connected to the VEC output of logic unit 27, and to the VEC4 input to detector 49.

The D1 output of raster scan logic unit 29 is connected to the I2 input of memory unit 31, and the D2 output of logic unit 29 is connected to the I14 input of logic unit 30 and to the I6 input of detector 49. The D3 output of logic unit 29 is connected to the I13 input of logic unit 30, and the D4 output of logic unit 29 is connected to the I12 input of logic unit 30. The D5 output of logic unit 29 is connected to the I11 input of logic unit 30, and the D6 output of logic unit 29 is connected to the I10 input of logic unit 30. The D7 output of logic unit 29 is connected to the I9 input of logic unit 30, and the D8 output of logic unit 29 is connected to the I8 input of logic unit 30. The D10 output of logic unit 29 also is connected to the D9 output of logic unit 30, and the D11 output of logic unit 29 in addition is connected to the D8 output of logic unit 30. The D12 output of logic unit 29 further is connected to the D5 output of logic unit 27, and the D13 output of logic unit 29 also is connected to the D6 output of logic unit 27.

The VEC input to logic unit 30 is connected by way of a six bit data cable 54 to the VEC output of logic unit 27. The I1 input to logic unit 30 is connected to the D1 output of logic unit 27, and the I2 input to logic unit 30 is connected to the D13 output of logic unit 27. The I4 input to logic unit 30 is connected to the D3 output of logic unit 27, and the I5 input to logic unit 30 is connected to the D4 output of logic unit 27 and to the I13 input of logic unit 28. The D14 output of logic unit 30 is connected to the I25 input of logic unit 28. The I7 input to logic unit 30 is connected to the D1 output of detector 49. The I8 input to the logic unit 30 is connected to the D2 output of detector 49, and to the I6 to logic unit 27. The I14 input to logic unit 30 also is connected to the I6 input of detector 49.

The D3 output of logic unit 30 is connected to the I4 input of logic unit 27 and to the I5 input of detector 49. The D4 output of logic unit 30 is connected to the I3 input of logic unit 27. The D5 output of logic unit 30 is connected to the EN1 enable input of logic unit 27, and the D6 output of logic unit 30 is connected to the EN1 enable input of detector 49. The D7 output of logic unit 30 is connected to the I16 input of logic unit 28, and the D8 output of logic unit 30 is connected to the D11 output of logic unit 29. The D9 output of logic unit 30 is connected to the D10 output logic unit 29, and the D12 output of logic unit 30 is connected to the DIN data input of logic unit 29. The D14 output of logic unit 30 is connected to the I25 input of logic unit 28.

The CK2 clock input of vector control logic unit 27 is connected to line 45, and to the CK2 clock input of detector 49. The I5 input to logic unit 27 is connected to the D3 output of detector 49, and the I6 input to logic unit 27 is connected to the D2 output of detector 49. The D9 output of logic unit 27 is connected to the I1 input of detector 49, and the D10 output of logic unit 27 is connected to the I2 input of detector 49. The D11 output of logic unit 27 is connected to the I3 input of detector 49. The DIN2 input of logic unit 27 is connected by way of a six bit data cable 55 to the DOUT1 output of detector 49. The D12 output of logic unit 27 is connected to the EN3 enable input of input memory control logic unit 20. The D14 output of logic unit 27 is connected to the I4 input of detector 49. The DOUT2 output of detector 49 is applied to an eight bit data cable 56 leading to microprocessor 14 of FIG. 1.

The I3 input to feature memory unit 31 is connected to the D6 output of logic unit 28, and the I5 input to the memory unit is connected to a control line 57 leading to microprocessor 14. The I6 input to memory unit 31 is connected to a control line 58 leading to microprocessor 14, and the I7 input to the memory unit is connected to a control line 59 also leading to the microprocessor 14. The I8 and I9 inputs to memory unit 31 are connected to control lines 38 and 39, respectively. The I10 input to the memory unit is connected to a control line 67 leading to the microprocessor. The I11 input to the memory unit is connected to a control line 60 leading to the microprocessor. The I12 input to memory unit 31 is connected to control line 41, and the I13 input to the memory unit 31 is connected to control line 42. The I14 input to the memory unit is connected to control line 61 leading to microprocessor 14. The ADDR address input to memory unit 31 is connected by way of a twelve bit data cable 65 to outputs of microprocessor 14. The DI/O data input to memory unit 31 is connected to a 24 bit data cable 66 leading to data cable 36.

In operation, the feature derivation system of FIG. 10 is initialized by a command word from the microprocessor 14 which is applied by way of lines 23 and 24 to the input memory control logic unit 20 and to logic unit 28. In addition, microprocessor data appearing on lines 22 is decoded to detect a memory plane load signal which is applied to the I2 input of unit 28.

Upon receiving the load signal, the logic unit 28 issues a PLCCLR (piece loop count clear) signal to the I9 input of raster scan control logic unit 29, and a data request signal to the character presence unit 12 by way of line 43. If the signal on line 39 is a logic one when control unit 28 receives a logic one load signal at its I2 input, the EN1 enable input to logic unit 20 is set to apply the binary character image data on cable 21 to cable 36. The character presence data thereafter is clocked into memory plane units 33–35 by a 9 MHz data clock signal supplied by character presence unit 12 on line 37.

Upon the occurrence of a first data clock pulse on line 37, logic unit 28 issues a limit strobe from the D7 output to store boundary limit information appearing on cable 36 into an internal memory of the logic unit 29. The data clocks occurring thereafter update a row counter of logic unit 28 to load information into the memory plane units 33–35. Marker memory unit 32, however, is loaded with all zeros.

The data loading process continues until 32 rows of data have been loaded into the memory planes. After the character image has been loaded, the logic unit 28 issues a start look signal to the I11 input of logic unit 29. The logic unit 29 in response thereto issues a BLDX and a BLDY signal to the I11 and I12 inputs, respectively, of logic unit 28 to store the limit information received from character presence unit 12 into row and column counters. More particularly, left boundary limit information is stored into a column counter and top boundary limit information is stored into a row counter. A scanning of the data stored in memory plane units 33–35 then is initiated. The raster scan control logic unit 29 scans 32 × 24 bit character images stored in memory plane units 33–35 in a left to right and top to bottom scan. The left to right scan in a row continues until a right limit is detected as defined by the data from the character presence unit. The row counter then is incremented, the column counter is reloaded with the left limit information, and a next row left to right scan is initiated. The scan from the image top to bottom continues until a mark condition is detected. The occurrence of a mark condition indicates that a center cell of a 3 × 3 bit subimage has been detected. This condition is characterized by the appearance of a black center cell with a white cell to the immediate left of the center cell. Upon detecting the mark condition, the row, column coordinates of the center cell are stored in a marker buffer internal to logic unit 29 and in marker memory unit 32. In addition, the logic unit 29 issues a start trace signal to the I8 input of the boundary search and stop control logic unit 30.

Upon receiving the start trace signal, logic unit 30 issues a logic one pulse to the ENI enable input of the vector control logic unit 27. In response thereto, the logic unit 27 issues a reset signal to the I5 input of logic unit 30 to reset a stop control counter. The reset signal also is applied to the I13 input of logic unit 28 to store the row and column counts in an end buffer to indicate a boundary trace end point. Logic unit 27 further initiates a boundary trace and thinning of the character image stored in memory plane units 33–35, and maintains a four vector average of cell to cell moves. Concurrently, the logic unit 28 updates column and row maximum and minimum registers at the end of each move, and the detector 49 maintains a circumference count of the cell to cell moves.

During the boundary trace operation, logic unit 29 detects the number of character segments or pieces encountered and the logic unit 30 detects the differences in the four vector slope averages. The logic unit 30 also accumulates inflection point data and maintains an inflection point count. Upon the occurrence of a zero piece count indicating that no character image has been detected, the logic unit 30 receives a zero count signal from logic unit 29 and issues a difference vector strobe to the EN1 enable input of detector 49 to store the difference vector information into the feature memory unit 31. Logic unit 27 thereupon issues a command to the I3 input of detector 49, to store the current circumference count in feature memory unit 31.

Upon completing a trace of the outer boundary of a character image, the vector control logic unit 27 issues a trace complete signal to the I2 input of logic unit 30. The logic unit 30 in turn issues a logic one signal to the I5 input of detector 49. In response thereto, detector 49 applied threshold criteria to the circumference count to provide an immunity to the occurrence of extraneous character pieces and small holes within a character piece. More particularly, the detector 49 senses the D14 output of logic unit 27 to determine whether a character image or a loop has been traced. If a logic one level is detected, the detector 49 compares the circumference count of the completed trace with the value 15. If the circumference count is greater than or equal to 15, an outer boundary is indicated. If a logic one level is not detected, the detector compares the circumference count with the value 7. If the circumference is greater than or equal to the value 7, a loop is indicated. If the detector 49 indicates that either an outer boundary or a loop has been traced, logic unit 30 issues a logic one pulse to the EN1 enable input of logic unit 27. The logic unit 27 in response thereto initiates a boundary trace to thin the outer boundary of the character image stored in memory plane units 33-35 until a one cell image remains. In addition, logic unit 27 supplies the row/column coordinates of detected stops to cable 54 for storage in a stop memory of logic unit 30.

If neither an outer boundary nor a loop is detected, the I7 input to logic unit 30 remains at a logic zero level, and the logic unit 30 issues a logic one signal to the I5 input of the raster scan control logic unit 29 to end the trace operation. Thereafter, the logic unit 29 initiates a character image scan beginning at the mark condition last detected.

It is to be understood that in a normal operation, a first mark condition is detected on the outer boundary of a character image during a first raster scan. The outer boundary then is traced from the first mark condition, and further mark conditions encountered during the boundary trace are recorded in the marker memory unit 32. Thereafter, the character image is again scanned beginning at the first mark condition. The raster scan continues until a mark condition that has not been recorded in the memory unit 32 is encountered. At that time, another boundary trace is initiated and the process is repeated. In this manner, both outer boundaries and inner loops of a character image may be traced with minimal redundancy.

Upon completing the boundary trace and thinning operation, the vector control logic unit 27 issues a trace complete signal to the I2 input of logic unit 30. In response thereto, logic unit 30 enables a data format controller of the raster scan control logic unit 29 as will be described. If the piece count of logic unit 29 is equal to zero, the format controller issues a logic one signal to the I2 input of feature memory unit 31 to preset the memory unit to the value 63. The format controller further issues a logic one pulse to the I5 input of logic unit 28 to store the column and row maximum information into the feature memory unit 31. The format controller also issues a logic one pulse to the I6 input of logic unit 28 to store the column and row minimum information in memory unit 31. In addition, the format controller issues a logic one pulse to the I6 input of detector 49 to store the circumference count into memory unit 31, and a logic one pulse to the I13 and I12 inputs of logic unit 30 to store the difference vector information and the inflection point coordinates and count into the memory unit 31. The raster scan control logic unit 29 thereafter stores three logic one words into memory unit 31. If the total stop count of logic unit 30 including both valid and invalid stops is equal to zero, the logic unit 29 stores an additional eight words of logic ones into memory unit 31. The all logic one words are placed into the memory unit for data validation purposes.

Upon completing the data format operation, the raster scan control logic unit 29 issues a trace complete signal to the I15 input of logic unit 30. The logic unit 29 also senses the VEC4 input to increment either a character piece or a loop counter to be further described.

The logic unit 30 senses the stop counter. If the stop count is equal to zero, a logic one signal is issued to the I5 input of logic unit 29 to end the trace operation. If the stop count is other than zero, the logic unit 30 vertically orders stop encountered in the previous boundary trace. Upon detecting the uppermost stop of the character image, logic unit 30 stores the row, column coordinates of the stop into both the stop memory and the row and column counters of logic unit 28. The logic unit 30 then issues a logic one pulse to the EN1 enable input of vector control logic unit 27.

The logic unit 27 responds by issuing a logic one signal to the I13 input of logic unit 28 to store the count of the row and column counters into the end buffer. The logic unit 27 thereafter initiates a boundary trace of the character image from the uppermost stop, and continues the trace for four cells unless a node is detected. If a node is detected and the circumference count of detector 49 is less than four as indicated by the D2 and D3 outputs of detector 49, a bad stop signal is issued by the logic unit 27 to the I6 input of logic unit 29 and to the I3 input of logic unit 30. The logic unit 29 deletes the node from the memory plane units 33-35, and the logic unit 30 increments a total stop counter but holds a good stop counter to its current value as will be further described. In addition, the logic unit 27 averages the four vectors generated during the four cell moves, and issues a trace complete signal to the I2 input of of the logic unit 30.

Upon receiving the trace complete signal, logic unit 30 enables the format controller of the raster scan control logic unit 29. The format controller issues a trace complete signal to the I15 input of logic unit 30. If a bad stop is not indicated at the D2 output of logic unit 27 and the circumference count of detector 49 is not less than four, the format controller issues a logic one signal to the I7 input of logic unit 28 to store the column and row coordinates of the end buffer of logic unit 28 into the feature memory unit 31. Logic unit 30 also increments the good stop counter, the stores the last detected vector in an accumulator of logic unit 30 to be further described. The logic unit 30 further detects a next vertically ordered stop, and initiates a boundary trace. The stop arm of each indicated stop of the character image is traced in a like manner.

When all of the detected stops have been traced, the logic unit 30 issues an end of trace signal to the I5 input of logic unit 29. The logic unit 29 thereupon senses the good stop count. If the good stop count is greater than five, the logic unit loads a fourteen into a format counter to be further described. If the good stop count is less than five, the logic unit 29 loads the stop count plus eight into the format counter. The format counter then is enabled to count to a value of 15. Upon the occurrence of a format count of 14, the logic unit 29 issues a logic one signal to the I11 input of logic unit 30 to store the good stop count into the memory unit 31. Upon the occurrence of a format count of 15, the logic unit 29 issues a logic one signal to the I12 input of logic unit 30 to store the accumulated inflection point information into the memory unit 31. Thereafter, the raster scan control logic unit 29 initiates a character image scan beginning at the mark condition last detected. The image scan continues until another mark condition or the bottom limit of the character image is detected. Upon detecting a bottom limit, the logic unit 29 issues an operation complete signal to the I8 input of logic unit 28. In addition, the logic unit 29 stores the character piece and loop counts into the memory unit 31.

Upon receiving the operation complete signal from logic unit 29, logic unit 28 resets the memory control logic unit 20. In response thereto, the microprocessor 14 of FIG. 1 issues a command word on lines 38 and 39 which is decoded at the D4 output of logic unit 28 to select one of two memory units comprising memory unit 31 as will be further described. Thus, the microprocessor may process the information stored in one memory unit while a second memory unit is being filled by the feature derivation system of FIG. 10.

FIG. 11

Figure 11:
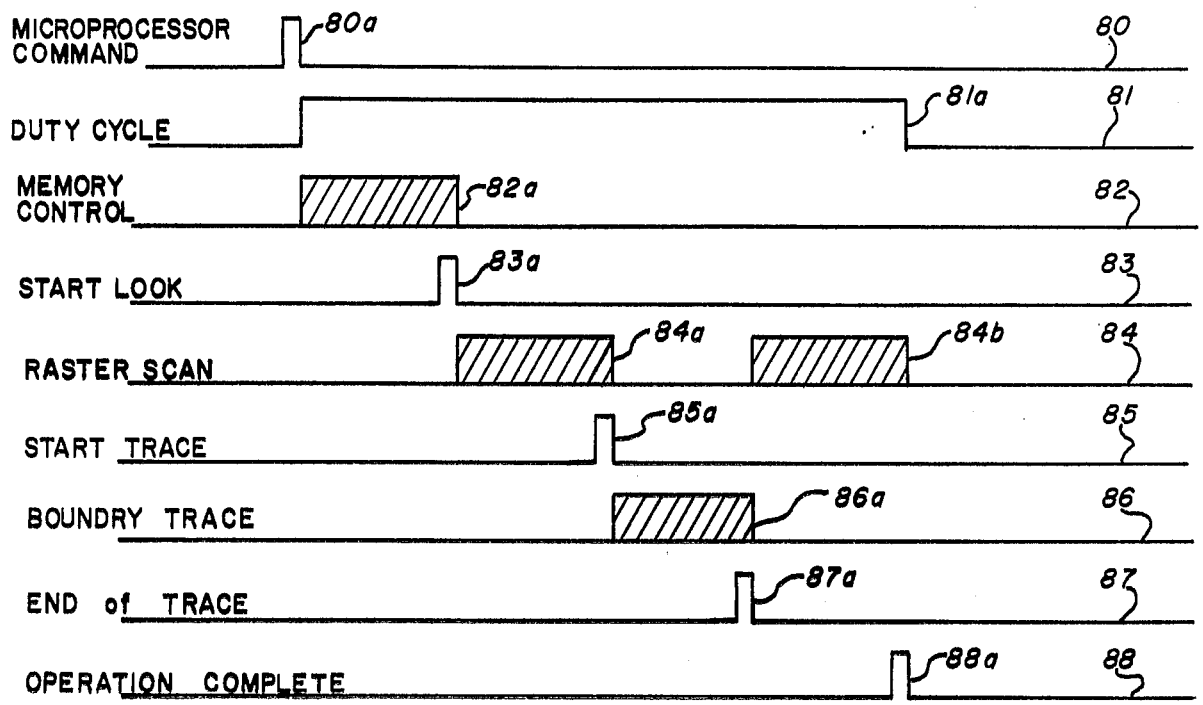
FIG. 11 is a relative timing diagram illustrating the operation of the feature derivation system of FIG. 10.

FIG. 11 is a relative timing diagram illustrating the operation of the feature derivation system of FIG. 10.

A first discrete waveform 80 illustrates a microprocessor output signal initiating the feature derivation operation. A discrete waveform 81 illustrates the duty cycle of the feature derivation system of FIG. 10. A discrete wave form 82 illustrates the duty cycle of the memory control logic unit 20. A discrete waveform 83 illustrates the start look signal from row/column control logic unit 28 initiating a raster scan of a character image stored in memory plane units 33-35. A discrete waveform 84 illustrates the duty cycle of the logic unit 29, and a discrete waveform 85 illustrates the start trace signal issued by the logic unit 29 to the boundary trace and stop control logic unit 30 to initiate a boundary trace. A discrete waveform 86 illustrates the duty cycle of the boundary trace operation, and a discrete waveform 87 illustrates the trace end signal issued by logic unit 30 to logic unit 29 upon completion of a boundary trace. A discrete waveform 88 illustrates the OPCOMP signal issued by logic unit 29 to logic unit 28 upon the completion of a feature derivation operation.

The microprocessor 14 of FIG. 1 issues a logic one pulse 80a of waveform 80 to initiate a feature derivation operation. Upon receiving pulse 80a, the logic unit 20 is enabled to receive data from the character presence unit 12 of FIG. 1. During the time period indicated by the pulse width of pulse 82a of waveform 82, a 24 × 32 bit character image is loaded into memory plane units 33-35. Upon completing the load operation, logic unit 28 issues a start look signal as illustrated by pulse 83a to the logic unit 29 and to the feature memory unit 31. Immediately thereafter, logic unit 29 initiates a scan of the memory plane units as illustrated by the pulse 84a of waveform 84. Upon detecting a character image within the 24 × 32 bit memory mosaic of memory planes 33-35, logic unit 29 issues a start trace pulse 85a of waveform 85 to the boundary search and stop logic unit 30. The logic unit 30 in response thereto initiates a three-pass boundary trace operation as indicated by pulse 86a of waveform 86.

During the first boundary trace, a first layer of the character image boundary is removed, and inflection points and average slopes of the character image boundary are isolated. During a second boundary trace operation, the character image boundary is repeatedly traced and thinned in one-cell layers until a boundary trace occurs in which no image cells are removed. The character image then is of a one-cell character stroke width. The coordinates of each stop detected during the boundary trace operation is stored for further analysis. During a third boundary trace operation, the stops are vertically ordered, and the average slope of each stop arm is determined. Upon completing the third boundary trace operation, logic unit 30 issues an end of trace signal as illustrated by pulse 87a of waveform 87. The logic unit 29 thereafter controls the transfer of character feature information to the feature memory unit 31 as indicated by pulse 84b of waveform 84. After the data transfer has been completed, the logic unit 29 issues an operation complete signal as illustrated by pulse 88a of waveform 88. The feature derivation system then enters into an inactive state illustrated by the trailing edge of pulse 81a of waveform 81.

FIG. 12

Figure 12:
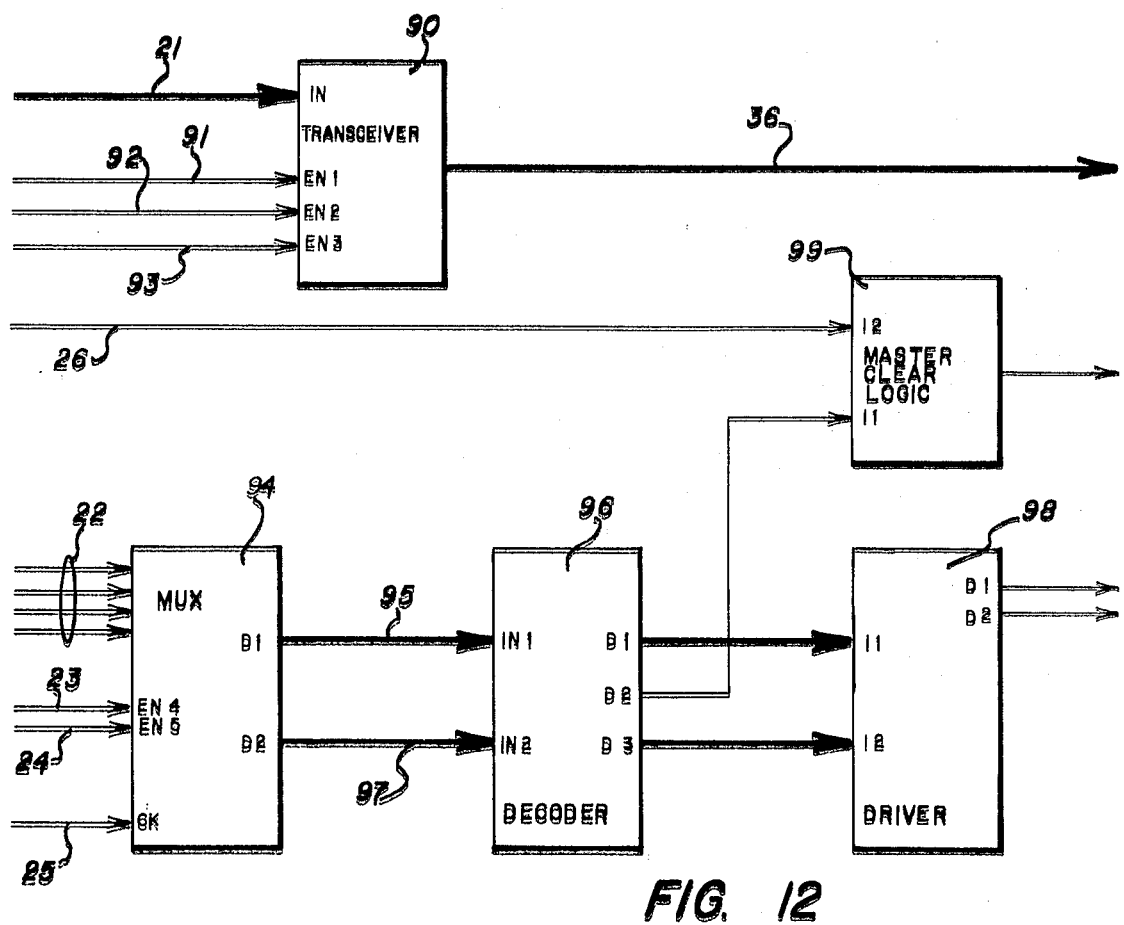
FIG. 12 is a detailed functional block diagram of the memory control logic unit of FIG. 10.

FIG. 12 illustrates in detailed functional block diagram form the memory control logic unit 20 of FIG. 10.

The input of a line transceiver 90 is connected by way of cable 21 to the character presence unit 12 of FIG. 1. The EN1 and EN2 enable inputs of the transceiver are connected by way of control lines 91 and 92 to the D1 and D2 outputs, respectively, of the row/column control logic unit 28 of FIG. 10. The EN3 enable input to the transceiver is connected by way of a control line 93 to the D12 output of the vector control logic unit 27. The output of transceiver 90 is applied to data cable 36.

The microprocessor data on lines 22 are applied to the inputs of a multiplexer 94, the clock input of which is connected by way of control line 25 to a clock output of the microprocessor 14 of FIG. 1. The EN4 and EN5 enable inputs of the multiplexer are connected to lines 23 and 24, respectively, leading to outputs of the microprocessor. The D1 output of multiplexer 94 is applied by way of a four bit data cable 95 to the N1 input of a decoder 96. The D2 output of multiplexer 94 is connected by way of a four bit cable 97 to the IN2 input of decoder 96.

The D1 output of decoder 96 is applied to the I1 input of a driver 98, and the D2 output of the decoder is applied to the I1 input of a master clear logic unit 99. The D3 output of decoder 96 is connected to I2 input of driver 98.

The I2 input of logic unit 99 is connected to control line 26 leading from an output of the I/O interface unit 17 of FIG. 1. The output of logic unit 99 is applied to the clear inputs of row/column control logic unit 28, vector control logic unit 27, raster scan control logic unit 29, feature memory unit 31 and boundary search and stop control logic unit 30 of FIG. 10.

The D1 output of driver 98 is connected to the I2 input of logic unit 28 of FIG. 10, and the D2 output of driver 98 is connected to the I1 input of logic unit 28.

In operation, a 24 × 32 bit memory mosaic is received from the character presence unit 12 by way of cable 21. When the EN1 enable input of transceiver 90 is set, bits 6–8 and bits 14–16 of cable 36 are connected to ground. Further, when the EN3 enable input of the transceiver is set, the entire cable 36 is connected to ground. The data cable 36 thereby may accommodate tristate logic.

Microprocessor commands are received at the input of multiplexer 94 by way of lines 22. The command words are applied to the cable 95 or the cable 97 depending upon the select control word received from the microprocessor by way of lines 23 and 24. The commands on lines 22 are clocked through the multiplexer under the control of the 1.0 MHz data clock signal on line 25. The decoder 96 decodes the signals on cable 95 to provide one of sixteen possible command levels, and decodes the signals on cable 97 to provide one of 16 possible command strobes as listed in Table 3.

TABLE 3
COMMAND DECODES

| IN1 Input | |
|---|---|
| Bit 0 | |
| Bit 1 | |
| Bit 2 | |
| Bit 3 | Diagnostics |
| Bit 4 | |
| Bits 5–9 | Not used |
| Bit 10 | Boundary trace enable |
| Bits 11–15 | Not used |
| IN2 Input | |
| Bits 0–10 | Initiate boundary trace |
| Bit 11 | System reset |
| Bits 12–15 | Not used |

Driver 98 applies the D1 and D3 outputs of decoder 96 to the I2 and I1 inputs, respectfully, of logic unit 28. The master clear logic unit 99 OR's the system reset signal applied by the system controller 18 of FIG. 1 to control line 26 with the reset command of microprocessor 14. The output of logic unit 99 is applied to succeeding devices of the feature derivation system of FIG. 10.

FIG. 13

Figure 13:
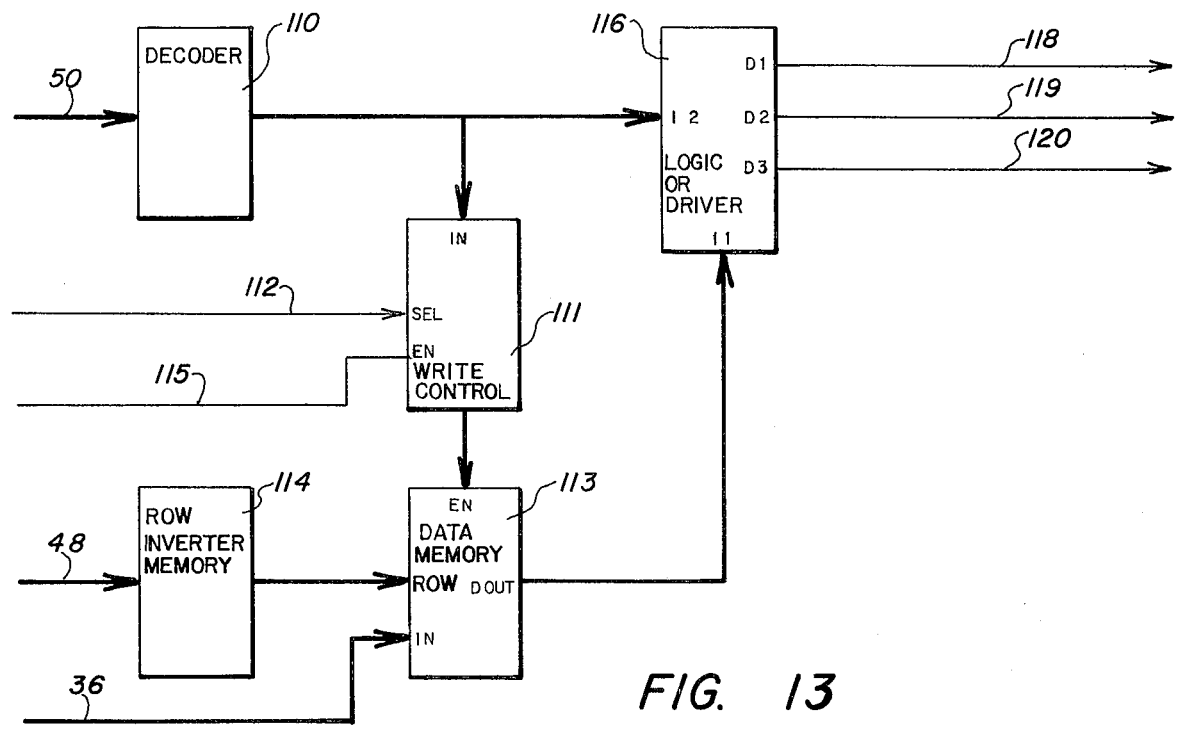
FIG. 13 is a functional block diagram of a memory plane unit.

FIG. 13 illustrates in functional block diagram form a memory plane unit of the type used for marker memory unit 32, and memory plane units 33–35 of FIG. 10.

A decoder 110 receives a column count from control unit 28 of FIG. 10 by way of cable 50. The output of the decoder is applied to the I2 input of a logic OR driver 116 and to the input of a write control unit 111. The select input of unit 111 is connected to a control line 112 leading to the D17 output of the logic unit 28, and the enable input of unit 111 is connected to a control line 115 leading to the D13 or D14 output of logic unit 28. The output of the write control unit is connected to the enable input of a 24 × 32 bit data memory unit 113. The ROW input of memory unit 113 is connected to the output of a row inverter memory unit 114 receiving a row count by way of cable 48. The data input to the memory unit 113 is connected to cable 36. The output of the memory unit 113 is applied to the I1 input of driver 116. The D1-D3 outputs of the driver are connected to the lines 118–120, respectively.

The memory plane unit as illustrated in FIG. 13 stores a 24 × 32 bit memory mosaic received from the character presence unit 12 of FIG. 1. In operation, decoder 110 receives a five bit column count by way of cable 50, and provides a one of 24 column indication to the write control unit 111 and to the logic OR driver 116.

When line 112 transitions to a logic one level, the one of 24 columns indicated by decoder 110 is enabled in data memory unit 113 for a write operation. When line 115 transitions to a logic zero level, data appearing on cable 36 is written into the memory cell of unit 113 designated by decoder 110 and unit 114. When line 112 transitions to a logic zero level, however, all 24 columns of unit 113 are enabled for a write operation. Data appearing on cable 36 thereafter, is written into unit 113 at the memory locations addressed by decoder 110 and unit 114, and at a rate controlled by line 115.

Figure 14A:
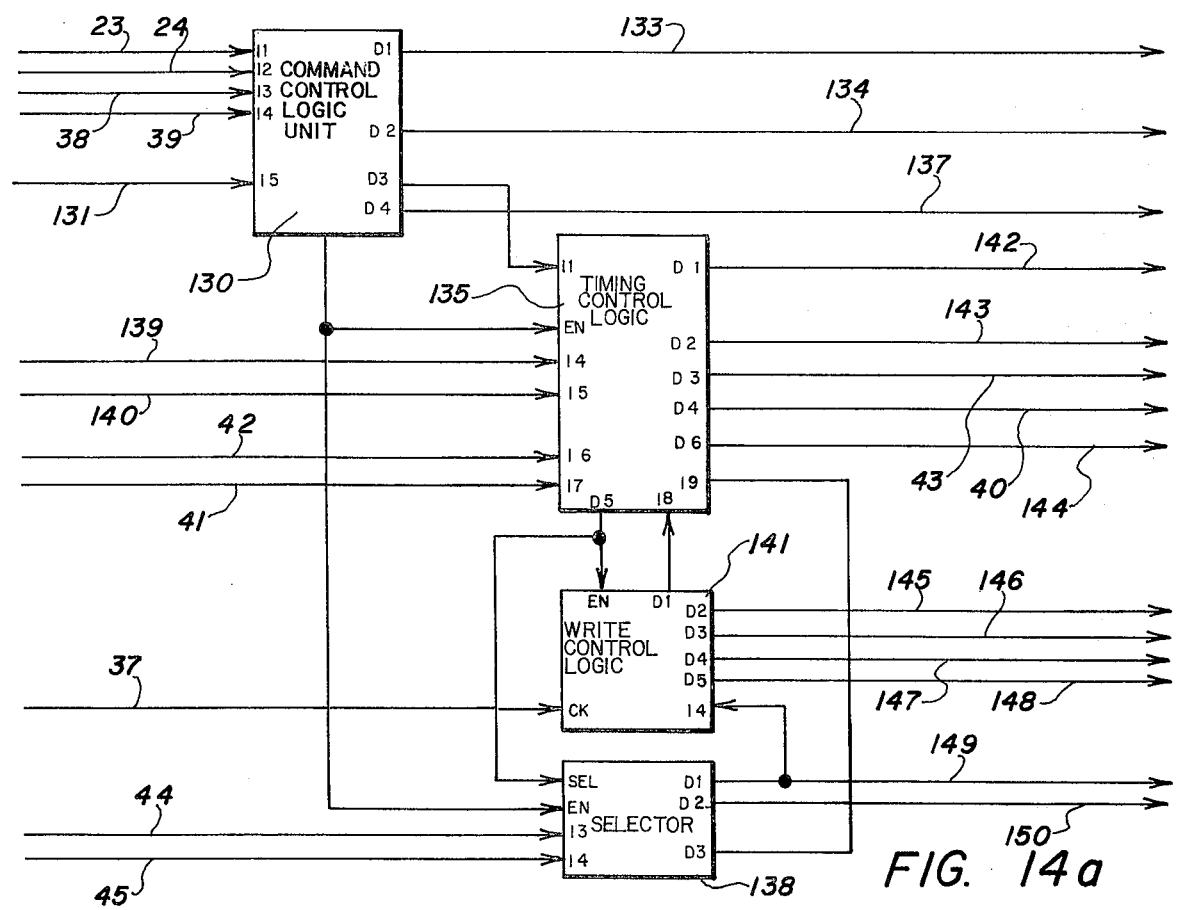
FIGS. 14a and 14b comprise a functional block diagram of the row/column control logic unit of FIG. 10.
Figure 14B:
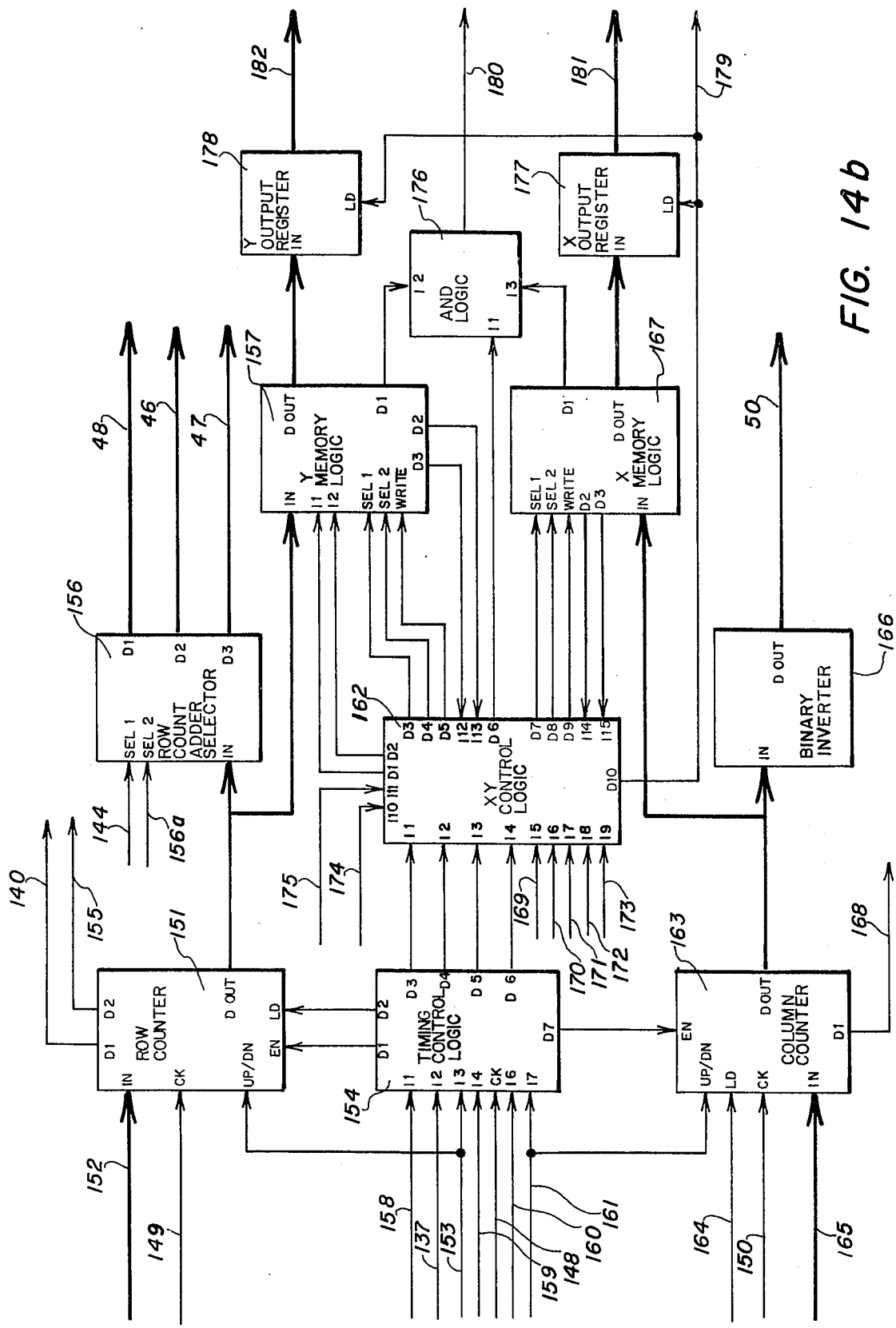

FIGURES 14a and 14b

FIGS. 14a and 14b comprise a detailed functional block diagram of the row/column control logic unit 28 of FIG. 10.

The I1 input of a command control logic unit 130 is connected to line 23 leading to an output of microprocessor 14 of FIG. 1, and the I2 input of the logic unit is connected to line 24 also leading to an output of the microprocessor. The I3 input to logic unit 130 is connected to a line 38 leading to an output of the microprocessor, and the I4 input to logic unit 130 is connected to line 39 also leading to an output of the microprocessor. The I5 input to logic unit 130 is connected by way of a control line 131 to the D1 output of memory control logic unit 20 of FIG. 10.

The D1 output of logic unit 130 is connected by way of a control line 133 to the I4 input of the feature memory unit 31, and the D2 output of the logic unit is connected by way of a control line 134 to the I9 input of the raster scan control logic unit 29. The D3 output of logic unut 130 is connected to the I1 input of a timing control logic unit 135. The D5 output of decoder 130 is supplied to the EN enable input of logic unit 135 and to the EN enable input of a selector 138.

The I4 input to the logic unit 135 is connected by way of a control line 139 to the D14 output of the raster scan control logic unit 29. The I5 input to the logic unit 135 is connected to a control line 140. The I6 input to the logic unit is connected to line 42, and the I7 input to the logic unit is connected to line 41. The I8 input to the logic unit 135 is connected to the D1 output of write control logic unit 141, and the I9 input to the logic unit is connected to the D3 output of selector 138.

The D1 output of logic unit 135 is connected by way of a control line 142 to the I11 input of raster scan control logic unit 29 and to the I3 input of feature memory unit 31. The D2 output of logic unit 135 is connected by way of a control line 143 to the EN1 enable input of the memory control logic unit 20. The D3 output of logic unit 135 is connected to line 43, and the D4 output is connected to line 40. The D5 output of logic unit 135 is connected to the SEL input of selector 138, and to the EN input of write control logic unit 141. The D6 output of logic unit 135 is connected to the CEN inputs of memory plane units 33–35, and to the CEN input of the marker memory unit 32.

The CK clock input of logic unit 141 is connected to line 37, and the I4 input is connected to the D1 output of selector 138. The D2 output of logic unit 141 is connected by way of a control line 145 to the I10 input of raster scan control logic unit 29. The D3 output of logic unit 141 is connected by way of a control line 146 to the I10 input of vector control logic unit 27, and to the write enable inputs of memory plane units 33–35. The D4 output of logic unit 141 is connected by way of a control line 147 to the write enable input of the marker memory unit 32, and the D5 of logic unit 141 is connected to a control line 148.

The I3 input to selector 138 is connected to line 44, and the I4 input to the selector 138 is connected to line 45. The D1 output of selector 138 also is connected to a control line 149, and the D2 output is connected to a control line 150.

The data input of a 5 bit up/down binary counter 151 is connected by way of a 5 bit data cable 152 to cable 36 of FIG. 10. The clock input to the counter is connected to control line 149, and the up/down enable input to the counter is connected by way of a control line 153 to the D8 output of vector control logic unit 27 of FIG. 10. The EN enable input to the counter is connected to the D1 output of a timing control logic unit 154, and the load input to the counter is connected to the D2 output of the logic unit 154. The D1 output of counter 151 is connected to line 140 leading to the I5 input of logic unit 135, and the D2 output of the counter is connected by way of a control line 155 to the I8 input of raster scan control logic unit 29. A 5 bit row count is supplied by counter 151 to the input of a row count adder/selector unit 156 and to the input of a Y-memory logic unit 157.

The SEL1 input to the unit 156 is connected by way of control line 144 to the D6 output of logic unit 135, and the SEL2 input to unit 156 is connected by way of a control line 156a to the D12 output of vector control logic unit 27 of FIG. 10. The D1 output of the unit 156 is connected to cable 48. The D2 output of unit 156 is connected to cable 46, and the D3 output of unit 156 is connected to cable 47.

The I1 input to timing control logic unit 154 is connected by way of a control line 158 to the D10 output of raster scan control logic unit 29, and the I3 input to logic unit 154 is connected to line 153. The I4 input to logic unit 154 is connected by way of a control line 159 to the D13 output of raster scan control logic unit 29. The I6 input to logic unit 154 is connected by way of a control line 160 to the D12 output of logic unit 29, and the I7 input to logic unit 154 is connected to a control line 161 leading to the D7 output of vector control logic unit 27. The D3–D6 outputs of logic unit 154 are applied to the I1–I4 inputs of an X, Y control logic unit 162. The D7 output of logic unit 154 is connected to the EN enable input of a five bit up/down binary counter 163. The up/down enable input of counter 163 is connected to control line 161, and the load input of the counter is connected by way of a control line 164 to the D11 output of logic unit 29. The clock input to the counter is connected to line 150 leading to the D2 output of selector 138. The data input to counter 163 is connected by way of a five bit data cable 165 to cable 36 of FIG. 10. The five bit column count supplied by counter 163 is applied to the input of a five bit binary inverter 166, and to the input of an X-memory logic unit 167. The D1 output of counter 163 is connected by way of a control line 168 to the I7 input of logic unit 29.

The I5 input to logic unit 162 is connected by way of a control line 169 to the D14 output of boundary search and stop control logic unit 30. The I6 input to logic unit 162 is connected to a control line 170 leading to the D4 output of logic unit 27. The I7 and I8 inputs to logic unit 162 are connected by way of control lines 171 and 172 to the D17 and D16 outputs, respectively, of raster scan control logic unit 29. The I9 input to logic unit 162 is connected to a control line 173 leading to the D15 output of logic unit 29. The I10 and I11 inputs of logic unit 162 are connected by way of control lines 174 and 175 to the D16 and D15 outputs, respectively, of vector control logic unit 27. The I12 and I13 inputs of logic unit 162 are connected to the D3 and D2 outputs, respectively, of Y memory logic unit 157. The I14 and I15 inputs of logic unit 162 are connected to the D2 and D3 outputs, respectively, of X memory logic unit 167.

The D1–D5 outputs of logic unit 162 are connected respectively to the I1, I2, SEL1, SEL2 and Write inputs of memory logic unit 157. The D6 output of logic unit 162 is connected to the I1 input of an AND logic unit 176, and the D7–D9 outputs of the logic unit 162 are connected to the SEL1, SEL2 and Write inputs, respectively of logic unit 167. The D10 output of logic unit 162 is connected to the load input of a five bit X-output register 177, to the load input of a five-bit Y-output register 178, and to a control line 179 leading to the EN2 enable input of the memory control logic unit 20.

The output of binary inverter 166 is connected to data cable 50, and the DOUT output of memory logic unit 157 is connected to the input of register 178. The D1 output of logic unit 157 is connected to the I2 input of logic unit 176, the I3 input of which is connected to the D1 output of logic unit 167. The output of logic unit 176 is applied by way of a control line 180 to the I9 input of the vector control logic unit 27. The DOUT output of logic unit 167 is connected to the input of output register 177, the output of which is applied by way of a five bit data cable 181 to cable 36 of FIG. 10. The output of register 178 is applied by way of a five bit data cable 182 to cable 36.

In operation, the microprocessor 14 of FIG. 1 issues a command word by way of lines 23 and 24 to the command control logic unit 130 to signal the presence of instructions on lines 38 and 39. The logic level of line 38 is sensed to detect which of two memories comprising feature memory unit 31 is to be selected for a write operation by the feature derivation system of FIG. 10. The second of the two memories is accessed by the microprocessor for a character recognition process. Thus, if the line 38 is at a logic one level, logic unit 130 issues a pulse on line 133 to select one of the two memories of feature memory unit 31. If the line 38 is at a logic zero level, however, the second of the two memories is selected by the logic unit 130. In addition, upon detecting a logic one level on line 39, the logic unit 130 issues a logic one pulse to the EN enable input of timing control logic unit 135 and to the EN enable input of selector 138. Upon detecting a logic zero pulse on line 39, the logic unit 130 issues a logic one pulse to line 134 to clear the piece loop counter of the raster scan control logic unit 29, and issues a logic one pulse to line 137 leading to the I2 input of the timing control logic unit 154. In addition, a logic one pulse is issued to the I1 input of timing control logic unit 135.

Upon the enable input of the timing control logic unit 135 being set and a logic one appearing at the I1 input of the logic unit, lines 40 and 143 transition to a logic one level. In addition, the logic unit 135 issues a logic one pulse to the enable input of the write control logic unit 141 and to the select input of selector 138. The logic unit 135 also issues a logic one pulse to line 144 to set the column enable inputs of the marker memory unit 32 and the memory plane units 33–35. Further, logic unit 135 issues a logic one pulse to line 43 to request a character image from the character presence unit 12 of FIG. 1. Upon a first data clock appearing on line 37, a clock pulse is issued by logic unit 141 to the I8 input of logic unit 135. In addition, line 145 transitions to a logic zero level to command the raster scan control logic unit 29 to store limit information supplied by the character presence unit. Upon receiving the clock pulse from write logic unit 141, the logic unit 135 resets line 43 to a logic zero level to indicate to the character presence unit that no further character information is requested.

When the selector 138 receives a logic one pulse at the select input, the 55 nanosecond clock signal on line 44 is selected to line 149 and to the I4 input of logic unit 141. In response to the 55 nanosecond pulse at the I4 input, the logic unit 141 selects the data clock on line 37 to line 148 with a delay of 55 nanoseconds. The clock signal on line 148 thereafter increments the row counter of the row/column control logic unit 28 of FIG. 10. Further, during the time period in which the D1 output of the logic unit 141 is at a logic one level, the logic unit issues a logic one pulse to lines 146 and 147 each time a data clock pulse occurs at the clock input of the logic unit.

During a write operation, the information on cable 36 is written into each of the memory plane units 33–35 and the marker memory unit 32 is cleared. After 32 rows of data have been loaded into memory plane units 33–35, a logic one pulse is received by timing control logic unit 135 on line 140. The logic unit 135 resets the enable signal supplied to its D5 output, and issues a logic one pulse to line 142 to initiate a raster scan of the character image stored in each of memory plane units 33–35. When the select input of selector 138 is reset, the 110 nanosecond clock signal on line 45 is selected to line 150 to control the row counter at a 9 MHz rate.

When the character image stored in memory plane units 33–35 has been scanned, traced, and the character features detected, line 139 transitions to a logic one level to indicate that the feature derivation process has been completed. Logic unit 135 in response thereto resets line 40 to a logic zero level.

Referring to FIG. 14b, the timing control logic unit 154 loads row counter 151 with logic one's when line 158 transitions to logic zero level. More particularly, the load enable input of the row counter is set during a time period when the cable 36 is idle. Cable 36 is a tristate cable which may reflect a logic one level, a logic zero level or a high impedance state. In the preferred embodiment described herein, the cable 36 is biased to reflect all logic one's when in the high impedance state. Thus, if the load input of the row counter 151 is enabled when the cable 152 is in the high impedance state, the row counter is loaded with all logic one's. The EN enable input of row counter 151 thereafter is set each time a clock pulse is received on line 148. During the time period when the enable input to the counter is set, the row counter counts the clock pulses on line 149. When a count of 32 occurs, a logic one pulse is issued on line 140 to logic unit 135 to indicate that the loading process has been completed.

During the loading process, the row count is applied to the input of the row count adder/selector unit 156. If either line 144 or line 156a is at a logic zero level, the row count is applied to cables 46–48. If both lines 144 and 156a are at a logic one level, however, the row count is applied to cable 48, the row count minus one is applied to cable 46 and the row count plus one is applied to cable 47.

Upon completing the loading process, row counter 151 is loaded with the data on cable 152 when line 158 transitions to a logic zero level. In addition, the row counter is selected to count up when line 153 transitions to a logic one level, and to count down when the line transitions to a logic zero level. In like manner, the column counter 163 is loaded with the data on cable 165 when the line 164 transitions to a logic zero level. The column counter 163 also is selected to count up when line 161 is at a logic one level, and to count down when the line is at a logic zero level. When a logic zero level appears on either lines 153 or 159, the EN enable input of row counter 151 is set. Further, when either lines 160 or 161 is at a logic zero level, the EN enable input of column counter 163 is set. When the enable inputs of counters 151 and 163 are set, the counters increment or decrement at the clock rate.

When the timing control logic unit 135 issues a logic one pulse to line 142, the raster scan control logic unit 29 initiates a raster scan of the character image stored in memory plane units 33–35. When a first character image cell is detected, the D4 output of vector control logic unit 27 transitions to a logic zero level which is carried by line 170 to the I6 input of the XY control logic unit 162. Upon initiating a boundary trace of the character image, the boundary search and stop control logic unit 30 issues a logic zero signal by way of line 169 to the I5 input of the logic unit 162. The vector control logic unit 27 also generates signals on lines 153 and 159 to indicate when the boundary trace has stepped up a row or down a row, respectively. The logic unit 27 further generates signals on lines 160 and 161 to indicate when the boundary trace has stepped forward a column or backed up a column, respectively. The signals on lines 153, 159, 160 and 161 are buffered for a four clock period in the timing control logic unit 154 and supplied to the I1-I4 inputs, respectively, of logic unit 162. With both lines 169 and 170 at a logic zero level to indicate a starting boundary point for the boundary trace operation, the logic unit 162 stores the row count into the first three memory locations of logic unit 157, and the column count into the first three locations of logic unit 167. In addition, the logic unit 162 loads an image cell side identification into the first locations of the memory logic units 157 and 167. More particularly, the image cell side is identified by lines 174 and 175. When both lines are at a logic zero level, side 4 is indicated. When line 174 is at a logic zero level and line 175 is at a logic one level, side 1 is indicated. When line 174 is at a logic one level and line 175 is at a logic zero level, side 2 is indicated. Further, when both lines 174 and 175 are at a logic one level, side 3 is indicated.

When the boundary trace operation moves from the starting boundary point, line 170 transitions to a logic one level. As long as line 169 is at a logic zero level the logic unit 162 in response to the signals at its I1-I4 inputs, stores succeeding boundary point information in the second and third memory locations of logic units 157 and 167. More particularly, upon a first move from the starting boundary point, logic unit 162 sets the SEL1 inputs of logic units 157 and 167 to store the succeeding boundary point information in the second locations of the respective memories. When a move is made to a next boundary location, the SEL2 inputs of the logic units 157 and 167 are set. As a boundary trace continues about a character image, the SEL1 and SEL2 inputs to logic units 157 and 167 are alternately set and reset. When new boundary point information is supplied to the input of logic units 157 and 167, such information is compared to the second memory locations to detect new minimum coordinates and to the third memory locations to detect new maximum coordinates. The starting boundary point coordinates are retained in the first memory locations of the respective logic units.

When a new minimum row coordinate is indicated, the D3 output of logic unit 157 transitions to a logic one level. When a new maximum row coordinate is detected, the D2 output of logic unit 157 transitions to a logic one level. In like manner, a new minimum column coordinate is indicated when the D2 output of logic unit 167 transitions to a logic one level, and a new minimum column coordinate is indicated when the D3 output of logic unit 167 transitions to a logic one level.

As the boundary trace proceeds about a character image, the D6 output of logic unit 162 transitions to a logic zero level to indicate that neither the second nor the third memory locations of the memory logic units 157 and 167 are selected. At this time, the logic unit 176 issues a logic one pulse to line 180 if the D1 outputs of logic units 157 and 167 are at a logic one level. The pulse on line 180 indicates that the starting point stored in the first locations of logic units 157 and 167 has again been encountered. The D1 output of logic unit 157 transitions to a logic one level when the row count received from row counter 151 is equal to the row count stored in the first location of the logic unit. In like manner, the D1 output of logic unit 167 transitions to a logic one level when the column count stored in the first location of the logic unit is equal to the column count received from column counter 163.

When the character features of a character image stored in memory plane units 33-35 have been detected and stored for further analysis, the raster scan control logic unit 29 issues signals on lines 171-173 to transfer the character feature information from the memory logic units 157 and 167 through output registers 178 and 177 to cables 182 and 181, respectively. More particularly, when line 171 is at a logic zero level, the logic unit 162 selects the first memory locations of logic units 157 and 167 for transfer to output registers 178 and 177, respectively. In like manner, lines 172 and 173 transition to a logic zero level when the second and third memory locations of logic units 157 and 167 are to be transferred to registers 178 and 177, respectively. In response thereto, logic unit 162 issues a signal to line 179 and to the load inputs of the registers 178 and 177 which is a logic OR of the signals appearing on lines 171-173.

During the load and the boundary trace operations, the column count is applied to the binary inverter 166 which supplies the compliment of the column count to cable 50.

FIG. 15

FIG. 15 is a timing diagram illustrating the operation of the row/column control logic unit 28 of FIG. 10.

A discrete wave form 190 illustrates a 9 MHz clock signal carried by line 45 of FIG. 10, and a discrete waveform 191 illustrates an 18 MHz clock signal carried by line 44 of FIG. 10. A discrete waveform 192 illustrates the microprocessor start command applied by the memory control logic unit 20 to the I2 input of the row/column control logic unit 28. A discrete waveform 193 illustrates the D3 output of the command control logic unit 130 of FIG. 14a, and a discrete waveform 194 illustrates the D5 output of timing control logic unit 135. A discrete waveform 195 illustrates the D5 output of logic unit 130, and a discrete waveform 196 illustrates the D1 output of the logic unit. A discrete waveform 197 illustrates the D2 output of logic unit 130, and a discrete waveform 198 illustrates the D2 and D6 outputs, respectively, of the logic unit 135. A discrete waveform 199 illustrates the D3 output of logic unit 135, and a discrete waveform 200 illustrates a compliment of the D1 output of selector 138. A discrete waveform 201 illustrates the data clock signal on line 37 of FIG. 14a, and a discrete wave form 202 illustrates the D1 output of write control logic unit 141. A discrete waveform 203 illustrates the D5 output of logic unit 141, and a discrete waveform 204 illustrates the D2 output of logic unit 141. A discrete waveform 205 illustrates the D3 and D4 outputs of logic unit 141, and a discrete waveform 206 illustrates the D1 output of logic unit 135. A discrete waveform 207 illustrates the D4 output of logic unit 135.

Upon receiving a 470 nanosecond start pulse 192a of waveform 192 at the I5 input, logic unit 130 synchronizes the pulse with the 9.0 MHz clock signal of waveform 190. Upon a next occurring leading edge of the clock signal, logic unit 130 issues a 110 nanosecond pulse 193a of waveform 193 which is applied to the I1 input of the logic unit 135. In addition, the compliment of pulse 193a is applied to the I2 input of the timing control logic unit 154 of FIG. 14b. Concurrent with pulse 192a, the D5 output of logic unit 130 transitions to a logic one level as illustrated by waveform 195. Further, the D1 output of the logic unit 130 transitions to a logic one level as illustrated by waveform 196 to select one of two memories comprising feature memory unit 31 of FIG. 10. It is to be understood that when the D1 output of logic unit 130 is at a logic zero level, the second of the two memories of the feature memory unit is selected.

Upon the occurence of the leading edge of pulse 193a, a 110 nanosecond pulse 197a of waveform 197 is applied by logic unit 130 to line 134 to clear the character piece and loop counters of the raster scan control logic unit 29 of FIG. 10. Synchronous with the trailing edge of pulse 193a, the D5 output of logic unit 135 transitions to a logic one level as illustrated by waveform 194, and the D2 and D6 outputs of logic unit 135 transition to a logic zero level as illustrated by the compliment of waveform 198. Further, the D4 output of logic unit 135 transitions to a logic one level as illustrated by waveform 207. Synchronous with the leading edge of pulse 194a of waveform 194, logic unit 135 issues a logic one pulse 199a on line 43 leading to the character presence unit 12 of FIG. 1 to request character image data.

Selector 138 is selected to line 44 by the leading edge of pulse 194a. The signal on line 149 thereafter is an 18 MHz clock signal as illustrated by waveform 200. No further activity occurs until a first 55 nanosecond data clock pulse 201a is received on line 37 leading to the clock input of the write control logic unit 141. Synchronous with the occurrence of the data clock pulse 201*a* and a logic zero level at its D1 output as illustrated by waveform 202, logic unit 141 issues a 55 nanosecond pulse 204*a* on line 145 leading to the raster scan control logic unit 29 of FIG. 10. Logic unit 29 thereby is commanded to store the first 24 bits of data supplied by the character presence unit to cable 36 of FIG. 10. Upon the occurrence of the trailing edge of pulse 201*a*, logic unit 141 raises its D1 output to a logic one level as illustrated by waveform 202. The logic unit 135 in response thereto transitions its D3 output to a logic zero level as illustrated at the trailing edge of pulse 199*a*.

Upon the occurrence of the trailing edge of pulse 193*a*, logic unit 154 loads row counter 151 with all logic one's as before described. Thereafter, pulse 201*a* is buffered in logic unit 141 and issued to line 148 after a delay of 55 nonoseconds as illustrated by pulse 203*a* of waveform 203. Upon receiving the leading edge of pulse 203*a*, the logic unit 154 increments the row counter 151 to an all logic zero state.

No further activity occurs until a next occurring data clock pulse 201*b* is received by logic unit 141, which logically AND's waveform 201 with waveform 202 to provide the write commands illustrated by waveform 205 to lines 146 and 147. The data clock pulses of waveform 201 beginning with pulse 201*b* are delayed 55 nanoseconds by logic unit 141 and applied to the timing control logic unit 154. In response thereto, logic unit 154 enables row counter 151 to be incremented by the pulses of waveform 200 appearing on line 149. Upon a row count of 32 occurring as illustrated by the leading edge of pulse 203*b* of waveform 203, the D5 output of logic unit 135 transitions to a logic zero level as illustrated by waveform 194*a*. In response thereto, selector 138 is selected to line 45 to provide a 9 MHz clock signal as illustrated by waveform 200 beginning at pulse 200*a*. In addition, the D2 and D6 outputs of logic unit 135 transition to a logic zero level as illustrated by waveform 198, and logic unit 135 issues a 110 nanosecond pulse 206*a* to line 142 leading to the raster scan logic unit 29 of FIG. 10. A raster scan of the character image stored in memory plane units 33-35 thereby is initiated.

Figure 17:
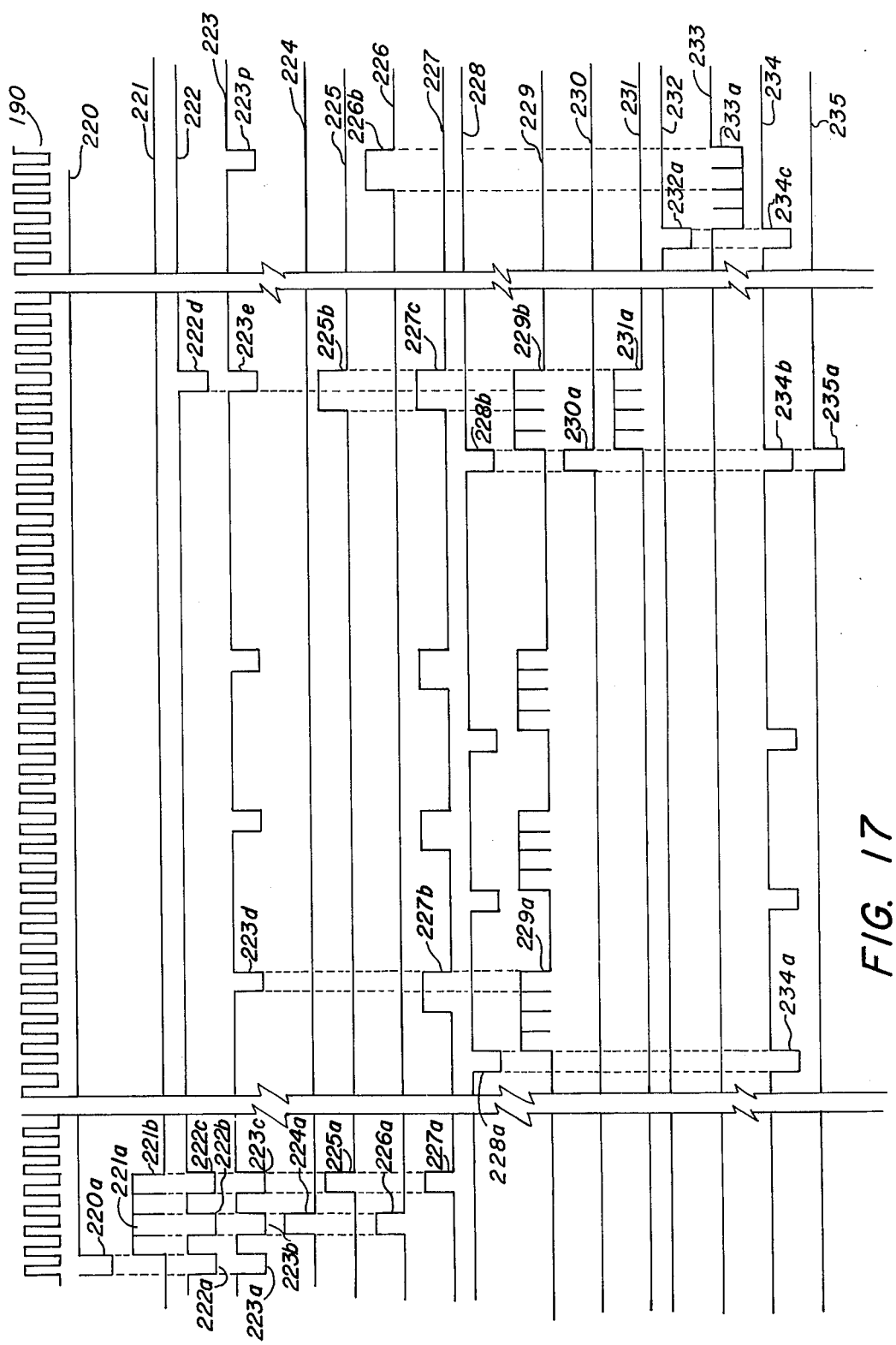
FIG. 17 is a timing diagram illustrating the operation of the system of FIG. 14b during a boundary trace of the binary image of FIG. 16.
Figures 16, 18A:
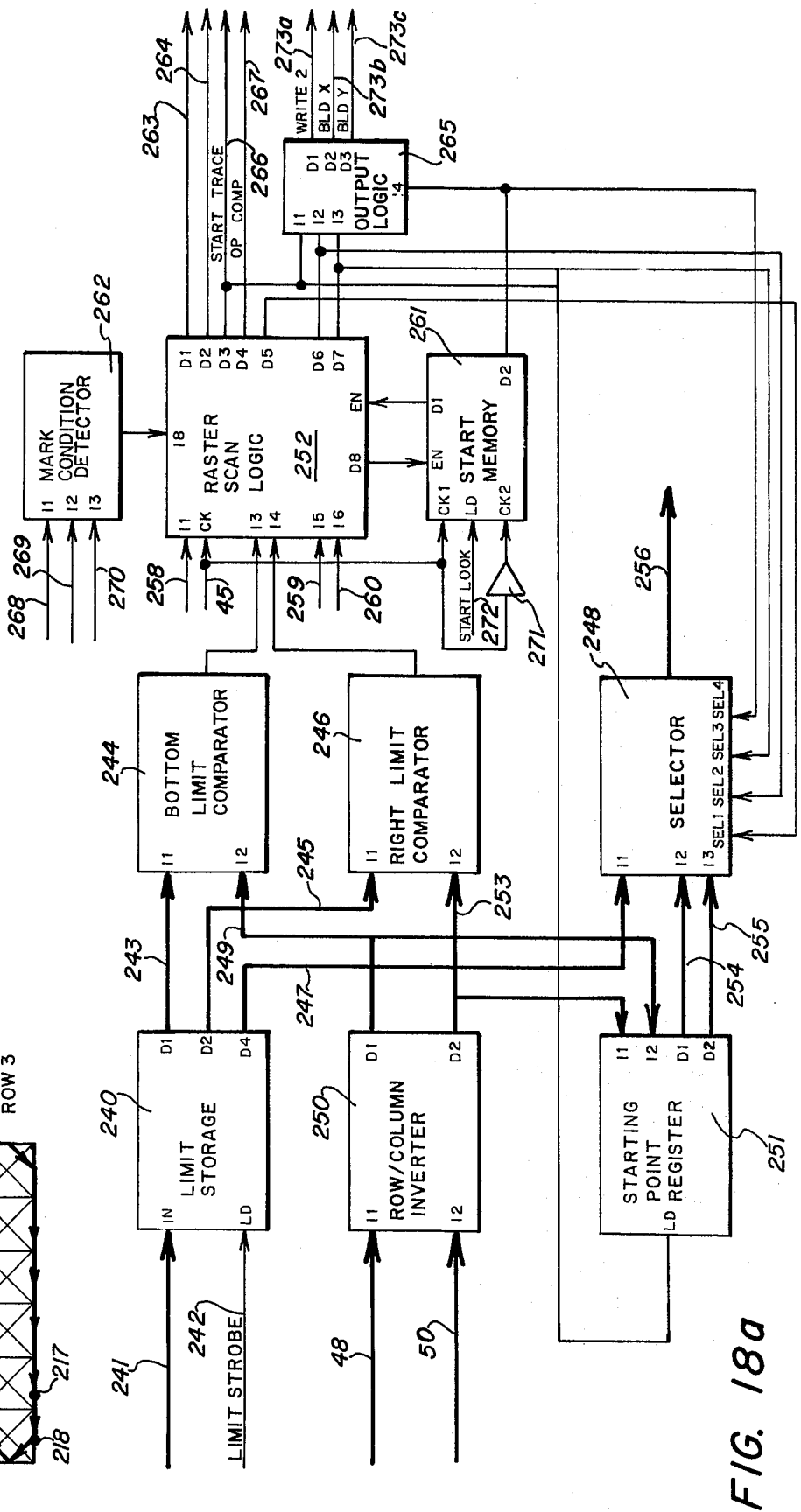
FIG. 16 is a diagram of a binary image of the letter O.
FIGS. 18a-18c comprise a functional block diagram of the raster scan control logic unit of FIG. 10.

FIGS. 16 and 17

FIG. 16 diagramatically illustrates a binary image of the letter O. FIG. 17 is a timing diagram of the operation of logic units 154, 157, 162, 167 and 176 of FIG. 14*b* during the boundary trace of the letter O as illustrated in FIG. 16.

Referring to FIG. 16, the boundary trace of the letter O is initiated from a starting boundary point 210, and proceeds stepwise from boundary point 210 to boundary points 211-216. The boundary trace continues along the outer boundary in a clockwise direction to boundary point 217. From boundary point 217, a move is made to a boundary point 218.

The content of the memory logic units 157 and 167 of FIG. 14*b* as the boundary is traced from the starting boundary point 210 in a clockwise direction is shown in Table 4.

TABLE 4

| | Maximum and Minimum Boundary Point Coordinates | | |
|---|---|---|---|
| Move | Word 1 Column/Row/ Side | Word 2 Column/Row Min. | Word 3 Column/Row Max. |
| 210–211 | 1,0,4 | 1,0 | 1,0 |

TABLE 4-continued

| | Maximum and Minimum Boundary Point Coordinates | | |
|---|---|---|---|
| Move | Word 1 Column/Row/ Side | Word 2 Column/Row Min. | Word 3 Column/Row Max. |
| 211–212 | 1,0,4 | 1,0 | 2,0 |
| 212–213 | 1,0,4 | 1,0 | 3,0 |
| 213–214 | 1,0,4 | 1,0 | 4,0 |
| 215–216 | 1,0,4 | 1,0 | 5,1 |
| 217–218 | 1,0,4 | 0,0 | 5,3 |

Referring to FIG. 17, the discrete waveform 190 illustrates the 9.0 MHz system clock signal. A discrete waveform 220 illustrates the D4 output of the vector control logic unit 27 of FIG. 10, and a discrete waveform 221 illustrates the output of a four bit shift register internal to the XY control logic unit 162 of FIG. 14*b*. A discrete waveform 222 illustrates the D5 output of logic unit 162, and a discrete waveform 223 illustrates the D9 output of logic unit 162. A discrete waveform 224 illustrates the D3 output of logic unit 162, and a discrete waveform 225 illustrates the D4 output of logic unit 162. A discrete waveform 226 illustrates the D7 output of logic unit 162, and a discrete waveform 227 illustrates the D8 output of the logic unit 162. A discrete waveform 228 illustrates the signal carried by line 160 leading to the I6 input of logic unit 154, and a discrete waveform 229 illustrates the output of a four bit shift register internal to logic unit 154. A discrete waveform 230 illustrates the signal carried by line 159 to the I4 input of logic unit 154. A discrete waveform 231 illustrates the D3 output of logic unit 154, and a discrete waveform 232 illustrates the signal carried by line 161 to the I7 input of logic unit 154. A discrete waveform 233 illustrates the output of a second four bit shift register internal to logic unit 154, and a discrete waveform 234 illustrates the D7 output of logic unit 154. A discrete waveform 235 illustrates the D1 output of logic unit 154.

During a first boundary trace of a character image stored in memory plane units 33–35, the I5 input to logic unit 162 is at a logic zero level. Upon the occurrence of a 110 nanosecond pulse 220*a* of waveform 220 on line 170 leading to the vector control logic unit 27 of FIG. 10, a boundary trace operation is initiated. Concurrent with the pulse 220*a*, logic unit 162 issues a 110 nanosecond pulse 222*a* of waveform 222 to the write enable input of memory logic unit 157, and pulse 223*a* of waveform 223 to the write enable input of memory logic unit 167. As shown in Table 4, the first memory location in memory logic unit 157 is filled with a row count of zero and a side 4 identification. The memory logic unit 167 has stored in its first memory location a column count of one. The boundary trace operation thereby is initialized at boundary point 210 of FIG. 16.

Pulse 220*a* is buffered for the duration of four clock pulses in logic unit 162 as illustrated by the pulse guad of waveform 221. During the time period generally referred to by reference number 221*a*, logic unit 162 issues pulse 222*b* to the write enable input of logic unit 157 and pulse 223*b* to the write enable input of logic unit 167. Synchronous therewith, logic unit 162 issues pulse 224*a* to the SEL1 input of lofic unit 157, and pulse 226*a* of waveform 226 to the SEL1 input of logic unit 167. The secoond memory location of logic unit 175 thereafter has sored therein a row count of zero and the second memory locaton of logic unit 167 has stored therein a column count of one.

During the time period generally referred to by reference 221b, logic unit 162 issues pulse 222c to the write enable input of logic unit 157 and pulse 223c to the write enable input of logic unit 167. Concurrently, logic unit 162 issues a pulse 225a to the SEL2 input of logic unit 157 and pulse 227a to the SEL2 input of logic unit 167. Memory logic unit 157 thereafter has a row count of zero stored in the third memory location thereof, and memory logic unit 167 has a column count of 1 stored in its third memory location. A boundary trace thus begins from the starting boundary point 210.

The boundary trace moves stepwise from boundary point 210 to boundary point 211. Upon moving from boundary point 211 to boundary point 212, a pulse 228a of waveform 228 is issued by the vector control logic unit 27 to the I6 input of logic unit 154. In response thereto and synchronous therewith, the logic unit 154 issues a pulse 234a of waveform 234 to the enable input of column counter 163. The pulse 228a is buffered for four clock periods as illustrated by the pulse quad 229a of waveform 229. During the first two clock periods of quad 229a, the row and column count is compared to the first memory locations of logic units 157 and 167 to detect an end of boundary trace condition. During the third and fourth time periods, however, the second and third memory locations of logic units 157 and 167 are compared to the row and column counts to detect new minimum and maximum boundary point coordinates. Upon the completion of the second time period of quad 229a, logic unit 162 issues a 220 nanosecond pulse 227b to the SEL2 input of logic unit 167. During the third time period of pulse quad 229a, logic unit 167 compares the column count with its third memory location. If the current count exceeds the value stored in memory, logic unit 167 issues a pulse to the I15 input of logic unit 162. The logic unit 162 in response thereto issues pulse 223d of waveform 223 to the write enable input of logic unit 167 to write the current column count into the third memory location of logic unit 167. The maximum column count thereby is updated to a new maximum.

The maximum column count stored in the third memory location of logic unit 167 is updated in a like manner as the boundary trace proceeds from boundary point 212 to boundary point 213, and from boundary point 213 to boundary point 214 of FIG. 16. Between boundary point 214 and boundary point 215, no move is recorded as shown in Table 4 since there is no cell to cell move. The boundary trace has a merely moved from one side to a second side of the same cell. Upon moving from boundary point 215 to boundary point 216, however, a cell to cell move occurs as is shown in Table 4.

Upon completing the move from boundary point 215 to boundary point 216, the vector control logic unit 27 issues a 110 nanosecond pulse 228b of waveform 228 to the I6 input of logic unit 154 of FIG. 14b. I addition, the logic unit 27 issues a pulse 230a of waveform 230 to the I4 input of logic unit 154. In response thereto and synchronous therewith, the logic unit 154 issues a 110 nanosecond pulse 234b of waveform 234 to the enable input of column counter 163, and a 110 nanosecond pulse 235a of waveform 235 to the enable input of row counter 151. Pulse 228b is buffered for four clock periods in logic unit 154 as illustrated by a pulse quad 229b, and pulse 230a is buffered for four clock periods as illustrated by a pulse quad 231a of waveform 231. During the first and second time periods of pulse quads 229b and 231a, logic units 157 and 167 compare their respective first memory locations with the current row and column counts, respectively. Upon completion of the second time period, logic unit 162 issues a 220 nanosecond pulse 225b to the SEL2 input of logic unit 154, and a 220 nanosecond pulse 227c to the SEL2 input of logic unit 167. In response thereto, logic unit 157 compares the row count in the third memory location with the current row count, and logic unit 167 compares the column count in the third memory location with the current column count. If the current row count exceeds the row count stored in the third memory location, the logic unit 157 issues a logic one pulse to the I13 input of logic unit 162. The logic unit 162 thereupon issues a 110 nanosecond pulse 222d to the write enable input of the logic unit 157 to write the current row count into the third memory location. In like manner, if the current column count exceeds the column count stored in the third memory location, the logic unit 167 issues a logic one pulse to the I15 input of logic unit 162. In response thereto, the logic unit 162 issues a 110 nanosecond pulse 223e to the write enable input of logic unit 167 to write the current column count into the third memory location.

As the boundary trace proceeds from boundary point 216 to boundary point 217 of FIG. 16, the memory locations of memory logic units 157 and 167 are updated as before described. When a move from boundary point 217 to boundary point 218 occurs, the vector control logic unit 27 issues a pulse 232a of waveform 232 to the I7 input of timing control logic unit 154. In response thereto and synchronous therewith, logic unit 154 issues a 110 nanosecond pulse 234c to the enable input of column counter 163. The pulse 232a is buffered for 4 clock periods as illustrated by pulse quad 233a. During the first 2 clock periods, logic unit 167 compares the current column count with the column count stored in the first memory location. During the third time period, logic unit 167 compares the current column count with the column count stored in memory location two. If the current column count is less than the value stored in memory, logic unit 167 issues a logic one pulse to the I14 input of logic unit 162. In response thereto, the logic unit 162 issues a 220 nanosecond pulse 226b to the SEL1 input of logic unit 167. During the fourth time period of pulse quad 233a, logic unit 162 issues a pulse 223f to the write enable input of logic unit 167 to write the current column count into the second memory location of logic unit 167. The minimum column count thereby is updated.

Figure 18B:
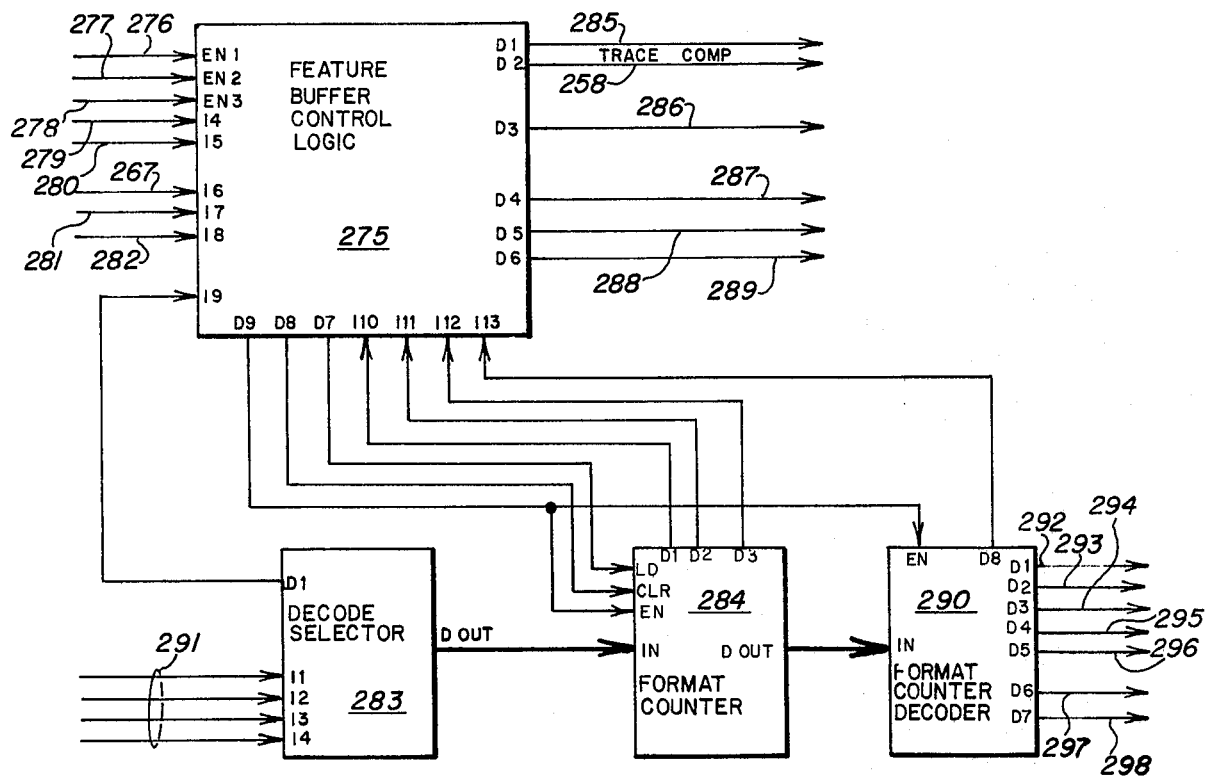
Figure 18C:
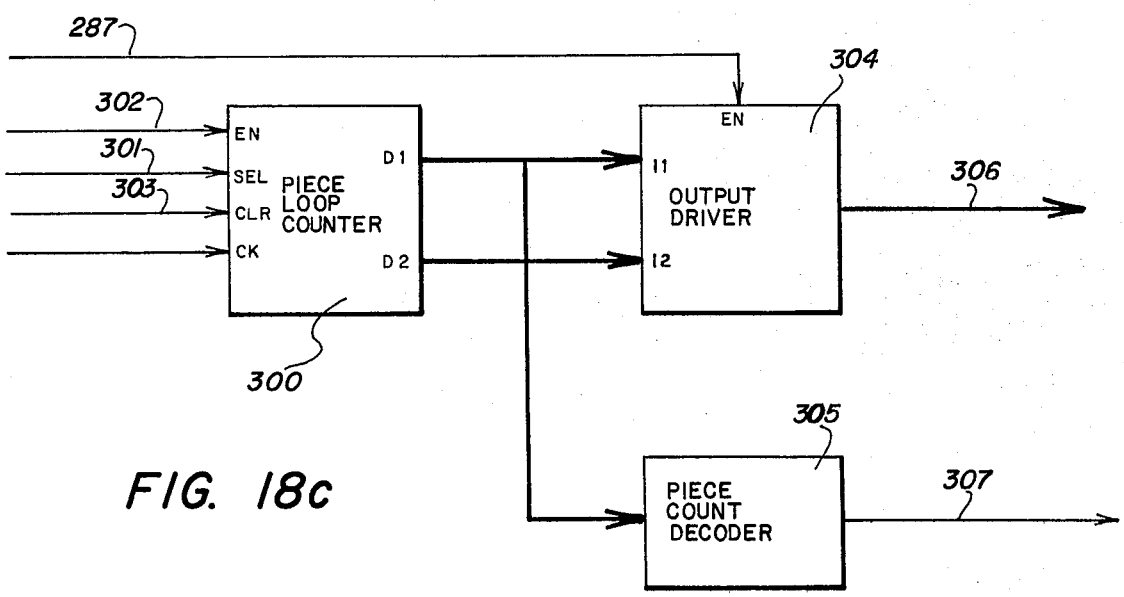

FIGS. 18a–18c

FIGS. 18a–18c illustrate in functional block diagram form the raster scan control logic unit 29 of FIG. 10.

The input of a limit storage unit 240 is connected by way of a 22 bit data cable 241 to cable 36 of FIG. 10. The load input to unit 240 is connected by way of a control line 242 to the D7 output of row/column control logic unit 28 of FIG. 10. The D1 output of unit 240 is applied to a five bit data cable 243 leading to the I1 input of a bottom limit comparator 244. The D2 output of unit 240 is applied to a five bit data cable 245 leading to the I1 input of a right limit comparator 246. The D4 output of unit 240 is applied by way of a ten bit data cable 247 to the I1 input of a selector 248.

The I2 input to comparator 244 is connected by way of a five bit data cable 249 to the D1 output of a row/column inverter 250 and to the I2 input of a ten bit starting point register 251. The output of comparator 244 is connected to the I3 input of a raster scan logic unit 252.

The I2 input to comparator 246 is connected by way of a five bit data cable 253 to the D2 output of inverter 250 and to the I1 input of register 251. The output of comparator 246 is connected to the I4 input of logic unit 252.

The I1 input to inverter 250 is connected to cable 48, and the I2 input to the inverter is connected to cable 50. The load input to register 251 is connected to the D3 output of logic unit 252. The D1 and D2 outputs of register 251 are connected by way of a five bit data cables 254 and 255 to the I2 and I3 inputs, respectively, of selector 248. The output of selector 248 is connected by way of a sixteen bit data cable 256 to cable 36 of FIG. 10. The SEL1 input to selector 248 is connected to the D5 output of logic unit 252, and the SEL2 input to selector 248 is connected to the D6 output of logic unit 252. The SEL3 input to selector 248 is connected to the D7 output of logic unit 252, and the SEL4 input to the selector is connected to the output D2 of a memory unit 261. The I1 input of the selector is connected to the D4 output of limit storage unit 240.

The I1 input to raster scan logic unit 252 is connected to a control line 258, and the clock input to the logic unit is connected to line 45 of FIG. 10. The I5 input to the logic unit is connected by way of a control line 259 to the D9 output of row/column control logic unit 28. the I6 input to logic unit 252 is connected by way of a control line 260 to the D10 output of logic unit 28. The EN enable input to logic unit 252 is connected to the D1 output of a start memory unit 261. The I8 input to logic unit 252 is connected to the output of a mark condition detector 262.

The D1 output of the raster scan logic unit 252 is connected by way of a control line 263 to the I9 input of logic unit 28 of FIG. 10. The D2 output of logic unit 252 is connected by way of a control line 264 to the I10 input of logic unit 28. The D3 output of the logic unit also is connected to the I1 input of an output logic unit 265 and to a control line 266 leading to the I8 input of the boundary search and stop control logic unit 30. The D4 output of logic unit 252 is connected to a control line 267 leading to the I8 input of logic unit 28 of FIG. 10. The D6 output of logic unit 252 further is connected to the I2 input of logic unit 265, and the D7 output of the logic unit is connected to the I3 inout of logic unit 265. The D8 output of logic unit 252 is connected to the EN enable input of memory unit 261.

The I1 input to detector 262 is connected by way of a control line 268 to the D2 output of memory plane unit 34 of FIG. 10, and the I2 input to the detector is connected to the control line 269 leading to data cable 52 of FIG. 10. The I3 input to detector 262 is connected by way of a control line 270 to the D1 output of marker memory unit 32.

The CK1 clock input to memory unit 261 is connected to line 45 and through an inverter 271 to the CK2 clock input of the memory unit. The load input to memory unit 261 is connected by way of a control line 272 to the D6 output of logic unit 28. The D2 output of memory unit 261 is connected to the I4 input of logic unit 265 and to the SEL4 input of selector 248.

The D1 output of logic unit 265 is applied by way of a control line 273a to the write enable input of marker memory unit 32 of FIG. 10, and the D2 output of the logic unit is applied to a control line 273b leading to the load input of column counter 163 of FIG. 14b. The D3 output of logic unit 265 is applied by way of a control line 273c to the load input of row counter 151.

Figure 24A:
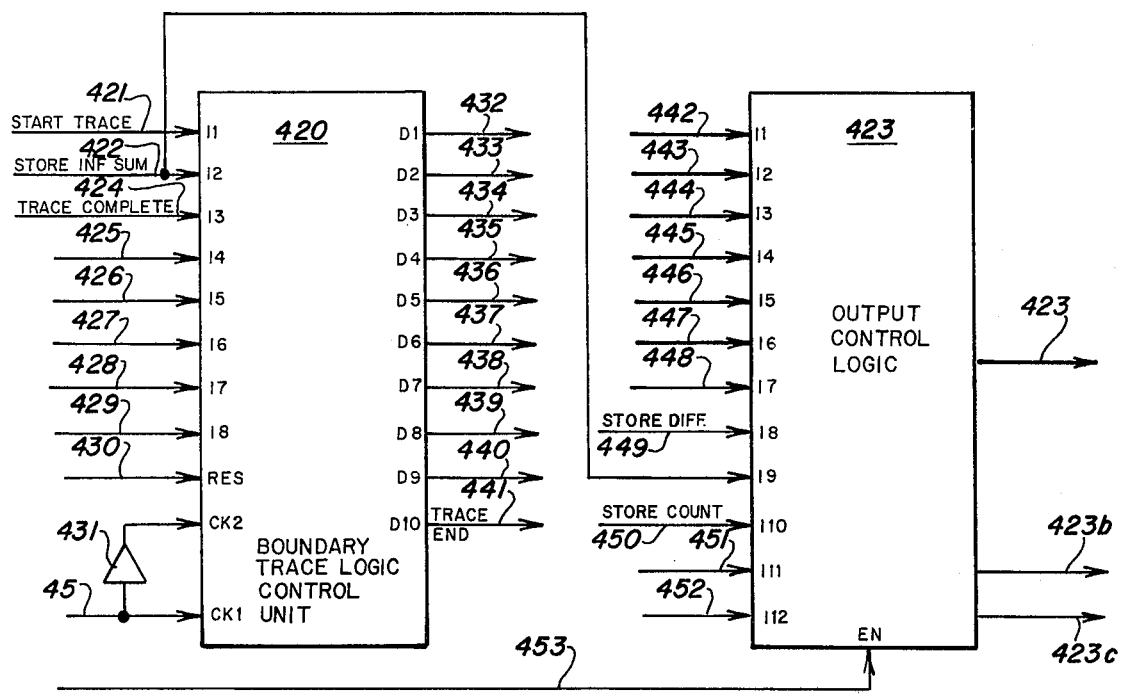
FIGS. 24a-24c comprise a functional block diagram of the boundary search and stop control logic unit of FIG. 10.

The EN1 enable input of a feature buffer control logic unit 275 is connected by way of a control line 276 to the D3 output of boundary trace logic control unit 420 of FIG. 24a, and the EN2 enable input of the logic unit 275 is connected by way of a control line 277 to the D1 output of logic unit 30. The EN3 enable input to logic unit 275 is connected to a control line 278 leading to the D13 output of logic unit 30, and the I4 input to logic unit 275 is connected to a control line 279 leading to the D10 output of logic unit 30. The I5 input to logic unit 275 is connected by way of a control line 280 to the D11 output of logic unit 30, and the I6 input to logic unit 275 is connected to control line 267. The I7 input to logic unit 275 is connected by way of a control line 281 to the D2 output of vector control logic unit 27 of FIG. 10. The I8 input to logic unit 275 is connected to a control line 282. The I9 input to logic unit 275 is connected to the D1 output of a decode selector 283, and the I10 input to logic unit 275 is connected to the D1 output of a seven bit format counter 284. The I11 input to the logic unit is connected to the D2 output of counter 284, and the I12 input to the logic unit is connected to D3 output of counter 284. The I13 input to the logic unit is connected to the D8 output of a format counter decoder 290.

The D1 output of feature buffer control logic unit 275 is connected by way of a control line 285 to the I15 input of logic unit 30 of FIG. 10, and the D2 output of the logic unit 275 is connected to control line 258 leading to the I1 input of logic unit 252. The D3 output of logic unit 275 is connected to a control line 286 leading to the I7 input of logic unit 28. The D4 output of logic unit 275 is connected to a control line 287, and the D5 output of logic unit 275 is connected by way of a control line 288 to the I2 input of feature memory unit 31. The D6 output of logic unit 275 is connected to a control line 289 leading to the D2 output of logic unit 30, to the I1 input to feature memory unit 31, and to the I4 input to logic unit 28. The D7 output of logic unit 275 is applied to the load input of counter 284, and the D8 output is connected to the CLR (clear) input of counter 284. The D9 output of logic unit 275 is connected to the EN enable input of counter 284, and to the EN enable input of decoder 290.

The I1-I4 inputs to decode selector 283 are connected by way of control lines 291 to the D12 output of logic unit 30. The output of decode selector 283 is applied to the input of counter 284, the output of which is applied to the input of decoder 290.

The D1 output of decoder 290 is applied to a control line 292 leading to the I5 input of logic unit 28 of FIG. 10, and the D2 output of decoder 290 is connected to a control line 293 leading to the I6 input of logic unit 28. The D3 output of decoder 290 is connected by way of a a control line 294 to the I14 input of logic unit 30 and to the I6 input of the loop/boundary detector 49. The D4 output of decoder 290 is applied to a control line 295 leading to the I13 input of logic unit 30, and the D5 output of decoder 290 is connected to a control line 296 leading to the I11 input of logic unit 30. The D6 output of decoder 290 is applied by way of a control line 297 to the I10 input of logic unit 30, and the D7 output of decoder 290 is connected to a control line 298 leading to the I12 input of logic unit 30.

A piece/loop counter 300 is comprised of two four bit binary counters which are selected by the logic level of the fourth bit of the VEC output of the vector control logic unit 27. The VEC4 bit is applied by way of a control line 301 to the SEL input to counter 300. The enable input to the counter is connected to a control line 302 leading to the D8 output of the feature buffer control logic unit 275. The clear input to counter 300 is connected to a control line 303 and to the D8 output of logic unit 28 of FIG. 10. The D1 output of counter 300 is connected to the I1 input of an output driver 304, and to the input of a piece count decoder 305. The D2 output of counter 300 is connected to the I2 input of driver 304. The enable input to driver 304 is connected to line 287 leading to the D4 output of logic unit 275, and the output of the driver is applied by way of an eight bit data cable 306 to cable 36 of FIG. 10. The output of decoder 305 is applied to a control line 307 leading to the I9 input of logic unit 30.

In operation, the row/column control logic unit 28 receives a first data clock pulse at its I3 input and issues a limit strobe to line 242 leading to the load input of the limit storage unit 240. In response thereto, the character image boundary limit information supplied by the character presence unit 12 of FIG. 1 to data cable 241 is stored into the limit storage unit 240.

No further activity within the raster scan logic unit 29 occurs until line 272 connected to the load input of start memory unit 261 transitions to a logic zero level. During this wait period, the D8 output of the raster scan logic unit 252 is at a logic one level to enable the start memory unit 261. Upon receiving a logic zero at the load input, the start memory unit 261 stores in the clock pulses appearing at the CK1 and CK2 inputs of the unit. Further, the D1 output of memory unit 261 transitions to a logic one level to enable the raster scan logic unit 252 to initiate a raster scan operation. Upon the raster scan logic unit 252 being enabled, the D8 output of the logic unit transitions to a logic zero level to disable the start memory unit 261. No further raster scan initialization signals can be received thereafter on line 272 until a trace complete signal is received on line 258.

During a raster scan, the row and column counts of counters 151 and 163 of FIG. 14b are applied by way of cables 48 and 50 through inverter 250 to comparators 244 and 246, respectively. In the event that the row count is equal to the bottom limit on cable 243, comparator 244 issues a logic one pulse to the I3 input of logic unit 252. Further, if the right boundary limit of the character image as carried by cable 245 is equivalent to the column count on cable 253, comparator 246 issues a pulse to the I4 input of logic unit 252. Upon the occurrence of a row count of 31, row counter 151 applies a logic zero pulse by way of lines 155 and 259 to the I5 input of logic unit 252. In addition, the column counter 163 issues a logic zero pulse by way of lines 168 and 260 to the I6 input of logic unit 252 upon the occurrence of a column 23 count. When either a logic one level appears at the I4 input or a logic zero level appears at the I6 input of logic unit 252, the D6 output of the logic unit transitions to a logic zero level to select the selector 248 to the I1 input. In addition, the D2 output of logic unit 265 transitions to a logic zero level to load the column counter 163 of logic unit 28 with the left limit information carried by data cable 247. If a logic one level appears at the I3 input of logic unit 252 or a logic zero level occurs at the I6 input thereof, the D4 output of the logic unit transitions to a logic zero level to indicate the completion of a trace operation.

If an unmarked black cell having an adjacent white cell to the left is encountered during a raster scan, the detector 262 indicates a mark condition. Upon the occurrence of a mark condition, the D3 output of logic unit 252 transitions to a logic zero level to initiate a boundary trace. Further, the starting point register 251 is loaded with the current row and column counts, and the D1 output of logic unit 265 transitions to a logic zero level to set the write enable input of the marker memory unit 32. A logic one then is loaded into the marker memory unit location indicated by the current row and column counts.

Upon the completion of a boundary trace, the I1 input to the logic unit 252 transitions to a logic one level. In response thereto, the D5 output of logic unit 252 transitions to a logic one level, and the D6 and D7 outputs transition to a logic zero level. The selector 248 thus is selected to its I2 and I3 inputs, and the D2 and D3 outputs of logic unit 265 transitions to a logic zero level to load the output of selector 248 into the counters 151 and 163 of FIG. 14b. The raster scan operation thereafter continues from the last mark condition indicated by detector 262. As the raster scan continues from row to row, and column to column, the D1 and D2 outputs of logic unit 252 transition to logic zero levels to increment the row and column counters, respectively.

As before described, the feature generation process occurs in three boundary trace operations. Inflection points, boundary vectors, slope averages, a boundary trace circumference count, and the row and column count maximums and minimums are detected and stored during the first trace. During the second boundary trace, the image boundary is thinned to an image having a one-cell width. Further, the image stops are detected and their locations are recorded. During the third boundary trace, the stops detected during the second boundary trace are vertically ordered and their directions are determined.

Referring to FIG. 18b, the EN1 input to the feature buffer control to logic unit 275 is set and the EN2 enable input of the logic unit transitions to a logic zero level during the first boundary trace. Concurrent therewith, a 110 nanosecond logic one pulse is issued to line 285 to provide a synchronization pulse to the control logic unit 30 as will be further described. The logic unit 275 thereafter enters into a wait state until the character image in memory plane units 33–35 has been thinned to a one-cell width image. Lines 276 and 277 thereupon transition to a logic zero level and logic unit 275 issues a 110 nanosecond pulse at the D8 output synchronous with the leading edge of the logic zero transition on line 277 to clear the format counter 284. After a clock period of 110 nanoseconds, a second 110 nanosecond pulse is supplied to the D9 output of logic unit 275 to enable the format counter 284.

If the line 282 is at a logic one level at the time that the D8 output of logic unit 275 transitions to a logic zero level, the logic unit 275 issues a logic zero pulse to line 288 to preset the feature memory unit 31 to a binary 63. The binary 63 places the loading operation at the location in the feature memory unit where the character image in memory plane units 33–35 is to be loaded. As before described, memory locations 0–63 include the slope averages, and the circumference count where the slope average occurred during a boundary trace.

The format counter 284 upon being enabled counts at the clock rate of 9 MHz. During the first four counts, the D1 output of format counter decoder 290 transitions to a logic zero level to access the minimum coordinates of the character image saved by the row/column control logic unit 28 into the feature memory unit 31. Upon the occurrence of a count of two the D1 output of format counter 284 transitions to a logic zero level and the D2 output of the counter transitions a logic one level. In addition the logic unit 275 issues a 110 nanosecond logic zero pulse to line 289 to store the minimum coordinates addressed by the signal on line 292 into the feature memory unit 31. Durng the time period of the binary 4 through binary 7 count, the D2 output of decoder 290 transitions to a logic zero level to access the maximum coordinates saved by the logic unit 28. Upon the occurrence of a binary count of 6, the logic unit 275 issues a 110 nanosecond logic zero pulse to line 289 to store the maximum coordinates into the feature memory unit 31. Between the binary counts of 8 and 11, the decoder 290 lowers the line 294 to a logic zero level to access the circumference count of the loop/boundary detector 49. Upon the occurrence of a count of binary 10, the D1 output of format counter 284 again transitions to a logic zero level and the D2 output of the counter transitions to a logic one level. The logic unit 275 thereupon issues a 110 nanosecond logic zero pulse to line 289 to store the circumference count in the feature memory unit 31. Between the binary counts of 12 and 15, the D4 output of decoder 290 transitions to a logic zero level to access the difference vector and inflection count information stored in the boundary search and stop control logic unit 30. Upon the occurrence of a count of 14, the D1 output of counter 284 transitions logic zero level and the D2 output of the counter transitions a logic one level. The logic unit 275 thereupon issues a 110 nanosecond logic zero pulse to line 289 to store the difference vector and inflection count into the feature memory unit 31. Between the binary counts of 16 and 19, the D5 output of decoder 290 transitions to a logic zero level to access the stop and accumulated inflection information stored in the logic unit 30. Upon the occurrence of a count of 18, the D1 and D2 outputs of counter 284 transition to a logic zero level and a logic one level, respectively. Logic unit 275 thereafter issues a logic zero pulse to line 289 to store the stop and accumulated inflection data into the feature memory unit 31. Following the count of 19, the decoder 290 decodes every four clock pulses. Further, upon the occurrence of every three clock pulses, the logic unit 275 generates a logic zero pulse to line 189 to increment the address input to the feature memory unit 31 tostore all logic one's therein.

As before described in connection with the description of FIGS. 14a and 14b, when the cable 36 is not accessed as would be the case when the D1-D7 outputs of decoder 290 are all at the logic one level, the cable is in a high impedance state. Further, the lines of cable 36 are biased to a logic one level when in the high impedance state. Thus, all logic one's are loaded into the feature memory unit 31 if a memory load is initiated during the high impedance state.

Upon the occurrence of a count of 32, the D8 output of decoder 290 transitions to a logic zero level. In response thereto, the logic unit 275 senses the line 280 to detect a stop count other than zero. If line 280 is at a logic one level indicating that the stop count stored in the logic unit 30 is zero, the format counter 284 continues to count as before described until a count of 64 is reached. If a stop count other than zero is sensed on line 280, the D1 output of logic unit 275 transitions to a logic one level to indicate that the feature memory unit 31 has been loaded. The logic unit 30 thereafter proceeds to a next feature derivation operation.

As the format counter 284 continues to count between the binary count of 32 and the binary count of 64, the occurrence of each four counts is decoded by decoder 290 as before described. Further, a logic zero pulse is issued to line 289 upon the occurrence of every third count. Thus, the address to feature memory unit 31 is incremented, and all logic one's are loaded into the indicated storage locations. When the format counter 284 counts to 64 under a zero stop count conditions, the D3 output of the counter transitions to a logic one level. The logic unit 275 thereupon issues a 110 nanosecond logic one pulse to line 285 to indicate that the loading operation for the feature memory unit 31 has been completed.

The boundary of the character image stored in memory plane units 3-35 thus has been traced, and an initial thinning has occurred. During a mext boundary trace operation, the character image is thinned to a one-cell stroke width and the feature buffer control logic unit 275 is idle. Upon thinning the character image to a single stroke width the detecting the location of all stops occurring in the character image, the line 277 transitions to a logic zero level. On completing the second boundary trace operation, the D1 output of logic unit 275 transitions to a logic one level. Thereafter, a third boundary trace operation is initiated as indicated by the line 276 at a logic one level. As the stops located during the second boundary trace operation are encountered during the third boundry trace operation, the logic unit 275 senses line 281. If line 281 is at a logic one level indicating that a stop is a good stop, the D3 and D6 outputs of logic unit 275 transition to a logic zero level. In response to the logic zero level of line 286, the starting point coordinates of the stop stored in row/column counter logic unit 28 are accessed. In response to the logic zero pulse on line 289, the starting point coordinates are stored in the feature memory unit 31. This process is repeated for each stop encountered during the third boundary trace operation.

After the starting point coordinates for each stop in the character image boundary have been stored in the feature memory unit 31, line 278 transitions to a logic zero level. In addition, line 279 transitions to a logic one level to indicate that each stop has been traced and that the starting point for each stop has been stored in feature memory unit 31. In response thereto, the logic unit 275 traces the logic level transition of line 279 to enable counter 284 by raising the D9 output of the logic unit to a logic one level. The D9 output of the logic unit is delayed one clock pulse, and applied with the D7 output of the logic unit to load the format counter with the DOUT output of the decode selector 283. The output of the decode selector is a fixed value if the number of good stops detected is equal to or greater than five as indicated by the D1 output of the selector. If the number of good stops is less than five, then the stop count appearing on lines 291 plus a binary 36 is loaded in the format counter 284.

A count of 32 is followed by a time period which is equivalent to four times the number of stop counts indicated by lines 291. Durng the time period no information is accessed and no information is stored in feature memory unit 31. Upon the next occurring binary counts, the decoder 290 continues as before described. That is, every four counts are decoded, and the line 289 transitions to a logic zero every three counts to increment the feature memory unit 31 and to store logic one's into the indicated memory location. After the occurrence of a count of 54, the D6 output of decoder 290 transitions to a logic zero level during the time period including binary counts of 56 and 59. Further, upon the occurrence of a count of 58, the D6 output of logic unit 275 transitions to a logic zero level to increment the feature memory unit 31, and to store in the indicated memory location the stop count information saved by the logic unit 30.

During the time period including the binary counts of 60 and 63, the D7 output of decoder 290 transitions to a logic zero level. In addition, the D6 output of logic unit 275 transitions to a logic zero level upon the occurrence of a binary count of 62. The stop information saved by the logic unit 30 is accessed thereby, and stored into the feature memory unit 31.

Upon the occurrence of a count of 64, the D3 output of the format counter 284 transitions to a logic one level. The logic unit 275 in response thereto issues a logic one pulse to line 258 to indicate that the third trace operation has been completed. Thereafter, a raster scan is initiated from the last indicated mark condition.

Upon completion of a raster scan of the character image stored in memory plane units 33-35, the line 267 transitions a logic zero for 110 nanoseconds. The signal is buffered for 110 nanoseconds within the logic unit 275 and then issued to line 287. Concurrent with the line 267 transition, the line 289 transitions to a logic zero level for 110 nanoseconds. The output driver unit 304 is enabled by the signal on line 287, and the piece and loop counts of counter unit 300 are applied to cable 306 leading to cable 36 of FIG. 10.

Upon the occurrence of a logic one signal on line 303 leading from the row/column counter logic unit 28 of FIG. 10, the piece/loop counter unit 300 is cleared. If line 302 leading from the D8 output of logic unit 275 transitions to a logic zero level during the time period that line 301 is at a logic one level, the piece counter comprising counter unit 300 is incremented. If the line 301 is as a logic zero level during the period that line 302 is at a logic zero level, the loop counter comprising counter unit 300 is incremented. The output of the piece counter comprising counter unit 300 is applied to the piece count decoder 305. The output of decoder 305 indicates the occurrence of a piece count of zero.

FIG. 19

FIG. 19 is a timing diagram of the operation of the raster scan logic unit 252 of FIG. 18a.

A discrete waveform 310 illustrates the 9 MHz system clock signal, and a discrete waveform 311 illustrates the signal carried by line 272 leading to the load input of the start memory unit 261. A discrete waveform 312 illustrates the D2 output of start memory unit 261, and a discrete waveform 313 illustrates the D1 output of the memory unit. The discrete waveforms 314-316 are control signals generated by the raster scan logic 252 for internal operation. A discrete waveform 317 illustrates the D2 output of logic unit 252, and a discrete waveform 318 illustrates the I4 input to logic unit 252. A discrete waveform 319 illustrate the D1 output of logic unit 252, and a discrete waveform 320 illustrates the I8 input to the logic unit. A discrete waveform 321 illustrates the D3 output of logic unit 252, and a discrete waveform 322 illustrates the D8 output of the logic unit. A discrete waveform 323 illustrates the D5 output of logic unit 252, and waveforms 324 and 325 illustrate the D2 and D3 outputs, respectively, of logic unit 265. A discrete waveform 326 illustrates the D1 output of logic unit 265.

In the time period immediately following the loading of a character image into memory plane units 33-35 and the loading of boundary limit information into the limit storage unit 240, the D8 output of raster scan logic unit 252 is at a logic one level to enable the start memory unit 261. Upon the occurrence of a 110 nanosecond start look pulse 311a on line 272, the pulse is buffered for 110 nanoseconds in the start memory unit 261 as illustrated by pulse 312a and applied to the I4 input of output logic unit 265 and to the SEL4 input of selector 248. Synchronous with the pulse 312a, the logic unit 265 issues logic zero pulses 324a and 325a at the D2 and D3 outputs, respectively, of the logic unit.

The pulse 311a also is buffered 220 nanoseconds in start memory unit 261 and applied as a pulse 313a to the enable input of logic unit 252. Upon the occurrence of the trailing edge of pulse 313a, a latch internal to the logic unit 252 is set as illustrated by waveform 314. Synchronous with the trailing edge of pulse 313a, a pulse 315a is generated internal to the logic unit 252 to initiate a first logic state operation. More particularly, waveforms 315 and 316 are logic state control waveforms. A logic state zero operation is initiated when both waveforms are at a logic zero level, a logic state one operation is initiated when waveform 316 is at a logic zero level and waveform 315 is at a logic one level, a logic state two operation is initiated when waveform 316 is at a logic one level and waveform 315 is at a logic zero level, and a logic state three operation is initiated when both waveforms are at a logic one level.

When waveform 314 transitions to a logic one level, the 110 nanosecond pulse 315a is generated to initiate a logic state one operation. The row counter 151 of FIG. 14b is sensed for a row count of 31, and the row count is compared to the image bottom limit information. Thereafter, a 110 nanosecond pulse 316a is generated to initiate a logic state two operation. The column counter is sensed for a column count of 23, andthe column count is compared to the right boundary limit information of the character image. Further, the output of detector 262 is sensed for a mark condition. During the time period between pulse 316a and pulse 315b, logic unit 252 initiates a logic state zero operation which is primarily a wait state. Upon the occurrence of pulses 315c and 316b, a logic state three operation is initiated which is a wait state from which a transfer is made upon the completion of a trace operation.

As illustrated by waveform 317, the logic unit 252 issues 110 nanosecond logic zero pulses to increment column counter 163 of FIG. 14b as long as the column count is other than 23 and the column count does not exceed the right boundary limit information. When the column count exceeds the right bondary limit information as illustrated by pulse 318a, however, no increment pulse is generated during logic state two. Rather, a row counter increment pulse 319a is generated. Concurrently, the logic unit 252 supplies a 110 nonosecond logic zero pulse to the I2 input of logic unit 265. In response thereto, the logic unit 265 issues a 110 nanosecond pulse 324b at the D2 output thereof, and the D6 output of logic unit 252 is applied to the SEL2 input of selector 248 to select the top and left boundary limit information on cable 247 to cable 256. The pulse 324b is applied to the load input of the row counter 151 which is loaded with the left boundary limit information.

Upon the occurrence of a mark condition, waveform 320 transitions to a logic one level. Upon the next occurrence of a logic state two operation as represented by waveforms 315 and 316, a 110 nanosecond start trace pulse 321a is applied by logic unit 252 to the load input of register 251, to the I1 input of logic unit 265 and to control line 266. The output logic unit 265 in response thereto generates a pulse 326a which is applied to the write enable input of the marker memory unit 32 of FIG. 10 to store the coordinates of the mark condition. Synchronous with the occurrence of the trailing edge of pulse 321a, the logic unit 252 enters into a logic state three operation as represented by waveforms 315 and 316, and the D5 output of the logic unit transitions to a logic one as illustrated by waveform 323.

FIG. 20

Figure 20:
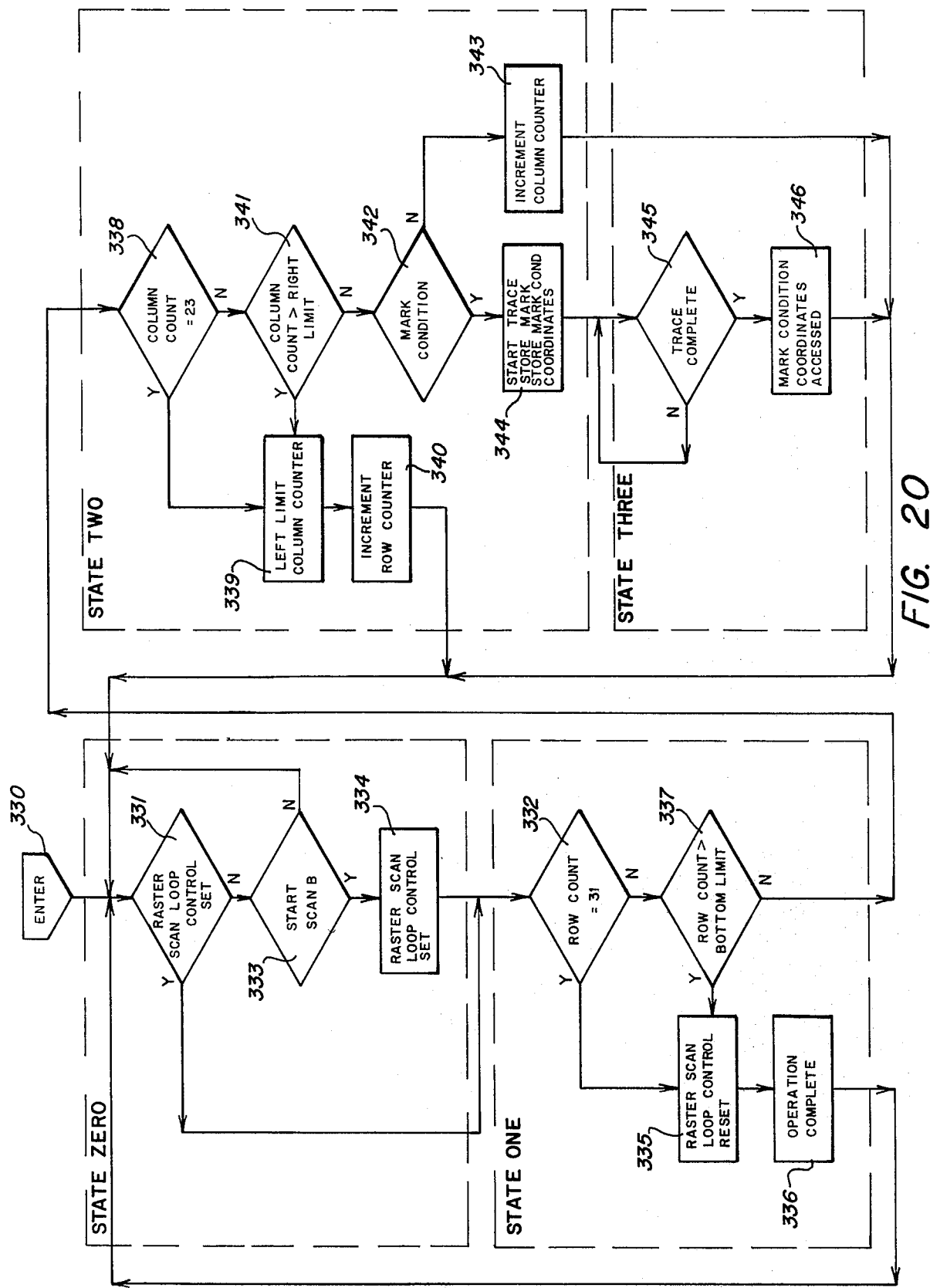

FIG. 20 is a logic flow diagram of the operation of the raster scan logic unit 252 of FIG. 18a.

Entry is made to a logic step 330 from which a transfer is made to a logic step 331 of a logic state zero. At step 331, a test is made to determine whether a raster scan loop control latch as illustrated by waveform 314 of FIG. 19 is set. If the latch is set, a transfer is made from step 331 to a logic step 332 of a logic state one. If the latch is not set, however, a transfer is made from step 331 to a logic step 333 where the D1 output of start memory unit 261 is sensed for a logic one level. If a logic one level is not detected, a transfer is made from step 333 to reenter step 331. If a logic one level is detected, however, a transfer is made from step 333 to a logic step 334 where the raster scan loop control latch is set. From step 334 a transfer is made to logic step 332 of the logic state one.

At step 332, line 259 is sensed for a logic zero level indicating that a row count of 31 has occurred. If a row count of 31 is detected, a transfer is made from step 332 to a logic step 335 where the raster scan loop control latch is reset. From step 335, a transfer is made to a logic step 336 where an operation complete signal is issued to line 267. The entire character image stored in memory plane units 33-35 thus has been scanned, and all features of the character image have been detected. From step 336 a transfer is made to reenter step 331 of logic state zero.

If a row count of 31 is not detected at step 332, a transfer is made from step 332 to a logic step 337 where the row count is compared to the bottom character limit information supplied by the character presence unit 12 of FIG. 1. If the row count exceeds the character image bottom limit, a transfer is made from step 337 to step 335 where the logic decision process continues as before described. If the row count is less than or equal to the bottom limit, however, a transfer is made from step 337 to a logic step 338 of a logic state two.

At step 338, the output of the column counter 163 is sensed to detect a count of 23. If a count of 23 is detected, a transfer is made from step 338 to a logic step 339 where the image left boundary limit information is stored into the column counter. From step 339, a transfer is made to a logic step 340 where the row counter 151 is incremented. A transfer then is made from step 340 to reenter step 331.

If a count of 23 is not detected at step 338, a transfer is made from step 338 to a logic step 341 where the column count is compared to the right character image limit. If the column count exceeds the right limit, a transfer is made from step 341 to logic step 339 where the logic decision process continues as before described. If the column count is less than or equal to the right limit, however, a transfer is made from step 341 to a logic step 342 where the output of mark condition detector 262 of FIG. 18a is sensed for a mark condition. If a mark condition is not detected, a transfer is made from step 342 to a logic step 343 where the column counter is incremented. From step 343 a transfer is made to reenter logic step 331. If a mark condition is detected at step 342, however, a transfer is made to a logic step 344 where a logic zero pulse is issued to line 266 to start a trace operation. In addition, the boundary coordinates where the mark condition occurred are stored in the start register 251 of FIG. 18a. Further, a logic one is stored into the memory location of the marker memory unit 32 indicated by the row and column counts. From step 344, a transfer is made to a logic step 345 of a logic state three.

At step 345, line 258 is sensed to detect a trace complete condition. If no signal is detected, the logic decision process remains in a wait state until a trace complete signal occurs. At that time, a transfer is made from step 345 to a logic step 346 where the mark condition coordinates stored in the register 251 of FIG. 18a are accessed by the selector 248. From step 346, a transfer is made to reenter logic state zero at step 331.

FIG. 21

Figure 21:
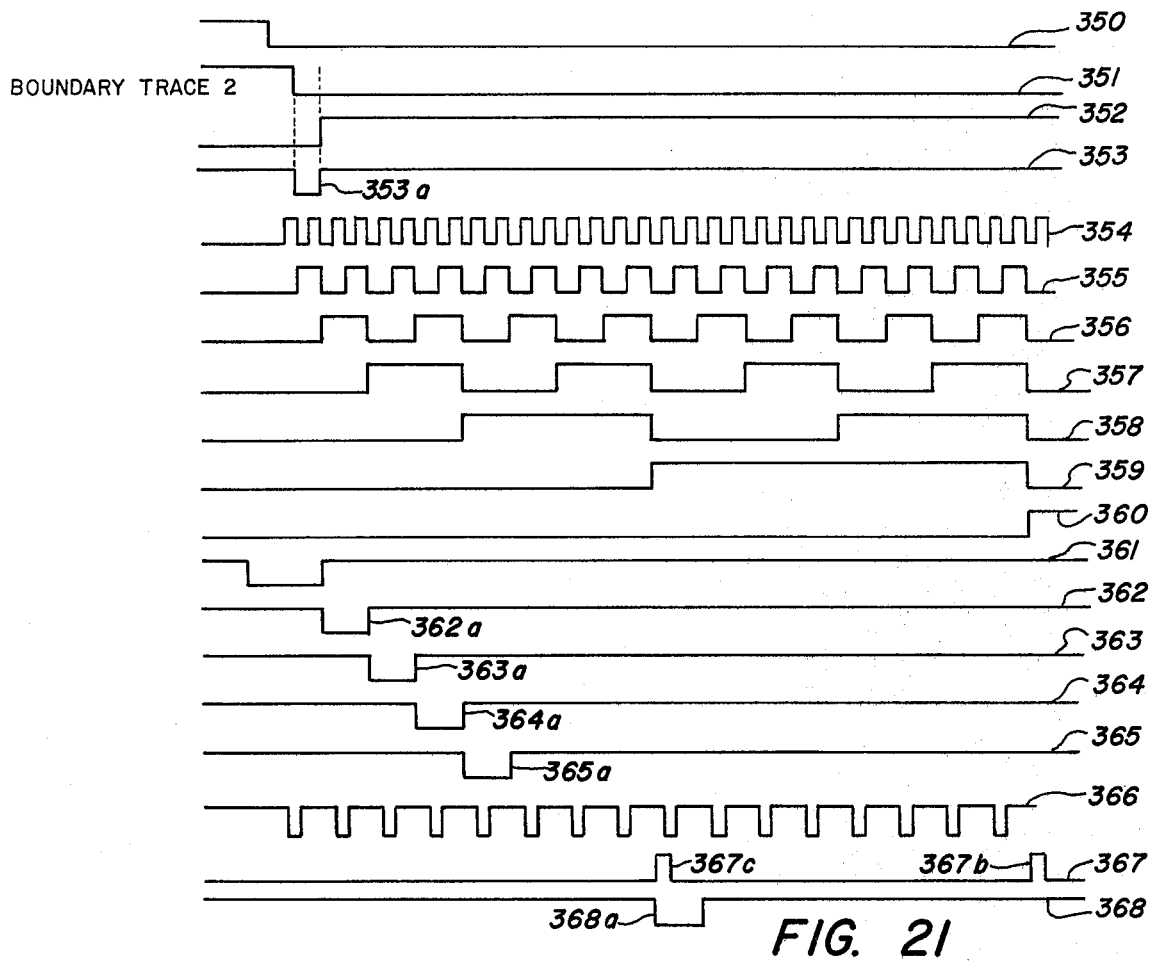
FIG. 21 is a timing diagram of the operation of the feature buffer control logic unit of FIG. 18b.

FIG. 21 is a timing diagram illustrating the operation of the feature buffer control logic unit 275 of FIG. 18b.

A discrete waveform 350 illustrates the D3 output of the boundary search and stop control logic unit 30 of FIG. 10. A discrete waveform 351 illustrates the D1 output of logic unit 30, and a discrete waveform 352 illustrates the D9 output of logic unit 275. A discrete waveform 353 illustrates the D8 output of logic unit 275, and a discrete waveform 354 illustrates the 220 nanosecond D1 output of format counter 284. A discrete waveform 355 illustrates the D2 output of counter 284, and waveforms 356-360 illustrate the five bit output DOUT of the format counter 287. Waveform 360 in addition illustrates the D3 output of format counter 284.

Discrete waveforms 361-365 illustrate the D1-D5 outputs, respectively, of the format counter decoder 290. A discrete waveform 366 illustrates the D6 output of logic unit 275, and a discrete waveform 367 illustrates the D1 output of logic unit 275. A discrete waveform 368 illustrates the D8 output of decoder 290.

Upon initiating a second boundary trace of the character image stored in memory plane units 33-35 to thin the character boundary to a one-cell stroke width, line 276 of FIG. 18b transitions to a logic zero level, as illustrated by waveform 350. When the second boundary trace operation has been completed, the control line 277 transitions to a logic zero as illustrated by waveform 351. The waveform 351 is delayed 110 nanoseconds in logic unit 275 as illustrated by waveform 352, and applied to the enable inputs of the format counter 284 and the format counter decoder 290. Further, logic unit 275 applies a logic zero pulse 353a by logic unit 275 to the clear input of the format counter 284. The pulse 353a has a leading edge synchronous with the occurrence of the logic zero level of waveform 351, and a trailing edge synchronous with the occurrence of the logic one level of waveform 352.

The counter 284 counts at a 9 MHz rate. The bit O-bit 6 outputs of the counter are illustrated by waveforms 354–360. The bit 2 bit 5 outputs are decoded to form the waveforms 361–365. During the time period that waveform 361 is at a logic one level, the minimum character image row and column counts stored in the row/column control logic unit 28 are accessed. Further, during the time period after waveform 362 transitions from a logic zero to a logic one level at 362a, the maximum row and column counts of the character image are accessed. In addition, after the waveform 363 transitions from a logic zero to a logic one level at 363a, the circumference count stored in loop/boundary detector 49 is accessed. After the waveform 364 transitions from a logic zero to a logic one level at 364a, the difference vector information and the inflection count saved by the boundary search and stop control logic unit 30 are accessed. When waveform 365 transitions from a logic zero to a logic one level at 365a, the accumulated inflection point data stored in logic unit 30 is accessed.

Each time waveform 354 is at a logic one level and waveform 355 is at a logic zero level, a pulse of waveform 366 is generated to increment the feature memory unit 31 and to store information carried by cable 36 into the memory unit.

If the I5 input to logic unit 275 is at a logic zero level to indicate that the stop count is not equal to zero at the time that a 880 nanosecond pulse 368a is supplied by the decoder 290 to the I13 input of logic unit 275, a 110 nanosecond pulse 367a of waveform 367 is supplied by logic unit 275 to line 285. The feature information detected during the second boundary trace operation thereupon has been stored into the feature memory unit 31. If the line 280 is at a logic one level to indicate a stop count equal to zero at the time the D3 output of format counter 284 as illustrated by waveform 360 is at a logic one level, a pulse 367b is supplied to line 285. The pulse 367b indicates that logic one's have been loaded into feature memory unit 31 to preserve a fixed character feature boundary.

FIG. 22

Figure 22:
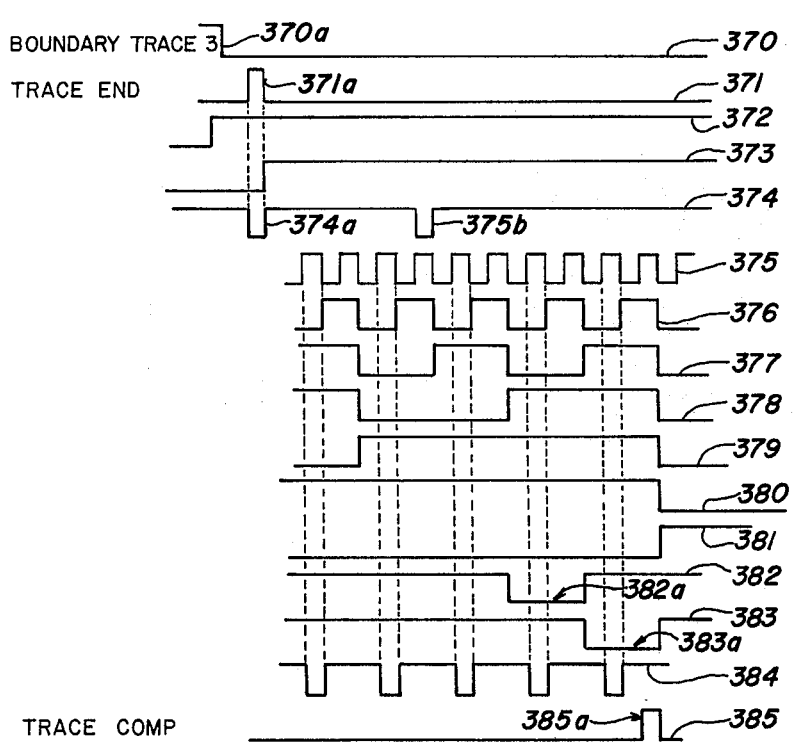
FIG. 22 is a timing diagram illustrating the operation of the feature buffer control logic unit of FIG. 18b under special stop conditions.

FIG. 22 is a timing diagram illustrating the operation of the feature buffer control logic unit 275 of FIG. 18b upon the occurrence of a stop count less than five, and a stop count greater than or equal to five at the completion of boundary trace three.

A discrete waveform 370 illustrates the signal carried by line 278 of FIG. 18b, and a discrete waveform 371 illustrates the signal carried by line 279. A discrete waveform 372 illustrates the D1 output of decode selector 283, and a discrete waveform 373 illustrates the D9 output of logic unit 275. A discrete waveform 374 illustrates the D7 output of logic unit 275, and a discrete waveform 375 illustrates the D1 output of format counter 284. A discrete waveform 376 illustrates the D2 output of counter 284, and discrete waveforms 377–381 illustrate the five bit DOUT output of the counter. In addition, waveform 381 illustrates the D3 output of the counter. A discrete waveform 382 illustrates the D6 output of format counter decoder 290, and a discrete waveform 383 illustrates the D7 output of the decoder. A discrete waveform 384 illustrates the D6 output of the logic unit 275, and a discrete waveform 385 illustrates the D2 output of the logic unit.

Upon completing a second boundary trace operation wherein the character image boundary is thinned to a one-cell stroke width and character stops are detected, a third boundary trace operation is initiated as indicated by the transition from a logic one to a logic zero at 370a of waveform 370. After the character stops have been vertically ordered and each stop has been traced, the boundary search and stop control logic unit 30 of FIG. 10 issues a 110 nanosecond pulse 371a. In response to and synchronous with pulse 371a, the logic unit 275 issues a pulse 374a to the load input of format counter 284. Upon the occurrence of the trailing edge of pulse 374a, the D9 output of logic unit 275 transitions to a logic one level as illustrated by waveform 373 to enable format counter 284 and format counter decoder 290.

Upon the occurrence of the pulse 374a, the format counter 284 is loaded from the decode selector 283 with a value equal to a binary 32 plus four times the stop count. More particularly, by way of example, when the stop count is equal to three, the format counter 284 is loaded with a binary 0011010 which is equivalent to a decimal 44. Each time the waveform 375 is at a logic one level and the waveform 376 is at a logic zero level, a pulse of waveform 384 is applied to the line 289 to increment the feature memory unit 31 and to store information carried by cable 36 into the memory unit. If a stop count equal to or greater than five occurs as illustrated by waveform 372, a load pulse 374b is supplied to the load input of format counter 284. The counter in response thereto is loaded from the decode selector 283 with a value of decimal 52.

Between the counts of 56 and 59, the D6 output of decoder 290 transitions to a logic zero as illustrated by waveform 382 at 382a, and between the counts of 60 and 63 the D7 output of the decoder transitions to a logic zero level as illustrated by waveform 383 at 383a. Further, the D2 output of logic unit 275 transitions from a logic zero to a logic one level as illustrated by pulse 385a of waveform 385 when a count of 64 occurs.

FIG. 23

Figure 23:
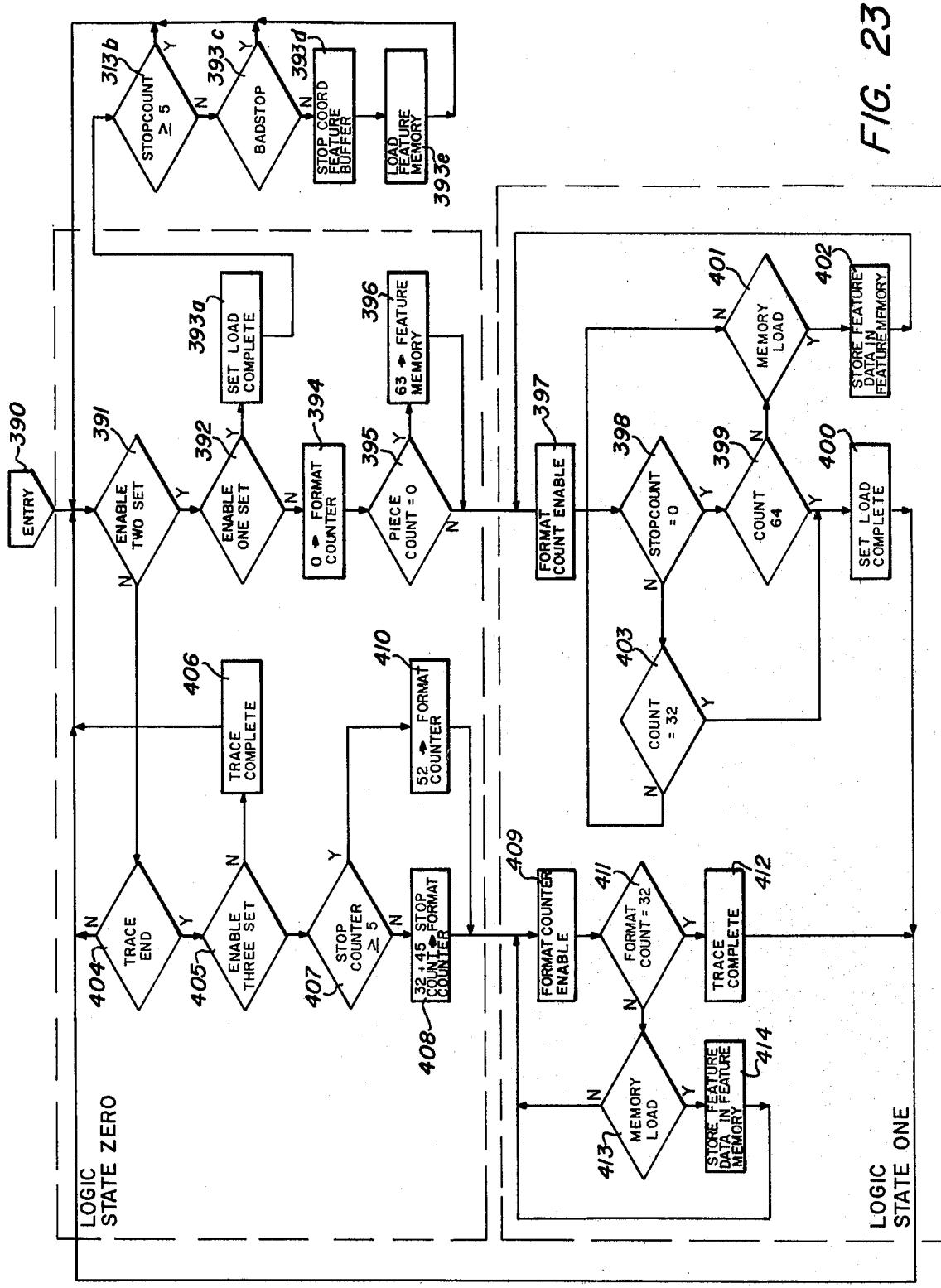
FIG. 23 is a logic flow diagram of the operation of the feature buffer control logic unit of FIG. 18b.

FIG. 23 is a logic flow diagram of the operation of the feature buffer control logic unit 275 of FIG. 18b.

Entry is made at a logic step 390 from which a transfer is made to a logic step 391. At step 391, the EN3 input of logic unit 275 is sensed for a logic one level. If a logic one level is detected, a transfer is made from step 391 to a logic step 392 where the EN1 input of logic unit 275 is sensed for a logic one level. If a logic one level is detected at step 392, a transfer is made to a logic step 393a where a logic one pulse is issued to line 295. The boundary search and stop control logic unit 30 of FIG. 10 thereby is signaled that a load operation for the feature memory unit 31 has been completed.

From step 393a, a transfer is made to a logic step 393b where the D1 output of decoder selector 283 is sensed to detect a stop count equal to or greater than five. If the stop count is greater than or equal to five, a transfer is made from step 393b to reenter step 391. If the stop count is less than five, however, a transfer is made from step 393b to a logic step 393c where the I7 input to logic unit 275 is sensed to detect a logic zero level indicating that a bad stop has been detected. If a logic zero level is present, a transfer is made from step 393c to reenter step 391. If a logic zero level is not present, however, a transfer is made from step 393c to a logic step 393d where the D3 output of logic unit 275 transitions to a logic zero level. The row/column counter logic unit 28 of FIG. 10 thereby is signaled that the coordinates of a stop that has been traced are to be stored in the feature memory unit 31. From step 393d, a transfer is made to a logic step 393e where the D6 output of logic unit 275 is lowered to a logic zero level to store the stop coordinates on cable 36 into the feature memory unit 31. From step 393e, a transfer is made to reenter step 391 where the logic decision process continues as before described.

If a logic one level is not detected at step 392, a transfer is made from step 392 to a logic step 394 to clear the format counter 284. From step 394, a transfer is made to a logic step 395 to sense the I8 input to logic unit 275 to detect a logic one level indicating a piece count of zero. If a count of zero is detected, a transfer is made from step 395 to a logic step 396 to load the feature memory unit 31 with a binary 63. From step 396, a transfer is made to a logic step 397 of a logic state one. If at step 395 the piece count is not zero, the logic proceeds directly to logic state one.

At step 397, format counter 284 is enabled and a transfer is made to a logic step 398. At step 398, the I5 input of logic unit 275 is sensed to detect a logic one level indicating that a stop count of zero has occurred. If a logic one level is detected at step 398, a transfer is made to a logic step 399 where the D3 output of format counter 284 is sensed to detect a logic one level indicating that a count of 64 has occurred. If a count of 64 has occurred, a transfer is made from logic step 399 to a logic step 400 to issue a logic one pulse to line 285 to indicate that a load operation for the feature memory unit 31 has been completed. From step 400, a transfer is made to reenter step 391.

If a count other than a count of 64 is detected at step 399, a transfer is made from step 399 to a logic step 401 where the D1 and D2 outputs of the format counter 284 are sensed to detect a memory load condition. If the D1 output is at a logic one level and the D2 output is at a logic zero level, then a memory load condition exists and a transfer is made from step 401 to a logic step 402 to store the feature data appearing on cable 36 into feature memory unit 31. From step 402, a transfer is made to reenter step 397.

If a stop count of zero is not present at step 398, a transfer is made from step 398 to a logic step 403 where the D8 output of the format counter decoder 290 is sensed for an indication that a count of 32 has occurred. If a count of 32 has occurred, a transfer is made from step 403 to step 400. If a count of 32 has not occurred, however, a transfer is made from step 403 to step 401 where the logic decision process continues as before described.

If a logic one level is not detected at step 391, a transfer is made from step 391 to a logic step 404 where the I4 input of logic unit 275 is sensed for a logic one level. If no logic one level is present, a transfer is made from step 404 to reenter step 391. If a logic one level is detected, however, all boundary traces of the character image stored in memory plane units 33–35 have been completed, and a transfer is made from step 404 to a logic step 405 where the EN3 input of logic unit 275 is sensed for a logic one level. If a logic one level is not detected, a transfer is made from step 405 to a logic step 406 where a logic one pulse is issued to line 258 to indicate to logic unit 30 of FIG. 10 that the boundary trace operation is complete. From step 406, a transfer is made to reenter step 391.

If the EN3 input of logic unit 275 has been set, a transfer is made from step 405 to a logic step 407 where the stop counter of logic unit 30 is sensed for a count greater than or equal to five. If a stop count less than 5 is detected, a transfer is made from step 407 to a logic step 408 to load the format counter 284 with a value equivalent to a binary 32 plus 4 times the current stop count. From step 408, a transfer is made to a logic step 409 of logic state one. If a stop count greater than or equal to five is detected at step 407, a transfer is made from step 407 to a logic step 410 where the format counter is loaded with a binary value of 52. From step 410, a transfer is made to step 409 to enable the format counter. From step 409, a transfer is made to a logic step 411 where the D8 output of the format counter decoder 290 is sensed to detect a logic zero level indicating that a count of 32 has occurred. If a logic zero level is detected, a transfer is made from step 411 to a logic step 412 to issue a logic one pulse to line 258 to indicate that the boundary trace operations on the character image stored in memory plane units 33–35 has been completed. The logic one pulse further indicates that the feature data appearing on cable 36 has been loaded into the feature memory unit 31. From step 412, a transfer is made to reenter step 391 where the logic decision process continues as before described.

If a logic zero level is not detected at step 411, a transfer is made from step 411 to a logic step 413 where the D1 and D2 outputs of format counter 284 are sensed to detect a memory load condition. If the D1 output is at a logic one level and the D2 output is at a logic zero level, a memory load condition exists and a transfer is made from step 413 to a logic step 414. At step 414, the feature data on cable 36 is stored into the feature memory unit 31. From step 414, a transfer is made to reenter step 409. If a memory load condition is not detected at step 413, a transfer is made from step 413 to reenter step 409 where the logic decision process continues as before described.

Figure 24B:
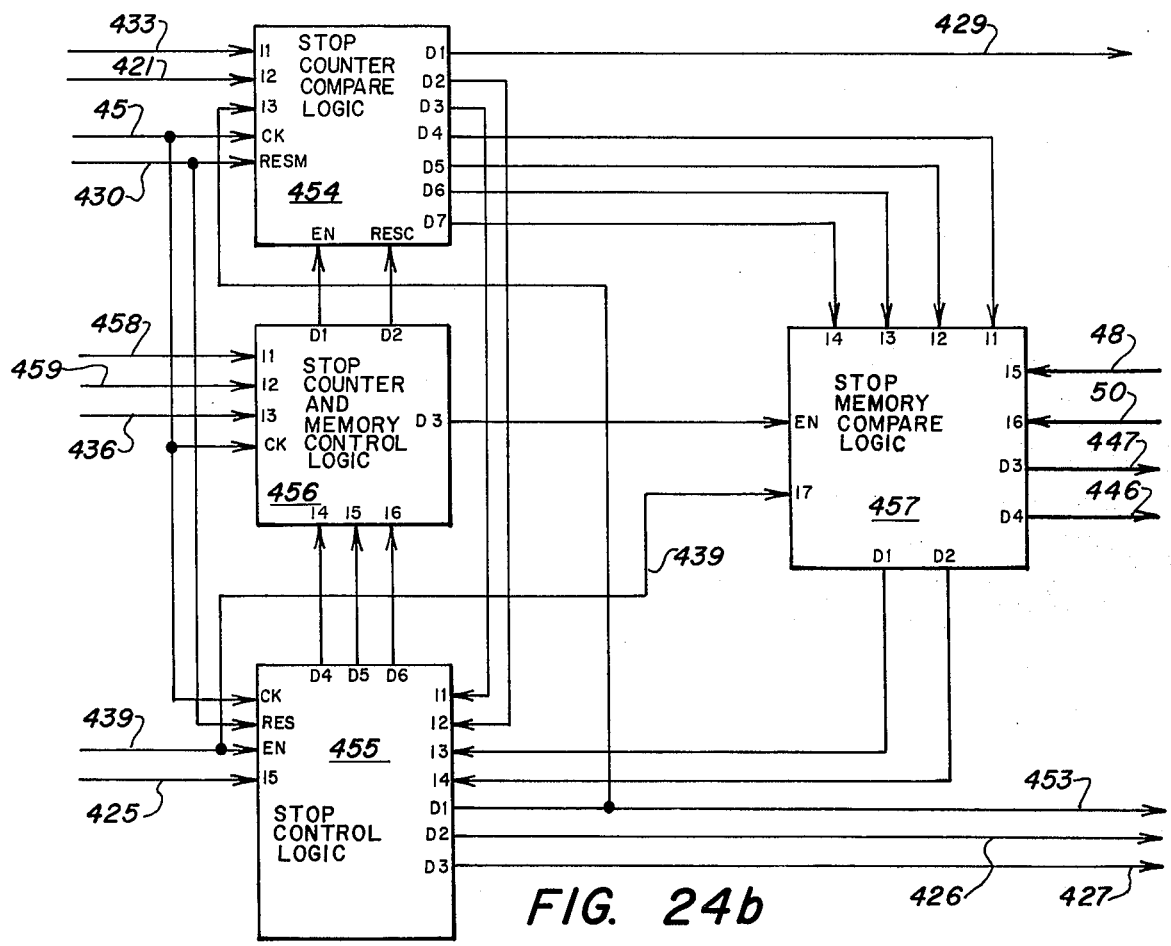
Figure 24C:
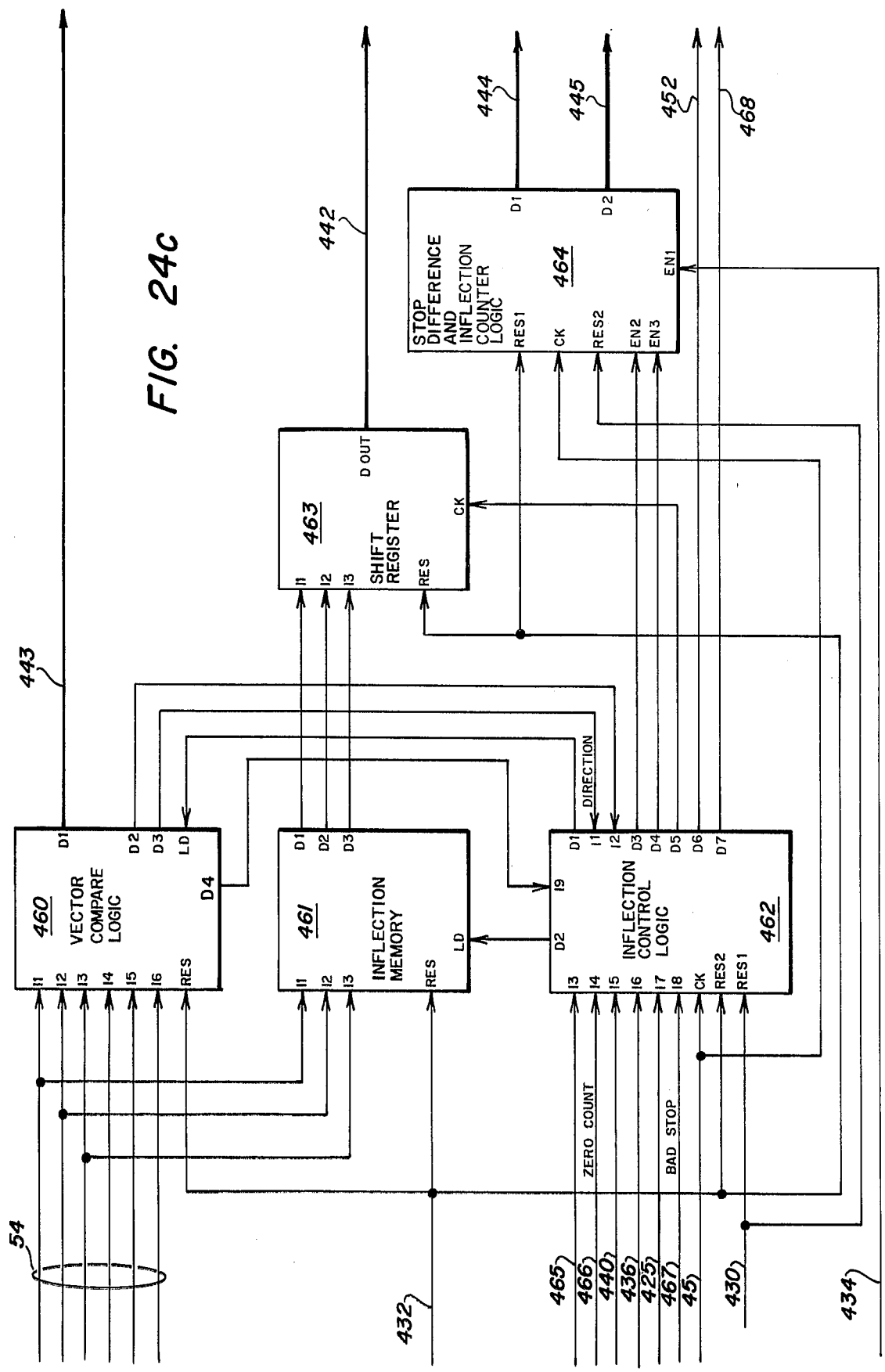

FIGS. 24a–24c

FIGS. 24a–24c illustrate in functional block diagram form the boundary search and stop control logic unit 30 of FIG. 10.

Referring to FIG. 24a, the I1 input of a boundary trace logic control unit 420 is connected by way of a control line 421 to the D8 output of the raster scan control logic unit 29 of FIG. 10. The I2 input of unit 420 is connected by way of a control line 422 to the D4 output of logic unit 29 and to the I9 input of an output control logic unit 423. The I3 input to unit 420 is connected by way of a control line 424 to the D13 output of vector control logic unit 27 of FIG. 10. The I4 input to unit 420 is connected to a control line 425 leading to the D18 output of logic unit 29, and the I5 input to unit 420 is connected to a control line 426. The I6 input to unit 420 is connected to a control line 427, and the I7 input to unit 420 is connected to a control line 428 leading to the D1 output of loop/boundary detector 49. The I8 input to unit 420 is connected to a control line 429, and the reset input to unit 420 is connected by way of a control line 430 to the D3 output of memory control logic unit 20 of FIG. 10. The CK1 input to unit 420 is connected to line 45, which carries a 110 nanosecond clock signal that is applied through an inverter 431 to the CK2 clock input of the unit. The D1–D10 outputs of the unit 420 are connected to control lines 432–441, respectively.

The I1 input to output logic unit 423 is connected to a fifteen bit data cable 442, and the I2 input to logic unit 423 is connected to a five bit data cable 443. The I3 input to logic unit 423 is connected to a six bit data cable 444, and the I4 input to logic unit 423 is connected to a four bit data cable 445. The I5 input to logic unit 423 is connected to a five bit data cable 446, and the I6 input to the logic unit is connected to a five bit data cable 447. The I7 input to logic unit 423 is connected by way of a control line 448 to the bit 5 line of cable 54, and the I8 input to logic unit 443 is connected by way of a control line 449 to the D3 output of raster scan control logic unit 29. The I9 input of logic unit 423 is connected to control line 422. The I10 input to logic unit 423 is connected by way of a control line 450 to the D5 output of logic unit 29, and the I11 input to driver unit 423 is connected by way of a control line 451 to the D6 output of logic unit 29. The I12 input to logic unit 423 is connected to a control line 452, and the enable input to the logic unit is connected to a control line 453.

Referring to FIG. 24b, the I1 input of a stop counter compare logic unit 454 is connected to control line 433, and the I2 input of the logic unit is connected to control line 421. The I3 input of the logic unit 454 is connected to the D1 output of a stop control logic unit 455 and to control line 453. The clock input to logic unit 454 is connected to control line 45, to the clock input of a stop counter and memory control logic unit 456 and to the clock input of logic unit 455. The RESM memory reset input to logic unit 454 is connected to control line 430 and to the reset input of logic unit 455. The enable input to logic unit 454 is connected to the D1 output of logic unit 456, and the RESC counter reset input of logic unit 454 is connected to the D2 output of logic unit 456.

The D1 output of logic unit 454 is connected to control line 429, and the D2 and D3 outputs of logic unit 454 are connected to the I1 and I2 inputs, respectively, of logic unit 455. The D4–D7 outputs of logic unit 454 are connected to the I1–I4 inputs, respectively, of a stop memory compare logic unit 457.

The I1 input to logic unit 456 is connected by way of a control line 458 to the D4 output of vector control logic unit 27 of FIG. 10. The I2 input to logic unit 456 is connected to a control line 459 leading to the D3 output of logic unit 27, and the I3 input to logic unit 456 is connected to control line 436. The I4–I6 inputs to the logic unit 456 are connected to the D4–D6 outputs, respectively, of logic unit 455. The D3 output of logic unit 456 is applied to the enable input of logic unit 457.

The enable input to stop control logic unit 455 is connected to control line 439. The I3 and I4 inputs to logic unit 455 are connected to the D1 and D2 outputs, respectively, of logic unit 457. The I5 input to logic unit 455 is connected to control line 425. The D2 and D3 outputs of logic unit 455 are connected to control lines 426 and 427, respectively.

The I5 input to logic unit 457 is connected to the cable 48 of FIG. 10, and the I6 input to the logic unit is connected to cable 50. The D3 output of logic unit 457 is connected to cable 447, and the D4 output of the logic unit is connected to cable 446.

Referring to FIG. 24c, the I1–I6 inputs of a vector compare logic unit 460 are connected by way of cable 54 to the VEC output of vector control logic unit 27. The I1–I3 inputs of the logic unit further are connected to the I1–I3 inputs, respectively, of a three bit inflection memory unit 461. The reset input to logic unit 460 is connected to the reset input of memory unit 461, to the RES2 reset input of an inflection control logic unit 462, to the reset input of a fifteen bit shift register 463, to the RES1 reset input of a stop difference and inflection counter unit 464 and to control line 432. The load input to logic unit 460 is connected to the D1 output of logic unit 462. The D1 output of logic unit 460 is applied to cable 443, and the D2 and D3 outputs of the logic unit are applied to the I1 and I2 inputs, respectively, of logic unit 462. The D4 output of logic unit 460 is applied to the I9 input of logic unit 462.

The load input to memory unit 461 is connected to the D2 output of logic unit 462. The D1–D3 outputs of memory unit 461 are applied to the I1–I3 inputs, respectively, of shift register 463. The output of register 463 in turn is applied to cable 442.

The I3 input of inflection control logic unit 462 is connected by way of a control line 465 to the D1 output of vector control logic unit 27 of FIG. 10. The I4 input to logic unit 462 is connected by way of a control line 466 to the D7 output of raster scan control logic unit 29, and the I5 input of logic unit 462 is connected to the control line 440. The I6 input to logic unit 462 is connected to control line 436, and the I7 input to the logic unit is connected to the control line 425. The I8 input to logic unit 462 is connected by way of a control line 467 to the D2 output of logic unit 27. The clock input to logic unit 462 is connected to line 45, and to the clock input of logic unit 464. The RES1 reset input to logic unit 462 is connected to control line 430, and to the RES2 reset input of unit 464.

The D3 output of logic unit 462 is connected to the EN2 enable input of logic unit 464, and the D4 output of unit 462 is connected to the EN3 enable input of logic unit 464. The D5 output of logic unit 462 is connected to the clock input of shift register 463, and the D6 output of logic unit 462 is connected to control line 452. The D7 output of unit 462 is connected by way of a control line 468 to the I1 input of feature memory unit 31, to the D18 output of raster scan control logic unit 29 and to the I4 input of row/column control logic unit 28 of FIG. 10.

The EN1 enable input of logic unit 464 is connected to control line 434. The D1 output of logic unit 464 is connected to cable 444, and the D2 output of the logic unit is connected to cable 445.

In operation, a logic zero pulse occurs on line 421 leading to the I1 input of the logic control unit 420. The logic zero pulse is a command from the raster scan control logic unit 29 to begin a boundary trace. Synchronous with the logic zero pulse on line 421, a logic zero pulse is issued by the unit 420 to line 432 to reset the vector compare logic unit 460, the inflection memory unit 461, the inflection control logic unit 462, the shift register 463 and the logic unit 464. Upon the occurrence of the trailing edge of the logic zero pulse on line 421, the D3 output of unit 420 transitions to a logic one level and the D6 output transitions to a logic zero level to enable the vector control logic unit 27. A first boundary trace about the character image stored in memory plane units 33–35 thereby is initiated. Upon completing the boundary trace, the logic unit 27 issues a logic one pulse to line 424. In response thereto, unit 420 senses line 428 to detect the presence of a character piece. If the line 428 is at a logic zero level, the character segment that previously was traced is too small to be a valid character piece. In that event, the D3 output of unit 420 transitions to a logic zero level. In addition, a logic one pulse is issued to line 441 to indicate to the raster scan control logic unit 29 that a trace has been completed.

If line 428 is at a logic one level when sensed, however, the D3 output of unit 420 transitions from a logic one to a logic zero level, the D4 output transitions from a logic zero to a logic one level, and a 110 nanosecond logic one pulse is issued to line 434 to initiate a second boundary trace of the character image stored in memory plane units 33-35. During the second boundary trace, the character image is thinned to a one-cell stroke width. Upon completing the second boundary trace, the vector control logic unit 27 issues a 110 nanosecond logic one pulse to line 424 to signal the completion of the boundary trace. Synchronous with the trailing edge of the logic one pulse on line 424, the D4 output of control unit 420 transitions to a logic zero level. Thereafter, the feature data information detected during the previous boundary traces is stored into the feature memory unit 31. Upon completing the load memory operation, the raster scan control logic unit 29 issues a 110 nanosecond logic one pulse to line 425 to signal the completion of the loading operation. Synchronous with the trailing edge of the pulse on line 425, the D7 output of unit 420 transitions from a logic zero to a logic one level. In addition, line 429 is sensed by unit 420, and if a logic one is detected the D4 output of unit 420 transitions to a logic zero level. In addition, a 110 nanosecond logic one pulse is issued to line 441 to signal the completion of a boundary trace operation. If line 429 is at a logic zero level when sensed, however, the occurrence of stops is indicated. In that event, the D3 output of unit 420 transitions from a logic zero to a logic one level, and the D8 output of unit 420 transitions from a logic one to a logic zero level. Further, a 110 nanosecond logic zero pulse is issued to line 433.

A logic one to logic zero transition on line 439 initiates a vertical ordering of the detected stops. Upon completing the vertical ordering of detected stops, the row counter 151 and column counter 163 of the row/column control logic unit 28 are set to indicate the coordinates of the stop having a maximum vertical height or lowest row number. Thereafter, a 110 nanosecond logic one pulse is issued by the stop control logic unit 455 to control line 426. Synchronous with the trailing edge of the pulse, line 439 transitions from a logic zero to a logic one level. 110 nanoseconds after the trailing edge of the logic one pulse on line 426, the D6 output of unit 420 transitions from a logic one to a logic zero level. At this time, the vector control logic unit 27 initiates a trace of a first of the stops detected in the previous boundary traces. At the end of each stop trace, the logic unit 27 issues a 110 nanosecond logic one pulse to line 424 leading to the I3 input of unit 420. Upon the occurrence of the trailing edge of the 110 nanosecond logic one pulse on line 424, the D6 output of unit 420 transitions from a logic zero to a logic one level. Concurrent therewith, the D7 output of unit 420 transitions from a logic one to a logic zero level. If the stop that has been traced is a good stop as determined by the raster scan control logic unit 29, the starting point of the stop is stored into the feature memory unit 31.

Upon completing the load memory operation, a 110 nanosecond logic one pulse is issued to line 425 by the logic unit 29 to indicate that the load operation has been completed. The pulse is synchronous with the logic zero pulse applied to line 438. One hundred and ten nanoseconds after the trailing edge of the logic one pulse on line 425, the D8 output of unit 420 transitions from a logic one to a logic zero level to initiate a trace of a next vertical stop. If no further stops have been detected, however, the stop control logic unit 455 issues a 110 nanosecond logic one pulse to line 427. In response thereto, the D8 output of unit 420 transitions from logic zero to a logic one level. Synchronous therewith, the D3 and the D4 outputs of unit 420 transition to a logic zero level. Further, a 110 nanosecond logic one pulse is issued to line 441 to indicate the end of a trace operation.

During the foregoing trace operation, the D9 output of unit 420 transitions from a logic one to a logic zero level when three conditions are met: the D3 output of the unit is at a logic one level; the D4 output is at a logic zero level; and the D6 output is at a logic zero level. During the time periods that the D9 output is at a logic zero level, the row and column maximum and minimums are determined in the row/column control logic unit 28.

Referring to FIG. 24b, the line 436 initially is at a logic zero level to allow the storage of stop information into the stop memory compare logic unit 457. When a 110 nanosecond logic zero pulse is received from the vector control logic unit 27 on line 458, logic unit 456 issues a pulse to the RESC input of the logic unit 454 to reset a four bit stop counter internal to the logic unit. Upon the receipt of a 110 nanosecond logic zero pulse from the logic unit 27 on line 459, a pulse is supplied at the D3 output of logic unit 456 to enable the stop memory compare logic unit 457. Synchronous with the occurrence of the trailing edge of the enable pulse, logic unit 456 issues a 110 nanosecond logic one pulse to the enable input of logic unit 454 to increment the stop counter. The output of the stop counter is applied to the I1-I4 address inputs of logic unit 457. Thus, during the time that a logic zero is applied to the enable input of logic unit 457, the row count on cable 48 and the column count on cable 50 are loaded into logic unit 457 at the address indicated by the stop counter.

Each valid stop that is detected is traced. After the stop information is loaded into the logic unit 457, a vertical ordering of the stops is initiated. More particularly, line 436 transitions to a logic one level to inhibit the I1 and I2 inputs of logic unit 456. Upon the generation of a 110 nanosecond logic zero pulse on line 433, the stop count is stored into one of two memories comprising logic unit 454. The two memories of logic unit 454 are hereinafter referred to as the maximum and the minimum memory, each of which is a four bit register.

Upon the occurrence of the trailing edge of the logic zero pulse on line 433, control line 439 transitions from a logic one to a logic zero level to enable the logic unit 455. After a delay of 110 nanoseconds, logic unit 455 applies a 110 nanosecond logic zero pulse to the I3 input of logic unit 454 to store the stop count into a memory of logic unit 454. Further, the logic zero pulse also is applied by way of line 453 to the enable input of output control logic unit 423. In response thereto, the row and column coordinates stored in logic unit 457 and addressed by the stop counter are applied by way of cables 446 and 447, respectively, to the output data cable 423a. In addition, logic unit 423 applies 110 nanosecond logic zero pulses to the control lines 423b and 423c to load the data on cable 423a into the column and row counters, respectively, of logic unit 28. Synchronous with the trailing edge of the logic zero pulse supplied to line 453, logic unit 455 applies a 110 nanosecond logic one pulse to the I5 input of the logic unit 456. In response thereto, logic unit 456 enables logic unit 454 to increment the stop counter. During the next 110 nanoseconds, the control line 433 transitions to a logic zero level. The logic unit 454 thereupon stores the stop count plus one into the maximum memory. Thereafter, the stops stored in the logic unit 457 are vertically ordered.

More particularly, the maximum memory count of logic unit 454 is compared with the current stop count. If the current stop count is less than the maximum memory count, the corresponding stop coordinates stored in logic unit 457 are compared with the row and column counts on cables 48 and 50. As long as the stop count is less than the maximum memory count, the stop counter is incremented to address a next memory location of logic unit 457. Each addressed memory location of logic unit 457 then is compared with the row count on cable 48. If the row coordinate of the addressed memory location is less than the row count on cable 48, the current stop count is stored into the minimum memory. In addition, the row and column coordinates of the addressed stop location of logic unit 457 is applied by way of cables 446 and 447 to be stored into the row and column counters, respectively, of the logic unit 28. More particularly, when the row coordinate of the address stop location in logic unit 457 is less than the row count on cable 48, the D2 output of logic unit 457 transitions to a logic one level. In response thereto, a logic zero pulse is applied by logic unit 455 to the line 453 to store the row and column coordinates of the addressed stop location in logic unit 457 into the row and column counters of logic unit 28. Thereafter, the logic unit 455 issues a logic one pulse to the I5 input of logic unit 456, which in response thereto issues a logic one pulse to increment the stop counter of logic unit 454. A next occurring stop memory location of logic unit 457 thereby is addressed. As long as the stop count of logic unit 454 is less than the maximum memory count the before described process continues.

When the stop count is equal to or exceeds the maximum memory count, logic unit 454 issues a logic one pulse to the I1 input of logic unit 455. In response thereto, logic unit 455 issues a logic one pulse to the I5 input of logic unit 456. Synchronous therewith, logic unit 456 issues a logic zero pulse to the RESC input of logic unit 454 to reset the stop counter. The value in the minimum memory thereafter is compared with the the stop count. If the minimum memory count and the current stop count are not equivalent, the D2 output of logic unit 454 remains at a logic zero level. Logic unit 455 in response thereto issues a logic one pulse to the I4 input of logic unit 456 to again increment the stop counter of logic unit 454. The stop counter is continually incremented until the minimum memory count and the stop count are equivalent. When an equivalence occurs, the D2 output of logic unit 454 transitions to a logic one level. The logic unit 455 then issues a logic one pulse to the I4 input of memory control logic unit 456, which in turn issues a logic zero pulse to the enable input of logic unit 457. If the line 439 is at a logic zero pulse when the logic unit 457 is enabled, a logic one is stored into the bit 5 position of the addressed stop location of logic unit 457. The starting point for a stop trace thereby is marked, and the logic unit 455 is signaled by a logic zero occurring at the D1 output of logic unit 457.

Concurrent with the marking of the starting point, the D2 output of logic unit 455 transitions to a logic one level to signal the logic unit 420 that the addressed stop in logic unit 457 has been vertically ordered, and that the row and column coordinates for that stop have been loaded into the row and column counters of the logic unit 28. The addressed stop thus may be traced beginning at the starting point indicated by the row and column counters of logic unit 28. Each stop stored in the logic unit 457 is vertically ordered and traced in a like manner.

As each stop location is addressed, the D1 output of logic unit 457 is sensed by the logic unit 455 to detect a logic zero level indicating that the addressed stop has been vertically ordered and traced as before described. Throughout the vertical ordering and tracing of the stops, the stop count is decoded to detect a stop count equal to zero as indicated by a logic one level on line 429. The raster scan control logic unit 29 and the unit 420 thereby are signaled that no further stops were encountered during the boundary trace of the character image in memory plane units 33–35.

Upon the occurrence of a 110 nanosecond logic one pulse on line 465 of FIG. 24c from the vector control logic unit 27, the logic unit 27 supplies vector information to the lines of cable 54. Upon the initialization of a boundary trace, the control unit 420 issues a logic zero pulse to the line 432 to clear the six bit register comprising the vector compare logic unit 460. The shift register 463, the stop difference and inflection counters of unit 464, and the inflection memory unit 461 also are reset. Further, a flip-flop internal to logic unit 462 is set to indicate the presence of a vector quantity on cable 54 which exceeds the difference vector value carried by cable 443.

As each boundary point during a trace is encountered, the logic unit 27 issues a vector strobe to line 465 leading to the I3 input of the logic unit 462. The vector strobe is buffered for 110 nanoseconds within the logic unit 462. During the buffer delay period, the vector value represented by the binary lines of cable 54 is compared to a vector value stored in the six bit register of the vector compare logic unit 460. If the two values are different, the D2 output of logic unit 460 transitions to a logic zero level and the buffered vector strobe on line 465 is output to the load input of logic unit 460. The vector value on cable 54 then is loaded into the six bit register of logic unit 460. It is to be understood that no slope feature detection occurs unless a difference vector condition arises.

Upon the occurrence of each vector strobe on line 465 after the system has been preset as described above, the vector information stored in the six bit register of logic unit 460 is compared with the vector value carried by cable 54. So long as the two values are equal, the D2 output of logic unit 460 remains at a logic zero level and no further action occurs. If the vector value on cable 54 is greater than the vector value stored in logic unit 460, the D3 output of the logic unit transitions to a logic one level. When the vector value on cable 54 is less than the vector value stored in the register of logic unit 460, the D4 output of logic unit 460 transitions to a logic one level. In response thereto, the logic unit 462 issues a logic zero pulse to the load input of logic unit 460 to load the vector value on cable 54 into the six bit register of unit 460. Synchronous therewith, the D2 output of logic unit 462 transitions to a logic zero to load the three bit memory 461 with the I1–I3 inputs thereto. Upon the occurrence of the trailing edge of the 110 nanosecond logic zero pulse issued to the load input of logic unit 460, a greater than flip-flop of logic unit 462 is reset to indicate a decreasing boundary slope condition. In addition, an inflection point flip-flop internal to logic unit 462 is set.

The before described operation is repeated as differences between the vector value on cable 54 and the vector value supplied to cable 443 are detected. Further, when a vector difference is followed by a vector equivalence, or by a vector difference increasing or decreasing in the same direction as the previously detected vector difference, an inflection point is indicated. If the inflection point sequence is followed by a vector difference indicating a slope variation in the opposite direction, then the vector value on cable 54 is stored into the memory unit 461. If inflection point sequences do not occur consecutively, the difference vector value stored in the memory unit 461 is stored into the shift register 463. Logic unit 462 issues a clock pulse to shift register 463, and a logic one pulse to the EN3 input of logic unit 464 to increment the inflection counter therein.

Upon the occurrence of each difference vector strobe at the D1 output of logic unit 462, the I4 and I5 inputs to the logic unit are sensed. If the I4 input is at a logic one level and the I5 input is at a logic zero level, logic unit 462 issues a 110 nanosecond logic zero pulse to line 468 to load feature information carried by cable 36 into the feature memory unit 31. The logic zero pulse is buffered 110 nanoseconds, and issued to line 452 which selects the output control logic unit 423 to the difference vector information carried by cable 443. The difference vector information thereby is transferred to cable 36 for loading into feature memory unit 31. In addition, the D3 output of logic unit 462 transitions to a logic one level to increment the stop difference counter of logic unit 464. It is to be understood that a single four bit counter may be used both as a stop counter and as a difference vector counter in logic unit 464 since the information stored therein is not used concurrently as stop and vector information.

In summary, upon the occurrence of a logic one vector strobe on line 465, the information carried by cable 443 is compared to the information on cable 54. If the D2 output of logic unit 460 transitions to a logic one level, no further action occurs. If a difference between the vector values on cables 443 and 54 is detected, however, either the D4 or the D3 outputs of logic unit 460 transition to a logic one level. If the information on cable 54 is greater than that carried by cable 443, a greater than flip-flop in logic unit 462 is set. If the information on cable 54 is less than that carried by cable 443 however, the flip-flop is reset. In response to the detection of a vector difference, the D1 output of logic unit 462 transitions to a logic zero level to load the information on cable 54 into a six bit register internal to logic unit 460. Thereafter, each time a vector strobe occurs on line 465, the vector information on cable 54 is compared with that carried by cable 443. Each time a vector difference occurs, the vector value on cable 54 is stored into logic unit 460.

If two consecutive vector differences occur, an inflection point may be indicated. More particularly, if a vector difference occurs in which the vector value on cable 54 is greater than the vector value on cable 443, and thereafter a vector difference is detected wherein the vector value on cable 54 is less than the vector value on cable 443 an inflection point is indicated. At that time, the vector value on cable 54 is stored into the inflection memory 461. If upon a next consecutive vector strobe the vector value on cable 54 is less than the vector value on cable 443, the content of the inflection memory unit 461 is loaded into the shift register 463. An inflection point may also be indicated when a less than vector difference occurs which is followed immediately by a greater than vector difference. In that event, the value on cable 54 is stored in the inflection memory 461. If a greater than vector difference is detected immediately thereafter, the contents of the inflection memory again is stored into the shift register 463. Thus, no information is stored into the inflection memory 461 unless two consecutive vector differences occur. More particularly, a greater than difference must be followed by a less than difference, or a less than difference must be followed by a greater than difference. In addition, three consecutive vector differences must occur with no intervening equivalences for an inflection point to be stored into the shift register 463. That is, a greater than difference may be followed by a less than difference, which in turn is followed by another less than difference. In addition, a less than difference may be followed by a greater than difference, which in turn is followed by a second greater than difference.

The shift register 463 is a 15 bit register as before described. Each of the inflection points stored in the shift register are represented by three bits each. Thus, the shift register may retain a maximum of five inflection points. At the end of a boundary trace, therefore, the last five inflection points encountered during the boundary trace are stored in the shift register.

During a third boundary trace operation in which each of the stops previously detected are traced, line 436 is at a logic one level. Upon completion of a stop trace, a logic one signal appears at the I7 input of logic unit 462. Synchronous therewith, the occurrence of a logic one on line 467 indicates that the traced stop is a good stop. In response thereto, a logic one pulse is issued to the EN2 input of logic unit 464 to increment the stop difference counter. Since line 434 is at a logic one level during the first and third boundary traces, the stop difference and inflection counters are enabled only during the first and third boundary traces.

FIGS. 25a–25f, and 26

Figure 25F:
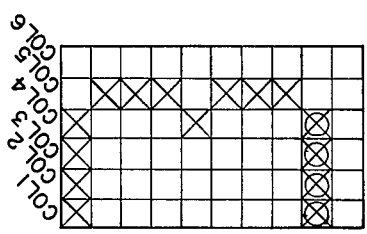
FIGS. 25a-25f are diagrams of the character 3 in successive stages of features derivation.
Figure 25E:
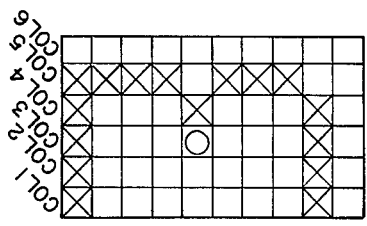
Figure 25D:
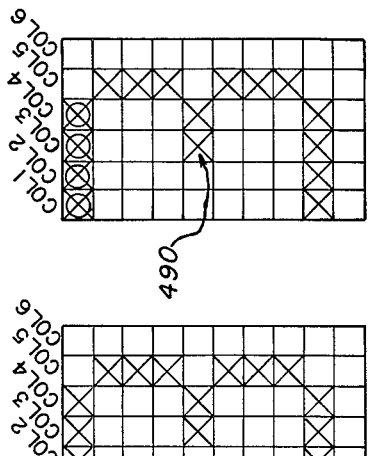
Figure 25C:
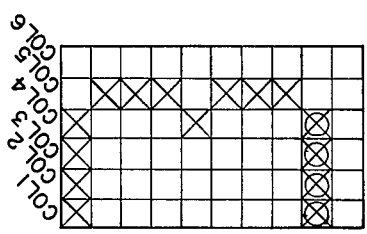
Figure 25B:
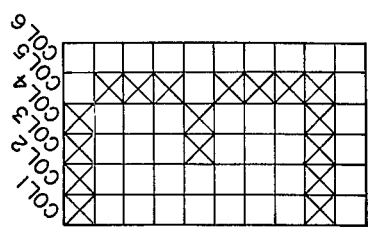

FIGS. 25a–25f illustrate the successive steps of the feature derivation process as disclosed herein when operating upon the character 3. FIG. 26 illustrates in timing diagram form the operation of the boundary trace logic control unit 420 of FIG. 24a.

Referring to FIG. 26, a discrete waveform 475 illustrates the signal appearing on line 421 pf of FIG. 24a, and a discrete waveform 476 illustrates the D3 output of control unit 420. A discrete waveform 477 illustrates the D4 output of control unit 420, and a discrete waveform 478 illustrates the D6 output of the control unit. A discrete waveform 479 illustrates the D7 output of control unit 420, and a discrete waveform 480 illustrates the D8 output of the control unit. A discrete waveform 481 illustrates the signal carried by control line 424, and a discrete waveform 42 illustrates the signal carried by control line 425. A discrete waveform 483 illustrates the signal carried by control line 426, and a discrete waveform 484 illustrates the signal carried by control line 427. A discrete waveform 485 illustrates the signal carried by control line 428, and a discrete waveform 486 illustrates the signal carried by control line 429. A discrete waveform 487 illustrates the D10 output of control unit 420, and a discrete waveform 488 illustrates the D9 output of the control unit. A discrete waveform 489 illustrates the D2 output of control unit 420.

Figure 25A:
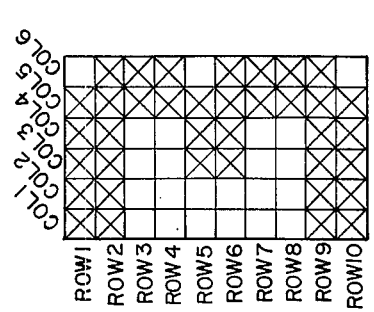
Figure 26:
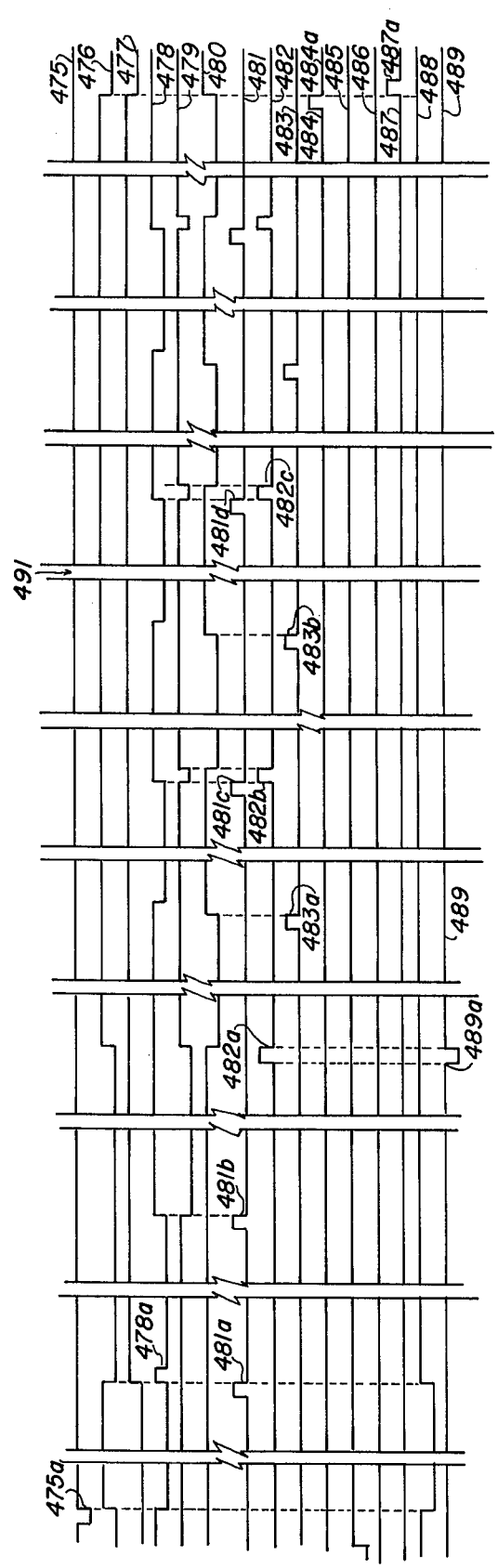

Upon the character image illustrated in FIG. 25a being stored into the memory plane units 33–35, a raster scan is initiated. Upon the occurrence of a first mark condition as before described, a 110 nanosecond pulse 475a of waveform 475 is issued by the raster scan control logic unit 29 of FIG. 10 to initiate a boundary trace operation. Upon the occurrence of the trailing edge of pulse 475a, waveform 476 transitions to a logic one level while waveforms 478 and 488 transition to a logic zero level. The waveform 476 thereby indicates that a first boundary trace has been initiated, while the logic zero level of waveform 478 enables the vector control logic unit 27. Further, the logic zero level of waveform 488 commands the logic unit 28 to store the maximum and minimum boundary coordinates of the character image of FIG. 25a.

The vector control logic unit 27 thins the boundary of the character 3 during the boundary trace, and upon completing the boundary trace the character image in the memory planes 33–35 becomes that illustrated by FIG. 25b. Further, as before described, the logic unit 28 has stored therein the boundary trace starting point and the character image minimum and maximum boundary coordinates as itemized in Table 5a.

TABLE 5a

|  | Column | Row, Side |
|---|---|---|
| Start | 1 | 1,4 |
| Minimum | 1 | 1 |
| Maximum | 6 | 10 |

A boundary trace thus is initiated at the side 4 of the memory cell located at column 1, row 1 of the memory plane units. The minimum boundary limit of the character image is located at column 1 and row 1, and the maximum boundary limit of the character image is located at column 6 and row 10.

Upon the completion of the boundary trace operation, a 110 nanosecond pulse 481a is issued by the vector control logic unit 27. If the waveform 485 is at a logic one level to indicate that the size of the character piece traced is large enough to be a valid character segment, the waveform 476 transitions to a logic zero level and the waveform 477 transitions to a logic one level synchronous with the trailing edge of pulse 481a. Further, a 110 nanosecond logic one pulse 478a is supplied by the control unit 420 to line 437 to enable the logic unit 27 during a second boundary trace operation. Further, the waveform 488 transitions to a logic one level to inhibit further maximum and minimum boundary limit determinations in the raster scan control logic unit 29.

Upon completion of the second boundary trace operation, a pulse 481b is issued. The character image stored in memory plane unit 33–35 is as illustrated in FIG. 25c, and the raster scan control logic unit 29 has stored therein the coordinates itemized in Table 5b.

TABLE 5b

|  | Column | Row, Side |
|---|---|---|
| Start | 4 | 9, 3 |
| Minimum | 1 | 1 |
| Maximum | 6 | 10 |

The starting point of the second boundary trace is seen to be side 3 of the image located at column 4 and row 9 of the memory plane units 33–35. The minimum and maximum boundary limits remain unchanged. The coordinates of the stops detected during the boundary trace are stored in the stop memory compare logic unit 457 of FIG. 24b as shown in Table 6.

TABLE 6

| Column | Row |
|---|---|
| 1 | 9 |
| 3 | 5 |
| 1 | 1 |

Upon the occurrence of the trailing edge of pulse 481b, waveform 478 transitions to a logic one level and waveform 479 transitions to a logic zero level to initiate a memory load operation under the control of the raster scan control logic unit 29. After the minimum and maximum boundary limits, the circumference count, the inflection and difference vector counts, and the inflection data stored in shift register 463 are stored into the feature memory unit 31, a 110 nanosecond pulse 482a of waveform is generated by the logic unit 29. Synchronous with the occurrence of pulse 482a, the boundary trace logic control unit 420 issues a 110 nanosecond logic zero pulse 489a to line 433. In addition, the D8 output of the control unit transitions to a logic zero level. Further, the D3 and D7 outputs of the control unit transition to a logic one level. The total stop count stored in the stop difference counter of unit 464 is stored into the maximum memory of logic unit 454 of FIG. 24b. Thereafter, a third boundary trace operation is initiated.

During the third boundary trace operation, the vector control logic unit 27 vertically orders the stops detected during the second boundary trace operation as listed in Table 6. When the logic unit 27 detects the uppermost stop, the logic unit issues a 110 nanosecond pulse 483a to the I5 input of control unit 420. Upon the occurrence of the trailing edge of the pulse, waveform 480 transitions to a logic one level. After 110 nanoseconds, waveform 478 transitions to a logic zero level to reinitialize the logic unit 27. Logic unit 27 in response thereto traces the uppermost of the detected stops. Upon completing the stop trace, the logic unit 27 issues a 110 nanosecond pulse 481c to the I3 input of control unit 420. At that time, the raster scan control logic unit 29 has stored therein the data shown in Table 5c.

TABLE 5c

|  | Column | Row |
|---|---|---|
| Start | 1 | 1 |
| Minimum | — | — |
| Maximum | — | — |

The stop arm traced by the logic unit 27 during the third boundary trace is illustrated in FIG. 25d by enclosed circles about those memory cells comprising the stop arm.

Upon the occurrence of the trailing edge of the pulse 481c, the D6 output of control unit 420 transitions to a logic one level as illustrated by waveform 478, and the D7 output of the control unit transitions to a logic zero level as illustrated by waveform 479. In addition, logic unit 29 issues a 110 nanosecond pulse 482b to the I4 input of control unit 420. During the time of the pulse 482b, the logic unit 29 evaluates the stop arm that has been traced. If the stop arm is valid, the logic unit stores the stop as shown in Table 5c into the feature memory unit 31. Further, the logic unit 29 increments the stop difference counter of unit 464. Upon the occurrence of the trailing edge of pulse 482b, the D8 output of control unit 420 transitions to a logic zero level as illustrated by waveform 480, and the D7 output transitions to a logic one level. The stop control logic unit 455 is enabled thereby to vertically order a next occurring stop listed in Table 6.

Upon vertically ordering the next stop, the logic unit 455 issues a 110 nanosecond pulse 483b to line 426 to to reenable the vector control logic unit 27 to trace the stop arm. Upon the occurrence of the trailing edge of the the pulse 483b, the D8 output of control unit 420 transitions to a logic one level as illustrated by waveform 480, and the D6 output of the control unit transitions to a logic zero level as illustrated by waveform 478. The logic unit 27 is enabled thereby to trace the stop arm. Upon completing the stop trace, the unit 27 issues a 110 nanosecond pulse 481d to the I3 input of control unit 420. Upon the occurrence of the trailing edge of pulse 481d, the D7 output of control unit 420 transitions to a logic zero as illustrated by waveform 479 and the D6 output of the control unit transitions to a logic one level as illustrated by waveform 478. In addition, the raster scan control logic unit 29 issues a 110 nanosecond pulse 482c. During the time period of pulse 482c, the logic unit 27 evaluates the stop arm at the start point listed in Table 5d. Upon detecting a body stop, the logic unit 27 thins the memory cell indicated by the stop coordinates of Table 5d from the image stored in memory plane units 33-35. The occurrence of the bad stop is flagged to the raster scan control unit which thereafter ignores the stop coordinates. Thus, the stop coordinates listed in Table 5d are not stored in the feature memory unit 31, and the stop difference counter of unit 464 is not incremented.

TABLE 5d

|  | Column | Row |
|---|---|---|
| Start | 3 | 5 |
| Maximum | — | — |
| Minimum | — | — |

Upon the occurrence of the trailing edge of pulse 482c, the D7 output of control unit 420 transitions to a logic one level as illustrated by waveform 479, and the D8 output of control unit 420 transitions to a logic zero level as illustrated by waveform 480. The stop control logic unit 455 is enabled thereby to vertically order a next occurring stop listed in Table 6. After the third stop arm illustrated in FIG. 25f by the encircled memory cells has been traced, no other stops remain. The stop control logic unit 455, therefore, issues a pulse 484a to line 427 leading to the I6 input of control unit 420. In response thereto, the D3 and D4 outputs of control unit 420 transition to a logic zero level, and the D8 output of the control unit transitions to a logic one level. In addition, the control unit 420 issues a 110 nanosecond logic one pulse 487a to line 441 to indicate the end of a trace operation. At this time, the character image stored in the memory plane units 33-35 is as illustrated in FIG. 25f, and the raster scan control logic unit 29 has stored therein the information listed in Table 5e.

TABLE 5e

|  | Column | Row |
|---|---|---|
| Start | 1 | 9 |
| Minimum | — | — |
| Maximum | — | — |

FIG. 27

Figure 27:
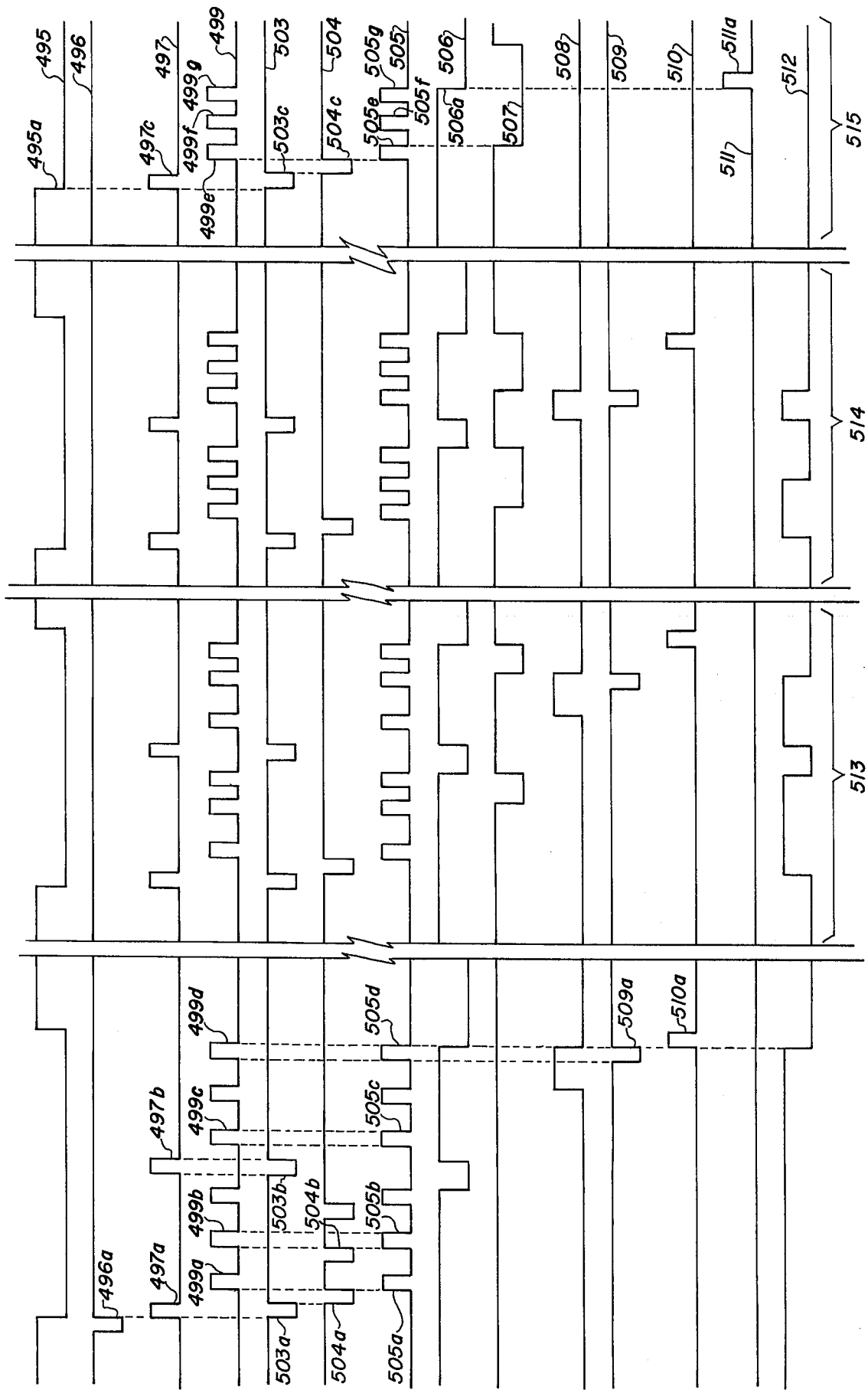
FIG. 27 is a timing diagram illustrating the operation of the stop control logic unit of FIG. 24b.

FIG. 27 is a timing diagram of the operation of the stop control logic unit 455 of FIG. 24b.

A discrete waveform 495 illustrates the signal carried by control line 439 leading to the enable input of the stop control logic unit 455. A discrete waveform 496 illustrates the signal carried by line 433 to the I1 input of logic unit 454. Discrete waveforms 497 and 499 illustrate the D6 and D5 outputs, respectively, of logic unit 455. A discrete waveform 503 illustrates the D2 output of the stop counter and memory contol logic unit 456, and a discrete waveform 504 illustrates the D1 output of logic unit 455. A discrete waveform 505 illustrates the D1 output of logic unit 456, and a discrete waveform 506 illustrates the D2 output of logic unit 454. A discrete waveform 507 illustrates the D2 output of stop memory compare logic unit 457, and a discrete waveform 508 illustrates the D2 output of logic unit 454. A discrete waveform 509 illustrates the D3 output of logic unit 456, and a discrete waveform 510 illustrates the D2 output of logic unit 455. A discrete waveform 511 illustrates the D3 output of logic unit 455.

Upon initiating a second boundary trace operation, the stop difference counter of logic unit 464 is reset to a count of zero and thereafter incremented each time a stop is encountered. Upon the occurrence of a 110 nanosecond logic zero pulse 496a at the I1 input of the logic unit 454, the stop count of the total stop counter of logic unit 454 is loaded into the maximum memory of the logic unit. Upon the occurrence of the trailing edge of pulse 496a, the enable input to the logic unit 455 transitions to a logic zero level as illustrated by waveform 495. Further, a 110 nanosecond logic one pulse 497a is issued by logic unit 455 to the I6 input of logic unit 456. In addition, logic unit 456 supplies a 110 nanosecond logic zero pulse 503a to the RESC input of logic unit 454 to reset the total stop counter. Upon the occurrence of the trailing edge of pulse 503a, a 110 nanosecond logic zero pulse 504a is applied by logic unit 455 to the I3 input of logic unit 454 and to control line 453. In response thereto, the stop count is loaded into the minimum memory of logic unit 454, and the logic unit 423 issues 110 nanosecond logic zero pulses to lines 423b and 423c. In addition, the stop coordinate information on cable 446 and 447 are applied to cable 423a.

Upon the occurrence of the trailing edge of pulse 504a, a 110 nanosecond logic one pulse 499a is issued by logic unit 455 to the I5 input of logic unit 456. In addition, a 110 nanosecond logic one pulse 505a is issued by logic unit 456 to the enable input of logic unit 454. The stop counter of logic unit 454 thereby is incremented.

Upon the occurrence of the trailing edge of pulse 505a, the stop count is compared with the maximum memory. Since the stop count is less than the maximum memory, the D3 output of logic unit 454 is at a logic one level as illustrated by waveform 506.

If at the time of the trailing edge of pulse 505a the D2 output of logic unit 457 as illustrated by waveform 507 is at a logic one level, a 110 nanosecond logic zero pulse 504b is supplied to the D1 output of logic unit 455 after a delay of 110 nanoseconds. Upon the occurrence of the trailing edge of pulse 504b, a 110 nanosecond logic one pulse 499b is supplied by logic unit 455 to the I5 input of logic unit 456. In response thereto, a 110 nanosecond logic one pulse 505b is issued by logic unit 456 to the enable input of logic unit 454 to increment the stop counter.

The before described process of incrementing the stop counter, and comparing with the maximum memory of logic unit 454 continues until the stop count is equal to the maximum memory. In that event, the D3 output of logic unit 454 transitions to a logic zero level as illustrated by waveform 506. After a delay of 110 nanoseconds, a 110 nanosecond logic one pulse 497b is issued by logic unit 455 to the I6 input of logic unit 456. Synchronous therewith, a 110 nanosecond logic zero pulse 503b is issued by logic unit 456 to the RESC input of logic unit 454 to reset the total stop counter. When the stop counter of logic unit 454 is reset, the D3 output of logic unit 454 transitions to a logic one level as illustrated by waveform 506. After a delay of 110 nanoseconds, a 110 nanosecond logic one pulse 499c is supplied by logic unit 455 to the I5 input of logic unit 456. Synchronous therewith, a 110 nanosecond logic one pulse 505c is issued by logic unit 456 to the enable input of logic unit 454 to increment the total stop counter. Thereafter, 110 nanosecond logic one pulses are provided at the D5 output of logic unit 455 and at the D1 output of logic unit 456. The total stop counter of logic unit 454 is incremented thereby until the stop count is equal to the minimum memory value. In that event, the D2 output of logic unit 454 transitions to a logic one level as illustrated by waveform 508. After a delay of 420 nanoseconds, the pulses 499d and 505d are issued at the D5 output of logic unit 455 and the D1 output of logic unit 456, respectively. Synchronous therewith, a 110 nanosecond logic zero pulse 509a is issued by logic unit 456 to the enable input of logic unit 457. A marker thereby is stored into the bit 5 position of the stop location addressed by the total stop counter.

Upon the occurrence of the trailing edge of pulse 509a, a 110 nanosecond logic one pulse 510a is issued by logic unit 455 to line 426. Synchronous therewith, the D1 output of the logic unit 457 transitions to a logic zero level as illustrated by waveform 512. The logic unit 455 thereby is signaled that the bit 5 position of the stop location addressed by the stop counter has been marked with a logic one. Timing diagram secions 513 and 514 illustrate the operation of the logic unit 455 in locating the second and third stops listed in Table 6. As the operaton illustrated in sections 513 and 514 repeat that before discussed, no further description is provided. The timing diagram section 515, however, illustrates the operation for completing a vertical ordering of the stops.

When the D8 output of the boundary trace logic control unit 420 transitions to a logic zero level as illustrated by waveform 495 at 495c, the logic unit 455 issues a 110 nanosecond logic one pulse 497c to the I5 input of the logic unit 456. Synchronous therewith, the logic unit 456 issues a 110 nanosecond logic zero pulse 503c to the RESC input of logic unit 454 to reset the total stop counter. Upon the occurrence of the trailing edge of pulse 503c, the stop control logic unit 455 issues a 110 nanosecond logic zero pulse 504c to the I3 input of logic unit 454 and to line 453. In response thereto, the stop coordinate information on cables 446 and 447 are applied by the logic unit 423 to cable 423a. In addition, 110 nanosecond logic zero pulses are issued by logic unit 423 to lins 423b and 423c to load the stop coordinate information into the feature memory unit 31.

Upon the occurrence of the trailing edge of pulse 504c, the logic unit 455 issues a 110 nanosecond logic one pulse 499e to the I5 input of logic unit 456. The logic unit 456 in response thereto issues a pulse 505e synchronous with pulse 499e to increment the stop counter of logic unit 454. Upon the occurrence of the trailing edge of pulse 505e, the D2 output of logic unit 457 transitions to a logic zero level to indicate that the row and column counts on cables 48 and 50 are less than the stop coordinate information stored in the location addressed by the total stop counter of logic unit 454. Thereafter, the total stop counter of logic unit 454 is incremented as illustrated by pulses 499f, 499g and 505f and 505g. The total stop counter thus is incremented every 220 nanoseconds until the stop count is equal to the maximum memory count of logic unit 454. In that event, the D2 output of logic unit 454 transitions to a logic zero level as illustrated by waveform 506 at 506a. Synchronous therewith, the stop control logic unit 455 issues a 110 nanosecond logic one pulse 511a if the bit 5 positions of all stop locations listed in Table 6 are marked with a logic one. This condition is indicated by a continuous logic zero level as illustrated by waveform 512, and the occurrence of a stop count which is equal to or greater than the maximum memory count of the logic unit 454. Pulse 511a is issued to line 427 leading to the I6 input of the boundary trace logic control unit 420. In response thereto, the control unit 420 formats the feature data in feature memory unit 31 as before described.

FIG. 28

Figure 28:
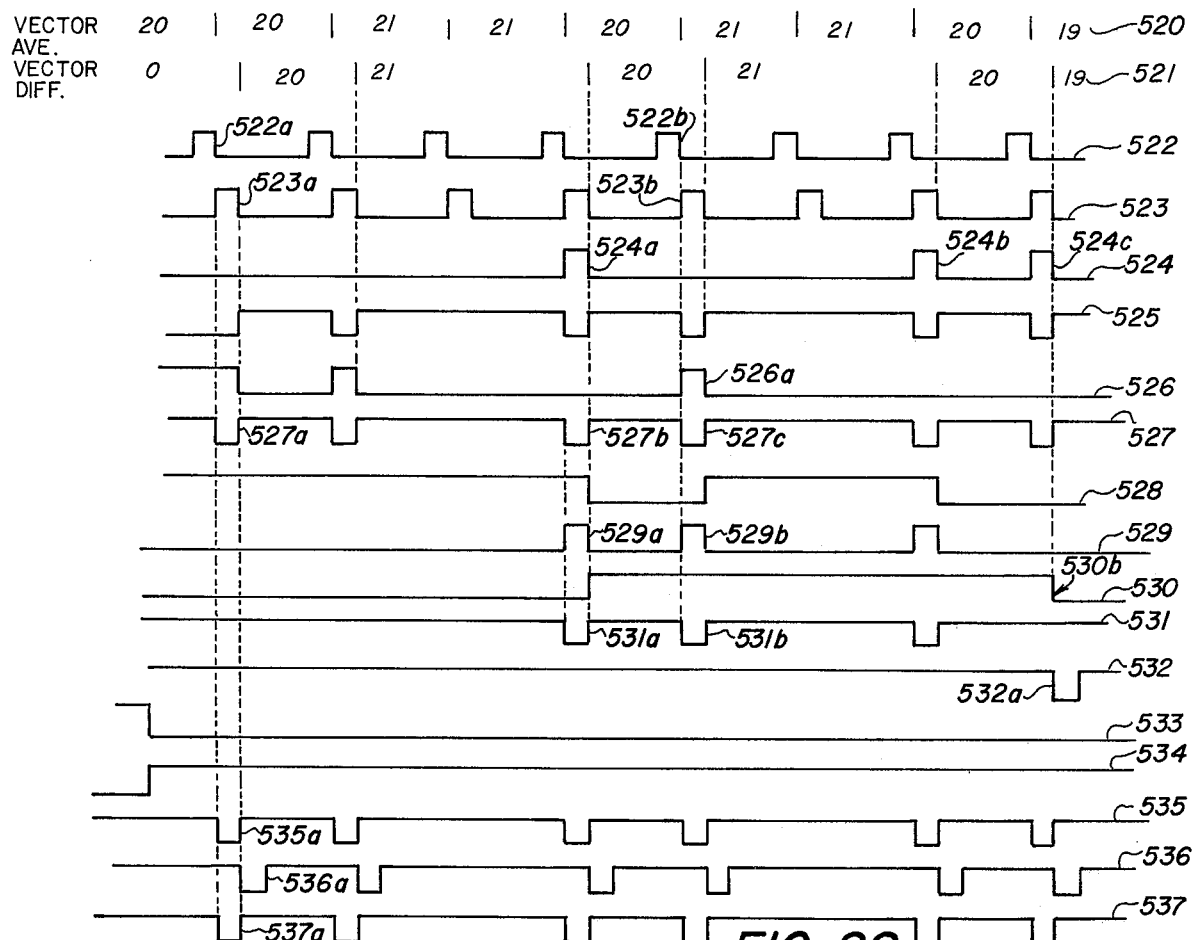
FIG. 28 is a timing diagram illustrating the operation of the system of FIG. 24c.

FIG. 28 illustrates in timing diagram form the operation of the vector compare logic unit 460, the inflection memory unit 461, the inflecion control logic unit 462, the shift register 463 and the counter logic unit 464 of FIG. 24c.

A vector average diagram 520 illustrates the four vector average output of vector control logic unit 27 to cable 54 of FIG. 10. A difference vector diagram 521 illustrates the output of logic unit 460 of FIG. 24c. A discrete waveform 522 illustrates the D1 output of logic unit 27, and a discrete waveform 523 illustrates the waveform 522 delayed by 110 nanoseconds in the stop control logic unit 455. A discrete waveform 524 illustrates the D4 output of logic unit 460, and a discrete waveform 525 illustrates the D2 output of the logic unit. A discrete waveform 526 illustrates the D3 output of logic unit 460, and a discrete waveform 527 illustrate the D1 output of the logic unit 462. The discrete waveforms 528–530 illustrate logic control signals internal to the inflection control logic unit 462. A discrete waveform 531 illustrates the D2 output of the logic unit 462, and a discrete waveform 532 illustrates the D5 output of the logic unit. A discrete waveform 533 illustrates the D9 output of logic control unit 420, and a discrete waveform 534 illustrates the signal carried by line 466 to the I4 input of logic unit 462. A discrete waveform 535 illustrates the D6 output of logic unit 462, and a discrete waveform 536 illustrates the waveform 535 delayed by 110 nanoseconds within the logic unit 462. A discrete waveform 537 illustrates the D7 output of logic unit 462.

In initiating a boundary trace about a character image, the initial four vectors are set to a value of twenty to avoid the occurrence of negative arithmetic indicating an incorrect slope. Referring to FIG. 7a, it may be seen that the vector V0 indicates a zero slope. As a boundary is traced in a clockwise direction, the boundary direction shall pass through registration with the vectors V1–V7 and V0. Thus, if a value of twenty is associated with the vector V0, and the vector values are incremented in octal steps as a boundary is traced counterclockwise, a 360° trace will be represented by a vector value of thirty. In like manner, a trace of an inner boundary in a counterclockwise direction will be represented by a vector value of ten.

When a boundary trace is initiated, the vector compare logic unit 460 is reset and the D3 output of the logic unit is set to a logic one level to indicate that an increase in slope is anticipated. Each time the vector control logic unit 27 of FIG. 10 provides a new four vector average, a pulse such as the 110 nanosecond logic one pulse 522a is issued from the D1 output of the logic unit to the I3 input of logic unit 462. The pulse 522a is buffered for 110 nanoseconds within logic unit 462 as illustrated by a pulse 523a. Synchronous with pulse 523a, a 110 nanosecond logic zero pulse 527a is issued by logic unit 462 to the load input of logic unit 460. Upon the occurrence of the trailing edge of pulse 527a, the vector value on cable 54 is stored into a six bit difference vector buffer of logic unit 460. Further, the D2 output of logic unit 460 transitions to a logic one level as illustrated by waveform 525, and the D3 output of logic unit 460 transitions to a logic zero level as illustrated by waveform 526. If the I5 input to logic unit 462 is at a logic zero level as illustrated by waveform 533, and the I4 input to logic unit 462 is at a logic one level as illustrated by waveform 534, a 110 nanosecond logic zero pulse 535a synchronous with pulse 527a is formed in logic unit 462. The pulse indicates that the logic unit 27 is performing a first boundary trace, and that a first character piece is being traced. In synchronization with pulse 535a, the logic unit 462 issues a 110 nanosecond logic zero pulse 537a to line 468 to load the four vector average indicated by diagram 520 into the feature memory unit 31. Upon the occurrence of the trailing edge of pulse 527a, the logic unit 462 issues a 110 nanosecond logic zero pulse 536a to line 452 to access the circumference count of the loop/boundary detector 49. A slope and circumference count pair is formed thereby to be stored into the feature memory unit 31. It is to be understood that the four vector slopes are generated for only a first character piece that may occur within a single memory mosaic supplied by the character presence unit 12. Thus, if the image stored in memory plane unit 33–35 comprises a broken character or more than one character piece, the four vector averages are stored for only a first piece. During the boundary trace of each of the character pieces in the memory plane units, however, the complete feature vector set is derived.

The boundary trace continues uninterrupted as long as the slope increases monotonically. More particularly, the vector average supplied by the vector control logic unit 27 is a five bit output. As the boundary trace proceeds from the starting point, at least three significant bits of the cable 54 are sensed to determine whether a slope increase or decrease is occurring from an initial vector average of twenty. When either waveform 524 or waveform 526 indicates that a vector difference has occurred in a direction opposite to that indicated by waveform 528, the presence of an inflection point is signaled. More particularly, when a 110 nanosecond logic one pulse 524a occurs at the D4 output of logic unit 460 during the time period that the D3 output of logic unit 460 as illustrated by waveform 528 is at a logic one level, an anomoly exists. The waveform 528 at that time indicates that the slope is increasing in the same direction. The pulse 524a, however, indicates that the slope is decreasing. In the event of such an anomoly, a pulse 529a of waveform 529 is formed internal to the inflection control logic unit 462 to indicate that an inflection point has been encountered. Synchronous with pulse 529a, a 110 nanosecond logic zero pulse 531a is issued by logic unit 462 to the load input D2 of inflection memory unit 461. In response thereto, the three least significant bits of cable 54 are loaded into the three bit inflection memory unit 461. Synchronous with pulse 529a, a 110 nanosecond logic zero pulse 527b is supplied by logic unit 462 to the load input of logic unit 460. Upon the occurrence of the trailing edge of pulse 527b, the D2 output of logic unit 460 transitions to a logic one level as illustrated by waveform 525. Further, the waveform 528 transitions to a logic zero level. In addition, waveform 530 transitions to a logic one level to indicate the presence of an inflection point. It is thus seen that an inflection point will be indicated when both waveform 528 and waveform 524 are at a logic one level, or when waveform 528 is at a logic zero level and waveform 526 is at a logic one level.

When a vector strobe pulse 522b is received at the I3 input of inflection control logic unit 462, the pulse is buffered 110 nanoseconds as illustrated by pulse 523b. Upon the occurrence of the leading edge of pulse 523b, the D2 output of logic unit 460 transitions to a logic zero level as illustrated by waveform 525 to indicate the occurrence of a vector difference. Synchronous therewith, a 110 nanosecond logic zero pulse 527c is issued to the load input of logic unit 460 to load the four vector average on cable 54 into the difference vector buffer internal to logic unit 460. Further, an inflection flip-flop internal to control logic unit 462 is set as illustrated by pulse 529b. A 110 nanosecond logic zero pulse 531b also is issued to the load input of inflection memory unit 461. In addition, a 110 nanosecond logic one pulse 526a is issued by logic unit 460 to the I1 input of logic unit 462. The simultaneous occurrence of a logic zero level in waveform 528 and a logic one level in waveform 526 is an indication of the presence of an inflection point.

The waveform 530 remains at a logic one level so long as inflection points occur consecutively. The waveform does not transition to a logic zero level until a four vector average occurs which does not indicate the presence of an inflection point.

As before described, a valid inflection point is indicated when a greater than vector difference is followed by a pair of less than vector differences, or when a less than vector difference is followed by a pair of greater than vector differences. Referring to FIG. 28, it is seen that a greater than vector difference as indicated by pulse 526a is followed by two less than vector differences as indicated by pulses 524b and 524c. The inflection point sequence is interrupted, and waveform 530 transitions to a logic zero level at 530b. Further, a 110 nanosecond logic zero pulse 532a is issued by logic unit 462 to the clock input of shift register 463. The inflection data stored in memory unit 461 thereby is loaded into the shift register 463.

FIG. 29

FIG. 29 illustrates in functional block diagram form the vector control logic unit 27 of FIG. 10.

The I1 input of a vector enable logic unit 540 is connected to control line 437 leading to the D6 output of boundary trace logic control unit 420 of FIG. 24a. The I2 input of logic unit 540 is connected to control line 434 leading to the D3 output of logic unit 420, and the I3 input of logic unit 540 is connected to control line 435 leading to the D4 output of logic unit 420. The D1 output of logic unit 540 is connected to the I5 input of a boundary trace termination logic unit 541, and the D2 output of logic unit 540 is connected to a control line 542 and to the I6 input of logic unit 541. The D3 output of logic unit 540 is connected to the control line 543, and the D4 output is connected to a control line 544. The D5 output of logic unit 540 is connected to the RES reset input of a vector control logic unit 545, to a control line 546, and to the RES input of logic unit 541. The D6 output of logic unit 540 is connected to the I3 input of logic unit 541, and the D7 output of logic unit 540 is connected to the I2 input of logic unit 545. The D8 output of logic unit 540 is connected to the EN enable input of logic unit 545.

The I2 input of logic unit 541 is connected to control line 434, and the I1 input to the logic unit is connected to control line 435. The I7 input to logic unit 541 is connected to control line 180 leading to the output of AND logic unit 176 and FIG. 14d. The I8 input to logic unit 541 is connected to a control line 547. The I10 input to logic unit 541 is connected to a control line 549, and the I11 input to the logic unit is connected to a control line 550. The I13 input to logic unit 541 is connected to a control line 552, and the I15 input to the logic unit is connected to the D6 output of logic unit 545 and to a control line 554. The I16 input to logic unit 541 is connected to the D11 output of logic unit 545 and to a control line 555, and the I17 input to logic unit 541 is connected to the D12 output of logic unit 545 and to a control line 556. The I18 input to logic unit 541 is connected to the D8 output of logic unit 545 and to line 564.

The D1 and D3 outputs of logic unit 541 are connected to the I4 and I6 inputs, respectively, of logic unit 545. The D4 output of logic unit 541 is connected to control line 467 leading to the I8 input of inflection control logic unit 462 of FIG. 24c. The D5 output of logic unit 541 is connected to control line 424 leading to the I3 input of boundary trace logic control unit 420 of FIG. 24a. The D6 output of logic unit 541 is connected to control line 170 leading to the I6 input of XY control logic unit 162 of FIG. 14b.

The I7 input to logic unit 545 is connected to a control line 557, and the I9 input to the logic unit is connected to a control line 568. The D1 output of logic unit 545 is connected to a control line 558, and the D2 output of the logic unit is connected to a control line 559. The D3 output of of logic unit 545 is connected to a control line 560, and the D4 output of the logic unit is connected to a control line 561. The D5 output of the logic unit is connected to a control line 562, and the D7 output of the logic unit is connected to a control line 563. The D9 output of logic unit 545 is connected to a control line 565, and the D10 output of the logic unit is connected to a control line 566. The D13 output of logic unit 545 is connected to a control line 567, and the D14 output of the logic unit is connected to a control line 569.

An FPLA unit 570 (field programable logical array) receives data from memory plane unit 34 by way of cable 52 and from memory planes 33 and 35 by way of cable 55. In addition, the I1 input of unit 570 is connected to control line 558, and the I2 input is connected to control line 559. The I3 input to unit 570 is connected to control line 562, and the LD2 input is connected to control line 556. The I4 input to unit 570 is connected to control line 563 and to the I1 input of a four bit up-/down shift register 571. The LD1 input to unit 570 is connected to the reset input of register 571 and to control line 546. The I5 input to unit 570 is connected to the D1 output of register 571 and to control line 175 leading to the I11 input of XY control logic unit 162 of FIG. 14b. The I6 input to unit 570 is connected to the D2 output of register 571 and to control line 174 leading to the I10 input of logic unit 162.

The eight bit DOUT output of unit 570 is applied to a PROM (programable ROM) 572. The D1 output of unit 570 is connected to the I3 input of a write memory control logic unit 573. The D2–D5 outputs of unit 570 are connected to the I1–I4 inputs, respectively, of a row/column counter control logic unit 574. The D2 and D3 outputs of unit 570 also are connected to the I1 and I2 inputs, respectively, of logic unit 573. The D6–D9 outputs of unit 570 are connected to the I6–I9 inputs, respectively, of shift register 571. The D10 output of unit 570 is connected to the control line 568.

The I2 input to shift 571 is connected to control line 564, and the I3 input is connected to the control line 567. The I4 input to shift register 571 is connected to control line 560, and the D3 output of shift register 571 is connected to the I4 input of logic unit 573.

The D1 output of PROM 572 is connected to control line 552, and the D2 output of the PROM is connected to control line 577. The D4 output of PROM 572 is connected to control line 550.

The I5 input to logic unit 574 is connected to control line 563, and the I6 input is connected to the control line 569. The I7 input to logic unit 574 is connected to control line 567 and to I8 input of logic unit 573.

The I7 input to logic unit 573 is connected to a control line 577 leading to the D1 output of boundary trace termination logic unit 541. The I9 input to logic unit 573 is connected to control line 566. The I11 input to logic unit 573 is connected to control line 556, and the I12 input to the logic unit is connected to control line 560. The I13 input to logic unit 573 is connected to control line 561, and the I14 input is connected to control line 565. The I15 input to logic unit 573 is connected to control line 547, and the I16 input is connected to control line 554. The I17 input to unit 573 is connected to control line 434.

The D1 output of logic unit 573 is connected to control line 146 leading to the D3 output of write control logic unit 141 of FIG. 14a, and the D2 output of the logic unit 573 is connected to control line 147 leading to the D4 output of logic unit 141. The D3 output of logic unit 573 is connected to control line 156a leading to the SEL2 input of adder selector 156 of FIG. 14b. The D4 output of logic unit 573 is connected to control line 549, and the D6 output of the logic unit is connected to control line 459 leading to the I4 input of boundary search and stop control logic unit 30 of FIG. 10.

Referring to FIG. 29c, the I1–I3 inputs of an adder 582 are connected by way of control lines 583–585 to the D2–D4 outputs, respectively, of the FPLA unit 570. The five bit output of adder 582 is applied to the IN input of a five bit register 586. The IN input to the adder is connected by way of a five bit data cable 587 to the output of register 586, to the input of an accumulator 588, and to the I1 input of an adder 589.

The RES reset input to register 586 is connected to the RES input of accumulator 588 and to control line 544. The clock input to register 586 is connected to the D1 output of a vector strobe control logic unit 590.

The clock input to accumulator 588 is connected to the D2 output of logic unit 590, and the five bit output of the accumulator is applied to the I1 input of a vector difference logic unit 591. The I2 input to logic unit 591 is connected to the output of adder 589, and the output of logic unit 591 is connected to the input of an eight bit register 592. The RES input to register 592 is connected to control line 544, and the clock input to the register is connected to the D2 output of logic unit 590. The eight bit DOUT output of register 592 is connected to the IN I2 input of adder 589 and to the input of an integer control logic unit 593. The output of logic unit 593 is applied to cable 54 of FIG. 10 leading to the VEC input of boundary trace and stop control logic unit 30.

The EN enable input to logic unit 590 is connected to control line 542, and the I2 input to the logic unit is connected to control line 556. The I3 input to logic unit 590 is connected to control line 555, and the I4 input is connected to control line 547. The D3 output of logic unit 590 is connected to control line 465 leading to the I3 input of inflection control logic unit 462 of FIG. 24c.

In operation, control line 437 transitions to a logic zero level to initiate a boundary trace operation. The logic unit 540 thereupon senses control line 434. If the control line 434 is at a logic one level, logic unit 540 supplies 110 nanosecond logic zero pulses to lines 543, 544 and 546. Logic units 541 and 545, shift register 571, control unit 570, registers 586 and 592, and accumulator 588 thereby are reset. After a delay of 110 nanoseconds, logic unit 540 issues a 110 nanosecond logic zero pulse to the I5 input of logic unit 541. In response thereto, logic unit 541 issues a 110 nanosecond logic zero pulse to control line 170 leading to the I6 input of the XY control logic unit 162 of FIG. 14b.

In response to the reset signal on line 546, the FPLA logic control unit 570 stores a 3 × 3 bit memory matrix supplied by memory plane units 33–35 by way of cables 52 and 55. The memory matrix is stored into an array register internal to the unit 570 as will be further described. In addition, the shift register 571 is reset to indicate a side 4.

After a delay of 110 nanoseconds following line 437's transition to a logic zero level, the logic unit 540 issues a 110 nanosecond logic zero pulse to the enable input of logic unit 545. In response to the enable signal, the D1 and D2 outputs of logic unit 545 transition to a logic zero level to access the 3 × 3 bit memory mosaic in the array register of the unit 570. Unit 570 thereafter applies the formula Q1 to the 3 × 3 bit memory mosaic. More particularly, if one of the patterns illustrated in FIGS. 5a–5k, 5m, 5n, and 5p–5r are satisfied, the unit 570 issues a 220 nanosecond logic zero pulse to the I1 input of row/column counter control logic unit 574 and to the I1 input of write memory control logic unit 573. Further, if one of the patterns illustrated in FIGS. 6a–6d is satisfied, unit 570 issues a 220 nanosecond logic zero pulse to the I2 input of logic unit 574 and to the I2 input of logic unit 573.

The signals on lines 558 and 559 are encoded by logic unit 545 to indicate the logic state of operation. For example, if both lines are at a logic zero level, a logic state zero operation is indicated when the D6 output of logic unit 545 transitions to a logic zero level. If line 558 is at a logic one level when line 559 is at a logic zero level, the D3 output of logic unit 545 transitions to a logic one level to indicate a logic state one operation. If the control line 558 is at a logic zero level when the control line 559 is at a logic one level, however, the D4 output of logic unit 545 transitions to a logic zero level to indicate a logic state two operation. Further, when both lines 558 and 559 are at a logic one level, the D5 output of logic unit 545 transitions to a logic zero level to indicate a logic state three operation.

During a logic state zero operation, the before described boundary point and stop thinning rules are applied. Upon receiving a 110 nanosecond logic zero pulse on line 554, the write memory control logic unit 573 senses its I1 and I2 inputs. If a boundary point thinning condition has been satisfied but a stop thinning condition has not been satisfied, and if the I15 input to logic unit 573 is at a logic one level to indicate that a character piece is of a magnitude greater than or equal to four memory cells, the D4 output of the logic unit transitions to a logic zero level. In the event that the I2 and I17 inputs of logic unit 573 each are at a logic zero level, the logic unit 573 issues a 110 nanosecond logic zero pulse to line 459 synchronous to the pulse on line 554. In response to the pulse on line 459, the boundary trace and stop control logic unit 30 stores stop coordinates and increments the good stop counter. The logic state zero operation of the vector control logic unit 27 thereby is completed.

Logic unit 545 thereafter enters a logic state one condition by raising the D1 output of the logic unit to a logic one level. Synchronous therewith, the D3 output of logic unit 545 transitions to a logic one level. During the logic state one, the D4 output of the write memory control logic unit 573 is evaluated. If line 549 is at a logic zero level, the logic unit 573 issues a 220 nanosecond logic zero pulse to line 156a which is synchronous with the logic one pulse appearing on line 560. During the last 110 nanoseconds of the 220 nanosecond pulse on line 156a, logic unit 573 issues a 110 nanosecond logic zero pulse to line 146.

In response to the signals on lines 146 and 157a, a memory cell that has satisfied a thinning condition is deleted from memory plane units 33–35. The write memory control logic unit 573 in addition senses its I3 and I4 inputs during the the last 110 nanoseconds of the pulse on line 156a. If the D1 output of unit 570 and the D3 output of shift register 571 are each at a logic one level, the occurrence of a mark condition is indicated. In response thereto, the logic unit 573 issues a 110 nanosecond logic zero pulse to line 147 to store the mark condition into the marker memory unit 32.

In the event that line 549 is at a logic one level when the vector control logic unit 27 enters into logic state one, the logic unit 573 senses its I3 and I4 inputs to detect and store a mark condition. No further activity occurs during the logic state one operation.

Upon completing the logic state one operation, the vector control logic unit 27 enters a logic two state. The D1 output of logic unit 545 transitions to a logic zero level, and the D2 output transitions to a logic one level. Synchronous therewith, the D4 output of logic unit 545 transitions to a logic zero level. If the line 549 is at a logic zero level in logic state two, the logic unit 573 issues a 220 nanosecond logic zero pulse to line 156a. During the logic state two operation, the control unit 570 controls the operation of the row and column counters of logic unit 28 of FIG. 10 by initiating boundary moves which satisfy equations Q2–Q9.

During the 110 nanosecond period defined by the last half of the pulse on line 561, the logic unit 574 senses the D2 output of unit 570. If the D2 output is at a logic zero level, logic unit 574 issues a 110 nanosecond logic zero pulse to line 159 to increment the row counter 151 of FIG. 14b. If the D3 output of unit 570 is at a logic zero level, the logic unit 574 issues a 110 nanosecond logic zero pulse to line 161 to decrement the column counter 163 of FIG. 14b. If the D4 output of unit 570 is at a logic zero level, the logic unit 574 issues a 110 nanosecond logic zero pulse to line 153 to decrement the row counter 151. Further, if the D5 output of unit 570 is at a logic zero level, the logic unit 574 issues a 110 nanosecond logic zero pulse to line 160 to increment the column counter 163. The control unit 570 also controls the stepwise moves taken in tracing the boundary of the character image stored in memory plane units 33-35 as will be further described. Upon completing a move from one boundary point to the next boundary point, the vector control logic unit 27 enters logic state three.

Upon entering logic state three, the D1 and D2 outputs of logic unit 545 transition to a logic one level. Synchronous therewith, the control line 562 transitions to a logic zero level. During logic state three, the three before described boundary trace operations are conducted. It is to be understood that during each of the boundary trace operations, the vector control logic unit 27 cycles through logic states zero-two when a cell to cell move is initiated. Further, the logic unit cycles through logic states one and two when a side to side move is initiated. A cell to cell move occurs when a transfer from a side of one memory cell is made to a side of a next memory cell in the boundary trace operation. A side to side move occurs during a boundary trace when a move from one side of a memory cell to another side of the same memory cell has been initiated. Each boundary trace operation begins in logic state zero. The operation ends in either logic state zero or logic state one depending upon whether a first, second or third boundary trace operation has occurred.

During the last 110 nanoseconds of the pulse on line 562, the logic unit 545 issues a 110 nanosecond logic zero pulse to the I17 input of logic 541 and to control line 556. During a first boundary trace operation and during the time period of the pulse supplied at the D12 output of logic unit 545, the logic unit 545 senses its I9 input to detect a side to side move. If line 568 is at a logic one level, the side to side move is indicated. If the line 568 is at a logic zero level, however, a cell to cell move is indicated.

If the control line 568 is at a logic zero level, logic unit 545 issues a 110 nanosecond logic zero pulse to control line 555 which is synchronous with the pulse on line 556. The circumference count of the loop/boundary detector 49 of FIG. 10 thereby is incremented. Upon receiving the 110 nanosecond pulse on line 556, the control unit 570 reloads the array register of the unit with a 3 × 3 bit memory mosaic supplied by way of cables 52 and 55. Further, control lines 558 and 559 are reset to a logic zero level by the logic unit 545 to reenter logic state zero.

If the 568 is at a logic one level, however, a side to side move is signaled. The D1 output of logic unit 545 remains set while the D2 output thereof is reset to reenter logic state one. The logic decision process then continues as before described in cycling through logic states one-three.

When the I7 input of logic unit 541 transitions to a logic one level during logic state three of a first boundary trace operation, logic unit 541 raises the D1 output thereof to a logic level. In response thereto, the logic unit 545 continues to trace a succeeding four boundary cells after an end condition occurs. An end condition occurs when a boundary point encountered during a boundary trace has coordinates equivalent to the coordinates of a trace starting point. As the four succeeding cells are traced, the logic unit 541 senses the D11 output of logic unit 545 to determine when the four-cell trace has been completed. The logic unit 541 thereafter issues a 110 nanosecond logic one pulse to line 424 which is synchronous with the pulse on line 556. The completion of a boundary trace thereby is indicated.

Synchronous with the occurrence of the trailing edge of the pulse on line 424, control line 434 transitions to a logic one level. After a delay of 110 nanoseconds, the D8 output of logic unit 540 transitions to a logic one level to disable the logic unit 545. The vector control logic unit 27 remains in the logic state zero or logic state one condition then existing.

Upon initiating a second boundary trace operation, control line 437 transitions to a logic zero level. During the boundary trace, line 434 is at a logic zero level. Thus, no signals are generated at the D3-D5 outputs of logic unit 540. After a delay of 110 nanoseconds following line 437's transition to a logic zero level, the D8 output of logic unit 540 transitions to a logic zero level to enable the control logic unit 545. The logic unit 545 in response thereto initiates a second boundary trace operation from its current logic state. Vector contorl logic unit 27 then cycles through logic states zero-three as before described until a next end condition occurs.

Synchronous with a pulse supplied by logic unit 545 to control line 556 as before described, logic unit 541 senses control line 549. If control line 549 is at a logic zero level, the D1 output of logic unit 541 transitions to a logic one level to indicate that the currently encountered boundary point is to be deleted. The logic unit 545 in response thereto, senses control line 568 to detect a side to side move. If control line 568 is at a logic one level, logic unit 545 signals the occurrence of a logic one state on control lines 558 and 559. If line 568 is at a logic zero level to indicate a cell to cell move, however, a logic zero state is indicated by control lines 558 and 559. The logic decision process then continues as before described.

If the line 549 is at a logic one level when sensed by logic unit 541, the current boundary point is not to be thinned. In that event, the D1 output of logic unit 541 transitions to a logic zero level upon the occurrence of the trailing edge of the pulse on line 556. The boundary trace operation at this time is in the last 110 nanoseconds of the time period indicated by the pulse on line 562. If the previous image cell encountered during the boundary trace was deleted from the memory plane units 33-35, the logic unit 541 issues a 110 nanosecond logic zero pulse to line 170. The logic decision process then continues as before described.

If the control line 180 is at a logic one level at the time the D1 output of logic unit 541 is reset, logic unit 541 issues a 110 nanosecond logic zero pulse to line 424 which is synchronous with the pulse on line 556. In response thereto, the logic unit 30 of FIG. 10 resets control line 437 leading to the I1 input of the vector enable logic unit 540. After a delay of 110 nanoseconds, logic unit 540 disables the logic unit 545 to remain in the current logic state.

Upon initiating a third boundary operation, shift register 571 is again preset to indicate a side 4 condition. Further, the control unit 570 is reloaded with a new 3 × 3 bit memory mosaic from memory plane units 33-35. In addition, logic units 541 and 545 are reset. Thereafter, logic unit 570 issues a 110 nanosecond logic zero pulse to line 170. The logic unit 545 then initiates the boundary trace operation beginning from logic state zero as before described. Each time a pulse is issued to line 556 by logic unit 545, a synchronous pulse is issued to line 147 by logic unit 573 to mark the current boundary point into the marker memory unit 32. It is to be understood that during the third boundary trace operation, each boundary point encountered is marked in the marker memory unit 32.

Figure 29A:
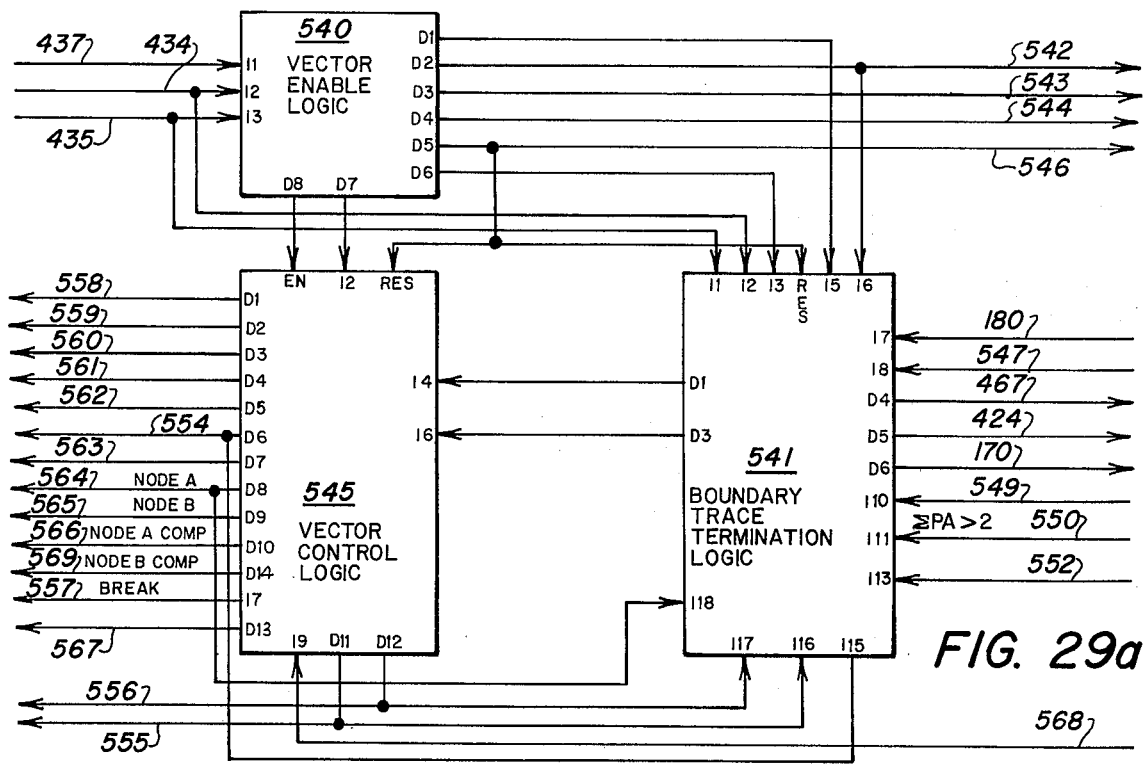
Figure 29B:
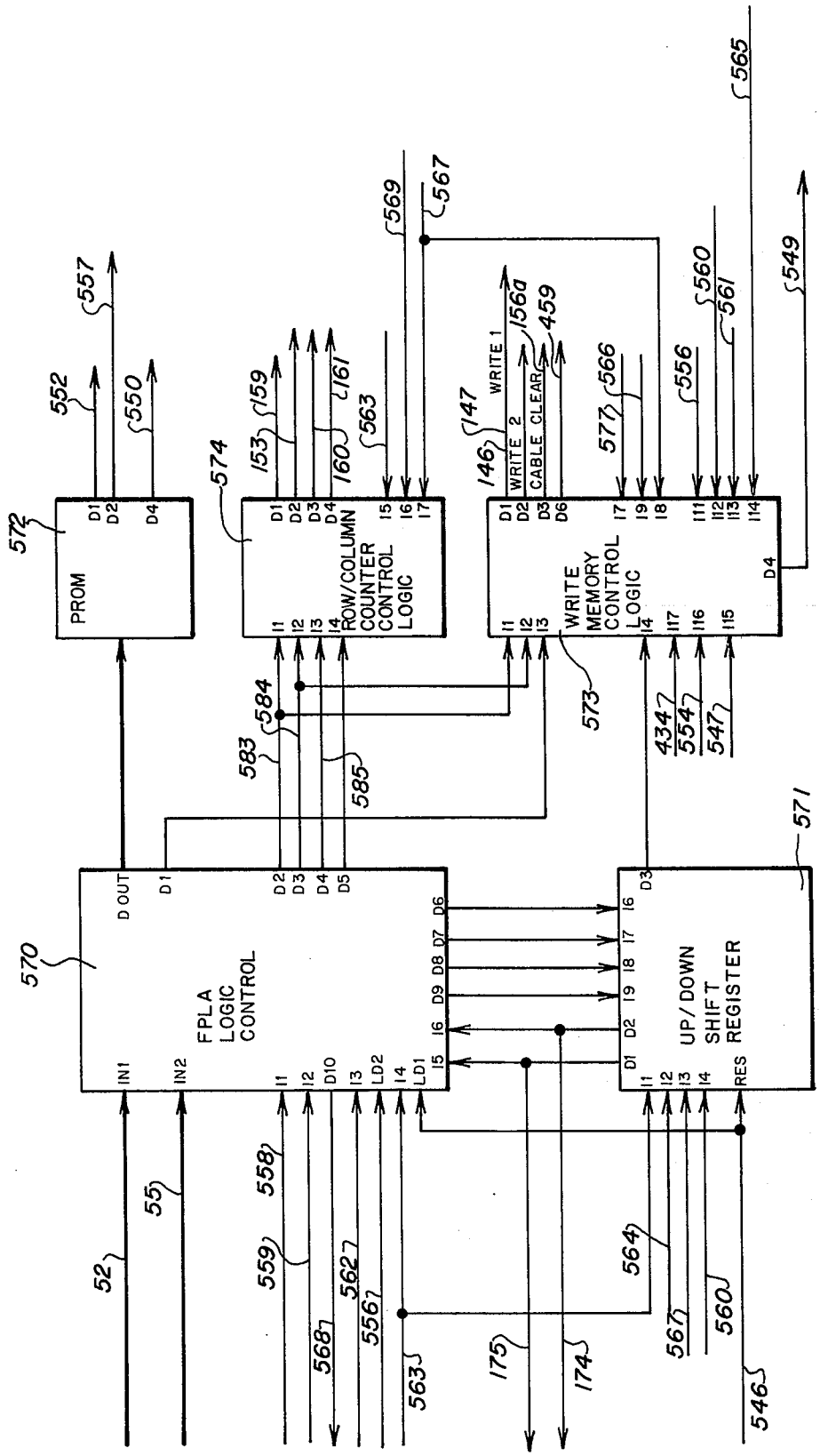

The architecture of the vector control logic unit 27 as illustrated in FIGS. 29a–29c further accommodates special conditions which may arise during a boundary trace operation. Such conditions arise when a stop arm is encountered which is too short to be valid, or when a center cell in a 3 × 3 bit memory mosaic stored in unit 570 is completely surrounded by white cells.

The occurrence of a black center cell completly surrounded by white cells is first indicated during a first boundary trace operation. More particularly, vector control logic unit 27 continues the logic decision process as before described through logic states zero-three. After the expiration of the first 110 nanoseconds of logic state zero, the vector control logic unit 545 generates a 110 nanosecond logic zero pulse at the D12 output of the unit. In response thereto, the logic unit 541 evaluates its I13 input. If line 552 is at a logic one level, the logic unit 541 generates a 110 nanosecond logic one pulse at the D5 output which is synchronous with the pulse on line 556. Control then is passed to the boundary trace and stop control logic unit 30 of FIG. 10, which qualifies the center cell as a character segment too small to be a valid character piece. The center cell thereafter is ignored. The raster scan control logic unit 29 then is enabled to detect a new starting point.

When a stop arm is encountered which is comprised of less than four memory cells, line 547 leading to the I8 input of logic unit 541 transitions to a logic one level. In response thereto, the D3 output of the logic unit 541 transitions to a logic one level. During the time period that the D3 output of logic unit 541 is at a logic one level, the logic unit 545 senses the D1 output of logic unit 541 and the D2 output of PROM 572. If both the D1 output of logic unit 541 and the D2 output of PROM 572 are at a logic zero level, a node A condition exists. Such a condition is characterized by a logic one level on line 564. If the D1 output of logic unit 541 is at a logic zero level and the D2 output of PROM 572 is at a logic one level, a condition referred to as a node B condition exists which is characterized by a logic one level on line 565. The node A and node B conditions are detected during a logic state one operation of the third boundary trace operation.

The node A condition indicates to the logic unit 545 that the previously encountered boundary point should be deleted from memory plane units 33–35. When the sum of the memory cells surrounding a boundary point is greater than two during the boundary trace, a node is indicated. Further, when the memory cell sum is greater than two and a stop arm is encountered which is comprised of less than four cells, a decision is made whether to break a node from the remaining character image. That is, the node boundary point may be deleted from the memory plane units 33–35. In the event that a no-break condition exists when a node and a bad stop indication are present, the previously encountered boundary point is deleted from the memory plane units. However, if a break condition exists during the time that a node and a bad stop condition is indicated, the current boundary point is deleted from the memory plane units and a node B condition is said to exist.

FIGS. 30

FIGS. 30a–30k, 30m and 30n illustrate node patterns for determining a node break-off condition.

The surrounding cells about a center cell of a 3 × 3 memory mosaic of memory plane units 33–35 are referred to as cells PA0–PA7. An X indicates a logic one level, while a slash mark indicates a don't care condition wherein the memory cell may reflect either a logic zero or a logic one level. It is to be understood that for a node condition to exist, the sum of the surrounding cells about a center cell must be greater than two as before described.

If a center cell is surrounded by two or three black cells, and two of the black cells satisfy one of the patterns, the node cell is removed from the remainder of the character image. Further, the memory cell to the immediate right of the node is marked in the marker memory unit 32. If a center cell is surrounded by two or three black cells, and none of the patterns are satisfied, the boundary point encountered immediately before the node cell is broken from the remainder of the character image.

When a node A condition is detected in logic state one during a third boundary trace operation, vector control logic unit 545 issues a 220 nanosecond logic one pulse to line 560. Concurrent with the pulse on line 560, the logic unit 545 issues a 220 nanosecond logic one pulse to line 564. In response thereto, the shift register 571 decrements under the control of the D7 and D6 outputs of the control unit 570. More particularly, if both the D6 and D7 outputs of unit 570 are at a logic one level, the shift register 571 decrements two times to reposition the boundary trace to the opposite side of the current memory cell. If either of the D6 and D7 outputs are at a logic zero level, however, the shift register 571 becomes responsive to line 567. After the expiration of the first 110 nanoseconds of logic state one, the logic unit 545 issues a 110 nanosecond logic one pulse to line 567. In response thereto, the shift register 571 decrements one place to an adjacent side of the current memory cell.

The logic unit 545 thereafter steps from logic state one to logic state two. Upon entering logic state two, the control unit 570 receives the new memory cell side information from the shift register 571 and reverses the boundary trace move direction. The new move information is supplied by the logic control unit 570 to the I1–I4 inputs of the row/column counter control logic unit 574. Upon the expiration of the first 110 nanoseconds of logic state two, the logic unit 545 issues a 110 nanosecond logic zero pulse to control line 563 leading to the I5 input of the logic unit 574. In response thereto, the logic unit 574 issues increment and decrement commands to the row counter 151 and the column counter 163 of FIG. 14b. The vector control logic unit 545 thereafter steps from logic state two to logic state three.

At the end of the first 110 nanoseconds of logic state three, the logic unit 541 senses control lines 550 and 547. If both lines 550 and 547 are at a logic one level, the logic unit 541 sets the D1 output to a logic one level. The logic unit 545 then steps from logic state three to logic state one.

Upon entering logic state one, the logic unit 545 issues a 220 nanosecond logic one pulse to line 560. During the time period of the logic one pulse on line 560, the logic unit 545 senses the D1 and D3 outputs of logic unit 541 and control line 557. If the D1 and D3 outputs of logic unit 541 are at a logic one level and the control line 557 is at a logic zero level, the logic unit 545 transitions the control line 566 to a logic one level. The logic unit 573 thereafter senses the logic one pulse on line 560 and the logic one level on line 566. In response thereto, the logic unit 573 issues a 220 nanosecond logic zero pulse to control line 156a to clear data cable 36 of FIG. 10. At the end of the first 110 nanoseconds of logic state one, the logic unit 545 issues a 110 nanosecond logic one pulse to control line 567. The logic unit 573 senses the pulse on line 567 and the logic one level of line 566, and responds by issuing a 110 nanosecond logic zero pulse to line 146. The logic zero level of data cable 36 thereby is written into the memory plane units 33–35 at the memory location indicated by the row counter 151 and the column counter 163. After the write operation has been completed, the logic unit 545 steps from logic state one to logic state three. At the end of the first 110 nanoseconds of logic state three, the logic unit 541 senses the logic one level at its D1 output. In response thereto, logic unit 541 issues a 110 nanosecond logic one pulse to control line 424 during the last 110 nanoseconds of logic state three.

When the vector control logic unit 545 enters logic state one, the logic unit issues a 220 nanosecond logic one pulse to control line 560. Thereafter, the logic unit senses the D3 output of logic unit 541 and control line 557. If both the D3 output of logic unit 541 and line 547 are at a logic one level, the D9 output of logic unit 545 transitions to a logic one level. In response to the pulse on line 560 and the logic level of line 565, the write memory control logic unit 573 issues a 220 nanosecond logic zero pulse to control line 156a to clear the cable 36. At the end of the first 110 nanoseconds of logic state one, the logic unit 545 issues a 110 nanosecond logic one pulse to control line 567. The logic unit 573 senses control lines 560 and 567, and in response thereto issues a 110 nanosecond logic zero pulse to control line 146. The logic zero state of cable 36 thereupon is written into the memory plane units 33–35 at the memory location indicated by row counter 151 and column counter 163. The logic unit 545 thereafter steps from logic state one to logic state three.

Upon the expiration of the first 110 nanoseconds of logic state three, the logic unit 545 issues a 110 nanosecond logic zero pulse to control line 556 and to the I17 input of logic unit 541. In response thereto the logic unit 541 senses its D3 output. If a logic one level is detected, the D1 output of logic unit 541 transitions to a logic one level. The vector control logic unit 545 thereupon steps from logic state three to logic state one.

Upon detecting logic one levels at the D1 and D3 outputs of logic unit 541 and on control line 557, the logic unit 545 transitions its D12 output to a logic one level. Upon entering logic state one, logic unit 545 issues the before described 220 nanosecond logic zero pulse to line 560. Upon the expiration of the first 110 nanoseconds of the pulse, logic unit 545 issues a 110 nanosecond logic zero pulse to control line 567. In response to the line 567 pulse and the logic one level on line 569, logic unit 574 issues a 110 nanosecond logic zero pulse to line 160 to increment the column counter 163 of FIG. 14b. Upon the occurrence of the trailing edge of the pulse on line 560, the vector control logic unit 545 steps from logic state one to logic state three.

Upon entering logic state three, logic unit 545 issues a 220 nanosecond logic zero pulse to the control line 562. Upon the expiration of the first 110 nanoseconds of the pulse on line 562, the logic unit 545 issues a 110 nanosecond logic zero pulse to control line 556 and to the I17 input of logic unit 541. Since the D1 output of logic unit 541 is at a logic one level, logic unit 541 issues a 110 nanosecond logic one pulse to control line 424. In addition, the D4 output of logic unit 541 transitions to a logic zero level to indicate a bad stop. The node B operation thereby is completed.

Referring to FIG. 29c, the vector arithmetic units of the vector control logic unit 27 are illustrated. When logic unit 545 is in either logic state one or logic state three as decoded from control lines 434 and 435, logic unit 540 transitions the D8 output thereof to a logic zero level at the time the signal carried by control line 437 transitions to a logic zero level. Synchronous therewith, logic unit 540 issues a 110 nanosecond logic zero pulse to control line 544. In response thereto, register 586 is preset to a binary 17. In addition, accumulator 588 and register 592 are reset.

When the logic unit 545 is in logic state one or logic state three, the D2 output of logic unit 540 is at a logic zero level to enable the vector strobe control logic unit 590. Further, the logic unit 545 issues a 220 nanosecond logic zero pulse to line 562. In addition, the D1 and D2 outputs of logic unit 545 transitions to a logic one level. While logic unit 545 is in logic state three, the unit 570 supplies move information by way of control lines 583–585 to adder 582. After the expiration of the first 110 nanoseconds of the pulse on line 562, logic unit 545 issues a 110 nanosecond logic zero pulse to control line 556 leading to the I2 input of logic unit 590. Concurrent with the pulse on line 556, the logic unit 590 clocks the output of adder 582 into register 586. The information received from the control unit 570 is a term of the following equation:

New vector = old vector + new move + last move (Q10)

More particularly, the control unit 570 supplies the (new move + last move) term to adder 582. The adder in turn combines the current output of register 586 with the unit 570 term to form the expression represented by equation Q10. The register 586 thus has stored therein an indication of the vector associated with a boundary trace move that has just been completed. The before described process is repeated each time that control line 556 transitions to a logic zero level. That is, the vector equation Q10 is satisfied each time the vector control logic unit 545 enters logic state three.

If control line 568 is at a logic zero level at the time the control line 556 transitions to a logic zero level, the vector control logic unit 545 issues a 110 nanosecond logic zero pulse to control line 555 and to the I16 input of logic unit 541. The vector equation Q10 is then satisfied as before described. Further, concurrent with the pulse on control line 555, a 110 nanosecond logic one pulse is issued by logic unit 590 to control line 565. In addition, the logic zero pulse on control line 555 is buffered in logic unit 590 for 110 nanoseconds, and thereafter applied to the clock inputs of register 592 and accumulator 588. Thus, each time a logic zero pulse appears on control line 555, the vector defined by equation Q10 is stored into accumulator 588 and presented to adder 589. Accumulator 588 is a twenty bit shift register which may accumulate four vectors. The first of the four accumulated vectors is applied to the I1 input of the vector difference logic unit 591. Further, when the control line 555 transitions to a logic zero level, the output of register 592 is equivalent to the sum of four previous vectors. The vector sum is applied to adder 589, the output of which becomes the current vector plus the sum of four vectors. In addition, the six most significant bit lines at the output of the register 592 are added to the bit 2 line of the output of the integer control logic unit 593. The output of logic unit 593 thereupon becomes a four vector average rounded to an integer. In performing the rounding operation, bit 0 and 1 of the of register 592 output are sensed. If the bit 1 line is at a logic one level, the binary quotient is incremented by one and applied to cable 54.

FIG. 31

Figure 30B:
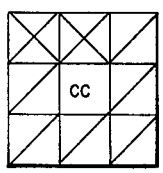
FIGS. 30a-30k, 30m and 30n are node pattern diagrams for detecting a node break-off condition.
Figure 30C:
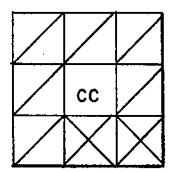
Figure 30D:
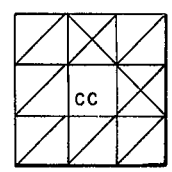
Figure 30E:
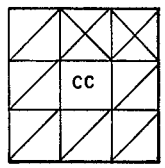
Figure 30F:
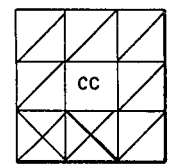
Figure 30G:
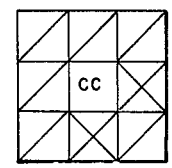
Figure 30H:
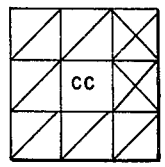
Figure 30I:
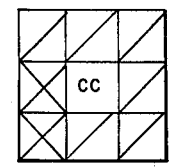
Figure 30J:
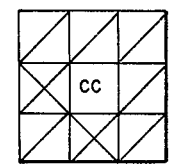
Figure 30K:
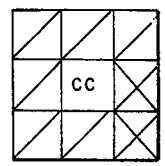
Figure 30M:
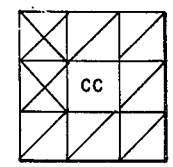
Figure 30N:
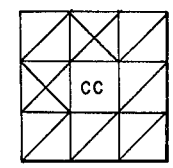
Figures 30A, 31:
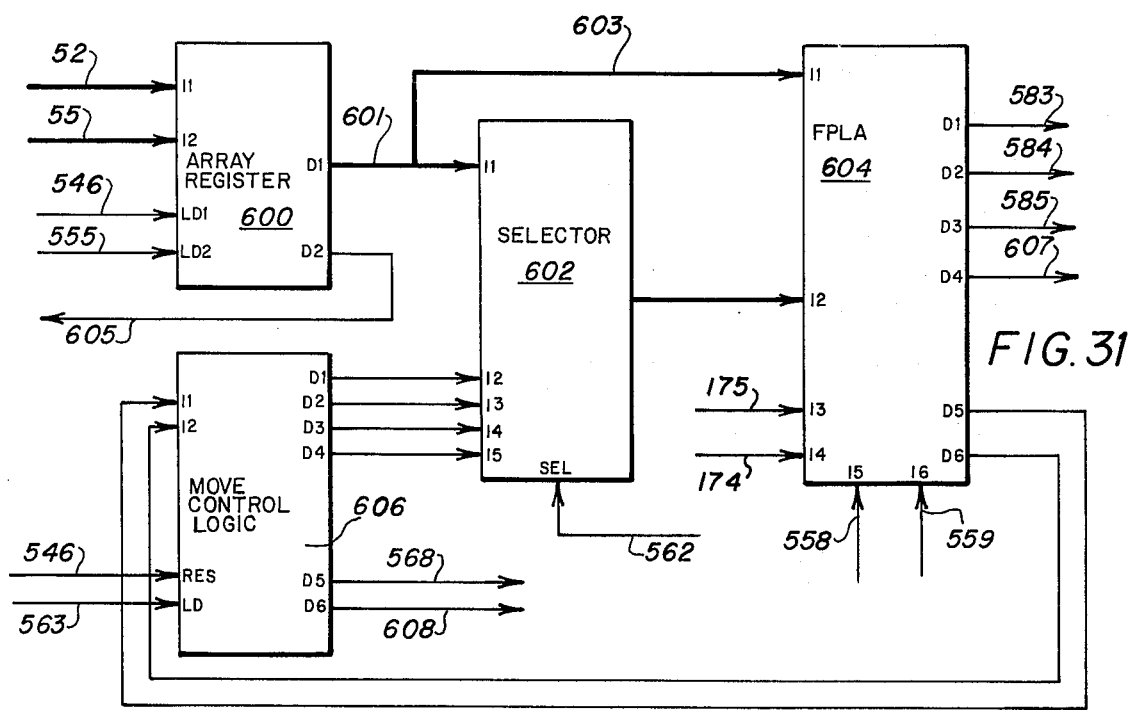
FIG. 31 is a detailed functional block diagram of the FPLA logic control unit of FIG. 29b.

FIG. 31 illustrates in a more detailed functional block diagram form the FPLA logic control unit 570 of FIG. 29b.

The I1 input of an eight bit array register 600 is connected to cable 52, and the I2 input to the register is connected to cable 55. The LD1 load input to the register 600 is connected to control line 546 leading to the D5 output of vector enable logic unit 540. The LD2 input to register 600 is connected to control line 555, leading to the D11 output of vector control logic unit 545 of FIG. 29a. The D1 output of register 600 is applied to an eight bit data cable 601 leading to the I1 input of a selector 602. Bits 4–7 of cable 601 are also applied by way of a data cable 603 to the I1 input of an FPLA unit 604. The D2 output of register 600 is applied by way of a control line 605 to the I3 input of write memory control logic unit 573 of FIG. 29b.

The I2–I5 inputs to selector 602 are connected to the D1–D4 outputs, respectively, of a move control logic unit 606. The SEL input to selector 602 is connected to control line 562 leading to the D5 output of logic unit 545. The four bit output of selector 602 is connected to the I2 input of FPLA unit 604.

The I3 input to unit 604 is connected to control line 175 leading to the D1 output of shift register of 571 of FIG. 29b, and the I4 input to unit 604 is connected to control line 174 leading to the D2 output of the shift register. In addition, the I5 input to unit 604 is connected to control line 558 leading to the D1 output of logic unit 545, and the I6 input is connected to control line 559 leading to the D2 output of logic unit 545.

The D1–D3 outputs of unit 604 are connected to control lines 583–585 leading to the D2–D4 outputs, respectively, of control unit 570. The D4 output of unit 604 is connected by way of a control line 607 to the I4 input of row/column counter control logic unit 574 of FIG. 29b. The D5 output of unit 604 is connected to the I1 input of logic unit 606, and the D6 output of unit 604 is connected to the I2 input of logic unit 606.

The reset input to logic unit 606 is connected to control line 546 leading to the D5 output of logic unit 540, and the load input to logic unit 606 is connected to control line 563 leading to the D7 output of logic unit 545. The D5 output of logic unit 606 is connected to control line 568 leading to the I9 input of logic unit 545, and the D6 output of logic unit 606 is connected to a control line 608 leading to the I7 input of shift register 571 of FIG. 29b.

In operation, a 3 × 3 bit memory mosaic from memory plane units 33–35 is loaded into an array register 600 upon the occurrence of a 110 nanosecond logic zero pulse on line 546. Concurrent therewith, the D1–D4 outputs of logic unit 606 transition to a logic zero level and the D5–D6 outputs of the logic unit transition to a logic one level.

During a boundary trace operation in which the vector control logic unit 545 cycles through the logic states zero-three, the FPLA unit 604 evaluates data from the array register 600 and the selector 602. More particularly, in logic state zero, unit 604 applies the thinning patterns illustrated in FIGS. 5a–5k, 5m, 5n, 5p–5r, and 6a–6d to the data received from selector 602 and register 600. In the event that one of the boundary point thinning patterns is satisfied, the D1 output of unit 604 transitions to a logic zero level. If a stop pattern is satisfied, however, the D2 output of unit 604 transitions to a logic zero level.

During a logic state two operation, the FPLA unit 604 senses control lines 174 and 175 to satisfy the equations Q2–Q9. If it is determined from equations Q2–Q9 that the row counter 151 of FIG. 14b is to be incremented, the D1 output of unit 604 transitions to a logic zero level. If the column counter 163 is to be decremented, the D2 output of unit 604 transitions to a logic zero level. Further, if the row counter is to be decremented, the D3 output of unit 604 transitions to a logic zero level. In addition, if the column counter is to be incremented, the D4 output of unit 604 transitions to a logic zero level. The D5 output of unit 604 transitions to a logic zero level if a zero move is indicated, and the D6 output of unit 604 transitions to a logic zero level if a minus one move is indicated.

When the vector control logic unit 545 steps from a logic state two or a logic state three, the vector equation Q10 is formed. More particularly, the selector 602 is selected to the D1–D4 outputs of logic unit 606. Unit 604 thereafter evaluates only the output of selector 602. In the event that the term (new move + last move) is equal to a minus one, the D1–D3 outputs of unit 604 transition to a logic zero level. Further, if the term is equal to a minus two, only the D1 and D2 outputs transition to a logic zero level. If the term is equal to a plus one, however, only the D1 output of unit 604 transitions to a logic zero level. In addition, if the term is equivalent to a plus two, only the D2 output of unit 604 transitions to a logic zero.

The FPLA unit 604 is a 16 × 48 × 8 bit field programable logic array operating according to the program listed in Table 7. An L represents a logic zero level and an H represents a logic one level.

TABLE 7

| Memory Location | FPLA Program Table | | | | | | | | | | | | | | | | | | | | | | | |
|---|---|---|---|---|---|---|---|---|---|---|---|---|---|---|---|---|---|---|---|---|---|---|---|---|
| | Input | | | | | | | | | | | | | | | | Output | | | | | | | |
| | 15 | 14 | 13 | 12 | 11 | 10 | 9 | 8 | 7 | 6 | 5 | 4 | 3 | 2 | 1 | 0 | 7 | 6 | 5 | 4 | 3 | 2 | 1 | 0 |
| 0 | — | L | L | — | — | — | — | — | — | L | L | L | — | — | H | — | — | — | — | — | — | — | — | L |
| 1 | — | L | L | — | — | L | — | — | — | L | L | L | — | H | — | — | L | — | — | — | — | — | — | L |
| 2 | — | L | L | — | — | L | — | — | — | H | — | H | — | — | — | L | — | — | — | — | — | — | — | L |
| 3 | — | L | L | — | — | L | — | — | — | H | — | H | — | L | — | — | L | — | — | — | — | — | — | L |
| 4 | — | L | L | — | — | L | — | — | L | — | — | H | — | — | — | L | — | — | — | — | — | — | — | L |
| 5 | — | L | L | — | — | L | — | — | L | — | H | — | L | L | — | L | — | — | — | — | — | — | — | L |
| 6 | — | L | L | — | — | — | — | — | — | H | — | — | L | L | — | H | — | — | — | — | — | — | — | L |

TABLE 7-continued
FPLA Program Table

| Memory Location | Input | | | | | | | | | | | | | | | | Output | | | | | | | |
|---|---|---|---|---|---|---|---|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 | 7 | 6 | 5 | 4 | 3 | 2 | 1 | 0 |
| 7 | — | L | L | — | — | — | — | — | — | H | — | L | L | — | — | H | — | — | — | — | — | — | — | L |
| 8 | — | L | L | — | — | L | — | — | — | H | — | — | L | L | — | — | — | — | — | — | — | — | — | L |
| 9 | — | L | L | — | — | L | — | — | H | — | L | L | L | L | — | — | — | — | — | — | — | — | — | — |
| 10 | — | L | L | — | — | — | — | — | — | — | L | L | — | H | — | H | — | — | — | — | — | — | — | L |
| 11 | — | L | L | — | — | — | — | — | L | L | — | — | H | — | H | — | — | — | — | — | — | — | — | L |
| 12 | — | L | L | — | — | — | — | — | — | L | L | L | — | H | — | — | — | — | — | — | — | — | — | L |
| 13 | — | L | L | — | — | H | — | — | L | L | L | L | L | — | — | — | — | — | — | — | — | — | L | — |
| 14 | — | L | L | — | — | — | — | — | L | — | — | H | — | H | — | L | — | — | — | — | — | — | — | L |
| 15 | — | L | L | — | — | — | — | — | L | L | — | H | — | H | — | — | — | — | — | — | — | — | — | L |
| 16 | — | L | L | — | — | L | — | — | L | L | L | L | L | L | — | H | — | — | — | — | — | — | L | — |
| 17 | — | L | L | — | — | H | — | — | L | L | L | L | L | L | — | L | — | — | — | — | — | — | L | — |
| 18 | — | L | L | — | — | L | — | — | L | L | L | L | L | H | — | L | — | — | — | — | — | — | L | — |
| 19 | — | L | L | — | — | L | — | — | L | L | L | L | H | L | — | L | — | — | — | — | — | — | L | — |
| 20 | — | L | L | — | — | L | — | — | L | L | L | H | L | L | — | L | — | — | — | — | — | — | L | — |
| 21 | — | L | L | — | — | L | — | — | L | L | H | L | L | L | — | L | — | — | — | — | — | — | L | — |
| 22 | — | L | L | — | — | L | — | — | L | H | L | L | L | L | — | L | — | — | — | — | — | — | L | — |
| 23 | — | L | L | — | — | L | — | — | H | L | L | L | L | L | — | L | — | — | — | — | — | — | L | — |
| 24 | — | L | H | — | — | — | L | H | L | — | — | — | — | — | — | H | — | — | — | L | L | — | — | — |
| 25 | — | L | H | — | — | H | H | L | — | — | — | — | — | — | — | — | — | L | — | L | — | — | — | L |
| 26 | — | L | H | — | — | L | H | L | — | — | — | — | H | — | — | — | — | L | — | L | — | — | — | L |
| 27 | — | L | H | — | — | — | H | H | — | — | — | — | H | — | — | — | — | L | — | — | — | — | L | L |
| 28 | — | L | H | — | — | — | H | H | — | — | — | H | L | — | — | — | — | — | L | — | — | L | L | — |
| 29 | — | L | H | — | — | — | H | H | — | — | H | — | — | — | — | — | — | L | — | — | L | L | — | — |
| 30 | — | L | H | — | — | — | L | L | — | H | L | — | — | — | — | — | — | L | — | L | — | — | — | — |
| 31 | — | L | H | — | — | — | L | H | H | — | — | — | — | — | — | — | — | L | — | L | L | — | — | — |
| 32 | — | H | H | — | — | L | — | — | — | — | — | H | HL | — | L | — | — | — | — | — | L | L | L | L |
| 33 | — | H | H | — | — | H | — | — | — | — | — | — | H | L | — | L | — | — | — | — | — | L | L | — |
| 34 | — | H | H | — | — | L | — | — | — | — | — | L | L | — | H | — | — | — | — | — | — | — | — | L |
| 35 | — | H | H | — | — | H | — | — | — | — | — | — | L | L | — | L | — | — | — | — | L | L | L | L |
| 36 | — | H | H | — | — | L | — | — | — | — | — | — | L | H | — | H | — | — | — | — | — | — | L | — |
| 37 | — | H | H | — | — | L | — | — | — | — | — | — | L | H | — | L | — | — | — | — | — | — | — | L |

The unit 604 has 12 inputs and six outputs as shown in Table 7. During the time that the vector control logic unit 545 is in logic state two as indicated by control lines 558 and 559, the D5 and D6 outputs of unit 604 are decoded by the move control logic unit 606. If the D5 output is at a logic zero level when the D6 output of unit 604 is at a logic one level, a zero move is indicated. In that event, the zero move is stored into a two bit current move buffer of logic unit 606 and the previous move is stored into a two bit last move buffer of logic unit 606. The outputs of the two buffers are supplied to the D1–D4 outputs of logic unit 606.

If the D5 output of unit 604 transitions to a logic one level at the time that the D6 output transitions to logic zero level, a minus one move is indicated. In response thereto, the logic unit 606 stores the minus one move into the current move buffer and the previous move into the last move buffer. Further, the D6 output of logic unit 606 transitions to a logic zero level and the D2 output of the logic unit transitions to a logic one level. When the D6 output of logic unit 606 transitions to a logic zero level during a logic state two operation, shift register 571 of FIG. 29b is decremented.

If the D5 output of unit 604 is at a logic one level when the D6 output is at a logic one level, a plus one move is indicated. In that event, logic unit 606 stores the plus one move into the current move buffer and the previous move into the last move buffer. Further, the D5 output of logic unit 606 transitions to a logic zero level and the D1 output transitions to a logic one level. In response thereto, shift register 571 is shifted up one position.

FIGS. 32 and 33a–33g

FIG. 32 illustrates in timing diagram form the operation of the vector control logic unit 545 of FIG. 29a. FIGS. 33a–33g illustrate diagrammatically the first five cell to cell moves which occur in the boundary trace of the numeral three.

A discrete waveform 620 illustrates the signal carried by control line 437 to the I1 input of vector enable logic unit 540 of FIG. 29a. A discrete waveform 621 illustrates the signal carried by control line 434, and a discrete waveform 622 illustrates the signal carried by control line 435. A discrete waveform 623 illustrates the D3–D5 outputs of logic unit 540, and a discrete waveform 624 illustrates the D1 output of logic unit 540. A discrete waveform 625 illustrates the D8 output of logic unit 540, and a discrete waveform 626 illustrates the D1 output of logic unit 545. A discrete waveform 627 illustrates the D2 output of logic unit 545, and a discrete waveform 628 illustrates the D6 output of logic unit 545. A discrete waveform 629 illustrates the D3 output of logic unit 545, and a discrete waveform 630 illustrates the D11 output of logic unit 545. A discrete waveform 631 illustrates the D4 output of logic unit 545, and a discrete waveform 632 illustrates the D7 output of logic unit 545. A discrete waveform 633 illustrates the D5 output of logic unit 545, and a discrete waveform 634 illustrates the D12 output of the logic unit. A discrete waveform 635 illustrates the D11 output of logic unit 545, and a discrete waveform 636 illustrates the D6 output of the boundary trace termination logic unit 541. A discrete waveform 637 illustrates the D2 output of shift register 571, and a discrete waveform 638 illustrates the D1 output of the shift register. A discrete waveform 639 illustrates the signal carried by control line 547, and a discrete waveform 640 illustrates the D3 output of row/column counter control logic unit 574 of FIG. 29b. A discrete waveform 641 illustrates the D1 output of logic unit 574, and a discrete waveform 642 illustrates the complement of the D6 output of control unit 570.

A discrete waveform 643 illustrates the D7 output of control unit 570, and a discrete waveform 644 illustrates the D4 output of write memory control logic unit 573. A discrete waveform 645 illustrates the D2 output of logic unit 573, and a discrete waveform 646 illustrates the D1 output of the logic unit. A discrete waveform 647 illustrates the D2 output of logic unit 573, and a discrete waveform 648 illustrates the D5 output of logic unit 541.

In operation, the waveform 620 transitions to a logic zero level as illustrated at 620a. At that time waveform 621 transitions to a logic one level and waveform 622 remains at a logic zero level to indicate a first boundary trace operation. Synchronous with the logical transition 620a, a pulse 623a is supplied by vector enable logic unit 540 to control lines 543, 544, and 546. In response to pulse 623a, the shift register 571 is preset to four as illustrated by waveforms 637 and 638, and a 3 × 3 bit memory mosaic of a starting point as illustrated in FIG. 33a is stored into the array register 600.

Upon the occurrence of the trailing edge of pulse 623a, a 110 nanosecond pulse 624a is issued by logic unit 540 to the I5 input of logic unit 541. In addition, waveform 625 transitions from a logic one to a logic zero level at 625a. Concurrent with pulse 624a, a pulse 636a is supplied by logic unit 541 to control line 170 to store the starting trace point coordinates and the starting side in the unit 28 of FIG. 10.

Synchronous with the occurrence of the logical transition 625a, the vector control logic unit 545 steps to logic state zero as indicated by the logic zero levels of waveforms 626 and 627. Logic unit 545 remains in logic state zero for 220 nanoseconds. After the expiration of 110 nanoseconds of logic state zero, a 110 nanosecond pulse 628a is issued by logic unit 545 to control line 554. During the time period of pulse 628a, the content of register 600 is evaluated to detect a boundary point omit or a stop condition. If a boundary point satisfies the boundary point or stop thinning rules, then the boundary point omit or stop condition is stored into the write memory control logic unit 573.

Upon the occurrence of the trailing edge of pulse 628a, the logic unit 545 enters logic state one as illustrated by waveforms 626 and 627. More particularly, waveform 626 is at a logic one level and waveform 627 is at a logic zero level. Synchronous with the transition to a logic one level in waveform 626, the waveform 629 transitions to a logic zero level as illustrated by the 220 nanosecond logic zero pulse 629a. Upon the expiration of the first 110 nanoseconds of pulse 629a, a 110 nanosecond logic zero pulse 630a is issued by logic unit 545 to conrol line 567. Synchronous with pulse 630a, a 110 nanosecond pulse 647a is issued by logic unit 573 to control line 147 if two conditions are detected. A side 4 condition must be present as illustrated by the logic zero levels of waveforms 637 and 638, and the memory cell to the left of the starting point cell must be void. Referring to FIG. 33a, it is seen that the memory cell to the left of a starting point 649 is void. The logic unit 545 thereafter steps from logic state one to logic state two as indicated by the logic zero level of waveform 626 and the logic one level of waveform 627.

During the logic state two operation, waveform 631 transitions to a logic zero level as illustrated by pulse 631a. In response thereto, the information stored in array register 600 and the signals carried by control lines 174 and 175 of FIG. 29b are evaluated by the FPLA unit 604 to determine a next move. Upon the expiration of the first 110 nanoseconds of pulse 631a, a 100 nanoseconds pulse 632a is supplied by the logic unit 545 to control line 563. If one of equations Q2–Q9 is satisfied during the time period of pulse 632a, a zero move or a minus one move is indicated. If none of the equations are satisfied, however, a plus one move is indicated.

It may be seen from an inspection of waveforms 637 and 638 that a side 4 condition is indicated. Since the PA5 and PA6 cells of the 3 × 3 bit memory mosaic illustrated by FIG. 33a are void, either equation Q8 or equation Q9 is satisfied. Thus, a plus one move is indicated. Accordingly, upon the occurrence of the trailing edge of pulse 632a, waveform 637 transitions to a logic one level to indicate a move from a side 4 to a side 1 of the same cell. Further, waveform 642 transitions to a logic one level to indicate that a plus one move has been taken. Thereafter, the logic unit 545 steps from logic state two to logic state one as indicated by the logic one level of waveform 626 and the logic zero level of waveform 627.

During logic state one, the waveform 633 transitions to a logic zero level as indicated by pulse 633a. During the time period of pulse 633a, the D1–D4 outputs of move control logic unit 606 of FIG. 31 are sensed by the FPLA unit 604 to satisfy the new vector equation Q10. Upon the expiration of the first 110 nanoseconds of pulse 633a, a 110 nanosecond logic zero pulse 634a is issued by logic unit 545 to both control line 556 and to the I17 input of the logic unit 541 of FIG. 29a.

When a plus one move has been indicated, the logic unit 545 steps from logic state one to logic state three upon the occurrence of the trailing edge of pulse 634a. Such occurrence is indicated by the logic one levels of waveforms 626 and 627. After a delay of 220 nanoseconds, waveform 629 transitions to a logic zero level as illustrated by pulse 629b. The logic decision process continues as before described until the logic unit 545 enters logic state two. The logic state two entry occurs synchronous with the leading edge of a pulse 631b. During the time period defined by pulse 631b, the FPLA unit 604 evaluates the D1–D4 outputs of move control logic unit 606 to determine a next boundary trace move. Upon the expiration of the first 110 nanoseconds of pulse 631b, a 110 nanosecond pulse 632b is issued by vector control logic unit 545 to control line 563. If one of equations Q2–Q9 is satisfied during the time period defined by pulse 631b, the row and column counters of logic unit 28 of FIG. 10 are incremented or decremented as illustrated by waveforms 640 and 641. More particularly, during the time period of pulse 631b, the FPLA unit 604 applies the criteria represented by equations Q2–Q9 to the 3 × 3 bit array of FIG. 33a. The array as stored in the array register 600. Waveforms 637 and 638 indicate that a side 1 condition is present, that the PA7 memory cell is void and that the PA0 memory cell is a black cell or at a logic one level. Thus, equation Q3 is satisfied, and a 110 nanosecond logic zero pulse 640a is generated synchronous with pulse 632b to increment the column counter 163 of FIG. 14b. Upon the occurrence of the trailing edge of pulse 632b, waveform 642 transitions to a logic zero level. In addition, the vector control logic unit 545 steps from logic state two to logic state three as illustrated by waveforms 626 and 627. During the logic state three operation, waveform 633 transitions to a logic zero level as illustrated by the pulse 633b. Upon the expiration of the first 110 nanoseconds of pulse 633b, a 110 nanosecond logic zero pulse 634b is issued by logic unit 545 to control line 556. During the time period of pulse 634b, the array register 600 is loaded with a next 3 × 3 bit memory mosaic about a next occurring boundary point as illustrated in FIG. 33b. Synchronous with pulse 634b, a 110 nanosecond logic zero pulse 635a is issued by logic unit 545 to control line 555 and to the I16 input of logic unit 541. During the time period of pulse 635a, the circumference count of the loop/boundary detector 49 of FIG. 10 is updated.

The logic unit 545 continues to step through logic states zero-three as before described, and the array register 600 is loaded with succeeding boundary point arrays as illustrated by FIGS. 33c–33f. The logic operation continues until the circumference count of the detector 49 is equal to or greater than four as illustrated by waveform 639 at 639a. Synchronous with the transition from a logic zero to a logic one level at 639a, the logic unit 545 steps to logic state zero as indicated by the waveforms 626 and 627. Upon the expiration of the first 110 nanoseconds of logic state zero, a 110 nanosecond pulse 628b is issued by logic unit 545 to control line 554. During the time period of pulse 628b, the vector control logic unit 545 evaluates the memory mosaic in the array register 600 illustrated by FIG. 33f. If a stop condition is not indicated and the circumference count is equal to or greater than four as illustrated by waveform 639, the waveform 644 transitions to a logic zero level upon the occurrence of the trailing edge of pulse 628b. Synchronous therewith, the logic unit 545 steps from logic state zero to logic state one as illustrated by pulse 628c of waveform 629. If the waveform 644 is at a logic zero level when the logic unit 545 enters logic state one, the waveform 645 transitions to a logic zero level as illustrated by pulse 645a. Further, the pulse 645a is applied by the write memory control logic unit 573 to the control line 156a. In response thereto, a logic zero is written into that memory cell of memory units 33–35 which is addressed by the row and column counters of logic unit 28 of FIG. 10. More particularly, upon the expiration of the first 110 nanoseconds of pulse 629c, a 110 nanosecond logic zero pulse 630b is issued by logic unit 545 to control line 567. Synchronous therewith, the write memory control logic unit 573 issues a 110 nanosecond logic zero pulse 646a of waveform 646 to control line 146. The logic zero pulse thereby is written into the memory cell addressed by the row and column counters of logic unit 28.

From logic state one, the vector control logic unit 545 steps to logic state two. Upon completion of the logic state two operation as illustrated by the trailing edge of pulse 631c of waveform 631, the waveform 645 transitions to a logic one level. After the logic state two operation is complete, the logic unit 545 enters logic state three as illustrated by pulse 633c. Synchronous with the last 110 nanoseconds of pulse 633c, a 110 nanosecond logic zero pulse 634c is issued by logic unit 545 to control line 556. During the time period of pulse 634c, the 3 × 3 bit memory mosaic illustrated by FIG. 33g is loaded into the array register 600. The process then contines as before described.

FIGS. 34 and 35a–35c

Figures 34, 35A, 35B, 35C:
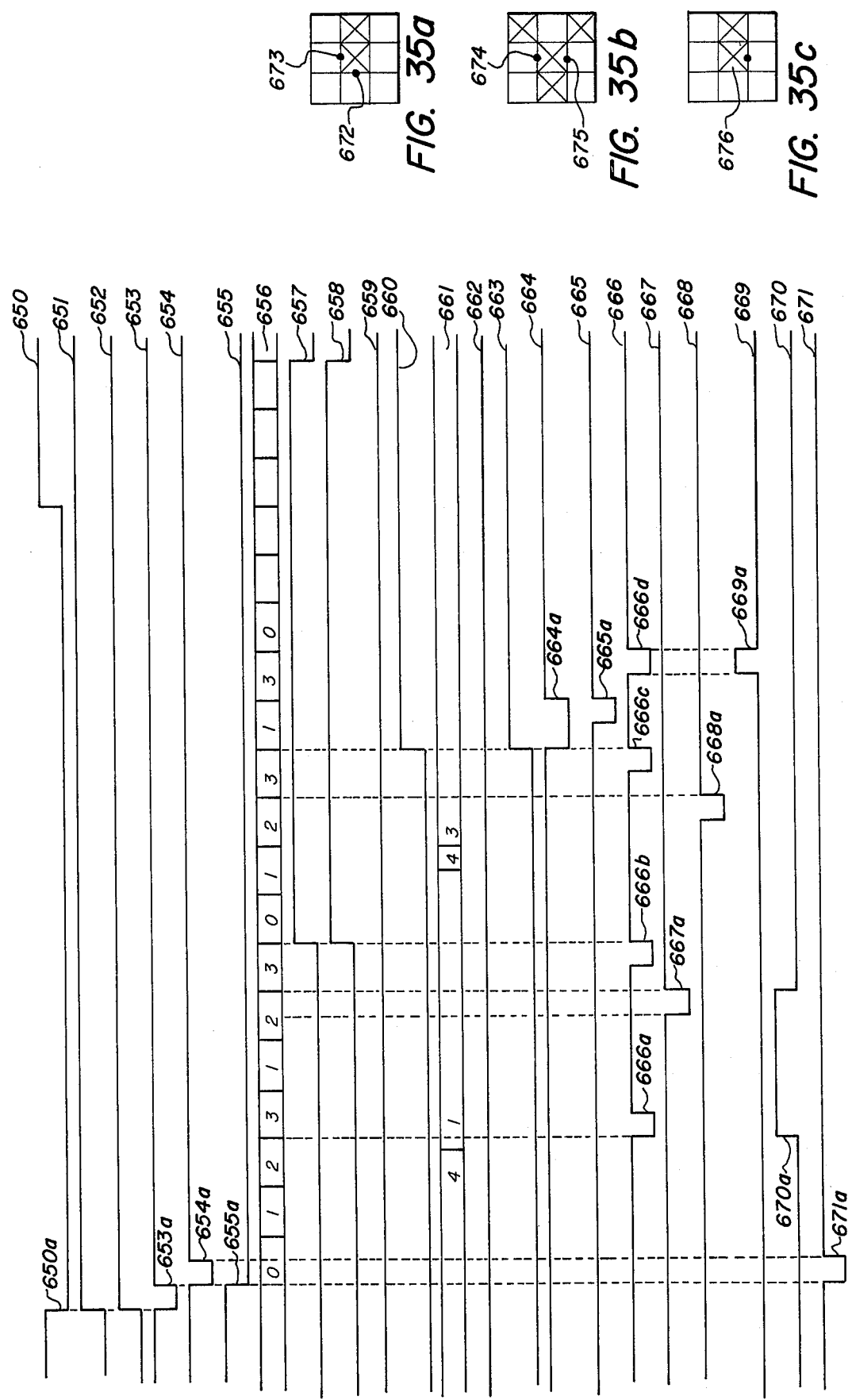
Figure 36A:
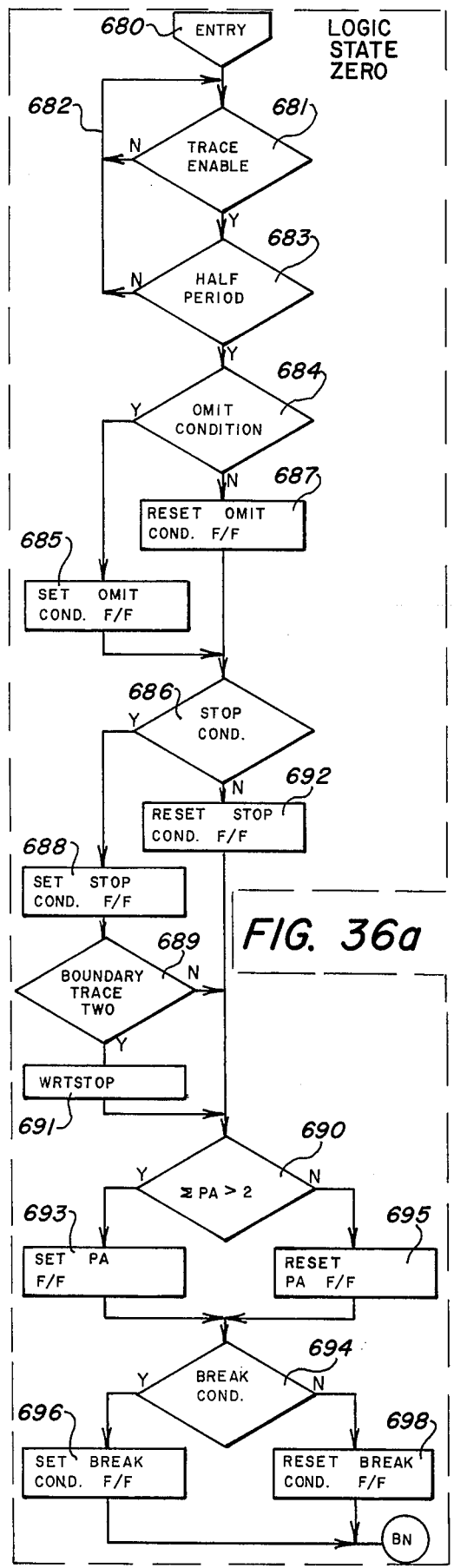
FIGS. 36a-36d comprise a logic flow diagram of the logical operation of the vector control logic unit of FIG. 10.
Figure 36C:
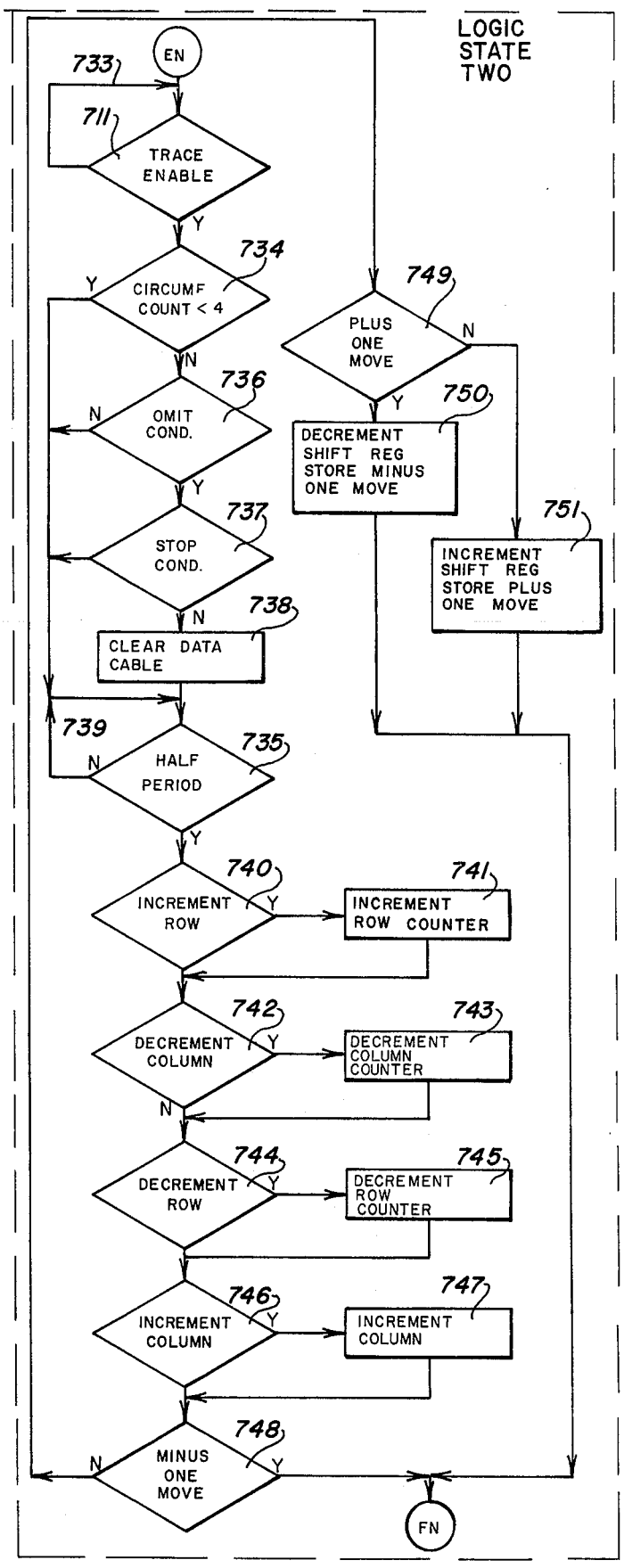
Figure 36B:
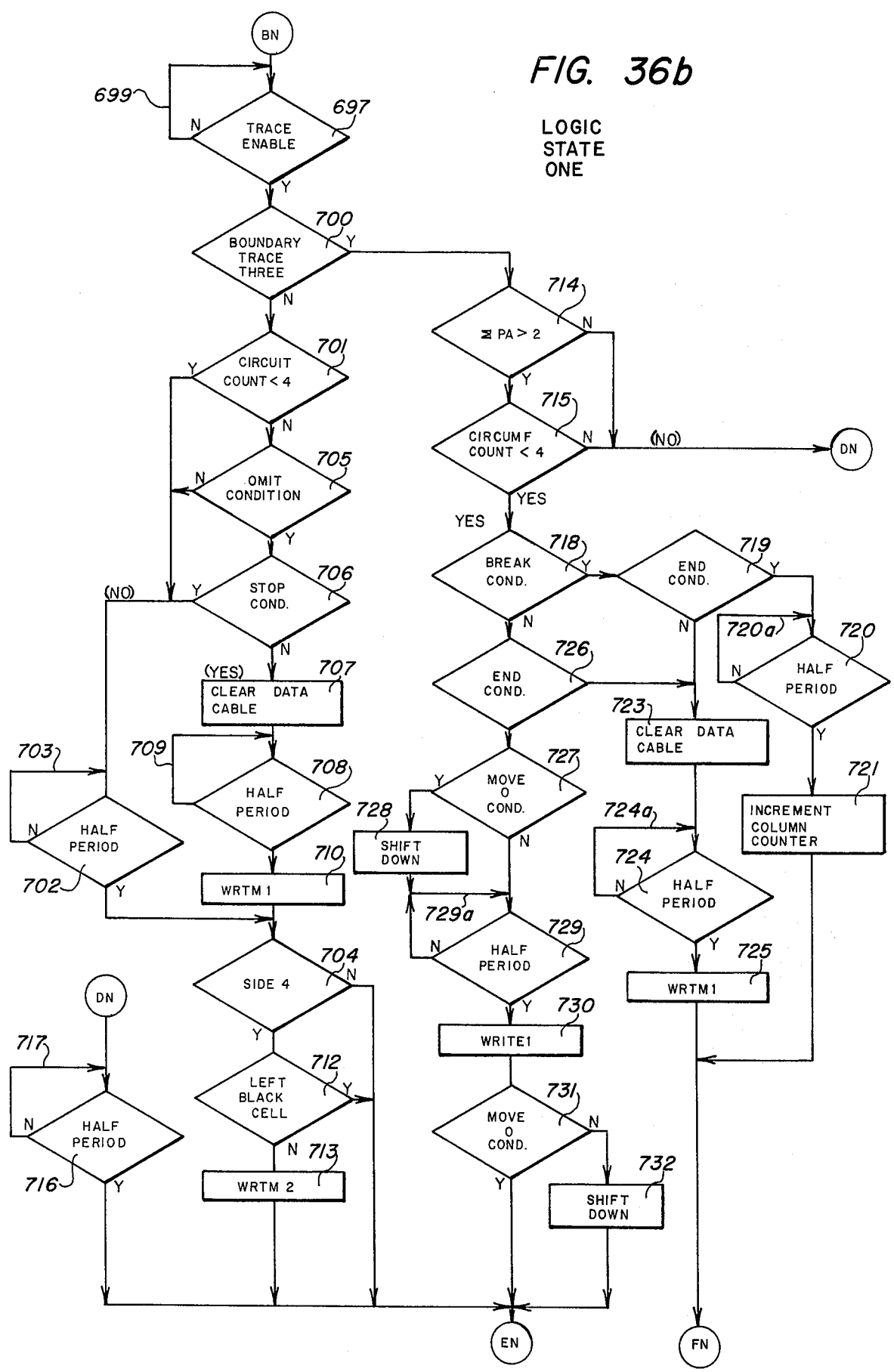
Figure 36D:
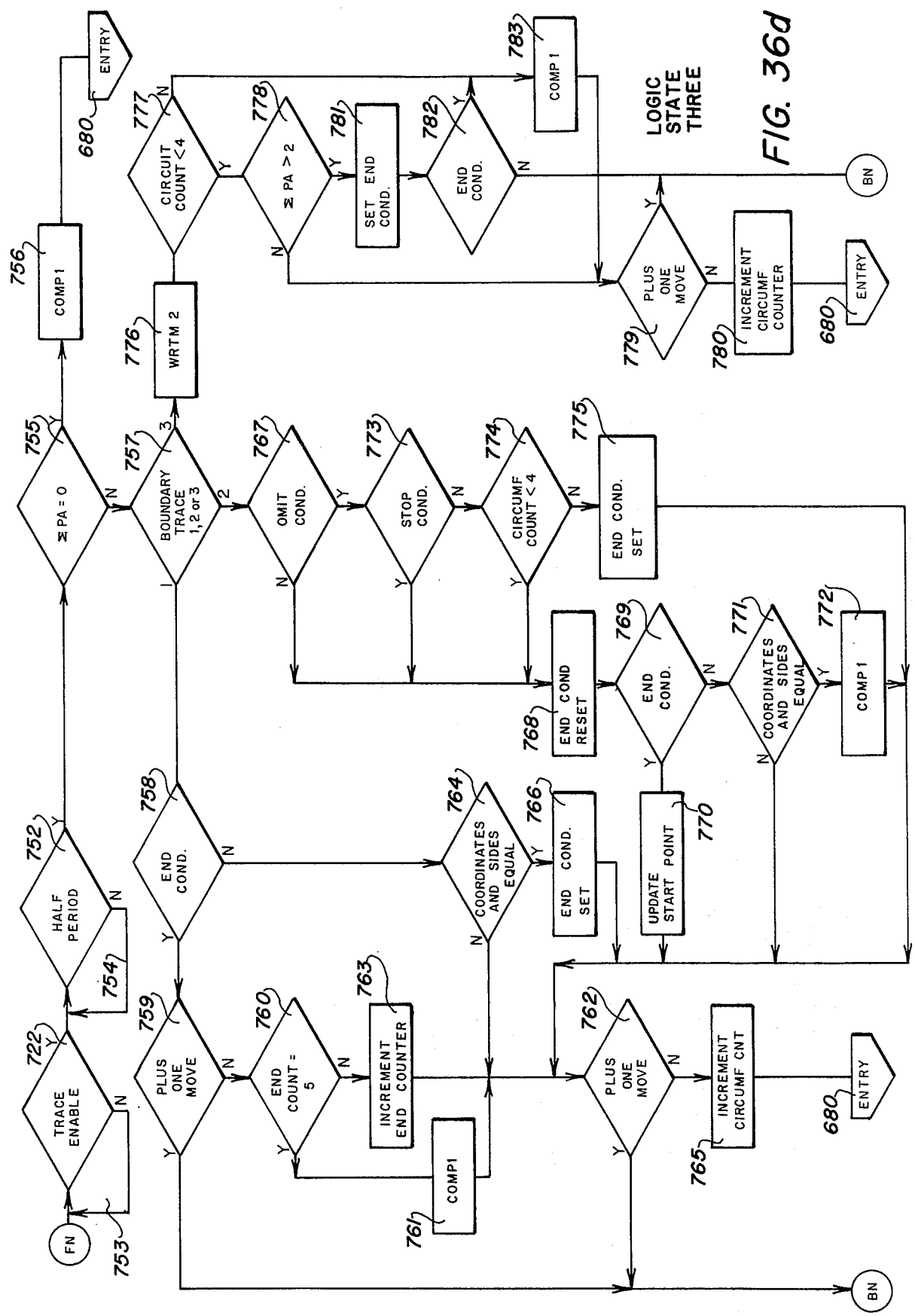

FIG. 34 is a timing diagram illustrating the operation of the vector control logic unit 545 of FIG. 29a for the special case where a node is to be deleted from the character image stored in memory plane units 33–35. The FIGS. 35a–35c illustrate the step by step operation of separating a node point of stop arm 490 of FIG. 25d from the numeral 3, which occurs during the time period generally referred to by reference number 491 of FIG. 26.

Referring to FIG. 34, a discrete waveform 650 illustrates the signal carried by control line 437 of FIG. 29a, a discrete waveform 651 illustrates the signal carried by control line 434, and a discrete waveform 652 illustrates the signal carried by control line 435. A discrete waveform 653 illustrates the D3–D5 outputs of vector enable logic unit 540, and a discrete waveform 654 illustrates the D1 output of logic unit 540. A discrete waveform 655 illustrates the D8 output of logic unit 540, and a time dependent logic state diagram 656 illustrates the order in which the logic states zero-three are entered by the vector control logic unit 545. A discrete waveform 657 illustrates the D8 output of logic unit 545, and a discrete waveform 658 illustrates the D4 output of PROM 572. A discrete waveform 659 illustrates the output of loop/boundary detector 49 as applied to control line 547. A discrete waveform 660 illustrates the D1 output of boundary trace termination logic unit 541, and a time dependent side diagram 661 illustrates the "cell sides" to which a move is made. A discrete waveform 662 illustrates the D2 output of PROM 572, and a discrete waveform 663 illustrates the D10 output of logic unit 545. A discrete waveform 664 illustrates the D3 output of write memory control logic unit 573, and a discrete waveform 665 illustrates the D1 output of logic unit 573. A discrete waveform 666 illustrates the D2 output of logic unit 573, and a discrete waveform 667 illustrates the D3 output of logic unit 574. A discrete waveform 668 illustrates the D4 output of logic unit 574, and a discrete waveform 669 illustrates the D5 output of logic unit 541. A discrete waveform 670 illustrates the compliment of the D6 output of the FPLA logic control unit 570.

Upon initialization, waveform 650 transitions to a logic zero level at 650a, and waveforms 651 and 652 transition to logic one levels to indicate a third boundary trace operation. Synchronous therewith, a 110 nanosecond logic zero pulse 653a is issued by the logic unit 540 to the control lines 543, 544 and 546. In response thereto, shift register 571 is preset to indicate a side 4 on control lines 174 and 175, and the 3 × 3 bit memory mosaic of FIG. 35a is stored into the array register 600 of FIG. 31.

Upon the occurrence of the trailing edge of pulse 653a, the waveform 654 transitions to a logic zero level as illustrated by pulse 654a, and the waveform 655 transitions to a logic zero level at 655a. Concurrent with pulse 654a, a pulse 671a of waveform 671 is supplied by logic unit 541 to control line 170. The starting trace point coordinates and the starting side indication thereby are stored into the of row/column counter logic unit 28 of FIG. 10.

Upon the occurrence of the logic one to logic zero transition at 655a, the logic unit 545 enters the logic state zero as illustrated by the diagram 656. The vector control logic unit 545 thereafter steps from logic state zero to logic state one, and thence to logic state two. Upon completing the logic state two operations, a plus one move is taken as indicated by the logic zero to logic one level transition at 670a of waveform 670. More particularly, a move is made from boundary point 672 of FIG. 35a to boundary point 673. Upon entering the logic state three as illustrated by diagram 656, a 110 nanosecond logic zero pulse 666a is issued. During the time period of pulse 666a, the memory cell addressed by the row and column counters of logic unit 28 is marked in the marker memory unit 32. Thereafter, the logic unit 545 steps from logic state three to logic state one and thence to logic state two.

Upon entering logic state two, the criteria represented by equations Q2–Q9 are applied to the memory mosaic stored in the array register 600 as illustrated by FIG. 35a. Since equation Q3 is satisfied, a 110 nanosecond logic zero pulse 667a is issued during the last half period of logic state two to increment the column counter of logic unit 28. The equation Q3 also indicates a zero move. Thus, the waveform 670 transitions to a logic zero level upon the occurrence of the trailing edge of pulse 667a. Thereafter, the logic unit 545 steps to logic state three.

During the last half period of logic state three, a 110 nanosecond pulse 666b is issued. Further, the next memory mosaic illustrated by FIG. 35b is stored in the array register 600. From logic state three, the logic unit 545 steps to logic state zero. Synchronous therewith, the D4 output of PROM 572 transitions to a logic one level as illustrated by waveform 658. The sum of the memory cells about the center cell of FIG. 35b thus is greater than two. In addition, the circumference count is not equal to or greater than four as illustrated by waveform 659, and the D1 output of logic unit 541 is at a logic zero level as indicated by waveform 660. Further, the D2 output of PROM 572 is at a logic zero level to indicate a no-break condition as illustrated by waveform 662. In response thereto, the waveform 657 transitions to a logic one level to indicate that a node has been encountered which should be broken away from the character image.

From logic state zero, the logic unit 545 steps to logic state one. The shift register 571 is down shifted twice to indicate first a side 4 and then a side 3 position, as illustrated by diagram 661. Thus, a move is initiated from the side 1 position indicated by reference number 674 of FIG. 35b to the side 3 position indicated by reference 675. Thereafter, the vector control logic unit 545 steps from logic state one to logic state two.

During logic state two, the FPLA unit 604 applies the criteria represented by equations Q2-Q9 to the memory mosaic illustrated by FIG. 35b and stored in array register 600. As the current boundary point referred to by reference number 675 is on side 3 of a cell, the equation Q7 is satisfied. In response thereto, a 110 nanosecond logic zero pulse 668a is issued during the last half period of logic state two to decrement the column counter of logic unit 28. The logic unit 545 then steps from logic state two to logic state three.

After the expiration of the first 110 nanoseconds of logic state three, a 110 nanosecond logic zero pulse 666c is issued to mark the current boundary point in the marker memory unit 32. Upon the occurrence of the trailing edge of pulse 666c, the D1 output of logic unit 541 of FIG. 29a transitions to a logic one level as illustrated by waveform 660. Thereafter, the logic unit 545 steps from logic state three to logic state one.

Upon entering the logic state one, the logic unit 545 senses the D1 output of logic unit 541 as illustrated by waveform 660. Upon detecting a logic one level, the D10 output of logic unit 545 transitions to a logic one level as illustrated by waveform 663. Synchronous therewith, the write memory control logic unit 573 issues a 220 nanosecond logic zero pulse 664a to control line 156a. After the expiration of the first 110 nanoseconds of the logic state one period, the write memory control logic unit 573 issues a 110 nanosecond logic zero pulse 665a to control line 146. The memory cell 676 of FIG. 35c thereby is deleted from the memory plane units 33-35. The logic unit 545 thereafter steps from logic state one to logic state three.

If waveform 660 remains set to a logic one level during the last 110 nanoseconds of logic state three, a 110 nanosecond pulse 666d is issued by the write memory control logic unit 573 to control line 147. The memory location indicated by the row and column counters of logic unit 28 thereupon is marked in the marker memory unit 32. Synchronous therewith, the logic unit 541 issues a 110 nanosecond logic one pulse 669a to control line 424 to indicate that the node has been broken from the character image.

It is to be understood that the logic one level of waveform 660 is an indication of the occurrence of a bad stop. Although the memory mosaic of FIG. 35c indicates a memory cell sum less than two, the waveform 658 remains at a logic one level since the waveforms 657 and 658 were set to logic one levels during the previous logic zero state. Once the logic one state of waveforms 657 and 658 are indicated and set, the waveforms 657 and 658 do not transition to a logic zero level and the circumference count is not allowed to increment. The waveform 659 thus remains at a logic zero level. Such conditions continue until the operation illustrated by FIG. 34 is complete.

FIG. 36

FIG. 36 is a logic flow diagram of the operation of the vector control logic unit 27 of FIG. 10.

Entry is made at a logic step 680 of logic state zero from which a transfer is made to a logic step 681. At step 681, the EN1 enable input of logic unit 27 is sensed to detect a logic zero level. If a logic zero level is not detected, the logic decision flow cycles about a logic path 682. When a logic zero level is detected, however, the vector control logic unit 545 of FIG. 29a enters logic step zero and a transfer is made from step 681 to a logic step 683. At step 683, logic unit 545 detects the elapsed time in logic state zero. If the first half period has not expired, a transfer is made from step 683 to reenter step 681. If the first half period has expired, however, a transfer is made from step 683 to a logic step 684.

At step 684, the write memory control logic unit 573 of FIG. 29b senses the D2 output of the FPLA logic control unit 570. If an omit condition is indicated, a transfer is made from step 684 to a logic step 685 where the logic unit 573 sets an omit condition flip-flop. From step 685, a transfer is made to a logic step 686. If an omit condition is not indicated at step 684, a transfer is made from step 684 to a logic step 687 where the logic unit 573 resets the omit condition flip-flop. From step 687, a transfer is made to step 686.

The write logic unit 573 senses the D3 output of control unit 570 at step 686. If a stop condition is indicated, a transfer is made from step 686 to a logic step 688 where logic unit 573 sets a stop condition flip-flop. From step 688, a transfer is made to a logic step 689 to sense the I16 input of logic unit 573. If a logic zero level indicating the initialization of a second boundary trace operation is not detected, a transfer is made from step 689 to a logic step 690. If a second boundary trace operation has been initiated, however, a transfer is made from step 689 to a logic step 691 where logic unit 573 issues a 110 nanosecond logic zero pulse to control line 459. From step 691, a transfer is made to step 690.

If a stop condition is not detected at step 686, a transfer is made from step 686 to a logic step 692 to reset the stop condition flip-flop. From step 692 a transfer is made to step 690.

The logic unit 541 senses control line 550 to determine whether the memory cells surrounding a center cell of a memory mosaic stored in array register 600 of FIG. 31 has a sum greater than two. If so, a transfer is made from step 690 to a logic step 693 where logic unit 541 sets a memory flip-flop. From step 693, a transfer is made to a logic step 694. If the memory cell sum is less than or equal to two at step 690, a transfer is made from step 690 to a logic step 695 where the logic unit 541 resets the memory flip-flop. From step 695, a transfer is made to step 694.

The vector control logic unit 545 senses control line 557 at step 694 to detect a condition indicating that a node is to be deleted from the character image stored in memory plane units 33–35. If a break condition is indicated, a transfer is made from step 694 to a logic step 696 where logic unit 545 sets a break condition flip-flop. From step 696, a transfer is made to a logic step 697 of FIG. 36b. If a break condition is not detected at step 694, a transfer is made from step 694 to a logic step 698 where the logic unit 541 resets the break condition flip-flop. From step 698, a transfer is made to step 697 of logic state one.

At step 697, the vector enable logic unit 540 again senses control line 437 leading from the EN1 enable input of the logic unit 27 to detect a trace enable condition. If an enable condition is not detected, the logic decision flow cycles about a logic path 699. When a trace enable condition is detected, however, a transfer is made from step 697 to a logic step 700. At step 700, the logic unit 545 of FIG. 29a senses the D7 output of logic unit 540 to detect a logic one level. A third boundary trace operation thereby is indicated. If a third boundary trace operation has not been initiated, however, a transfer is made from step 700 to a logic step 701 where the logic unit 541 senses control line 547 to detect a logic zero level. If a logic zero level is detected, a transfer is made from step 701 to a logic step 702 where the logic unit 545 detects the expired time in logic state one. If the first half period of logic state one has not expired, the logic decision flow cycles about a logic path 703. If the first half period has expired, however, a transfer is made from step 702 to a logic step 704.

If the circumference count is greater than or equal to four at step 701, a transfer is made from step 701 to a logic step 705 to sense the omit condition flip-flop of steps 685 and 687. If the flip-flop is reset, a transfer is made from step 705 to step 702. If the flip-flop is set, however, a transfer is made from step 705 to a logic step 706 to sense the stop condition flip-flop of steps 688 and 692. If a stop condition is indicated, a transfer is made from step 706 to step 702. If a stop indication is not indicated, a transfer is made from step 706 to a logic step 707. At step 707, the D3 output of logic unit 573 transitions to a logic zero level to clear data cable 36 of FIG. 10. From step 707, a transfer is made to a logic step 708 where the logic unit 545 again detects the expired time in logic state one. If a half period has not expired, the logic decision flow cycles about a logic path 709. If the first half period of logic state one has expired, however, a transfer is made from step 708 to a logic step 710. At step 710, the logic unit 573 issues a 110 nanosecond logic zero pulse to the control line 146. A logic zero thereby is written into a memory cell of memory plane units 33–35 which is to be deleted. From step 710, a transfer is made to step 704.

At step 704, the logic unit 573 senses the D3 output of shift register 571 to detect a side 4 condition. If a side 4 is not indicated, a transfer is made from step 704 to a logic step 711 of logic state two. If a side 4 condition is indicated, however, a transfer is made from step 704 to a logic step 712 where the logic unit 573 senses the D1 output of logic control unit 570. If a logic zero level is detected, the memory cell to the left of the center cell of the register 600 array is black or at a logic one level. In that event, a transfer is made from step 712 to step 711. If a black cell is not indicated, a transfer is made from step 712 to a logic step 713 where the logic unit 573 issues a 110 nanosecond logic zero pulse to control line 147. In response thereto, the memory cell indicated by the row and column counters of logic unit 28 of FIG. 10 is marked in the marker memory unit 32. From step 713, a transfer is made to step 711.

If a third boundary trace operation has been initiated at the time of step 700, a transfer is made from step 700 to a logic step 714 to sense the flip-flop of steps 693 and 695. If the flip-flop is set, a transfer is made from step 714 to a logic step 715 where the logic unit 541 senses control line 547 to detect a circumference count less than four. If the flip-flop of steps 693 and 695 is reset, a transfer is made from step 714 to a logic step 716. Further, if the circumference count at step 715 is greater than or equal to four, a transfer is made from step 715 to step 716.

At step 716, the logic unit 545 detects the expired time of logic state one to determine whether a half period has expired. If not, the logic decision flow cycles about a logic path 717. If a half period has expired, however, a transfer is made from step 716 to logic step 711.

If the circumference count at step 715 is less than four, a transfer is made from step 715 to a logic step 718 where the flip-flop of step 696 and 698 is sensed by logic unit 545. If a break condition is indicated, a transfer is made from step 718 to a logic step 719. At step 719, the logic unit 545 senses the D1 output of logic unit 545 to detect a logic one level. A logic one level indicates that the end point of a boundary trace has been encountered during logic state one. If an end condition is detected, a transfer is made from step 719 to a logic step 720 where the logic unit 545 senses the expired time in logic state one. If the first half period of logic state one has not expired, the logic decision flow cycles about a logic path 720a. If 110 nanoseconds have expired, a transfer is made from step 720 to a logic step 721. At step 721, the logic unit 574 issues a 110 nanosecond logic zero pulse to control line 160. In response thereto, the column counter 163 of FIG. 14b is incremented. From step 721, a transfer is made to a logic step 722 of logic state three.

If an end condition is not detected at step 719, a transfer is made from step 719 to a logic step 723 where the D3 output of logic unit 573 transitions to a logic zero level to clear the data cable 36 of FIG. 10. From step 723, a transfer is made to a logic step 724 where the logic unit 573 awaits the expiration of the first half of the logic state one. If the first half period has not expired, the logic decision flow cycles about a logic path 724a. After 110 nanoseconds in logic state one, a transfer is made from step 724 to a logic step 725. At step 725, the logic unit 573 issues a 110 nanosecond logic zero pulse to line 146 as before described. From step 725, a transfer is made to step 722.

If a break condition is not indicated at step 718, a transfer is made from step 718 to a logic step 726. At step 726, the logic unit 545 senses the D1 output of logic unit 541 to detect an end condition. If an end condition exists, a transfer is made from step 726 to step 723. If an end condition is not detected, however, a transfer is made from step 726 to a logic step 727. At step 727, the shift register 571 senses the D7 and D6 outputs of logic control unit 570 to detect a zero move condition. If both the D6 and D7 outputs of logic control unit 570 are at a logic one level, a zero move condition is indicated. In that event, a transfer is made from step 727 to a logic step 728 where the shift register 571 is shifted down one place. From step 728, a transfer is made to a logic step 729. At step 729, the logic unit 573 awaits the expiration of the first half of the logic state one time period. If 110 nanoseconds have not expired in logic state one, the logic decision flow cycles about a logic path 729a. After the first half of the 220 nanosecond logic state one time period has expired, however, a transfer is made from step 729 to a logic step 730 where the logic unit 573 issues a 110 nanosecond logic zero pulse to line 146. From step 730, a transfer is made to a logic step 731. At step 731, the D6 and D7 outputs of the logic control unit 570 are sensed by shift register 571 to detect a zero move condition. If a zero move condition is detected, a transfer is made from step 731 to step 711. If a zero move is not detected, a transfer is made from step 731 to a logic step 732 where the shift register 571 is shifted down one place. From step 732, a transfer is made to step 711.

At step 711, the logic unit 545 steps from logic state one to logic state two, and the logic unit 540 senses line 437 to detect a trace enable signal. If a trace enable signal is not detected, the logic decision flow cycles about a logic path 733. Upon detecting a trace enable signal, however, a transfer is made from step 711 to a logic step 734 where the logic unit 541 senses line 547 to detect a circumference count less than four. If the circumference count is less than four, a transfer is made from step 734 to a logic step 735. If the circumference count is greater than or equal to four, a transfer is made from step 734 to a logic step 736 to sense the flip-flop of steps 685 and 687. If the flip-flop is set, a transfer is made from step 736 to a logic step 737 to sense the flip-flop of steps 688 and 692. If an omit condition is not detected at step 736, however, a transfer is made from step 736 to step 735.

If a stop condition is detected at step 737, a transfer is made to step 735. If a stop condition is not detected, however, a transfer is made from step 737 to a logic step 738. At step 738, the logic unit 573 issues a 110 nanosecond logic zero pulse to line 156a to clear the data cable 36 of FIG. 10. From step 738, a transfer is made to step 735. At step 735, the logic control unit 570 awaits the expiration of the first 110 nanoseconds of logic state two. During the first half period of logic state two, the logic decision flow cycles about a logic path 739. Upon completing the first half period of logic state two, however, a transfer is made from step 735 to a logic step 740. The logic unit 574 thereupon senses the D2 output of logic unit 570 to detect a logic zero level. If a logic zero level is detected, the row counter 151 of FIG. 14b is to be incremented, and a transfer is made from step 740 to a logic step 741. At step 741, the logic unit 574 issues a 110 nanosecond logic zero pulse to control line 159. From step 741, a transfer is made to a logic step 742.

If a logic zero level is not detected at step 740, a transfer is made from step 740 to step 742 where the logic unit 574 senses the D3 output of logic control unit 570. If a logic zero level is detected, a transfer is made from step 742 to a logic step 743. At step 743, the logic unit 574 issues a 110 nanosecond logic zero pulse to line 161 to decrement the column counter 163 of FIG. 14b. From step 743, a transfer is made to a logic step 744. If a logic one level is detected at step 742, a transfer is made from step 742 to step 744 where logic unit 574 senses the D4 output of control unit 570 to detect a logic zero level. If a logic zero level is detected, a transfer is made from step 744 to a logic step 745. At step 745, the logic unit 574 issues a 110 nanosecond logic zero pulse to line 153 to decrement the row counter 151. From step 745, a transfer is made to a logic step 746. If a logic one level is detected at step 744, a transfer is made to step 746 where the logic unit 574 senses the D5 output of control unit 570 to detect a logic zero level. If a logic zero level is detected, a transfer is made from step 746 to a logic step 747. The logic unit 574 thereupon issues a 110 nanosecond logic zero pulse to line 160 to increment the column counter 163. From step 747, a transfer is made to a logic step 748. Further, if a logic one level is detected at step 746, a transfer is made from step 746 to step 748 to sense the D9 output of control unit 570 to detect a minus one move condition. If a logic zero level is detected, a transfer is made from step 748 to step 722. If a logic one level is detected, however, a transfer is made from step 748 to a logic step 749 to sense the D8 output of control unit 570 for a plus one move condition.

If a logic zero level is detected at step 749, a transfer is made from step 749 to a logic step 750 where the shift register 571 is decremented. Further, the minus one move condition is stored into the new move buffer of logic control unit 570. From step 750, a transfer is made to step 722. If a logic one level is detected at step 749, a transfer is made from step 749 to a logic step 751 where the shift register 571 is incremented. The plus one move condition also is stored into the new move buffer of the control unit 570. From step 571, a transfer is made to step 722.

At step 722, the logic unit 545 of FIG. 29a enters logic state three and the vector enable logic unit 540 senses line 437 for a trace enable condition. If line 437 is at a logic zero level, a transfer is made from step 722 to a logic step 752. If the line 437 is at a logic one level, however, the logic decision flow cycles about a logic path 753.

At step 752, the logic unit 541 awaits the expiration of 110 nanoseconds in logic state three. If the first half period of the logic state has not expired, the logic decision flow cycles about a logic path 754. If the first half period of logic state three has expired, however, a transfer is made from step 752 to a logic step 755. The logic unit 541 thereupon senses line 552 to detect the presence of a memory cell sum equal to zero. More particularly, when the memory cells surrounding a center cell of a 3 × 3 cell memory mosaic of register 600 has a sum equal to zero, line 552 transitions to a logic one level. If a logic one level is detected, a transfer is made from step 755 to a logic step 756 where the logic unit 541 issues a 110 nanosecond logic one pulse to line 424. The completion of logic state three operations thereby is signaled. From step 756, a transfer is made to reenter step 680. If the sum of the surrounding cells at step 755 is other than zero, a transfer is made from step 755 to a logic step 757 where logic unit 541 senses control lines 434 and 435 to detect the boundary trace operation that is being executed. If a first boundary trace operation is indicated, a transfer is made from step 757 to a logic step 758.

The logic unit 545 senses the D1 output of logic unit 541 at step 758 to detect an END condition. If a logic one level is detected, a transfer is made from step 758 to a logic step 759 where the new move buffer of control unit 570 is sensed to detect a plus one move condition. If a plus one move condition is detected, a transfer is made from step 759 to step 697 to continue the logic decision process as before described. If a plus one move condition is not detected at step 759, a transfer is made from step 759 to a logic step 760 where the END counter of logic unit 541 is sensed for a count of five. If a count of five is detected, a transfer is made from step 760 to a logic step 761. There, the logic unit 541 issues a 110 nanosecond logic one pulse to line 424. From step 761, a transfer is made to a logic step 762.

If the END count is not equal to five at step 760, a transfer is made from step 760 to a logic step 763 where the END counter of logic unit 541 is incremented. From step 763, a transfer is made to step 762. Further, if an END condition is not detected at step 758, a transfer is made to a logic step 764. At step 764, the logic unit 541 senses control line 180 to detect a condition in which the row/column coordinates and side of a current boundary point are equal to the coordinates and side of the starting point of the boundary trace. If an equivalence is not detected, a transfer is made from step 764 to step 762 where the new move buffer of logic control unit 570 is sensed for a plus one move condition. If a plus one move is indicated, a transfer is made from step 762 to step 697. If a plus one move is not indicated, however, a transfer is made from step 762 to a logic step 765. The vector control logic unit 545 thereupon issues a 110 nanosecond logic zero pulse to control line 555 to increment the circumference counter of detector 49 of FIG. 10. From step 765, a transfer is made to reenter step 680.

If an equivalence is detected at step 764, a transfer is made from step 764 to a logic step 766 where the D1 output of logic unit 541 is set to a logic one level. From step 766, a transfer is made to step 762.

If a boundary trace two operation is indicated at step 757, a transfer is made from step 757 to a logic step 767. The write memory control logic unit 573 thereupon senses the flip-flop of steps 685 and 687 to detect an omit condition. If an omit condition is not detected, a transfer is made from step 767 to a logic step 768 where the D1 output of logic unit 541 is reset to a logic zero level. From step 768, a transfer is made to a logic step 769 where the logic unit 545 senses the D1 output of logic unit 541 to detect the occurrence of an END condition. If a logic one level is detected, a transfer is made from step 769 to a logic step 770. At step 770, the next occurring boundary point after an omit condition has been satisfied is stored into a starting point buffer of logic unit 28 of FIG. 10. A new boundary trace starting point thereby is indicated. From step 770, a transfer is made to step 762. If an END condition is not indicated at step 769, however, a transfer is made from step 769 to a logic step 771 where the coordinates and side of a current boundary point are compared to the coordinates and side of the boundary trace starting point. If an equivalence is indicated, a transfer is made from step 771 to a logic step 772 where the logic unit 541 issues a 110 nanosecond logic one pulse to line 424. From step 772, a transfer is made to step 762. If an equivalence is not detected at step 771, a transfer is made to step 762.

If an omit condition is detected at step 767, a transfer is made from step 767 to a logic step 773. At step 773, write memory control logic unit 573 senses the flip-flop of steps 688 and 692 to detect a stop condition. If a stop condition is indicated, a transfer is made from step 773 to step 768. If a stop condition is not detected, however, a transfer is made from step 773 to a logic step 774. The logic unit 541 thereupon senses control line 547 to detect the occurrence of a circumference count which is less than four. If a circumference count equal to or greater than four is detected, a transfer is made from step 774 to step 768. If a circumference count less than four is detected, however, a transfer is made from step 774 to a logic step 775 where the D1 output of logic unit 541 is set to a logic one level. From step 775, a transfer is made to step 762.

If a third boundary trace operation is detected at step 757, a transfer is made to a logic step 776 where the logic unit 573 issues a 110 nanosecond logic zero pulse to line 147. From step 776, a transfer is made to a logic step 777 where the logic unit 541 senses control line 547 to detect a circumference count less than four. If a circumference count less than four is detected, a transfer is made from step 777 to a logic step 778 where the logic unit 541 senses the flip-flop of steps 693 and 695. If the flip-flop is not set, a transfer is made from step 778 to a logic step 779 to sense the new move buffer of control unit 570. If a plus one move is indicated, a transfer is made from step 779 to step 697 where the logic decision process continues as before described. If a pulse one move is not indicated, however, a transfer is made from step 779 to a logic step 780. The vector control logic unit 545 thereupon issues a 110 nanosecond logic zero pulse to line 555. In response thereto, the circumference counter 163 of FIG. 14b is incremented. From step 780, a transfer is made to reenter step 680.

If the flip-flop of steps 693 and 695 is set, a transfer is made from step 778 to a logic step 781 where the D1 output of logic unit 541 is set to a logic one level. From step 781, a transfer is made to a logic step 782 where the logic unit 545 senses the D1 output of logic unit 541. If a logic one level is detected, a transfer is made from step 782 to a logic step 783. At step 783, the boundary trace termination logic unit 541 issues a 110 nanosecond logic one pulse to line 424. Further, if a circumference count greater than or equal to four is detected at step 777, a transfer is made from step 777 to step 783. From step 783, a transfer is made to step 779 where the logic decision process continues as before described. If an END condition is not detected at step 782, a transfer is made from step 782 to reenter step 697.

FIG. 37

Figure 37:
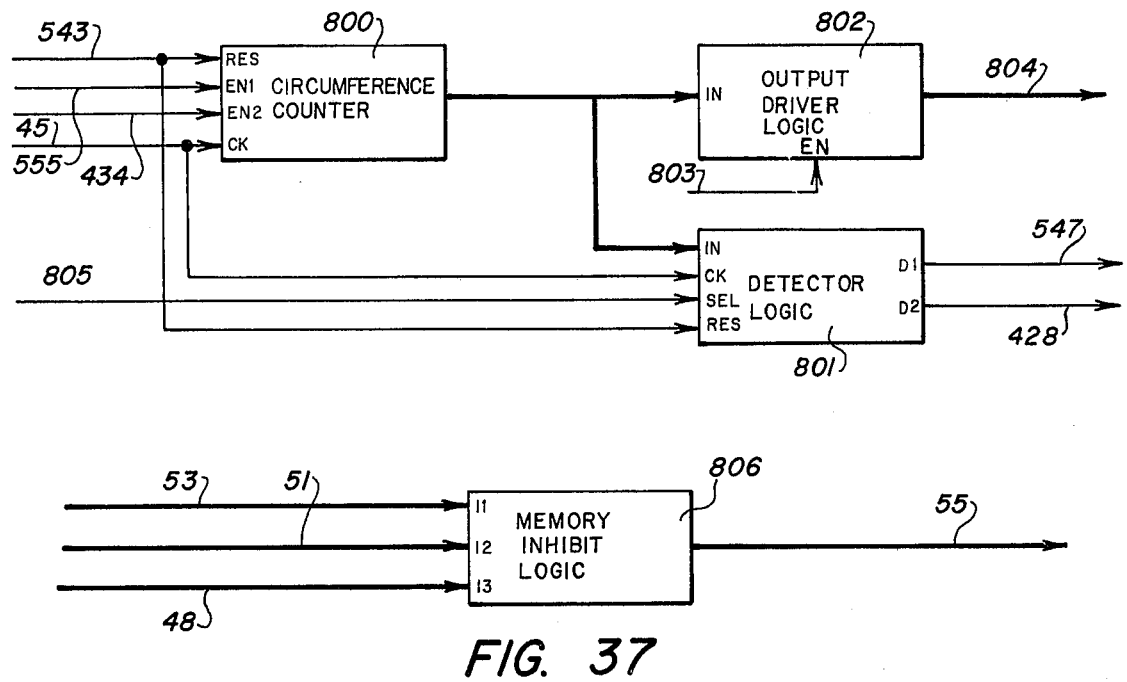
FIG. 37 is a functional block diagram of the loop/boundary detector of FIG. 10.

FIG. 37 illustrates in functional block diagram form the loop/boundary detector 49 of FIG. 10.

The D3 output of vector enable logic unit 540 of FIG. 29a is applied by way of control line 543 to the reset input of an eight bit circumference counter 800. The EN1 enable input of counter 800 is connected to control line 555 leading to the D11 output of vector control logic unit 545, and the EN2 enable input to counter 800 is connected to control line 434 leading to the I2 input of vector enable logic unit 540. The clock input to counter 800 is connected to control line 45 and to the clock input to a detector logic unit 801. The eight bit output of counter 800 is applied to the input of an output driver logic unit 802 and to the IN input of logic unit 801.

The enable input to logic unit 802 is connected by way of a control line 803 to the D6 output of boundary search and stop control logic unit 30 of FIG. 10, and the output of logic unit 802 is applied by way of an eight bit data cable 804 to data cable 36 of FIG. 10. The SEL select input to logic unit 801 is connected by way of a control line 805 to cable 54, and the reset input to logic unit 801 is connected to the reset input of counter 800. The D1 output of logic unit 801 is applied by way of control line 547 to the I8 input of boundary trace termination logic unit 541 of FIG. 29a. The D2 output of logic unit 801 is applied by way of control line 428 to the I7 input of boundary trace logic control unit 420 of FIG. 24a.

The I1 input to a memory inhibit logic unit 806 is connected by way of data cable 53 to the D1 output of memory plane unit 35. The I2 input to the logic unit 806 is connected to data cable 51 leading to the D1 output of memory plane unit 33. The I3 input to logic unit 806 is connected to data cable 48 leading to the ROW2 output of row/column control logic unit 28. The output of logic unit 806 is connected to data cable 55 leading to the DIN2 input of vector control logic unit 27.

In operation, circumference counter 800 and logic unit 801 are reset upon the occurrence of a 110 nanosecond logic zero pulse on control line 543. When line 434 is at a logic one level and a 110 nanosecond logic zero pulse appears on line 555, the counter 800 is enabled to count at the 9.0 MHz clock rate supplied by line 45. When the output driver logic unit 802 is enabled by a 110 nanosecond logic zero pulse on line 803, the output of counter 800 is applied to cable 804.

When the circumference count is equal to four, the D1 output of logic unit 801 transitions to a logic one level. Further, when the VEC4 signal on line 805 is at a logic one level, the logic unit 801 compares a manually set character piece threshold with the current circumference count. If the circumference count is equal to or greater than the character piece threshold, the D2 output of logic unit 801 transitions to a logic one level. If the circumference count is less than the character piece threshold, however, the D2 output remains at a logic zero level.

When the VEC4 signal on line 805 is at a logic zero level, the logic unit 801 compares a manually set loop threshold with the circumference count. If the circumference count is equal to or exceeds the loop threshold, the D2 output of logic unit 801 transitions to a logic one level. If the circumference count is less than the loop threshold, however, the D2 output remains at a logic zero level. In the preferred embodiment described herein, the loop threshold is set to a value of seven and the character piece threshold is set to a value of 15.

The memory inhibit logic unit 806 receives the row count of logic unit 28 of FIG. 10 by way of cable 48. Upon detecting a row count of zero, the data carried by cable 53 is inhibited while the data on cable 51 is applied to the cable 55. When a row count of 31 is detected, the data on cable 51 is inhibited and the data on cable 53 is applied to cable 55. When a row count other than zero or 31 is detected, the data on both of the cables 51 and 53 is applied to cable 55.

FIG. 38

Figure 38:
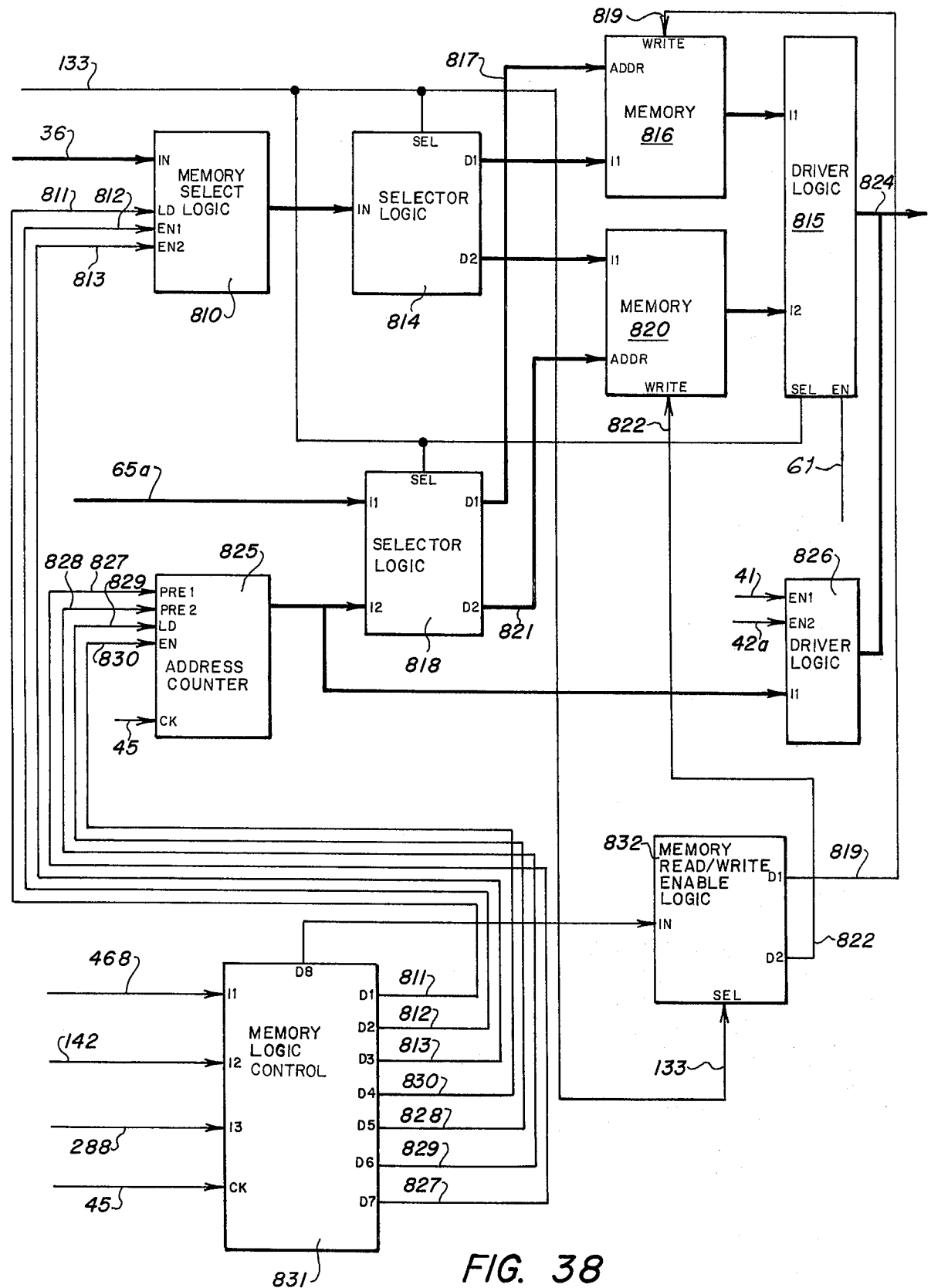
FIG. 38 is a functional block diagram of the feature memory unit of FIG. 10.

FIG. 38 illustrates in functional block diagram form the feature memory unit 31 of FIG. 10.

Data cable 36 of FIG. 10 is connected to the input of a memory select logic unit 810, the load input of which is connected to a control line 811. The EN1 and EN2 enable inputs of logic unit 810 are connected to control lines 812 and 813, respectively. The eight bit output of logic unit 810 is connected to the IN input of a selector logic unit 814. The select input to logic unit 814 is connected to line 133 leading to the D1 output of command control logic unit 130 of FIG. 14a. The D1 output of logic unit 814 is supplied to the I1 input of a 256 × 8 bit memory unit 816, the address input of which is connected by way of a data cable 817 to the D1 output of a selector logic unit 818. The D2 output of logic unit 814 is connected to the I1 input of a 256 × 8 bit memory unit 820. The write enable input of memory unit 820 is connected to a control line 822. The output of the memory unit is connected to the I2 input of logic unit 815. The address input of memory unit 820 is connected by way of an eight bit data cable 821 to the D2 output of logic unit 818, and the write enable input to the memory unit 816 is connected to a control line 819. The eight bit output of memory unit 816 is applied to the I1 input of logic unit 815. The enable input to logic unit 815 is connected to control line 61 leading to the microprocessor 14 of FIG. 1. The select input to logic unit 815 is connected to line 133, and to the select input of logic unit 818. The output of logic unit 815 is applied to an eight bit data cable 824 comprised of control lines 38-40, 57-60 and 67 of FIG. 10.

The I1 input to the logic unit 818 is connected to a data cable 65a comprising the eight least significant bit lines of cable 65 of FIG. 10. The I2 input to logic unit 818 is connected to the eight bit output of an address counter 825, and to the I1 input of a driver logic unit 826.

The PRE1 and PRE2 preset inputs to the address counter 825 are connected to control lines 827 and 828, respectively. The load input to address counter 825 is connected to a control line 829, and the enable input to the counter is connected to a control line 830. The clock input to address counter 825 is connected to a 9.0 MHz system clock by way of control line 45.

The EN1 and EN2 enable inputs to driver logic unit 826 are connected to control lines 41 and 42, respectively, leading from the microprocessor 14. The output of driver logic unit 826 is connected to the data cable 824.

The I1 input of a memory logic control unit 831 is connected to control line 468 leading to the D7 output of inflection control logic unit 462 of FIG. 24c. The I2 input to control unit 831 is connected to control line 142 leading to the D1 output of timing control logic unit 135 of FIG. 14a, and the I3 input to logic control unit 831 is connected to control line 288 leading to the D5 output of the feature buffer control logic unit 275 of FIG. 18b. The clock input to logic control unit 831 is connected to the 9.0 MHz system clock by way of control line 45.

The D1 output of control unit 831 is connected to control line 811, and the D2 output is connected to control line 812. Further, the D3 output of control unit 831 is connected to control line 813, the D4 output is connected to control line 830 and the D5 output is connected to control line 828. The D6 output of control unit 831 is connected to control line 829 and the D7 output is connected to control line 827. The D8 output of control unit 831 is connected to the input of a memory read/write enable logic unit 832. The select input to logic unit 832 is connected to control line 133, and the D1 output is applied to control line 819. The D2 output of logic unit 832 is applied to control line 822.

In operation, a memory select signal is received from the row/column control logic unit 28 on control line 133. If the memory select signal is at a logic one level, the output of address counter 825 is applied by the selector logic unit 818 to the address input of memory unit 820. In addition, address data from microprocessor 14 is directed by the selector logic unit 818 from cable 65a to the cable 817. Further, the output of memory select logic unit 810 is applied by the selector logic unit 814 to the I1 input of memory unit 820, and the input to the enable logic unit 832 is applied to control line 822. Thus, the data at the I1 input of the memory unit 820 is written into the memory locations addressed by the D2 output of selector logic unit 818. During the time period that the memory unit 820 is being filled, the memory locations of the memory unit 816 are addressed by the microprocessor by way of cable 65a and applied to the I1 input of the driver logic unit 815. When the driver logic unit is enabled, the output of the memory unit 816 is applied to cable 824.

In a memory write operation, a 110 nanosecond logic zero pulse is received by the memory logic control unit 831 by way of control line 142. Concurrent therewith, the control unit 831 issues 110 nanosecond logic one pulses to control lines 827 and 828. In addition, the control unit issues a 110 nanosecond logic zero pulse to control line 829. In response thereto, the address counter 825 is loaded with all logic one's.

Each time that the control unit 831 receives a 110 nanosecond logic zero pulse on control line 468, the control unit issues a 110 nanosecond logic zero pulse to control line 811. In response thereto, the information on cable 36 is stored into one of two eight bit buffers comprising the memory select logic unit 810. Synchronous with the 110 nanosecond pulse on line 811, the control unit 831 issues a 110 nanosecond logic one pulse to control line 830. In response thereto, the address counter 825 is enabled to count at the clock rate appearing on control line 45.

Upon the occurrence of the trailing edge of the pulse on line 830, the control unit 831 issues a 110 nanosecond logic zero pulse to control line 812. The logic unit 810 is enabled thereby to select the first eight bit buffer of the logic unit to the input of the selector logic unit 814. Synchronous with the pulse on control line 812, the control unit 831 issues a 110 nanosecond logic one pulse to the input of the enable logic unit 832. In response thereto, the enable logic unit 832 supplies a 110 nanosecond logic zero pulse to line 822.

Upon the occurrence of the trailing edge of the pulse on control line 812, control unit 831 issues a 110 nanosecond logic one pulse to control line 828 to increment the address counter 825. At the time of the trailing edge of the pulse on line 830, the control unit 831 issues a 110 nanosecond logic zero pulse to control line 813 to select the second of the two eight bit buffers of logic unit 810. Synchronous with the pulse on line 813, the control unit 831 issues a 110 nanosecond logic one pulse to the input of the enable logic unit 832. The enable logic unit thereupon issues a 110 nanosecond logic zero pulse to control line 822.

By way of summary, a 16 bit word on data cable 36 is stored into two eight bit buffers of the memory select logic unit 810. The address counter 825 is loaded with all logic one's and then incremented. The first of the two eight bit buffers of logic unit 810 thereupon is loaded into the memory unit 820. Thereafter, the address counter again is incremented and the second of the two buffers of logic unit 810 is loaded into the memory unit 820. This operation is repeated each time that a 110 nanosecond logic zero pulse is received by the control unit 831 by way of control line 468.

When the raster scan control logic unit 29 of FIG. 10 issues a 110 nanosecond logic zero pulse to control line 288 as before described, the control unit 831 issues a 110 nanosecond logic one pulse to control line 827 and a 110 nanosecond logic zero pulse to control line 829. In response thereto, the address counter 825 is preset to a decimal 63. Thereafter, the address counter 825 is incremented as before described, and the information stored in the two eight bit buffers of logic unit 810 are written into the memory unit 820. Upon completing the feature derivation operation, the microprocessor 14 transitions the control lines 41 and 42a to logic zero levels. In response thereto, the output of the address counter 825 applied by the driver logic unit 826 to the cable 824. The microprocessor 14 thereby is provided with the last memory location of memory unit 820.

The microprocessor alternately transitions the control line 133 to a logic one level and to a logic zero level. One of memory units 816 and 820 thereby is selected for a write operation while the other unit is selected for a read operation. In the event that the control line 133 is at a logic zero level, the I2 input to the logic unit 818 is applied to the address input of the memory unit 816. Further, the I1 input of the logic unit 818 is applied to the address input of the memory unit 820. In addition, the input to the logic unit 814 is applied to the I1 input of the memory unit 816, and the input to the enable logic unit 832 is applied to the control line 819 to enable the memory unit 816 for a write operation. Thereafter, the output of logic unit 810 is written into the memory unit 816 at the memory locations addressed by the address counter 825. Further, those memory locations of memory unit 820 which are addressed by the microprocessor are supplied to the I2 input of the driver logic unit 815. When the driver logic unit is enabled, the output of memory unit 820 is applied to cable 824.

The memory map for each of memory units 816 and 820 is provided in Table 8.

TABLE 8

| Memory Location | Memory Map<br>Feature Information |
|---|---|
| 0 | Vector No. 1 |
| 1 | Circumference Count |
| 2 | Vector No. 2 |
| 3 | Circumference Count |
| 4 | Vector No. 3 |
| 5 | Circumference Count |
| 6 | Vector No. 4 |
| 7 | Circumference Count |
| 8 | Vector No. 5 |
| 9 | Circumference Count |
| 10 | Vector No. 6 |
| 11 | Circumference Count |
| 12 | Vector No. 7 |
| 13 | Circumference Count |
| 14 | Vector No. 8 |
| 15 | Circumference Count |
| 16 | Vector No. 9 |
| 17 | Circumference Count |
| 18 | Vector No. 10 |
| 19 | Circumference Count |
| 20 | VEctor No. 11 |
| 21 | Circumference Count |
| 22 | Vector No. 12 |
| 23 | Circumference Count |
| 24 | Vector No. 13 |
| 25 | Circumference Count |
| 26 | Vector No. 14 |
| 27 | Circumference Count |
| 28 | Vector No. 15 |
| 29 | Circumference Count |
| 30 | Vector No. 16 |
| 31 | Circumference Count |
| 32 | Vector No. 17 |
| 33 | Circumference Count |

TABLE 8-continued

Memory Map

| Memory Location | Feature Information |
|---|---|
| 34 | Vector No. 18 |
| 35 | Circumference Count |
| 36 | Vector No. 19 |
| 37 | Circumference Count |
| 38 | Vector No. 20 |
| 39 | Circumference Count |
| 40 | Vector No. 21 |
| 41 | Circumference Count |
| 42 | Vector No. 22 |
| 43 | Circumference Count |
| 44 | Vector No. 23 |
| 45 | Circumference Count |
| 46 | Vector No. 24 |
| 47 | Circumference Count |
| 48 | Vector No. 25 |
| 49 | Circumference Count |
| 50 | Vector No. 26 |
| 51 | Circumference Count |
| 52 | Vector No. 27 |
| 53 | Circumference Count |
| 54 | Vector No. 28 |
| 55 | Circumference Count |
| 56 | Vector No. 29 |
| 57 | Circumference Count |
| 58 | Vector No. 30 |
| 59 | Circumference Count |
| 60 | Vector No. 31 |
| 61 | Circumference Count |
| 62 | Vector No. 32 |
| 63 | Circumference Count |
| 64 | Row Minimum |
| 65 | Column Minimum |
| 66 | Row Maximum |
| 67 | Column Maximum |
| 68 | All Logic One's |
| 69 | Circumference Count |
| 70 | Inflection Count |
| 71 | Diff. Vector Count |
| 72 | (Slopes At Last Five |
| 73 | (Inflection Points |
| 74 | All Logic One's |
| 75 | " |
| 76 | " |
| 77 | " |
| 78 | " |
| 79 | |
| 80 | Row Stop Coordinate No. 1 |
| 81 | Column Stop Coordinates No. 1 |
| 82 | Row Stop Coordinate No. 2 |
| 83 | Column Stop Coordinate No. 2 |
| 84 | Row Stop Coordinate No. 3 |
| 85 | Column Stop Coordinate No. 3 |
| 86 | Row Stop Coordinate No. 4 |
| 87 | Column Stop Coordinate No. 4 |
| 88 | Row Stop Coordinate No. 5 |
| 89 | Column Stop Coordinate No. 5 |
| 90 | All Logic One's |
| 91 | " |
| 92 | " |
| 93 | Stop Count |
| 94 | (First Five Stop |
| 95 | (Slopes |
| 96–127 | Character No. 2 |
| 128–159 | Character No. 3 |
| 160–191 | Character No. 4 |
| 192–223 | Character No. 5 |
| 224–253 | Character No. 6 |

FIG. 39

Figure 39:
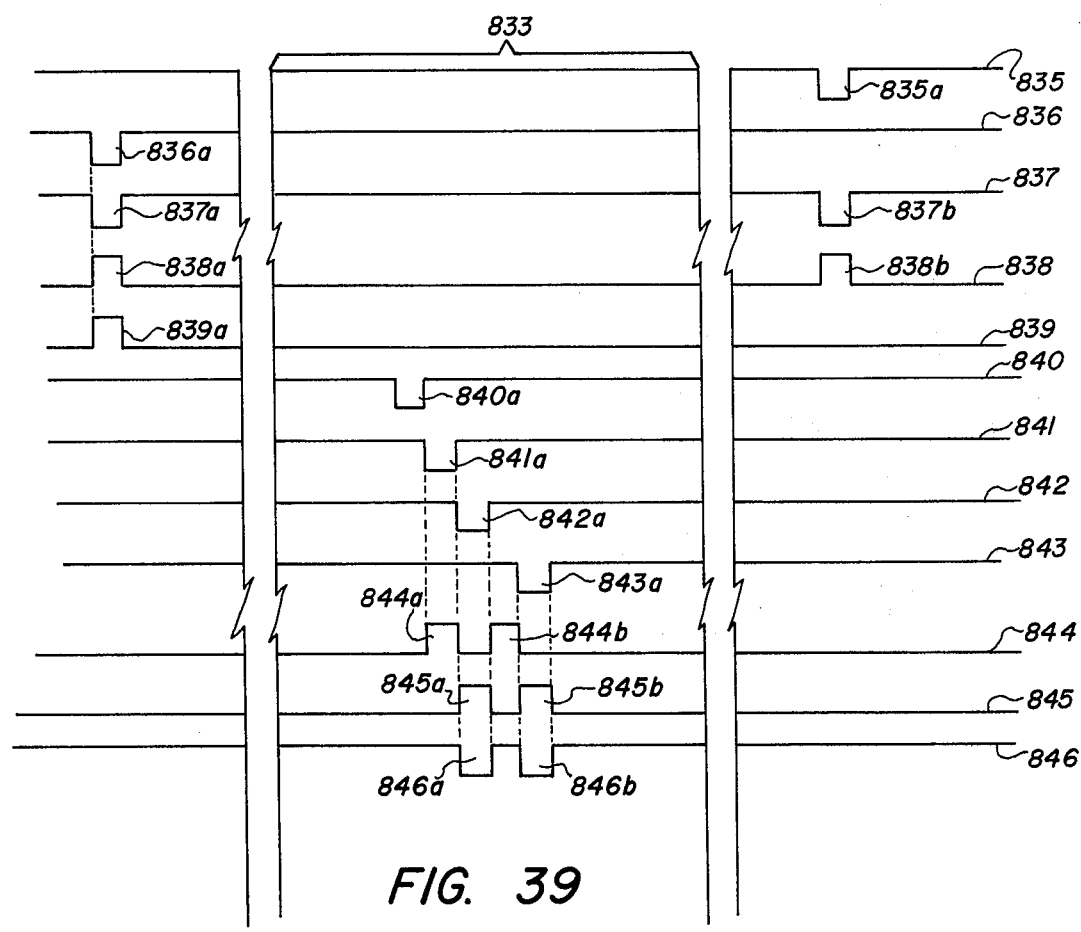
FIG. 39 is a timing diagram illustrating the operation of the memory logic control unit of FIG. 38.

FIG. 39 illustrates in timing diagram form the operation of the memory logic control unit 831 of FIG. 38.

A discrete waveform 835 illustrates the I3 input to memory logic control unit 831, and a discrete waveform 836 illustrates the I2 input to the control unit. A discrete waveform 837 illustrates the D6 output of the control unit, and a discrete waveform 838 illustrates the D7 output of the control unit. A discrete waveform 839 illustrates the D5 output of the control unit, and a discrete waveform 840 illustrates the I1 input to the control unit. A discrete waveform 841 illustrates the D1 output, a discrete waveform 842 illustrates the D2 output, a discrete waveform 843 illustrates the D3 output, and a discrete waveform 844 illustrates the D4 output of the control unit 831. A discrete waveform 845 illustrates the D8 output of the control unit, and a discrete waveform 846 illustrates one of the two outputs of the memory read/write enable logic unit 832 of FIG. 38.

In operation, the row/column control logic unit 28 of FIG. 10 issues a 110 nanosecond logic zero pulse 836a to the I2 input of the memory logic control unit 831. Immediately thereafter, control unit 831 issues a 110 nanosecond logic zero pulse 837a to control line 829, and a 110 nanosecond logic one pulse 838a to control line 827. Further, control unit 831 issues a 110 nanosecond logic one pulse 839a to control line 828. In response thereto, the address counter 825 is loaded with all logic one's.

When a 110 nanosecond logic zero pulse 840a is received at the I1 input of control unit 831, the pulse is buffered for 110 nanoseconds as illustrated by pulse 841a and issued to control line 811. In response to pulse 841a, the information on cable 36 is stored into the memory select logic unit 810. The control unit 831 also issues a 110 nanosecond logic one pulse 844a to control line 830. In response to pulse 844a, the address counter 825 is incremented.

Upon the occurrence of the trailing edge of pulse 841a, a 110 nanosecond logic zero pulse 842a is supplied by control unit 831 to control line 812. The output of the first of two eight bit buffers comprising logic unit 810 thereby is enabled. The information stored in the buffer then is supplied to the input of selector logic unit 814. Synchronous with the occurrence of pulse 842a, a 110 nanosecond logic one pulse 845a is supplied by control unit 831 to the input of the memory read/write enable logic unit 832. In response thereto, a logic unit 832 supplies a 110 nanosecond logic zero pulse 846a to either control line 819 or control line 822 depending upon the logic level of line 133.

Upon the occurrence of the trailing edge of pulse 842a, control unit 831 supplies a 110 nanosecond logic one pulse 844b to control line 830 to increment the address counter 825. Upon the occurrence of the trailing edge of pulse 844b, control unit 831 supplies a 110 nanosecond logic zero pulse 843a to control line 813. The output of the second eight bit buffer of logic unit 810 is enabled thereby and control unit 831 supplies a 110 nanosecond logic one pulse 845b to the input of logic unit 832. In response thereto, logic unit 832 issues a 110 nanosecond logic zero pulse 846b to control line 819 or control line 822.

Each time a vector difference is detected by the boundary search and stop control logic unit 30 of FIG. 10, a pulse as illustrated by pulse 840a is received at the I1 input of control unit 831. The operation of control unit 831 then proceeds as before described in connection with the discussion of the time period generally referred to by reference number 833.

Upon the completion of a boundary trace two operation as before described, a 110 nanosecond logic zero pulse 835a is issued by the raster scan control logic unit 29 of FIG. 10 to the I3 input of control unit 831. Synchronous to pulse 835a, control unit 831 issues a 110 nanosecond logic zero pulse 837b to line 829, and a 110 nanosecond logic one pulse 838b to control line 827. In response thereto, the address counter 825 is loaded with a decimal 63. Thereafter, the operation described in connection with time period 83 is repeated with the difference that pulse 840a is supplied by the raster scan control logic unit 29.

Figure 40:
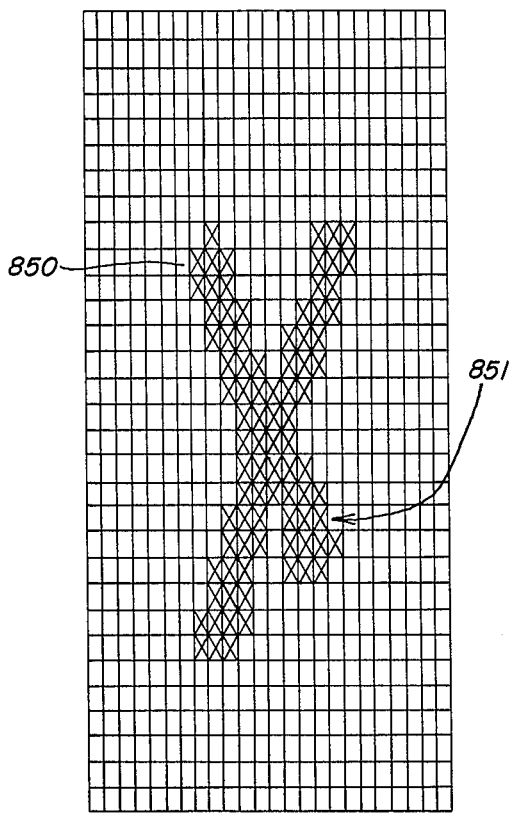
FIGS. 40 and 41 are binary image diagrams of the letter x and the numeral nine, respectively.
Figure 41:
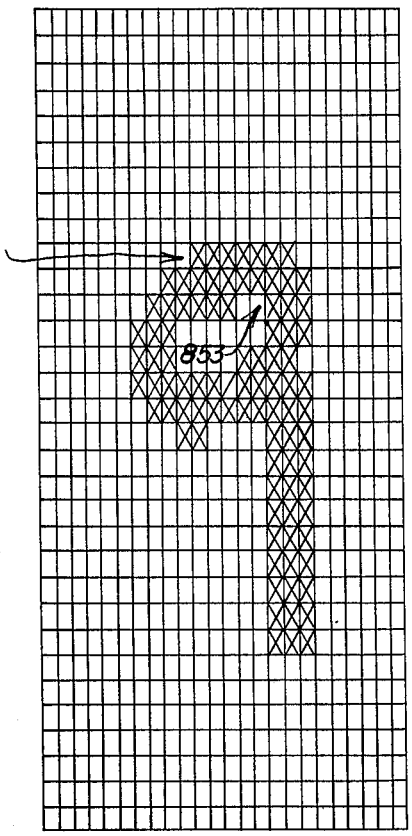
Figure 46:
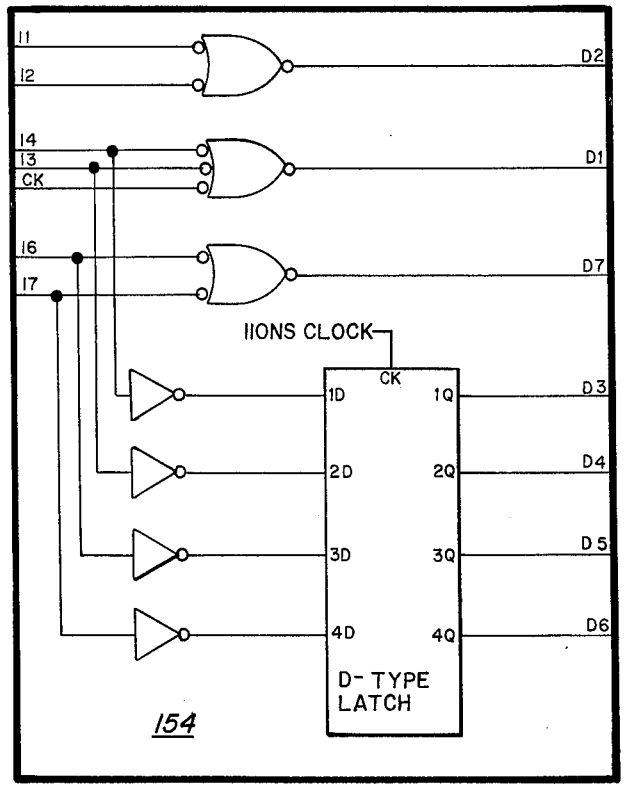
FIG. 46 is a logic diagram of the timing control logic unit of FIG. 14b.
Figure 42:
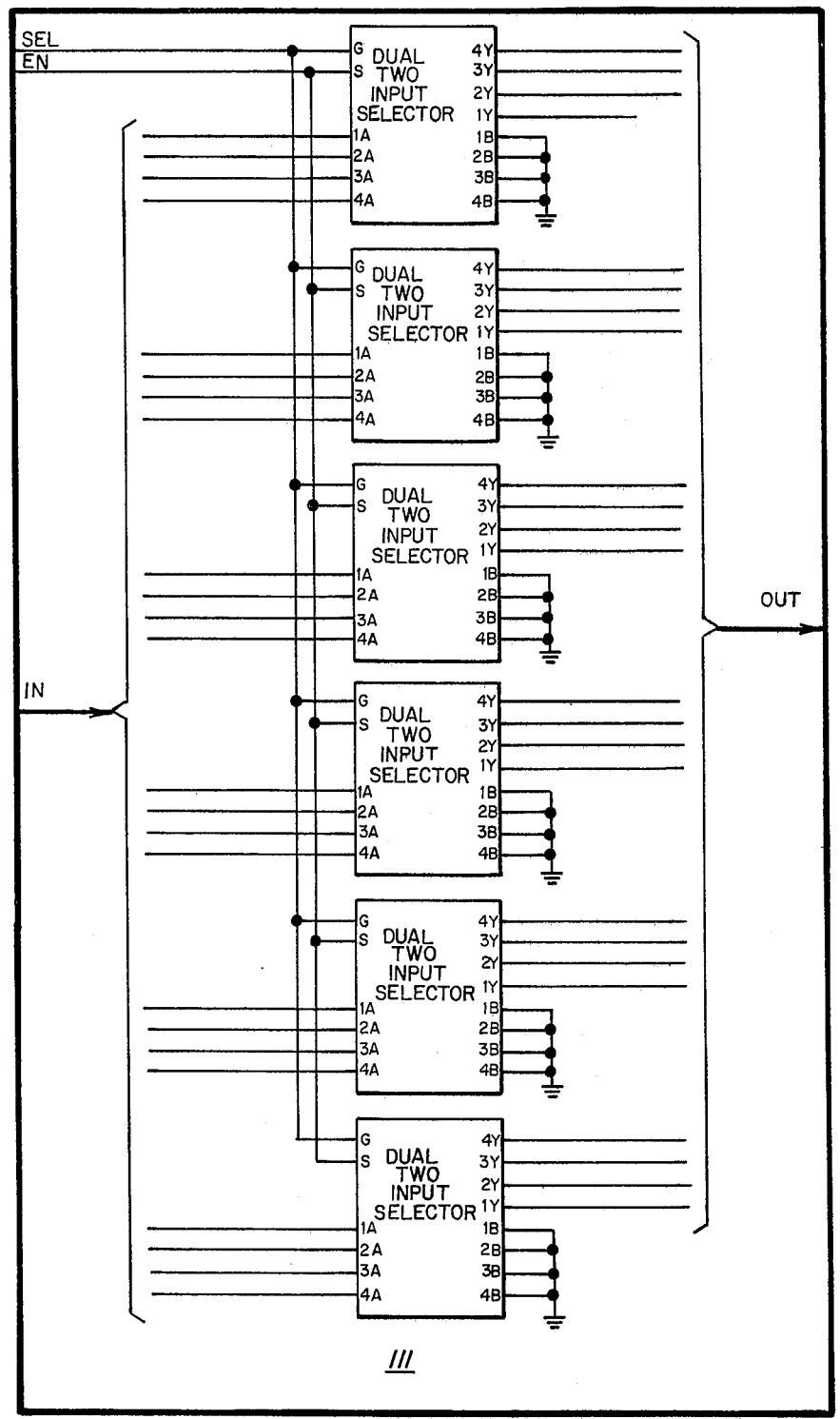
FIG. 42 is a logic diagram of the write control unit of FIG. 13.
Figure 43:
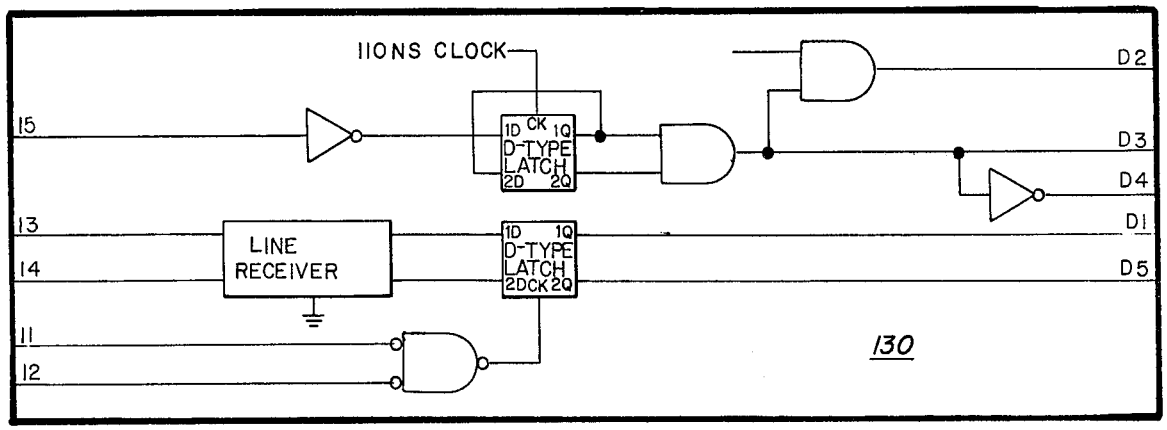
Figure 47:
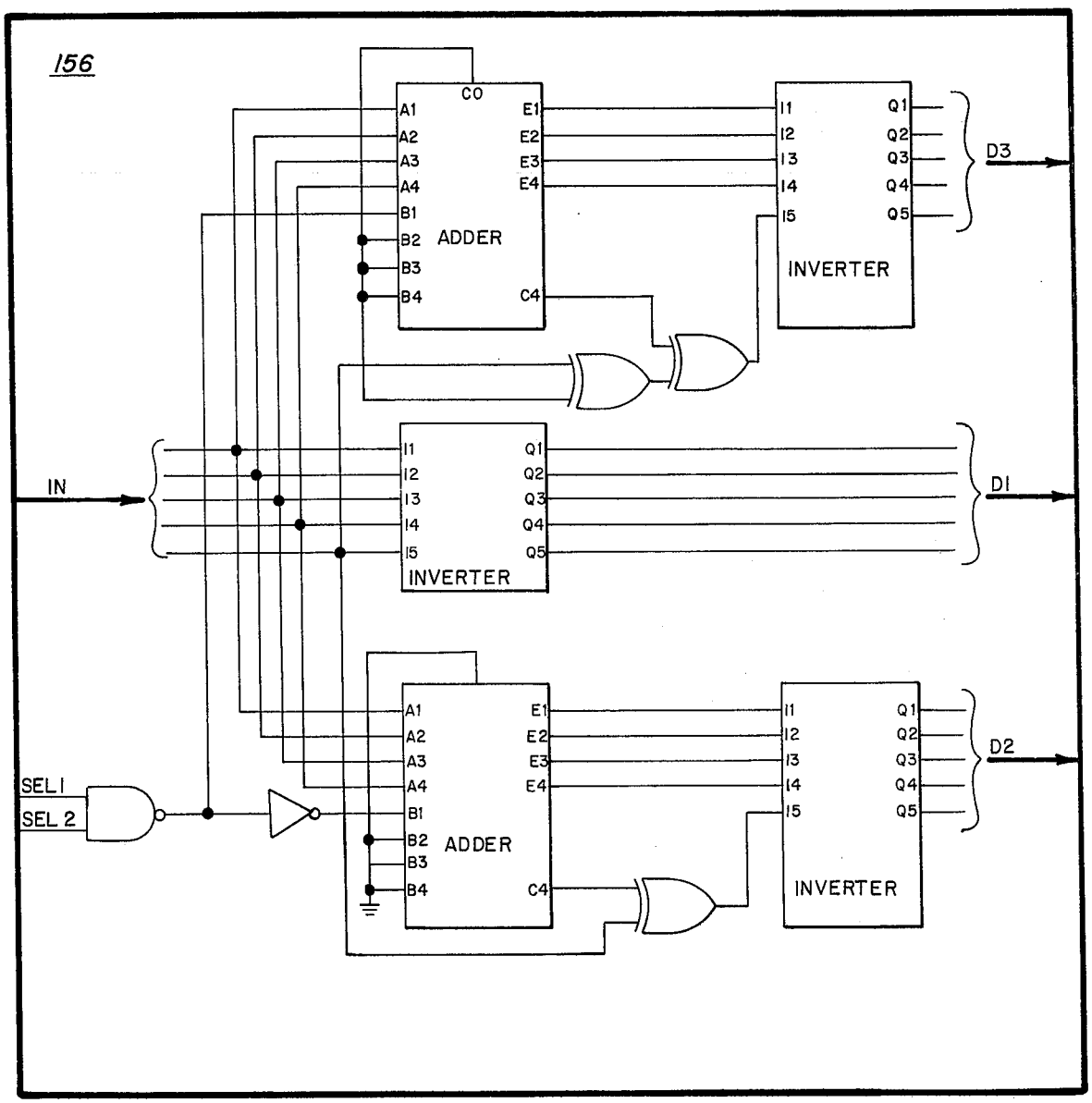
FIG. 47 is a logic diagram of the row count adder/selector unit of FIG. 14b.
Figure 45:
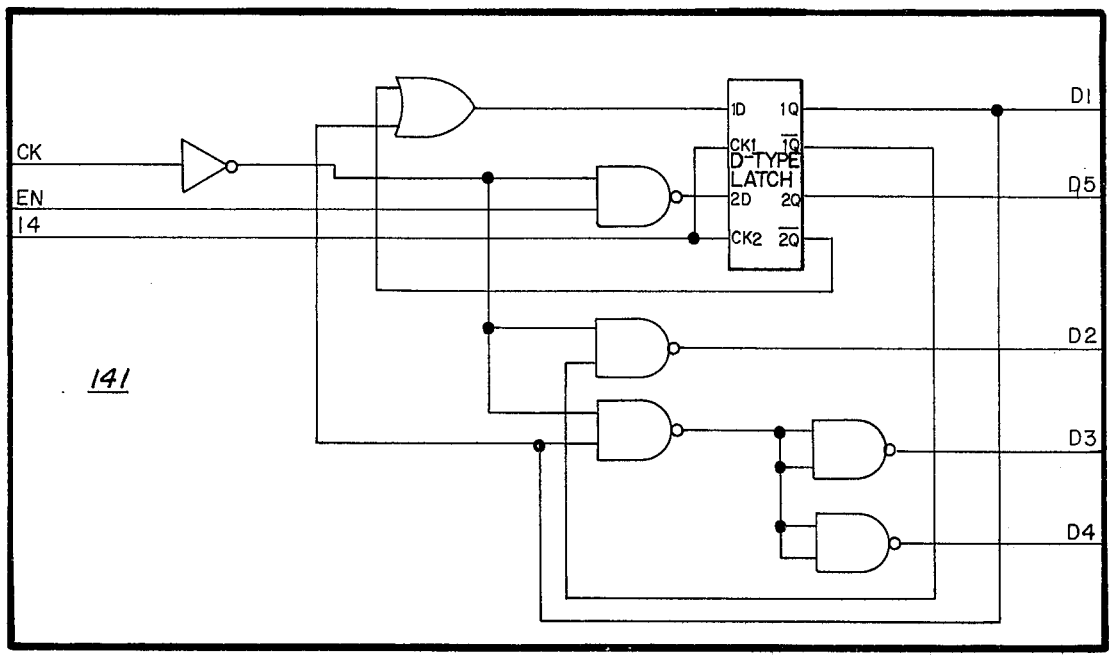
Figure 44:
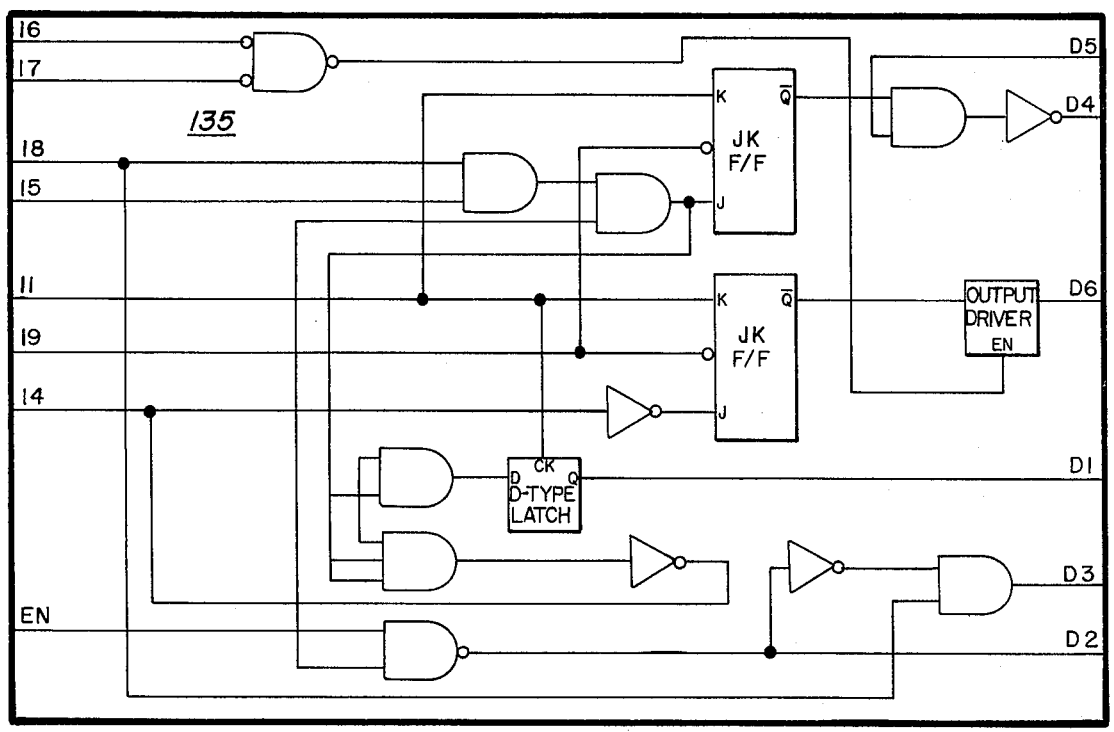
Figure 48:
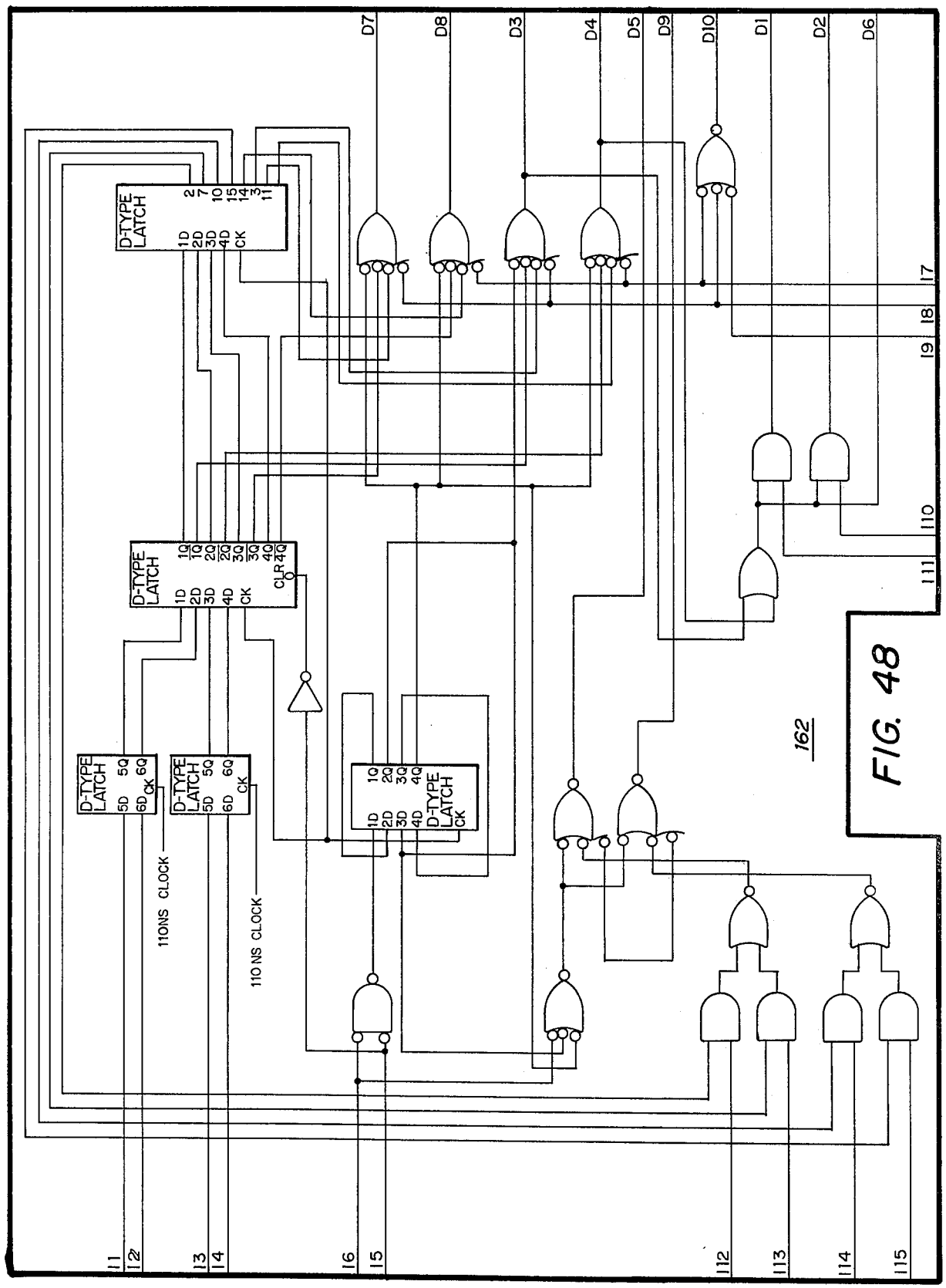
FIG. 48 is a logic diagram of the XY control logic unit of FIG. 14b.
Figure 49:
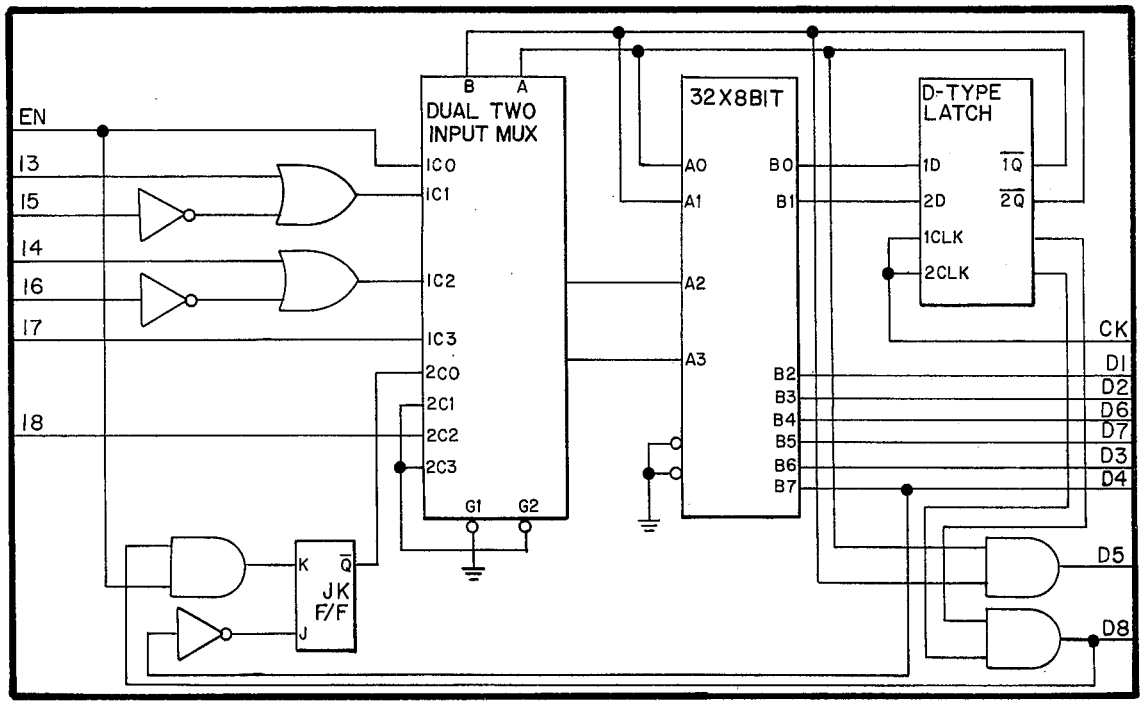
Figure 56:
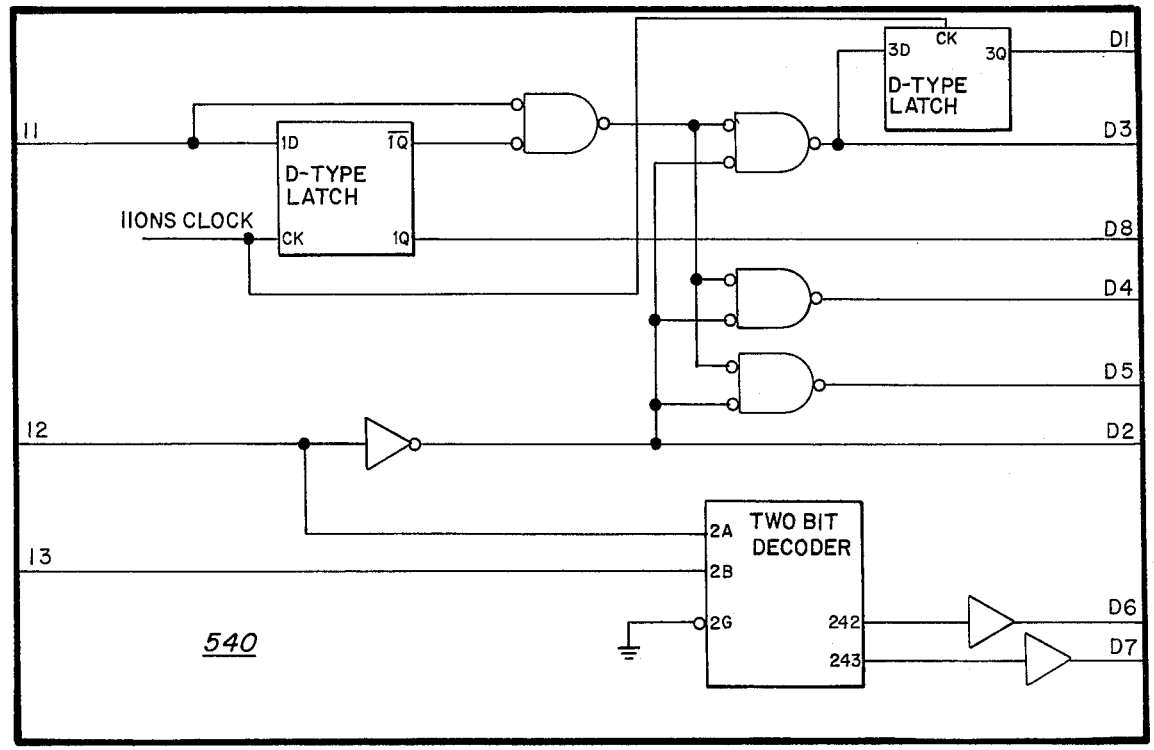
Figure 50:
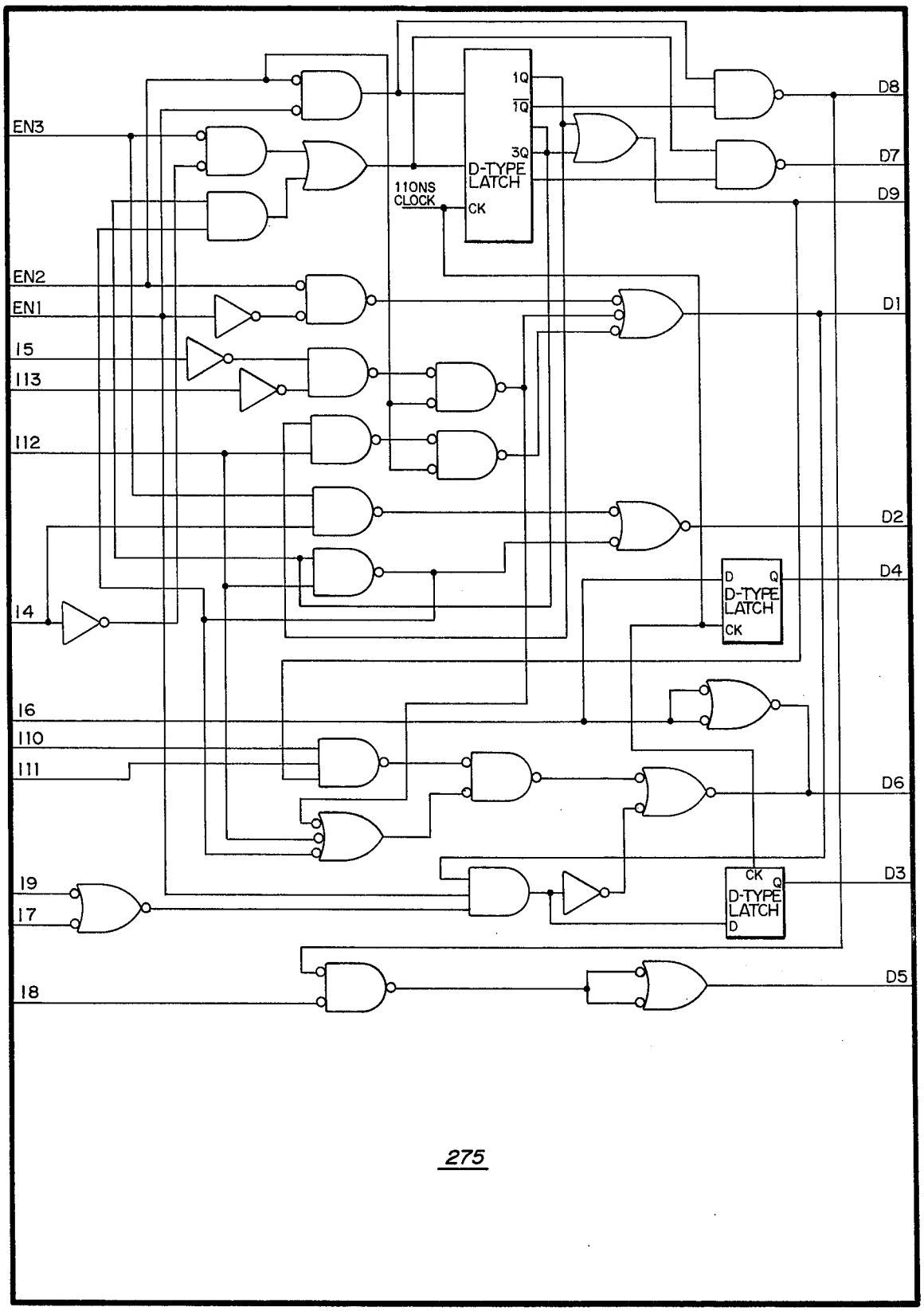
FIG. 50 is a logic diagram of the feature buffer control logic unit of FIG. 18b.
Figure 51:
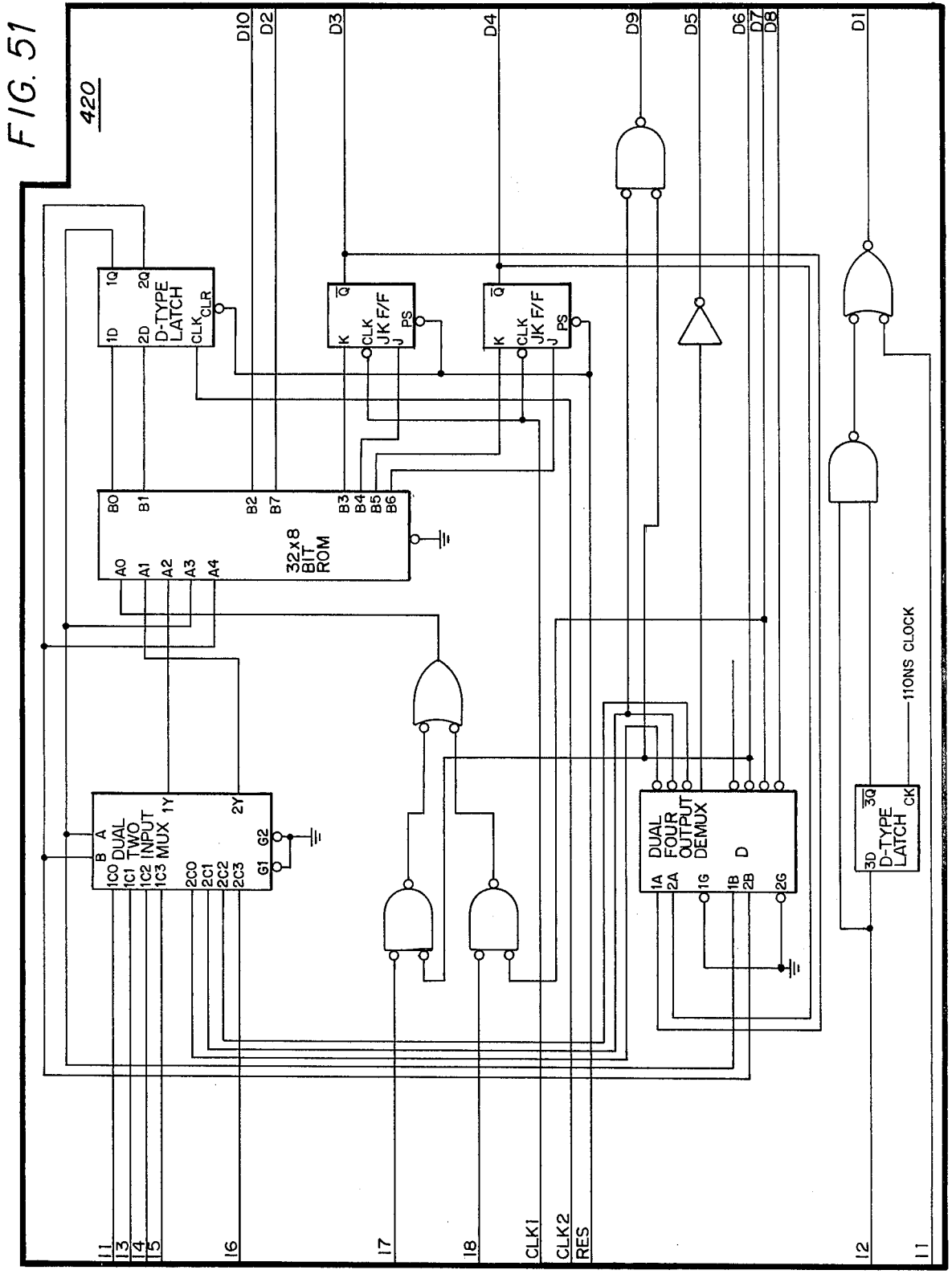
Figure 52:
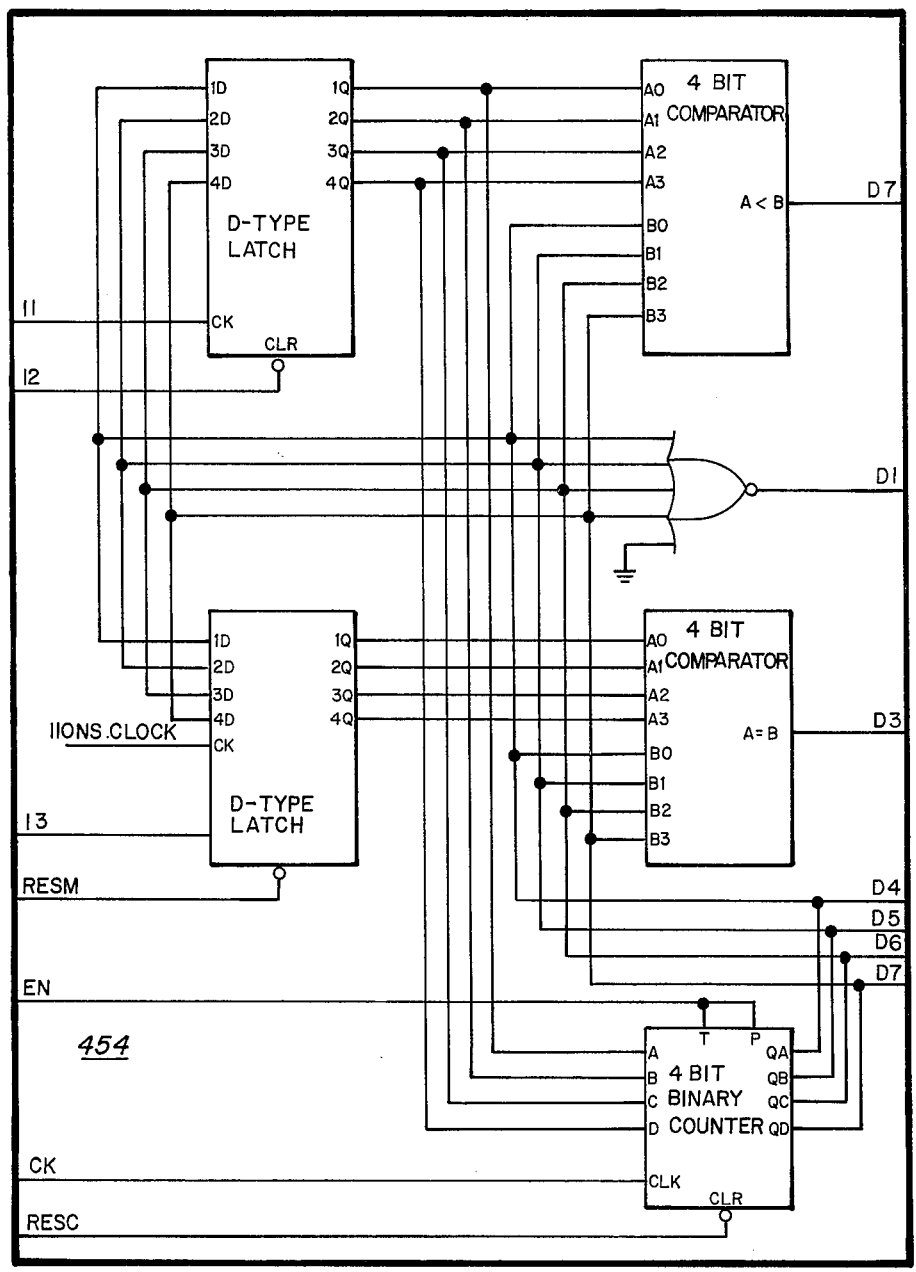
FIG. 52 is a logic diagram of the stop counter compare logic unit of FIG. 24b.
Figure 54:
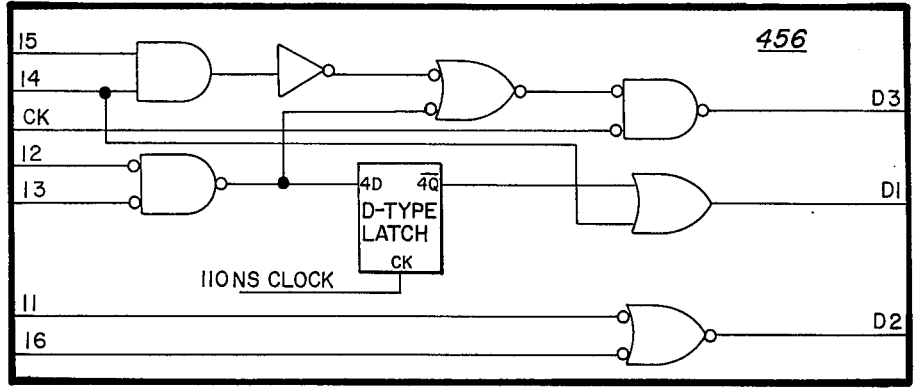
FIG. 54 is a logic diagram of the stop counter and memory control logic unit of FIG. 24b.
Figure 53:
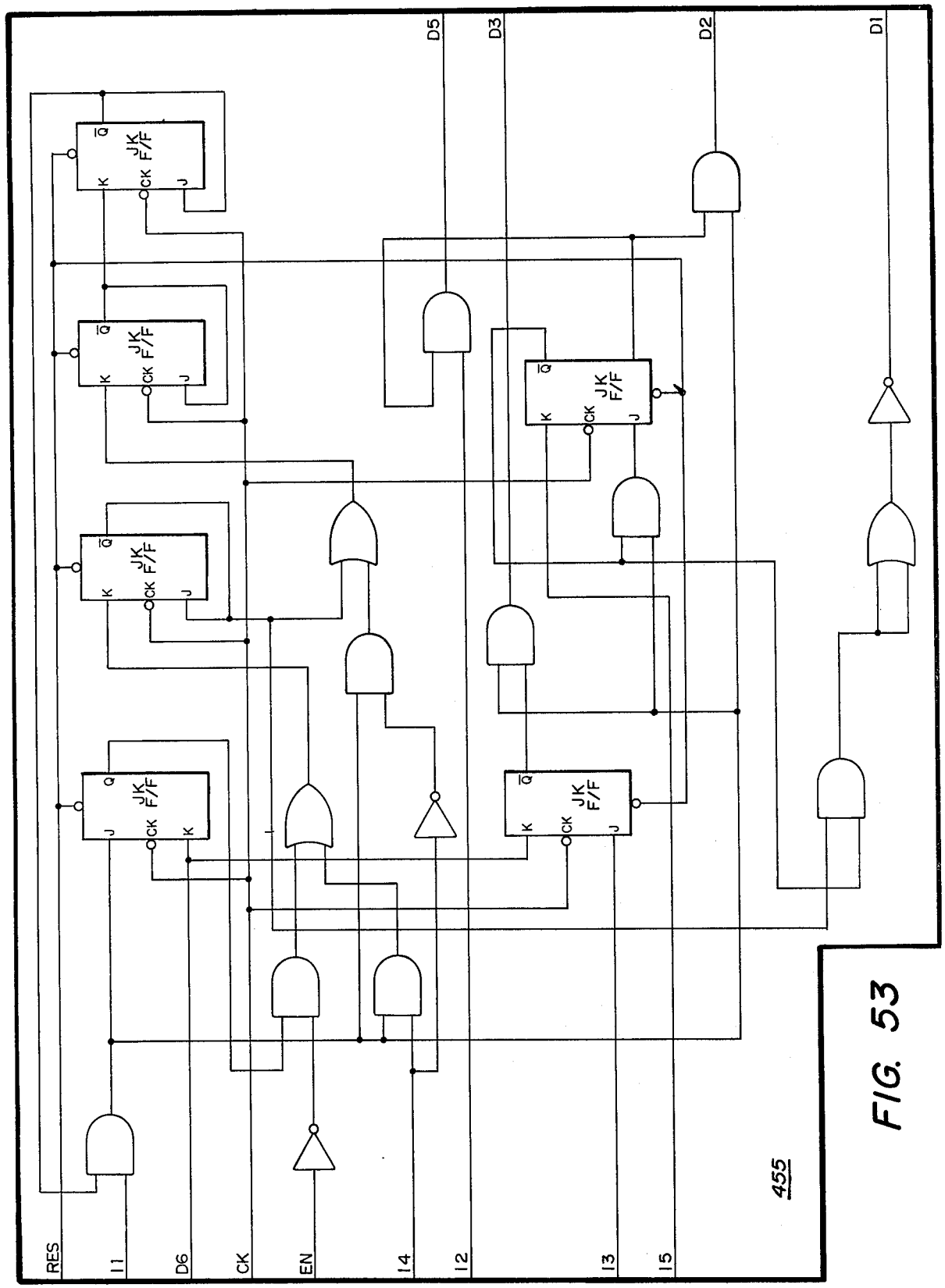
FIG. 53 is a logic diagram of the stop control logic unit of FIG. 24b.
Figure 55:
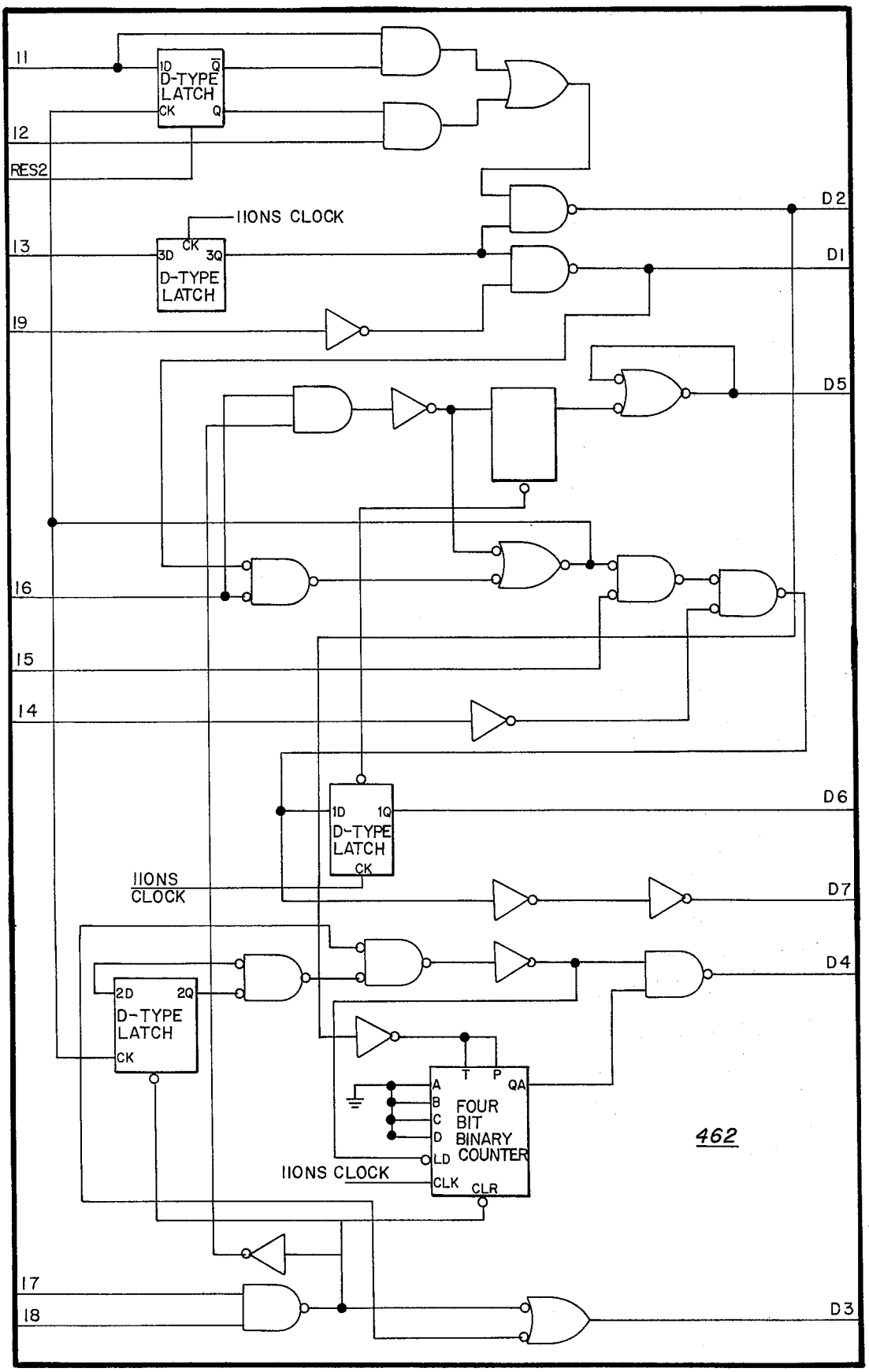
FIG. 55 is a logic diagram of the inflection control logic unit of FIG. 24c.
Figure 57:
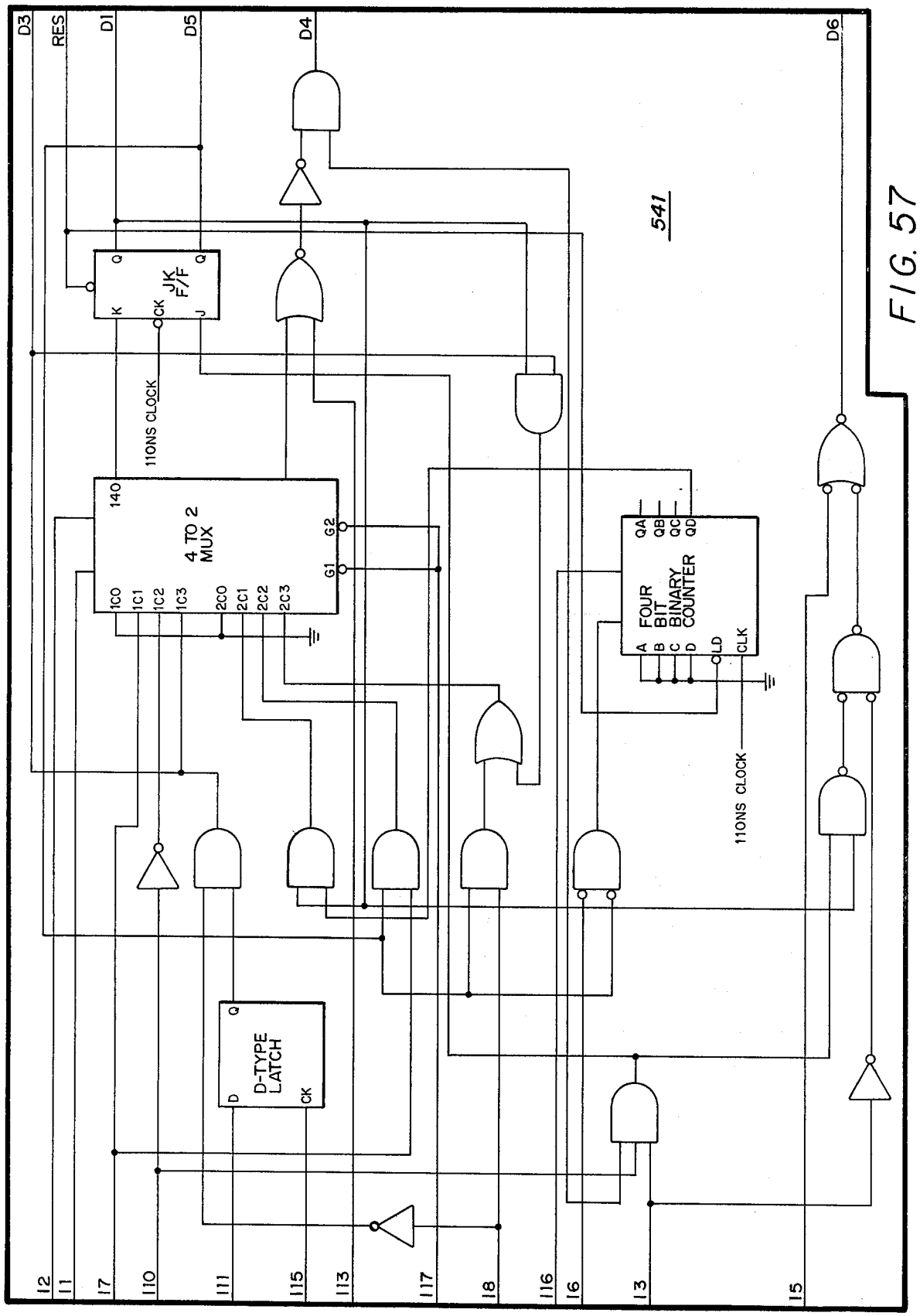
Figure 58:
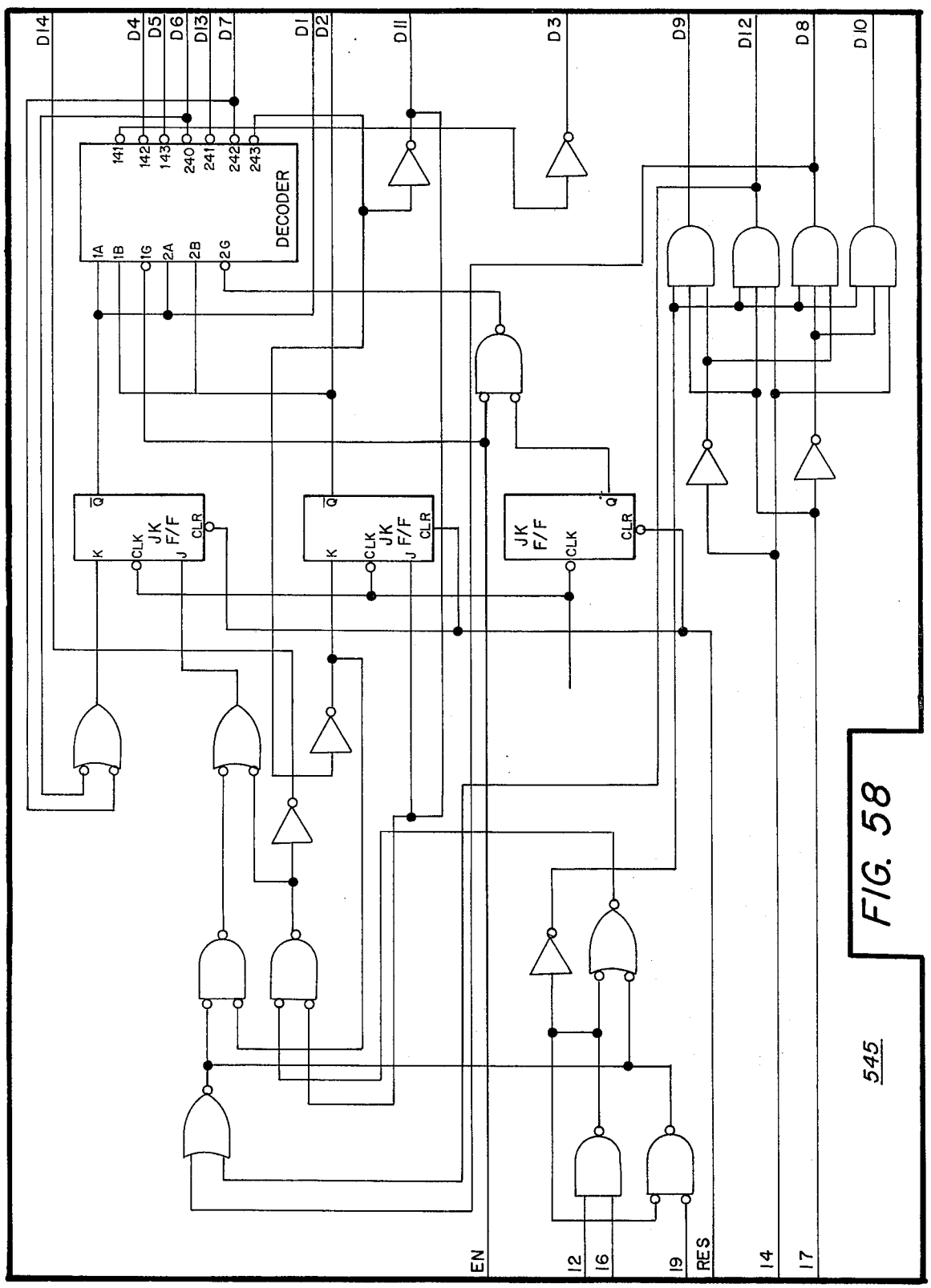
Figure 59:
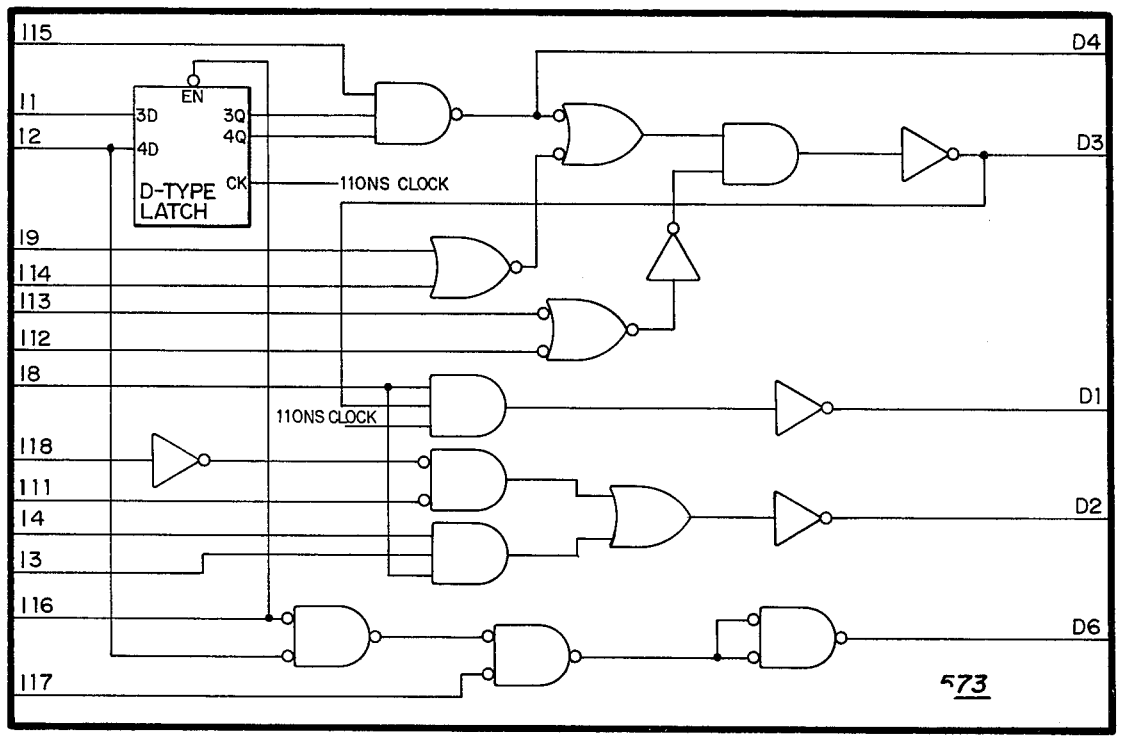
FIG. 59 is a logic diagram of the write memory control logic unit of FIG. 29b.
Figure 60:
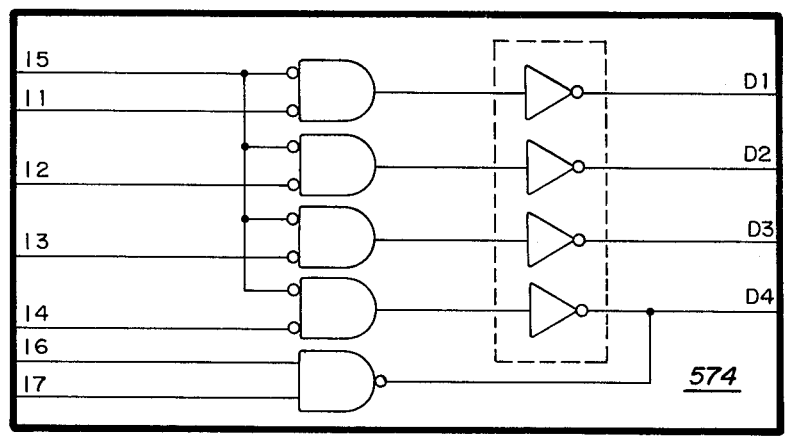
FIG. 60 is a logic diagram of the row/column counter control logic unit of FIG. 29b.
Figure 61:
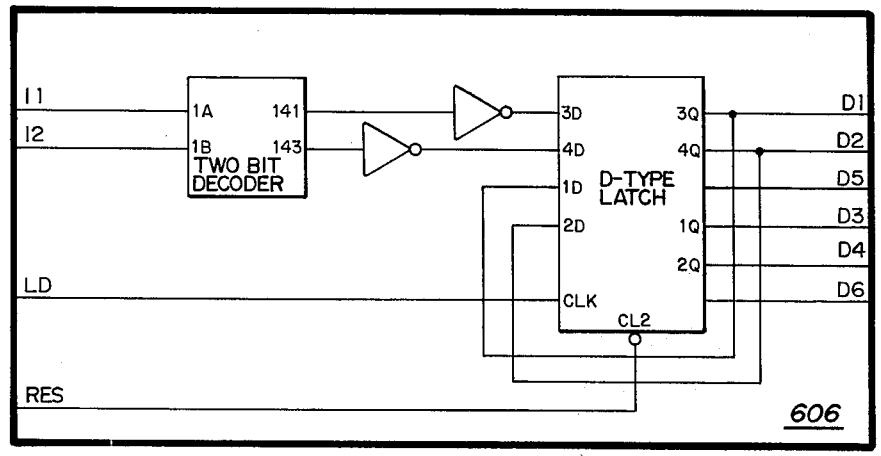
FIG. 61 is a logic diagram of the move control logic unit of FIG. 31.
Figure 62:
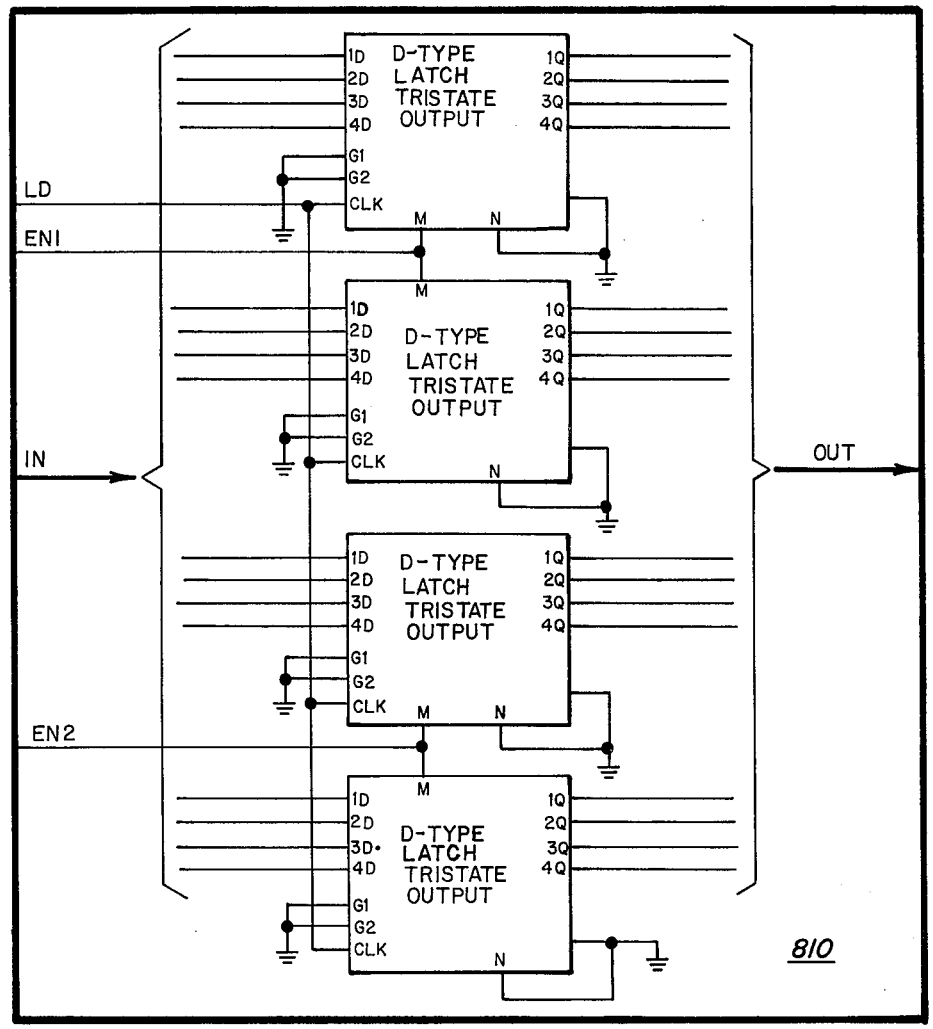
FIG. 62 is a logic diagram of the memory select logic unit of FIG. 38.
Figure 63:
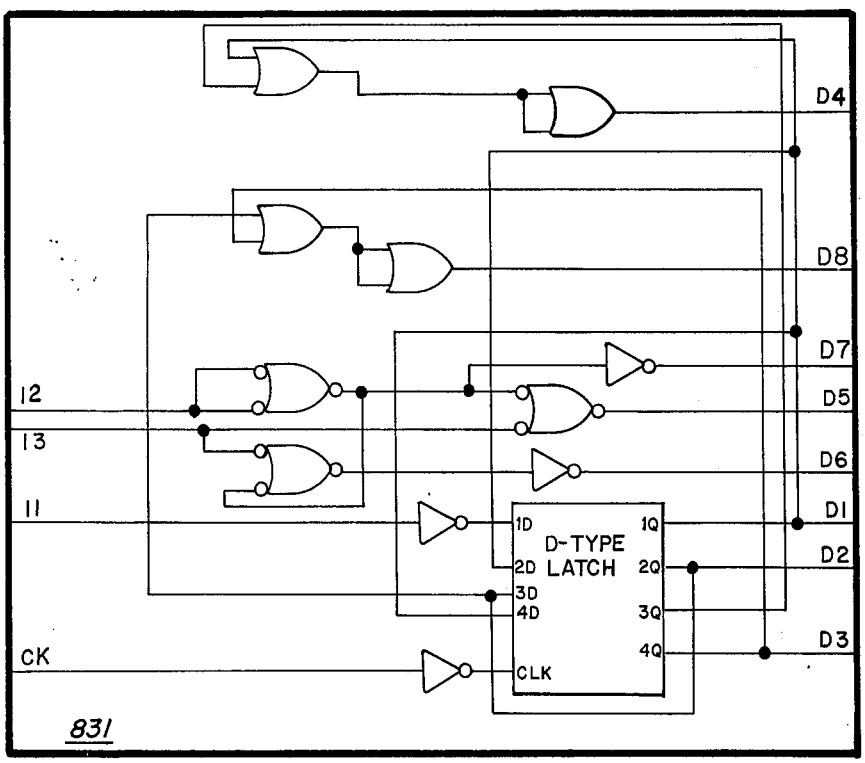
FIG. 63 is a logic diagram of the memory logic control unit of FIG. 38.

FIGS. 40 and 41

FIGS. 40 and 41 illustrate diagrammatically the binary images of the letter x and the numeral 9, respectively.

The operation of the feature derivation system herein described may further be understood from a description of the features detected in tracing the boundaries of the images illustrated in FIGS. 40 and 41. Referring to FIG. 40, a boundary search is initiated at boundary point 850 and proceeds in a clockwise direction about the outer boundary of the letter x. Upon completing the three boundary trace operations before described, the features listed in Table 9 are detected.

TABLE 9

Feature Data Table

| Character Pieces | Loops | Decimal Circumference Count/ Octal Slope Average Pairs | Boundary Limit Column Max/Min | Row Max/Min |
|---|---|---|---|---|
| 1 | 0 | 5–22 | 17/7 | 24/8 |
|   |   | 7–21 |   |   |
|   |   | 9–20 |   |   |
| Total Circumference Count |   | 10–17 | Stop Count | |
| 56 |   | 16–20 | 3 | |
|   |   | 17–21 |   |   |
| Total Number Vector Differences |   | 18–22 | Stop Slopes | |
| 27 |   | 19–23 | 2 | |
|   |   | 24–22 | 3 | |
| Inflections |   | 27–21 | 7 | |
| 6 |   | 28–22 |   |   |
|   |   | 29–23 | Stop Coordinates | |
| Slopes At Last Five |   | 31–24 | Column | Row |
| Inflection Points |   | 32–25 | 8 | 9 |
| 0 |   | 35–24 | 16 | 9 |
| 2 |   | 36–23 | 8 | 23 |
| 2 |   | 38–22 |   |   |
| 4 |   | 39–23 |   |   |
| 3 |   | 42–24 |   |   |
|   |   | 43–25 |   |   |
|   |   | 44–26 |   |   |
|   |   | 45–27 |   |   |
|   |   | 49–26 |   |   |
|   |   | 56–27 |   |   |
|   |   | 56–30 |   |   |
|   |   | 56–31 |   |   |
|   |   | 56–32 |   |   |

The character image of FIG. 40 is comprised of a single character piece having no loops. The boundary of the character image includes 56 boundary points. In tracing between the boundary points, 27 cell to cell vector differences were detected. As before described, a vector difference occurs when a difference between consecutive cell to cell vector values is detected in tracing between boundary points. The vectors describing the moves between boundary points are illustrated in FIG. 7a.

Six inflection points also are detected in the boundary trace. The boundary slopes at the last five of the inflection points detected are 0, 2, 2, 4, and 3. Further, the character image is comprised of three stops. The segment generally referred to by reference number 851 is too short to be counted a valid stop. The stop directions or slopes beginning with the stop arm of boundary point 850, and continuing in a clockwise manner are indicated by the numerals 2, 3 and 7. The stop directions may be determined by a visual inspection of FIG. 7a. The stop coordinates are determined by counting the columns from left to right and the rows from top to bottom. The boundary limits of the character image occur between columns 7 and 17, and rows 8 and 24. As the boundary trace proceeds in a clockwise manner from starting point 850, the slope averages are derived by adding the cell to cell vector value of a current boundary point to the three immediately preceding cell to cell vector values, and dividing the sum by four.

Referring to FIG. 41, the image of the numeral 9 is traced from a starting point 852 in a clockwise direction. In addition, the internal loop of the numeral 9 is traced in a counterclockwise direction from a starting point 853. Upon completing the three before described boundary trace operations, the features listed in Table 10 are detected.

TABLE 10

Feature Data Table

| Character Pieces | Loops | Decimal Circumference Count/Octal Slope Average Pairs | Boundary Limit Column Max/Min | Row Max/Min |
|---|---|---|---|---|
| 1 | 1 | 5–20 | 17/6 | 24/9 |
| Total Circumference Count |   | 9–21 |   |   |
|   |   | 11–22 |   |   |
| 46 |   | 23–23 | Stop Count | |
|   |   | 25–24 | 1 | |
| Total Number Vector Differences |   | 26–25 |   |   |
|   |   | 27–26 | Stop Slope | |
| 13 |   | 34–25 | 6 | |
|   |   | 36–24 |   |   |
| Inflections |   | 41–25 | Stop Coordinates | |
| 2 |   | 44–26 | Column | Row |
|   |   | 45–27 | 16 | 23 |
| Slopes At Last Five Inflection Points |   | 46–30 |   |   |
|   |   |   | Loop Circumference | |
| 0 |   |   | 16 | |
| 0 |   |   | Loop Coordinates | |
| 5 |   |   |   |   |
| 5 |   |   | Column Max/Min | Row Max/Min |
|   |   |   | 15/8 | 14/10 |

The binary image of the numeral 9 illustrated in FIG. 41 is comprised of a single character piece encompassing a single loop. The total circumference count of the outer boundary of the image is 46, and the total number of vector difference encountered in tracing the outer boundary is 13. Further, two inflection points were detected, each having a boundary slope of five. In addition, a single stop was detected which has a slope of six. The starting point for a trace of the stop arm is located at column 16 and row 23. In tracing the inner boundary defining the loop, a circumference count of 16 occurred. The loop is located between columns 8 and 15 and rows 10 and 14. The numeral 9 is located between columns 6 and 17 and rows 9 and 24.

The architecture of a preferred embodiment of the feature detection system herein disclosed has been described in detail as an integrated system in connection with the functional block diagram illustrated in FIG. 10. The functional blocks of FIG. 10 further have been described by detail functional block diagrams, logical flow diagrams and detailed timing diagrams. From such descriptions, a freedom of logical design is provided to one of ordinary skill in the art for tailoring the system to a client's requirements without a loss of reading reliability.

As before described, the architecture of the feature detection system herein disclosed lends itself to simplistic logic means. FIGS. 42–63 have been provided as illustrations of representative logic diagrams in accordance with the invention. A cross reference of the logic units illustrated in the Figures is listed in Table 11. It is to be understood, however, that any logic diagrams developed in accordance with the criteria set forth herein are suitable. As the function of each of the logic units as well as the inputs and outputs thereof have been described in detail, no further description is given.

TABLE 11

|  | FIG. |
|---|---|
| Write Control Logic Unit 111 | 42 |
| Command Control Logic Unit 130 | 43 |
| Timing Control Logic Unit 135 | 44 |
| Write Control Logic Unit 141 | 45 |
| Timing Control Logic Unit 154 | 46 |
| Row Count Adder Selector Unit 156 | 47 |
| XY Control Logic Unit 162 | 48 |
| Raster Scan Logic Unit 252 | 49 |
| Feature Buffer Control Logic Unit 275 | 50 |
| Boundary Trade Logic Control Unit 420 | 51 |
| Stop Counter Compare Logic Unit 454 | 52 |
| Stop Control Logic Unit 455 | 53 |
| Stop Counter And Memory Control Logic Unit 456 | 54 |
| Inflection Control Logic Unit 462 | 55 |
| Vector Enable Logic Unit 540 | 56 |
| Boundary Trace Termination Logic Unit 541 | 57 |
| Vector Control Logic Unit 545 | 58 |
| Write Memory Control Logic Unit 573 | 59 |
| Row/Column Counter Control Logic Unit 574 | 60 |
| Move Control Logic Unit 606 | 61 |
| Memory Select Logic Unit 810 | 62 |
| Memory Logic Control Unit 831 | 63 |

In accordance with the invention, there is provided a method and simplistic logic system for reliably detecting features of both handprinted and mutifont machine printed alphanumeric characters. The handprinted characters need only be nontouching. Further, the characters may be comprised of broken segments and may be of varying sizes. No normalization is required.

A binary image of each character is formed, and the image is scanned for boundary points satisfying a mark condition. Contour traces of both the outer boundary and inner loops of the image are initiated from such boundary points to obviate unnecessary redundancy. The image is thinned in one-cell layers as the image boundaries are traced to prevent substantial image distortion. Each boundary trace is comprised of stepwise moves between boundary points forming the image boundaries, and each move between image cells represented by one of eight equally divergent vectors. The vector values are averaged to form a sequence of slope values representative of an image boundary. Slope features including circumference counts, maximum and minimum image boundary limits, loops and inflection points are detected from the slope sequence.

The character image is thinned to a one-cell stroke width, and character stops and nodes are located. Each stop is traced to detect valid stops, and invalid stops are deleted at the node. The slope of each valid stop is determined to complete the feature set for character identification.

Having described the invention in connecting with certain specific embodiments thereof, it is to be understood that further modifications may now suggest themselves to those skilled in the art, and it is intended to cover such modifications as fall within the scope of the appended claims.

What is claimed is:

1. A method of detecting descriptive features of binary images of characters stored in a memory means formed from sensor cell responses generated by a sensor array scanning handprinted and multifont machine printed characters, which comprises:
    (a) generating first signals representing the outer boundaries and inner loops of said characters by a vector control means in communication with said memory means;
    (b) generating second signals which are vector representations of said boundaries by a trace control means receiving said first signals, each of said representations comprising one of a set of a plurality of equally divergent vectors;
    (c) generating a first set of indicia representative of said characters representing averages of selected sets of said second signals by said trace control means;
    (d) reducing each character to a one-cell stroke width by said vector control means and generating a second set of indicia representative of reduced ones of said characters from third signals produced by said vector control means tracing the outer boundary of said reduced ones.

2. A method of detecting primary features of both handprinted and multifont machine printed alphanumeric characters in an information field, which comprises:
    (a) storing said information field in a memory means to form binary images of said characters;
    (b) generating first signals forming a continuum for vectors representative of the outer boundaries and inner loops of said characters by a trace control means;
    (c) generating a set of boundary slope indicia from said first signals representative of said continuum of vectors by said trace control means;
    (d) generating a set of slope feature indicia representative of an average of selected ones of said set of boundary slope indicia by said trace control means;
    (e) reducing said binary images to a single cell width about the entire character by said vector control means; and
    (f) generating second signals forming a spatial set of indicia representative of a boundary trace of reduced ones of said binary images by said trace control means.

3. A method of detecting features of a character within a binary image formed by passing a sensor array through registration with either a handprinted or a machine printed character and stored in a memory means, which comprises:
    (a) scanning said memory means to detect a first boundary point of said character by a scan control means;
    (b) tracing from said first boundary point to successive boundary points of outer boundaries and inner loops of said character in stepwise moves by a vector control means which generates first signals according to said stepwise moves;
    (c) accumulating a trace count of cell to cell moves taken during a boundary trace by a trace control means;
    (d) comparing said trace count to an outer boundary threshold count and an inner loop threshold count by said trace control means;
    (e) if said trace count is at least equal to said outer boundary threshold count or said inner loop threshold count, generating second signals forming a vector set representative of said cell to cell moves by said trace control means;
    (f) generating boundary slope indicia as a function of said second signals by said trace control means;
    (g) generating third signals comprising a slope feature set representative of detected characteristics in said boundary slope indicia by said trace control means;

(h) removing selected boundary points from said character in said memory means to form a reduced character having a one-cell stroke width by said vector control means;

(i) tracing said reduced character in said memory means and generating a spatial set of indicia representative of the occurrence of stops and nodes of said reduced character by said trace control means;

(j) tracing each of said stops of said reduced character and counting the number of cell to cell moves as a measure of stop length by said trace control means;

(k) removing those of said stops having a stop length less than a predetermined stop threshold count by said vector control means; and (l) generating fourth signals comprising a set of stop slope indicia representative of the direction of each of said stops in said memory having a stop length at least equal to said stop threshold count by said trace control means.

4. A method of detecting primary features of an unnormalized and multi-pieced binary character image comprising characters stored in a memory mosaic, which comprises:

(a) scanning said mosaic for a black cell with a white cell to its immediate left to locate an end of scan boundary point of each character satisfying a mark condition by a scan control means;

(b) generating a boundary trace of said character in stepwise moves from said end of scan boundary point by a vector control means;

(c) accumulating a count of cell to cell moves during said boundary trace in a counter, and comparing row and column coordinates of each boundary point encountered to detect maximum and minimum coordinates of said image in a trace control means;

(d) thinning said image in one-cell layers and marking boundary points encountered during said boundary trace which satisfy said mark condition by said vector control means;

(e) upon the occurrence of a boundary point satisfying an end of trace condition, scanning said mosaic by said scan control means from a last end of scan boundary point to detect a next end of scan boundary point as represented by an unmarked boundary point satisfying said mark condition;

(f) repeating steps (b) through (e) until no unmarked boundary points satisfying said mark condition are detected;

(g) if said count is at least equal to a character piece threshold count or an inner loop threshold count, generating first signals comprising a vector set representative of said stepwise moves;

(h) generating second signals forming slope indicia as averages of those members of said first signals representative of said cell to cell moves;

(i) generating third signals comprising slope feature indicia representative of said second signals;

(j) thinning said character to a one-cell stroke width, and tracing said character to detect stops and nodes by said vector control means;

(k) vertically ordering and tracing each of said stops by said trace control means;

(l) comparing a stop count of cell to cell moves encountered in tracing each of said stops with a threshold stop count by said vector control means; and (m) generating fourth signals comprising stop slope indicia representative of those of said stops having a stop count at least equal to said threshold stop count.

5. A system for detecting primary features of binary images of both handprinted and multifont machine printed aliphanumeric characters, which comprises:

(a) data control logic means responsive to electrical signals from independent sources to activate said system;

(b) plural image memory means in electrical communication with said data control logic means for storing said binary images;

(c) coordinate control logic means responsive to said data control logic means for controlling the loading of said binary images into said plural image memory means;

(d) scan control logic means responsive to said coordinate control logic means for scanning said binary images to detect a boundary point of a character satisfying a mark condition;

(e) trace enable logic means responsive to said scan control logic means for synchronizing boundary trace and feature data formatting operations;

(f) vector control logic means responsive to said trace enable logic means for tracing outer boundary and inner loops of said character and thinning said character to a one cell thickness, said vector control logic means including first means for generating vector representations of said outer boundary and inner loops, said trace enable logic means including second means responsive to said vector representations for averaging selected sets thereof to form vector averages;

(g) logic detector means in electrical communication with said vector control logic means for detecting the presence of character pieces and loops in said characters; and (h) feature memory means responsive to said scan control logic means for storing said primary features including said vector averages for character recognition.

6. The combination set forth in claim 5, wherein each of said plural image memory means includes:

(a) a column count decoder in electrical communication with said coordinate control logic means for identifying one of plural memory columns;

(b) write control logic means responsive to said coordinate control logic means and in electrical communication with said column count decoder for enabling selected ones of said plural memory columns;

(c) row count means in electrical communication with said coordinate control logic means for enabling plural memory rows singularly; and (d) memory means responsive to said write control logic means and said row count means for storing said binary images.

7. The combination as set forth in claim 5 including third means for detecting boundary points satisfying a stop condition and determining the length of each stop and means for comparing the length of said stop with a threshold value.

8. A feature detection system for isolating character features occurring in characters contained within a binary data stream, which comprises:

(a) memory control logic means responsive to an independent source for circulating said data stream in said system;

(b) three memory plane means in electrical communication with said memory control logic means for forming three two-dimensional images including characters within said data stream;

(c) coordinate control logic means responsive to said memory control logic means for storing said data stream in said three memory plane means;

(d) marker memory means in electrical communication with said coordinate control logic means for marking those cells of each character of said three memory plane means satisfying a mark condition;

(e) raster scan control logic means responsive to said coordinate control logic means for generating a raster scan of said three memory plane means to locate said character;

(f) logic detector means in electrical communication with said three memory plane means for detecting outer boundaries and inner loops of said characters;

(g) vector control logic means in electrical communication with said logic detector means and said coordinate control logic means for tracing said inner loops and said outer boundaries;

(h) trace control means in electrical communication with said raster scan control logic means and said vector control logic means for synchronizing boundary trace and feature formatting operations; and (i) feature memory means responsive to said coordinate control logic means and said raster scan control logic means for storing said character features.

9. A system for detecting features of a character stored within a binary memory comprising:

(a) a memory scanning means connected to said memory for locating one point on each boundary of said character therein, said character having at least one boundary;

(b) a first tracing means connected to said memory for determining a vector indicative of the slope of each boundary of said character between all adjacent points thereon by tracing each boundary;

(c) an averaging means responsive to said first tracing means forming vector averages, each vector average representing the average of a certain number of vectors produced for consecutive points;

(d) thinning means connected to said memory and responsive to said first tracing means tracing all boundaries for reducing said character to a reduced character having a single point width by removing portions of said character within said memory;

(e) a second tracing means for tracing a boundary of said reduced character;

(f) stop means connected to said second tracing means locating stops on said reduced character for determining the length thereof;

(g) threshold means connected to said stop means for removing any stop having a length less than a certain length from said memory; and (h) node means connected to said second tracing means for locating nodes within said reduced character.

10. System for detecting features as set forth in claim 9 includes storage means connected to said vector averaging means, said stop means, and said node means for storing vector averages, and locations of each stop and each node in a specific format.

11. A system for detecting features of a character stored within a binary memory, said binary memory comprising a plurality of cells with at least some cells containing binary character information representing said character, said character having at least one boundary, the one boundary comprising an outer boundary, any other boundaries being inner loops, comprising:

(a) means for scanning said memory to locate at least one cell in said memory containing character information on each boundary;

(b) means for producing vectors representative of the slope between adjacent cells containing character information on each boundary by tracing each boundary in response to said means for scanning locating said one cell thereof;

(c) means for averaging said vectors received from said means for producing to form vector averages;

(d) thinning means for reducing said character by removing selected portions of character information within said cells of said memory to form a reduced character having a one cell width;

(e) stop means in electrical communication with said memory for locating stops on said reduced character and determining the length thereof;

(f) threshold means for removing character information from said cells representing any stop having a length less than a certain predetermined length; and (g) a node means for locating cells containing character information representing a portion of said reduced character having more than two adjacent cells containing character information.

12. A system for detecting features of a character stored within a binary memory, said binary memory comprising a plurality of cells with at least some cells containing binary information representing said character, said character having at least one boundary, the one boundary comprising an outer boundary, any other boundaries being inner loops, comprising:

(a) scanning means connected to said memory for locating at least one cell in said memory containing information on each boundary;

(b) vector means connected to produce vectors representative of the slope between adjacent cells containing information concerning said character located on each boundary by tracing each boundary in response to said scanning means locating said one cell thereof;

(c) averaging means connected to average a certain number of consecutive vectors received from said vector means to form a set of vector averages for each boundary and;

(d) inflection means connected to compare consecutive vector averages of said set for locating inflection points from differences between consecutive vector averages of said set by signaling when a difference of one sign is followed by a difference of opposite sign.

13. System as set forth in claim 12 including:

(a) thinning means connected to said memory for reducing said character by removing portions of information concerning said character within said cells to form a reduced character having a one cell width;

(b) stop means in electrical communication with said memory for locating stops on said reduced character to determine the length thereof;

(c) threshold means connected to said stop means and said memory for removing from said cells portions of said reduced character representing any stop having a length less than a certain predetermined length to a node; and (d) a node means in electrical communication with said memory for locating cells containing a portion of said reduced character having more than two adjacent cells containing information concerning said reduced character.

14. A system for detecting features of a character stored within a binary memory, said binary memory comprising a plurality of cells with at least some cells containing binary information representing said character, said character having at least one boundary comprising:

(a) means for scanning said memory to locate at least one cell in said memory on each boundary of said character;

(b) vector means producing vectors representative of the slope between adjacent cells on each boundary by tracing successively from cell to cell about each boundary in response to said means for scanning locating said one cell on each boundary;

(c) means for averaging said vectors received from said vector means to form a set of vector averages, each vector average representing the average of a certain number of successive vectors;

(d) difference means for determining the difference between successive vector averages;

(e) inflection means receiving differences from said difference means to locate inflections by the occurrence of a difference of one sign followed by a difference of opposite sign;

(f) thinning means for reducing said character by removing selected portions thereof within said cells of said memory to form a reduced character having a one cell width;

(g) stop means in electrical communication with said memory for locating stops on said reduced character and determining the length thereof;

(h) means connected to said stop means for removing from said cells portions of said reduced character representing any stop having a length less than a certain predetermined length; and (i) a node means for locating cells containing a portion of said reduced character having more than two adjacent cells containing a portion of said reduced character.

* * * * *